United States Patent
Datinska et al.

(10) Patent No.: US 12,153,013 B2
(45) Date of Patent: Nov. 26, 2024

(54) DETECTION METHODS FOR EPITACHOPHORESIS WORKFLOW AUTOMATION

(71) Applicant: Roche Sequencing Solutions, Inc., Pleasanton, CA (US)

(72) Inventors: Vladimira Datinska, Pleasanton, CA (US); Frantisek Foret, Brno (CZ); Ivona Voracova, Brno (CZ); Jaeyoung Yang, Pleasanton, CA (US)

(73) Assignee: Roche Sequencing Solutions, Inc., Pleasanton, CA (US)

( * ) Notice: Subject to any disclaimer, the term of this patent is extended or adjusted under 35 U.S.C. 154(b) by 825 days.

(21) Appl. No.: 17/281,934

(22) PCT Filed: Oct. 14, 2019

(86) PCT No.: PCT/EP2019/077714
§ 371 (c)(1),
(2) Date: Mar. 31, 2021

(87) PCT Pub. No.: WO2020/074742
PCT Pub. Date: Apr. 16, 2020

(65) Prior Publication Data
US 2021/0382002 A1    Dec. 9, 2021

Related U.S. Application Data

(60) Provisional application No. 62/744,984, filed on Oct. 12, 2018.

(51) Int. Cl.
*G01N 27/447*    (2006.01)
*G01J 5/00*    (2022.01)
*G01N 21/64*    (2006.01)
*H04N 5/33*    (2023.01)

(52) U.S. Cl.
CPC ...... *G01N 27/44726* (2013.01); *G01J 5/0003* (2013.01); *G01N 21/6456* (2013.01);
(Continued)

(58) Field of Classification Search
CPC .................................. G01N 27/44717–44734
See application file for complete search history.

(56) References Cited

U.S. PATENT DOCUMENTS 3,640,813 A * 2/1972 Nerenberg ....... G01N 27/44704
204/615
3,915,822 A 10/1975 Veltman
(Continued)

FOREIGN PATENT DOCUMENTS

JP    613041 A * 1/1986 ............. G01N 27/26
WO    2019092269 A1    5/2019

OTHER PUBLICATIONS

Edward Southern, "Gel Electrophoresis of Restriction Fragments," Chapter 9, pp. 152-176, in Methods of Enzymology, vol. 68, Academic Press, 1979 (Year: 1979).*
(Continued)

*Primary Examiner* — Alexander S Noguerola
(74) *Attorney, Agent, or Firm* — Kilpatrick Townsend and Stockton LLP

(57) ABSTRACT

The present disclosure generally relates to systems comprising devices for effecting epitachophoresis and sample detection and methods of using such systems. Epitachophoresis may be used to effect sample analysis, such as by selective separation, detection, extraction, and/or pre-concentration of target analytes such as, for example, DNA, RNA, and/or other biological molecules. Sample detection may be used to trigger automated target analyte collection. Said target ana-
(Continued)

lytes may be used for desired downstream applications and further analysis.

17 Claims, 35 Drawing Sheets

Specification includes a Sequence Listing.

(52) U.S. Cl.
CPC ..... *G01N 21/6486* (2013.01); *G01N 27/4473* (2013.01); *G01N 27/44791* (2013.01); *H04N 5/33* (2013.01); *G01J 2005/0077* (2013.01)

(56) References Cited

U.S. PATENT DOCUMENTS

| | | | |
|---|---|---|---|
| 5,298,139 A | * | 3/1994 | Huang ............... G01N 27/4473 204/603 |
| 2011/0247935 A1 | * | 10/2011 | Dhawan ........... G01N 27/44704 204/645 |
| 2016/0251763 A1 | | 9/2016 | Benedetto |

OTHER PUBLICATIONS

USPTO English language translation of Jiro Tokida et al. JP 61003041 A, published Jan. 9, 1986 (Year: 1986).*

Fernando Acevedo, "Isotachophoresis of Proteins," Journal of Chromatography, 470 (1989) 407-414 (Year: 1989).*

Foret F et al., Macrofluidic Device for Preparative Concentration Based on Epitachophoresis, Analytical Chemistry, (2019), pp. 7047-7053, vol. 91 Issue 11.

International Search Report and Written Opinion for PCT/EP2019/077714, Filed Oct. 14, 2019 and ISR Issued Jan. 31, 2020.

Muller O et al., Design of a High-Precision Fraction Collector for Capillary Electrophoresis, Analytical Chemistry, (1995), pp. 2974-2980, vol. 67 Issue 17.

Smejkal, P et al., Microfluidic isotachophoresis: A review, Electrophoresis, (2013), pp. 1493-1509, vol. 34 Issue 11.

* cited by examiner

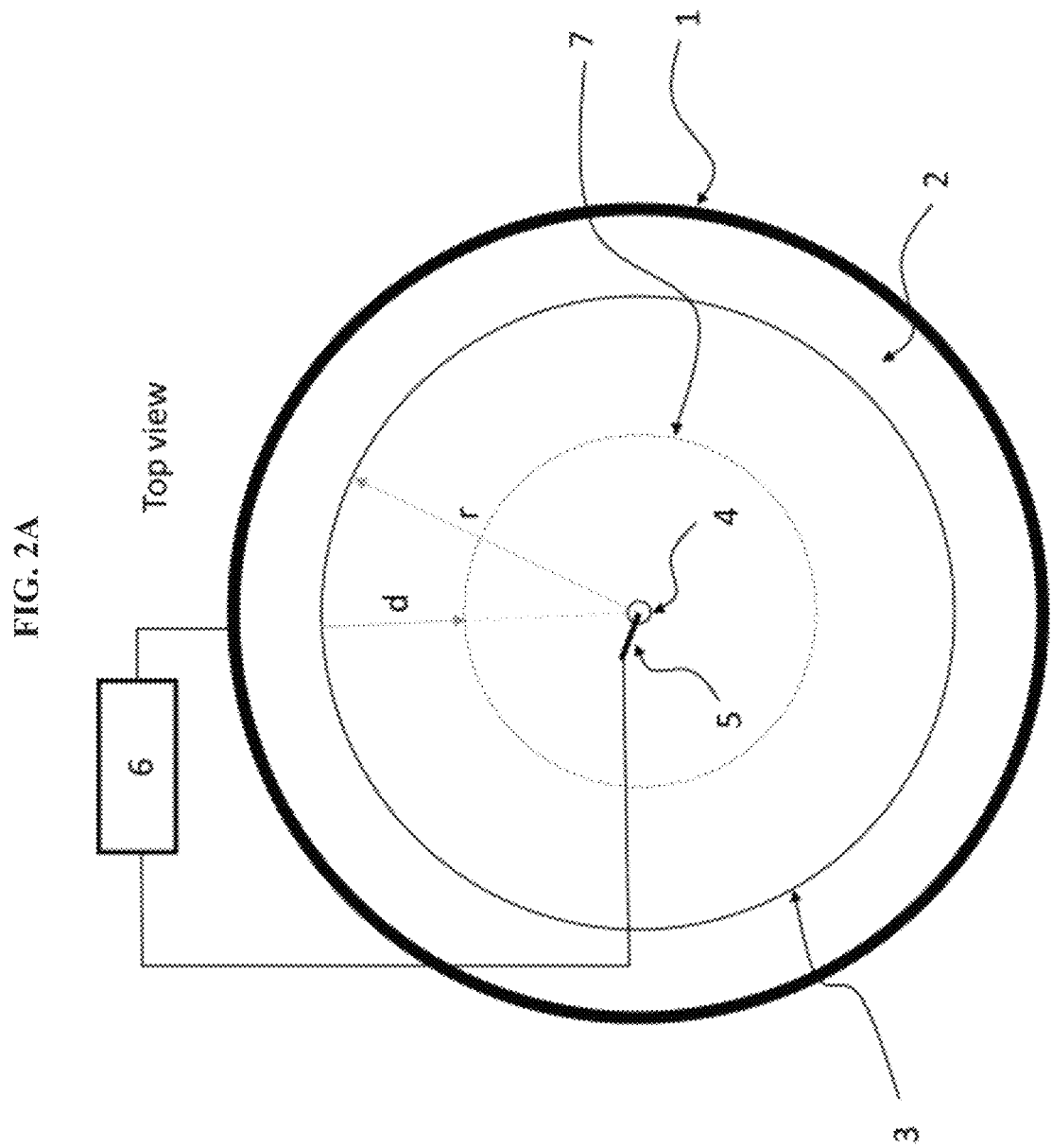

SEPARATION AT CONSTANT VOLTAGE

Equivalent electric circuit

SEPARATION AT CONSTANT POWER

Equivalent electric circuit

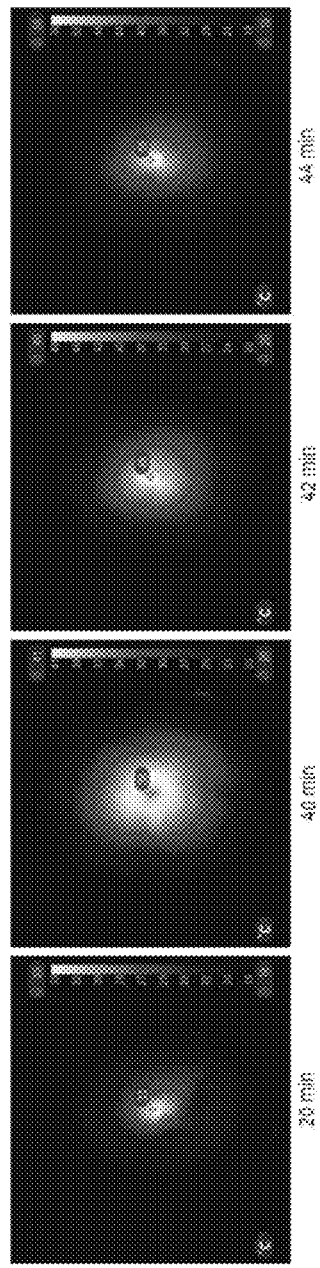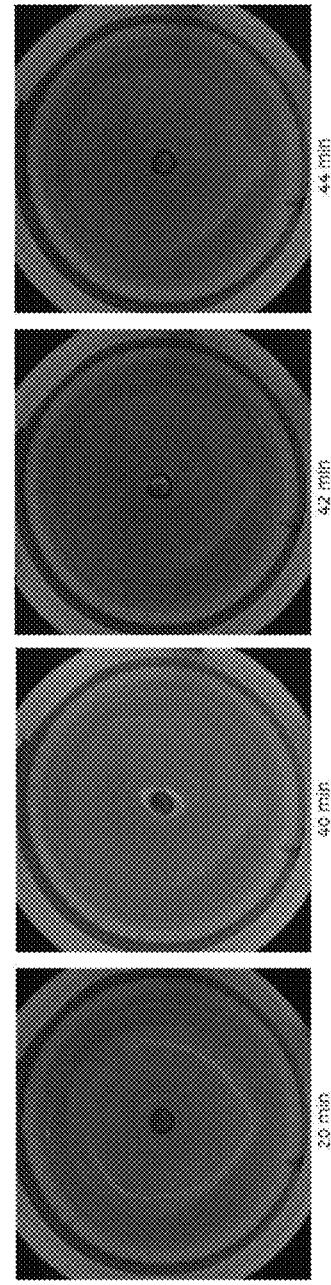
FIG. 20A
FIG. 20B

SEQUENCE LISTING

```
<160> NUMBER OF SEQ ID NOS: 1

<210> SEQ ID NO 1
<211> LENGTH: 18
<212> TYPE: DNA
<213> ORGANISM: Artificial Sequence
<220> FEATURE:
<223> OTHER INFORMATION: Single Stranded

<400> SEQUENCE: 1
aatcccaatc ccaatccc                                                18
```

DETECTION METHODS FOR EPITACHOPHORESIS WORKFLOW AUTOMATION

FIELD OF THE INVENTION

The present disclosure generally relates to the field of electrophoresis, and more particularly to sample analysis by selective separation, detection, extraction, and/or (pre-) concentration of samples such as, for example, biological samples, through systems, devices and methods for epitachophoresis and sample detection, e.g., automated detection methods.

BACKGROUND

Electrophoresis approaches have long been used in the separation and analysis of samples for a variety of purposes, such as for identifying a particular substance or for determining the size and type of molecules in a solution. For example, a variety of molecular biology applications have employed electrophoresis to separate proteins or nucleic acids, determine molecular weight, and/or prepare samples for further analysis. In these and other applications, electrophoresis generally involves the movement of an electrically-charged substance (e.g., molecules or ions) under the influence of an electric field. This movement can facilitate the separation of a sample from other samples or substances. Once separated, the sample may readily be analyzed using an optical or other approach.

A variety of electrophoresis-based approaches are typically used in connection with different applications depending on the particular needs of the analysis to be performed. For example, isotachophoresis ("ITP") is a concentration and separation technique which leverages electrolytes with different electrophoretic mobility to focus and, in some cases, separate ionic analytes into distinct zones ("focused zones"). In ITP, analytes simultaneously focus and separate between high effective mobility leading electrolyte ("LE") ions and low effective mobility trailing electrolyte ("TE") ions. The balance of electromigration and diffusion at the zone boundaries in ITP typically results in sharp moving boundaries.

Conventionally, ITP is effected through use of devices and methods that feature capillary or microfluidic channel designs. Such devices and methods are capable of handling only small volumes (μL scale) of sample for analysis, which can make the analysis of biological samples, such as the extraction of nucleic acids from blood and/or plasma, difficult. As such, further development of devices and methods for analyzing samples that may comprise a large volume would likely be beneficial. Also, epitachophoresis methods which provide for more rapid analysis of samples would be beneficial.

BRIEF SUMMARY

The present disclosure generally relates to systems comprising devices for effecting epitachophoresis and sample detection, and methods of using such systems. In some embodiments, the present disclosure relates to a system for automated sample analysis, wherein said system comprises:

(a) at least one device for effecting epitachophoresis of a sample comprised therein, wherein at least one of said devices is in contact with an arrangement of one or more electrodes that provide for epitachophoresis of at least one sample comprised in said at least one device; and (b) at least one means for automated input and/or output of a moiety, e.g., a fluid sample, into or out of at least one of said devices.

In some embodiments, (b) comprises at least one means for automated input of a moiety, e.g., a fluid, electrolyte, sample, reactant, reagent, detectable label, or any combination thereof into at least one of said devices.

In some embodiments, (b) comprises at least one means for automated output of a moiety, e.g., a fluid, sample, analyte, electrolyte, or any combination of the foregoing from at least one of said devices.

In some embodiments, (b) comprises at least one means for automated input of a moiety, e.g., a fluid, electrolyte, sample, reactant, reagent, detectable label or any combination thereof into at least one of said devices and further comprises at least one means for automated output of a moiety, e.g., a fluid, sample, analyte, electrolyte, or any combination of the foregoing from at least one of said devices.

In some embodiments, said system further comprises at least one sample which putatively comprises at least one analyte.

In some embodiments, said system further comprises at least one means for detecting at least one analyte.

In some embodiments, said system further comprises at least one means for effecting a reaction in at least one of said devices for effecting epitachophoresis.

In some embodiments, said reaction comprises a cleavage, enzymatic, binding, labeling, polymerization, intercalation or addition reaction or a combination of any of the foregoing.

In some embodiments, the system further comprises a means for controlling the temperature within said at least one device, the temperature of an area within said device, and/or the temperature of a sample which is introduced, e.g., automatically, into said at least one device.

In some embodiments, said system comprises more than one device for effecting epitachophoresis of a sample comprised therein.

In some embodiments, said system comprises more than one device for effecting epitachophoresis of a sample comprised therein, wherein said devices are stacked upon each other.

In some embodiments, said system comprises more than one device for effecting epitachophoresis of a sample comprised therein, wherein said devices are not connected to each other.

In some embodiments, said system comprises more than one device for effecting epitachophoresis of a sample comprised therein, wherein at least two of said devices are connected to each other.

In some embodiments, said system comprises more than one device for effecting epitachophoresis of a sample comprised therein, wherein said devices are each labeled or bar coded to denote a particular sample and/or analyte comprised therein.

In some embodiments, said sample comprises a biological, environmental or industrial sample.

In some embodiments, said environmental sample comprises a water or soil sample.

In some embodiments, said industrial sample comprises a sample obtained from an industrial plant or industrial apparatus, e.g., a sanitation plant, water purification plant, industrial reaction device, oil or gas purification plant, or papermaking or paper processing plant or device.

In some embodiments, the biological sample comprises plasma, blood, urine, saliva, a tissue extract, a biopsy extract or a combination of any of the foregoing.

In some embodiments, at least one of said devices comprises at least one leading electrolyte and at least one trailing electrolyte.

In some embodiments, the location of at least one target analyte is detected by a transition between the leading electrolyte and the trailing electrolyte in at least one of said devices.

In some embodiments, the sample detection comprises detection through electrical, spectroscopic, photochemical, biochemical, immunochemical, optical, thermal, or chemical means.

In some embodiments, the sample is detected by electrical detection.

In some embodiments, the electrical detection is conductivity detection, resistivity detection, voltage detection, or current detection.

In some embodiments, the electrical detection comprises conductivity detection and/or resistivity detection.

In some embodiments, the detection of at least one analyte is effected by one or more detectors positioned anywhere within and/or in contact with at least one device that effects epitachophoresis.

In some embodiments, the detection is effected by one detector which is comprised or connected to said at least one device.

In some embodiments, the detection is effected anywhere within the epitachophoresis area of said at least one device.

In some embodiments, the detection of at least one analyte occurs near, within, and/or below the sample collection volume in at least one of said devices.

In some embodiments, the detection of at least one analyte is effected by analyzing at least one sample collected from at least one of said devices after effecting epitachophoresis of a sample comprised therein.

In some embodiments, the detection of the target analyte comprises direct or indirect detection of the target analyte.

In some embodiments, the detection of the target analyte comprises detecting the transition between the leading electrolyte and the trailing electrolyte.

In some embodiments, the automated introduction of a sample and/or collection of at least one target analyte is effected by a robotic liquid handler which is connected to said at least one device.

In some embodiments, the sample putatively comprises more than one target analyte.

In some embodiments, the more than one target analytes, if present, are collected together.

In some embodiments, the more than one target analytes, if present, are collected separately.

In some embodiments, detection of the one or more target analytes triggers the end of an epitachophoresis run in at least one of said devices.

In some embodiments, the one or more target analytes comprise small inorganic and organic ions, metals, salts, polymers, peptides, proteins, polysaccharides, nucleic acids, cells, bacteria and/or viruses.

In some embodiments, the nucleic acids are cell free DNA (cfDNA), circulating tumor DNA (ctDNA), or infectious DNA or RNA.

In some embodiments, the infectious DNA or RNA is from bacteria, archaea, eukaryotes, viruses, yeasts, fungi, protozoan, amoeba, and/or parasites.

In some embodiments, the system additionally comprises an electrical detector, a capacitance meter, an ohmmeter, a wattmeter, a voltmeter, an ammeter, a magnetometer, an electric probe, an optical detector, a spectrometer, a spectrophotometer, a fluorometer, a pH meter, an optical power meter, a photodetector, a charge coupled device, a laser, a microscope, a camera, an interferometer, a refractometer, a temperature detector, a thermometer, a pyrometer, a chemical detector, an immunochemical detector, a photochemical detector and/or further devices or apparatuses for in vitro diagnostic methods.

In some embodiments, the collected volume of sample comprising target analyte is then processed or analyzed in said further detectors, devices or apparatuses.

The present disclosure also relates to a method of automated target analyte collection, comprising:
 (a) loading at least one sample putatively comprising at least one target analyte into at least one device capable of effecting epitachophoresis;
 (b) effecting epitachophoresis in said at least one device of (a);
 (c) during or after step (b), detecting the presence and/or location of at least one target analyte comprised in the epitachophoresis area of said at least one device; and
 (d) wherein, in step (a), the at least one sample is automatically loaded into said at least one device, and/or before or during step (c), at least one target analyte is automatically collected from said at least one device.

In some embodiments, the detection results of step (c) trigger the automated collection of at least one target analyte from said at least one device.

In some embodiments, automated collection of at least one target analyte from said at least one device occurs automatically after a specific time interval after epitachophoresis of the sample has been effected.

In some embodiments, at least one target analyte is detected in at least one sample which is collected automatically from said at least one device after epitachophoresis of the sample has been effected.

In some embodiments, a reaction is effected within said at least one device before or after effecting epitachophoresis.

In some embodiments, said reaction comprises a cleavage, enzymatic, binding, labeling, polymerization, intercalation, amplification, hybridization, amplification, or addition reaction, or a combination of any of the foregoing.

In some embodiments, said reaction comprises a binding or labeling reaction.

In some embodiments, said reaction comprises an amplification reaction.

In some embodiments, said at least one device further comprises a means for controlling the temperature within said at least one device, the temperature of a specific area within said device, and/or the temperature of a sample which is introduced, e.g., automatically, into said at least one device.

The present disclosure also relates to a method of detecting the location of at least one target analyte within a sample in one or more epitachophoresis devices.

The present disclosure also relates to a method of label-free and dye-free sample purification and/or concentration based on detection of one or more target analytes within one or more epitachophoresis devices.

In some embodiments, the method according to any of the foregoing embodiments comprises more than one device for effecting epitachophoresis of a sample comprised therein, wherein said devices are not connected to each other.

In some embodiments, the method comprises more than one device for effecting epitachophoresis of a sample comprised therein, wherein at least two of said devices are connected to each other.

In some embodiments, the method comprises more than one device for effecting epitachophoresis of a sample comprised therein, wherein said devices are each labeled or bar coded to denote a particular sample and/or analyte comprised therein.

In some embodiments, said sample is an industrial, environmental, or biological sample.

In some embodiments, said environmental sample comprises a water or soil sample.

In some embodiments, said industrial sample comprises a sample obtained from an industrial plant or industrial apparatus, e.g., a sanitation plant, water purification plant, industrial reaction device, oil or gas purification plant, or papermaking or paper processing plant or device.

In some embodiments, the biological sample is plasma, blood, urine, saliva, a tissue extract, or a biopsy extract.

In some embodiments, at least one of said devices comprises at least one leading electrolyte and at least one trailing electrolyte.

In some embodiments, the location of at least one target analyte is detected by a transition between the leading electrolyte and the trailing electrolyte in at least one of said devices.

In some embodiments, the sample detection comprises detection through electrical, spectroscopic, photochemical, biochemical, immunochemical, optical, thermal, or chemical means.

In some embodiments, the sample is detected by electrical detection.

In some embodiments, the electrical detection comprises conductivity detection, resistivity detection, voltage detection, or current detection.

In some embodiments, the electrical detection comprises conductivity detection and/or resistivity detection.

In some embodiments, the detection of at least one analyte is effected by one or more detectors positioned anywhere within and/or in contact with at least one device that effects epitachophoresis.

In some embodiments, the detection is effected by one detector which is comprised or connected to said at least one device.

In some embodiments, the detection is effected anywhere within the epitachophoresis area of said at least one device.

In some embodiments, the detection of at least one analyte occurs near, within, or below the sample collection volume in at least one of said devices.

In some embodiments, the detection of at least one analyte is effected by analyzing at least one sample collected from at least one of said devices after effecting epitachophoresis of a sample comprised therein.

In some embodiments, the detection of the target analyte comprises direct or indirect detection of the target analyte.

In some embodiments, the detection of the target analyte comprises detecting the transition between the leading electrolyte and the trailing electrolyte.

In some embodiments, the automated introduction of a sample and/or collection of at least one target analyte is effected by a robotic liquid handler which is connected to said at least one device.

In some embodiments, the sample putatively comprises more than one target analyte.

In some embodiments, the more than one target analytes, if present, are collected together.

In some embodiments, the more than one target analytes, if present, are collected separately.

In some embodiments, detection of the one or more target analytes triggers the end of the epitachophoresis run in at least one of said devices.

In some embodiments, the one or more target analytes comprise small inorganic and organic ions, metals, salts, polymers, peptides, proteins, polysaccharides, nucleic acids, cells, bacteria and/or viruses.

In some embodiments, the nucleic acids are cell free DNA (cfDNA), circulating tumor DNA (ctDNA), or infectious DNA or RNA.

In some embodiments, the infectious DNA or RNA is from bacteria, archaea, eukaryotes, viruses, yeasts, fungi, protozoan, amoeba, and/or parasites.

In some embodiments, the method according to any of the foregoing embodiments additionally comprises an electrical detector, a capacitance meter, an ohmmeter, a wattmeter, a voltmeter, an ammeter, a magnetometer, an electric probe, an optical detector, a spectrometer, a spectrophotometer, a fluorometer, a pH meter, an optical power meter, a photodetector, a charge coupled device, a laser, a microscope, a camera, an interferometer, a refractometer, a temperature detector, a thermometer, a pyrometer, a chemical detector, an immunochemical detector, a photochemical detector and/or further devices or apparatuses for in vitro diagnostic methods.

In some embodiments, the collected volume of sample comprising at least one target analyte is then processed or analyzed in said further detectors, devices or apparatuses.

Further, according to any of the foregoing embodiments of systems and methods, in some embodiments, the starting volume of sample is 1 µl or less, 1 µl or more, 10 µl or more, 100 µl or more, 1 mL or more, 4 mL or more, 5 mL or more, 10 mL or more, or 15 mL or more.

In some embodiments, the collected volume of sample comprising target analyte is 10 mL or less, 5 mL or less, 1 mL or less, 500 µL or less, 250 µL or less, 100 µL or less, 50 µL or less, 10 µL or less, 5 µL or less, or 1 µL or less.

In some embodiments, the collected volume of sample comprising target analyte has a 5-fold or more, 10-fold or more, 20-fold or more, 30-fold or more, 40-fold or more, 50-fold or more, 100-fold or more, 500-fold or more, 1000-fold or more, 2000-fold or more, or 5000-fold or more increase in target analyte concentration compared to the loaded sample.

In some embodiments, the collected volume of sample comprising target analyte has a 30-fold or more increase in target analyte concentration compared to the loaded sample.

In some embodiments, the collected volume of sample comprising target analyte is 10% or more, 20% or more, 30% or more, 40% or more, 50% or more, 60% or more, 70% or more, 80% or more, 90% or more, 95% or more, 98% or more, or 99% or more free of other components.

In some embodiments, at least one device for effecting epitachophoresis comprises a circular, spherical or polygonal geometry.

In some embodiments, during use of at least one device for effecting epitachophoresis for analysis of said sample the epitachophoresis zone of the device moves from the edge of the polygon or circle towards the center of the polygon or circle.

In some embodiments, the polygon is selected from a triangle, quadrilateral, pentagon, hexagon, heptagon, octagon, nonagon, decagon.

In some embodiments, the polygon has 3, 4, 5, 6, 7, 8, 9, 10-20, 20-50 or 50-100 or more sides.

In some embodiments, said arrangement of electrodes comprises a two dimensional arrangement of one or more electrodes sufficient for effecting epitachophoresis.

In some embodiments, said one or more electrodes comprise one or more ring-shaped (circular) electrodes.

In some embodiments, said one or more electrodes comprise one or more electrodes arranged in a polygonal shape.

In some embodiments, the polygon is selected from a triangle, quadrilateral, pentagon, hexagon, heptagon, octagon, nonagon, decagon.

In some embodiments, the polygon has 3, 4, 5, 6, 7, 8, 9, 10-20, 20-50 or 50-100 or more sides.

In some embodiments, the diameter or width of said arrangement of electrodes ranges from about 1 mm to about 20 mm.

In some embodiments, said one or more electrodes comprises an electrode at the center of the device.

In some embodiments, said one or more electrodes comprise a platinum plated and/or gold-plated stainless steel ring; one or more stainless steel electrodes; and/or one or more graphite electrodes.

In some embodiments, said one or more electrodes comprise one or more wire electrodes.

In some embodiments, said one or more electrodes comprise an arrangement of more than one regularly spaced electrodes.

In some embodiments, said at least one device for effecting epitachophoresis comprises glass, ceramics, and/or plastics.

In some embodiments, said at least one device for effecting epitachophoresis comprises dimensions that accommodate 1 µl or less, 1 µl or more, 10 µl or more, 100 µl or more, 1 mL or more, 4 mL or more, 5 mL or more, 10 mL or more, or 15 mL or more of sample volume.

In some embodiments, said volume is about 15 mL.

In some embodiments, electric current is applied through one or more high voltage connections and a ground connection in the center of the system or said at least one device for effecting epitachophoresis.

In some embodiments, sample is injected into the device through an opening in the top of said system or said at least one device for effecting epitachophoresis.

In some embodiments, during use of said at least one device for effecting epitachophoresis, the focused sample collects in the center of the device.

In some embodiments, the focused sample comprises a target analyte.

In some embodiments, sample is collected from the center of said at least one device for effecting epitachophoresis following epitachophoresis.

In some embodiments, application of electricity to said at least one device for effecting epitachophoresis focuses a target analyte comprised by a sample into a focused zone.

In some embodiments, said target analyte is collected from said at least one device for effecting epitachophoresis after epitachophoresis.

In some embodiments, said at least one device for effecting epitachophoresis is used for cationic separation/epitachophoresis.

In some embodiments, said at least one device for effecting epitachophoresis is used for anionic separation/epitachophoresis.

In some embodiments, said at least one device for effecting epitachophoresis comprises a leading electrolyte that is stabilized by a gel which gel is optionally pH stable, viscous additive, or otherwise hydrodynamically separated from the terminating electrolyte.

In some embodiments, said gel or hydrodynamic separation prevents mixing of the leading and terminating electrolytes during device operation.

In some embodiments, said gel comprises an uncharged material and/or comprises a hydrogel.

In some embodiments, said uncharged material comprises agarose, polyacrylamide, pullulans, and the like.

In some embodiments, said at least one device for effecting epitachophoresis comprises a leading electrolyte, e.g., one that is stabilized by a gel, viscous additive, and/or otherwise hydrodynamically separated from the terminating electrolyte, whose diameter ranges from a thickness (height) of about 10 µm to about 20 mm.

In some embodiments, said at least one device for effecting epitachophoresis comprises an electrode in a leading electrolyte reservoir connected with a concentrator by a tube.

In some embodiments, said tube is connected directly or closed on one end by a semipermeable membrane.

In some embodiments, said concentrator is connected on-line to other devices, such as, for example, capillary analyzers, chromatography, PCR devices, enzymatic reactors, and the like.

In some embodiments, said tube is used to supply a countercurrent flow of the leading electrolyte in an arrangement without a gel containing said leading electrolyte.

In some embodiments, said at least one device for effecting epitachophoresis comprises at least one electrolyte reservoir.

In some embodiments, said at least one device for effecting epitachophoresis comprises at least two electrolyte reservoirs.

In some embodiments, said at least one device for effecting epitachophoresis comprises at least three electrolyte reservoirs.

In some embodiments, sample is mixed with leading electrolyte and then loaded into said at least one device for effecting epitachophoresis.

In some embodiments, sample is mixed with trailing electrolyte and then loaded into said at least one device for effecting epitachophoresis.

In some embodiments, sample is mixed with a conducting solution and loaded into said at least one device for effecting epitachophoresis.

In some embodiments, sample that contains suitable terminating ions for epitachophoresis is loaded into said at least one device for effecting epitachophoresis.

In some embodiments, said use of said sample eliminates a terminating electrolyte zone.

In some embodiments, said device is used to concentrate a target analyte.

In some embodiments, said device concentrates said target analyte by about 2 fold or more to about 1000 fold or more.

In some embodiments, said at least one device for effecting epitachophoresis is operated using a constant current, a constant voltage, or a constant power.

In some embodiments, said at least one device for effecting epitachophoresis is operated using constant current.

In some embodiments, the Epitachophoresis Boundary Velocity equation for calculating velocity v at a distance d from the start with a radius r is given by:

$$v_{(d)} = u_L I / 2\pi (r-d) h \kappa_L = \text{Constant}/(r-d).$$

In some embodiments, said at least one device for effecting epitachophoresis is operated using constant voltage.

In some embodiments, the Epitachophoresis Boundary Velocity equation for calculating velocity v at a distance d from the start with a radius r is given by:

$$v_L = u_L U \kappa_T [(r-d)\kappa_T + \kappa_L d].$$

In some embodiments, said device is operated using constant power.

In some embodiments, the Epitachophoresis Boundary Velocity equation for calculating velocity v at a distance d from the start with a radius r is given by:

$$E_L \approx \sqrt{P/(r-d)\kappa_L S}.$$

In some embodiments, said at least one device for effecting epitachophoresis is used to extract nucleic acids from whole blood or blood plasma.

In some embodiments, said nucleic acids comprise one or more target nucleic acids.

In some embodiments, said at least one device for effecting epitachophoresis is used to extract the entirety of nucleic acids comprised by a sample.

In some embodiments, said at least one device for effecting epitachophoresis is used to extract ctDNA from a sample.

In some embodiments, said at least one device for effecting epitachophoresis is used to extract cfDNA from a sample, e.g., blood or plasma from a pregnant woman.

In some embodiments, said at least one device for effecting epitachophoresis is used to extract a microbe from a sample, e.g., bacterium, virus, yeast, fungus or parasite.

In some embodiments, said at least one device for effecting epitachophoresis is used to extract a biomarker from a sample.

In some embodiments, said at least one device for effecting epitachophoresis is used to extract target nucleic acids from cell-free DNA.

In some embodiments, said at least one device for effecting epitachophoresis is used to concentrate and collect a target analyte from a sample.

In some embodiments, said target analyte is selected from any ion, molecule, nucleic acid, biomarker, and/or cell or population of cells, e.g., desired cells.

In some embodiments, said sample comprises a biological sample.

In some embodiments, said target analyte is used for one or more downstream in vitro diagnostic applications.

The present disclosure additionally relates to a method of automated sample analysis, wherein said method comprises: a. providing a device comprising an arrangement of electrodes sufficient for epitachophoresis; b. providing a sample on said device that comprises one or more target analytes; c. providing a leading electrolyte and a trailing electrolyte on said device; d. performing epitachophoresis using said device; e. detecting the location of said one or more target analytes; and f. automated collection of said one or more target analytes.

The present disclosure also relates to a method of automated sample analysis, wherein said method comprises: a. providing a device comprising or in contact with an arrangement of one or more electrodes sufficient for effecting epitachophoresis, wherein the device comprises a polygonal or circular or spheroid geometry such that during use of the device for analysis of a sample the epitachophoresis zone of the device moves from the edge of the polygon or circle or spheroid towards the center of the polygon or circle; b. providing a sample on said device that comprises one or more target analytes; c. providing a leading electrolyte and a trailing electrolyte on said device; d. performing epitachophoresis using said device; e. detecting the location of said one or more target analytes; and f. automated collection of said one or more target analytes.

The present disclosure further relates to a method of sample analysis, wherein said method comprises: a. providing a device comprising a non-linear, contiguous arrangement of electrodes sufficient for effecting epitachophoresis; b. providing a sample on said device that comprises one or more target analytes; c. providing a leading electrolyte and a trailing electrolyte on said device; d. performing epitachophoresis using said device; e. detecting the location of said one or more target analytes; and f. automated collection of said one or more target analytes.

In further embodiments, according to any of the foregoing, use of said system or method results in any one or more of the following: higher extraction yields (potentially lossless) compared to column- or bead-based extraction methods; a simpler device setup compared to the larger footprint for the MagNA Pure or other benchtop instruments; potentially faster sample turn-around and high parallelizability as compared to other devices applied to similar uses; easy integration with other microfluidics-based systems for down-stream processing of extracted nucleic acids; ease of automation; ease of high throughput design; label free sample detection; many-fold sample concentration; minimal sample manipulation; convenient and rapid separation of sample from other components; lower sample loss; higher sample yield; fewer steps to obtain a substantially pure sample; larger quantities of low concentration samples; greater utility and accuracy for downstream sample analysis; less sample contamination.

BRIEF DESCRIPTION OF THE SEVERAL VIEWS OF THE DRAWING

FIG. 2A provides a schematic representation of a top view of an exemplary device for effecting epitachophoresis. In FIG. 2A, numbers 1-7 refer to the following: 1. Outer circular electrode; 2. Terminating electrolyte ("TE") reservoir; 3. Leading electrolyte ("LE"), optionally contained within a gel or otherwise hydrodynamically separated from the terminating electrolyte; 4. Leading electrolyte electrode/collection reservoir; 5. Central electrode; 6. Electric power supply; and 7. Boundary between leading and terminating electrolytes with sample ions focused in between; and the symbols r and d are used to represent the leading electrolyte reservoir radius and distance migrated by the LE/TE boundary, respectively.

In FIG. 2B, numbers 1-6 and 8 refer to the following: 1. Outer circular electrode; 2. Terminating electrolyte reservoir; 3. Leading electrolyte, optionally contained within a gel or otherwise hydrodynamically separated from the terminating electrolyte; 4. Leading electrolyte electrode/collection reservoir; 5. Center electrode; 6. Electric power supply; and 8. Bottom support.

In FIG. 4, the numbers 1-6 and 8-10 refer to the following: 1. Outer circular electrode; 2. Terminating electrolyte reservoir; 3. Leading electrolyte, optionally contained within a gel or otherwise hydrodynamically separated from the terminating electrolyte; 4. Opening to leading electrolyte/collection reservoir; 5. Center electrode; 6. Electric power supply; 8. Bottom support; 9. Tube connecting device to a leading electrolyte reservoir; 10. Leading electrolyte reservoir.

In FIG. 9B, the numbers refer to dimensions in millimeters. The symbol "ø" indicates the diameter.

FIG. 20A provides images captured using an infrared-based thermal imaging camera during at ETP run in accordance with Example 10.

FIG. 20B provides a fluorescence-based image captured during an ETP run in accordance with Example 10.

DETAILED DESCRIPTION

Definitions

Figure 1:
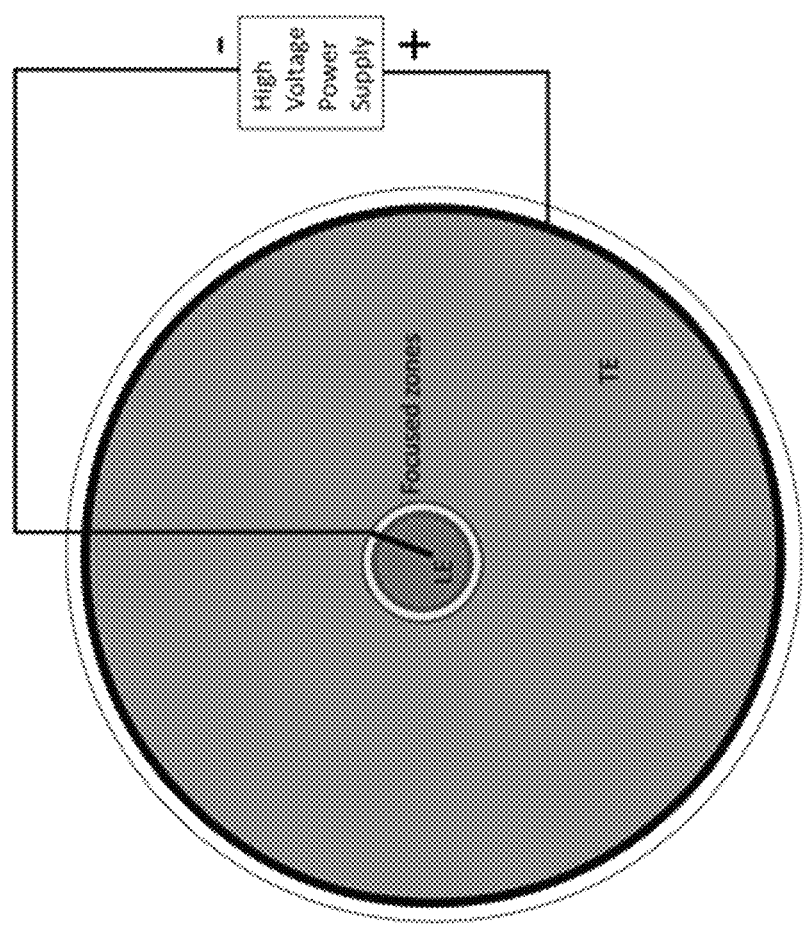
FIG. 1 provides a schematic representation of an exemplary device for effecting epitachophoresis.

As used herein the singular forms "a", "and", and "the" include plural referents unless the context clearly dictates otherwise. Thus, for example, reference to "a cell" includes a plurality of such cells and reference to "the protein" includes reference to one or more proteins and equivalents thereof known to those skilled in the art, and so forth. All technical and scientific terms used herein have the same meaning as commonly understood to one of ordinary skill in the art to which this invention belongs unless clearly indicated otherwise.

The term "electric field" is used to mean the effect produced by the existence of an electric charge, such as an electron, ion, or proton, in the volume of space or medium that surrounds it. Each of a distribution of charges contributes to the whole field at a point on the basis of superposition. A charge placed in the volume of space or in the surrounding medium has a force exerted on it. Electric fields can be created by differences in voltage: the higher the voltage, the stronger will be the resultant field. In contrast, magnetic fields can be created when electric current flows: the greater the current, the stronger the magnetic field. An electric field can exist even when there is no current flowing. Electric fields can be measured in Volts per meter (V/m). In some embodiments, in order to cause movement of the charged particles in the present methods and devices, within a convenient time frame, the electric field strength may be about 10 V to about 10 kV with electric powers ranging from about 1 mW to about 100 W. In some embodiments, the maximum electric power applied for the fastest analysis may depend on the electric resistivity of the sample and electrolyte solutions and the cooling capabilities of the materials that may be used for construction of the devices described herein.

As used herein, the term "isotachophoresis" generally refers to the separation of charged particles by using an electric field to create boundaries or interfaces between materials (e.g., between the charged particles and other materials in a solution). ITP generally uses multiple electrolytes, where the electrophoretic mobilities of sample ions are less than that of a leading electrolyte (LE) and greater than that of a trailing electrolyte (TE) that are placed in a device for ITP. The leading electrolyte (LE) generally contains a relatively high mobility ion, and a trailing electrolyte (TE) generally contains a relatively low mobility ion. The TE and LE ions are chosen to have effective mobilities respectively lower and higher than target analyte ions of interest. That is, the effective mobility of analyte ions is higher than that of the TE and lower than that of the LE. These target analytes have the same sign of charge as the LE and TE ions (i.e., a co-ion). An applied electric field causes LE ions to move away from TE ions and TE ions to trail behind. A moving interface forms between the adjacent and contiguous TE and LE zones. This creates a region of electric field gradient (typically from the low electric field of the LE to the high electric field of the TE). Analyte ions in the TE overtake TE ions but cannot overtake LE ions and accumulate ("focus" or form a "focused zone") at the interface between TE and LE. Alternately, target ions in the LE are overtaken by the LE ions; and also accumulate at interface. With judicious choice of LE and TE chemistry, ITP is fairly generally applicable, can be accomplished with samples initially dissolved in either or both the TE and LE electrolytes, and may not require very low electrical conductivity background electrolytes.

As used herein, the term "epitachophoresis" generally refers to methods of electrophoretic separation that are performed using a circular or spheroid and/or concentric device and/or circular and/or concentric electrode arrangement, such as by use of the circular/concentric and/or polygonal devices as described herein. Due to a circular/concentric or another polygonal arrangement that is used during epitachophoresis; unlike conventional isotachophoresis devices, the cross section area changes during migration of ions and zones, and the velocity of the zone movement is not constant in time due to the changing cross sectional area. Thus, an epitachophoretic arrangement does not strictly follow conventional isotachophoretic principles, wherein the zones migrate with constant velocities. Notwithstanding these significant differences, as shown herein epitachophoresis can be used to efficiently separate and focus charged particles by using an electric field to create boundaries or interfaces between materials that may have different electrophoretic mobilities (e.g., between the charged particles and other materials in a solution). LE and TE, as described for use with ITP, can be used for epitachophoresis as well. A description of the movement of the zones under constant current, constant voltage, and constant power for embodiments wherein circular or spheroid device architectures, e.g., devices comprising one or more circular electrodes, may be used, are presented in the Examples section infra. In exemplary embodiments, epitachophoresis may be effected using constant current, constant voltage, and/or constant power. In exemplary embodiments, epitachophoresis may be effected using varying current, varying voltage, and/or varying power. In exemplary embodiments, epitachophoresis may be effected within the context of devices and/or an arrangement of electrodes whose shape may be described in general as circular or spheroid, such that the basic principles of epitachophoresis may be accomplished as described herein. In some embodiments, epitachophoresis may be effected within the context of devices and/or an arrangement of electrodes whose shape may be described in general as polygons, such that the basic principles of epitachophoresis may be accomplished as described herein. In some embodiments, epitachophoresis may be effected by any non-linear, contiguous arrangement of electrodes, such as electrodes arranged in the shape of a circle and/or electrodes arranged in the shape of a polygon.

As used herein, the terms "in vitro diagnostic application (IVD application)", "in vitro diagnostic method (IVD method)" and the like generally refer to any application and/or method and/or device that may evaluate a sample for a diagnostic and/or monitoring purposes, such as identifying a disease in a human subject, optionally a human subject. In exemplary embodiments, said sample may comprise blood and/or plasma from a subject. In exemplary embodiments, said sample may comprise nucleic acids and/or target nucleic acids from a subject, optionally further wherein said nucleic acids originated from blood and/or plasma from a subject. In exemplary embodiments, an epitachophoresis device may be used as an in vitro diagnostic device. In exemplary embodiments, a target analyte that has been concentrated/enriched through epitachophoresis may be used in a downstream in vitro diagnostic assay. In exemplary embodiments, an in vitro diagnostic assay may comprise nucleic acid sequencing, e.g., DNA sequencing. In further exemplary embodiments, an in vitro diagnostic method may be, but is not limited to being, any one or more of the following: staining, immunohistochemical staining, flow cytometry, FACS, fluorescence-activated droplet sorting, image analysis, hybridization, DASH, molecular beacons, primer extension, microarrays, CISH, FISH, fiber FISH, quantitative FISH, flow FISH, comparative genomic hybridization, blotting, Western blotting, Southern blotting, Eastern blotting, Far-Western blotting, Southwestern blotting, Northwestern blotting, and Northern blotting, enzymatic assays, ELISA, ligand binding assays, immunoprecipitation, ChIP, ChIP-seq, ChIP-ChIP, radioimmunoassays, fluorescence polarization, FRET, surface plasmon resonance, filter binding assays, affinity chromatography, immunocytochemistry, gene expression profiling, DNA profiling with PCR, DNA microarrays, serial analysis of gene expression, realtime polymerase chain reaction, differential display PCR, RNA-seq, mass spectrometry, DNA methylation detection, acoustic energy, lipidomic-based analyses, quantification of immune cells, detection of cancer-associated markers, affinity purification of specific cell types, DNA sequencing, next-generation sequencing, detection of cancer-associated fusion proteins, and detection of chemotherapy resistance-associated markers.

As used herein, the terms "leading electrolyte" and "leading ion" generally refer to ions having a higher effective electrophoretic mobility as compared to that of the sample ion of interest and/or the trailing electrolyte as used during ITP and/or epitachophoresis. In exemplary embodiments, leading electrolytes for use with cationic epitachophoresis may include, but are not limited to including, chloride, sulphate and/or formate, buffered to desired pH with a suitable base, such as, for example, histidine, TRIS, creatinine, and the like. In exemplary embodiments, leading electrolytes for use with anionic epitachophoresis may include, but are not limited to including, potassium, ammonium and/or sodium with acetate or formate. In some embodiments, an increase of the concentration of the leading electrolyte may result in a proportional increase of the sample zone and a corresponding increase in electric current (power) for a given applied voltage. Typical concentrations generally may be in the 10-20 mM range; however, higher concentrations may also be used.

As used herein, the terms "trailing electrolyte", "trailing ion", "terminating electrolyte", and "terminating ion" generally refer to ions having a lower effect electrophoretic mobility as compared to that of the sample ion of interest and/or the leading electrolyte as used during ITP and/or epitachophoresis. In exemplary embodiments, trailing electrolytes for use with cationic epitachophoresis may include, but are not limited to including, MES, MOPS, acetate, glutamate and other anions of weak acids and low mobility anions. In exemplary embodiments, trailing electrolytes for use with anionic epitachophoresis may include, but are not limited to including, reaction hydroxonium ion at the moving boundary as formed by any weak acid during epitachophoresis.

As used herein, the term "focused zone(s)" generally refers to a volume of solution that comprises a component that has been concentrated ("focused") as a result of performing epitachophoresis. A focused zone may be collected or removed from a device, and said focused zone may comprise an enriched and/or concentrated amount of a desired sample, e.g., a target analyte, e.g., a target nucleic acid. In the epitachophoresis methods described herein the target analyte generally becomes focused in the center of the device, e.g., a circular or spheroid or other polygonal shaped device.

A "band" or "ETP band" generally refers to a zone (e.g. focused zone) of ion, analyte, or sample that travels separately from other ions, analytes, or samples during electrophoretic (e.g., isotachophoretic, or epitachophoretic) migration. A focused zone within an epitachophoresis device may alternatively be referred to as an "ETP band". In some embodiments, an ETP band may comprise one or more types of ions, analytes, and/or samples. In some instances, an ETP band may comprise a single type of analyte whose separation from other materials present in a sample is desired, e.g., separation of target nucleic acid from cellular debris. In some instances, an ETP band may contain more than one desired analyte, e.g., polypeptides or nucleic acids sequences highly similar in sequence, e.g., allelic variants. In some instances, the ETP band may comprise different analytes of similar size or electrophoretic mobility, e.g., nucleic acids 0-500 bp in length. In such instances, the more than one desired analyte may be separated by further ETP runs, e.g., under different conditions that promote separation of said more than one analytes, and/or said more than one analyte may be separated by other techniques known in the art for separation of analytes, such as those described herein.

The terms "nucleic acid" and "nucleic acid molecule" may be used interchangeably throughout the disclosure. The term generally refers to polymers of nucleotides (e.g., ribonucleotides, deoxyribonucleotides, nucleotide analogs etc.) and comprising deoxyribonucleic acids (DNA), ribonucleic acids (RNA), DNA-RNA hybrids, oligonucleotides, polynucleotides, aptamers, peptide nucleic acids (PNAs), PNA-DNA conjugates, PNA-RNA conjugates, etc., that comprise nucleotides covalently linked together, either in a linear or branched fashion. A nucleic acid is typically single-stranded or double-stranded and will generally contain phosphodiester bonds, although in some cases, nucleic acid analogs are included that may have alternate backbones, including, for example, phosphoramide (Beaucage et al. (1993) *Tetrahedron* 49(10):1925); phosphorothioate (Mag et al. (1991) *Nucleic Acids Res.* 19:1437; and U.S. Pat. No. 5,644,048), phosphorodithioate (Briu et al. (1989) *J. Am. Chem. Soc.* 111:2321), O-methylphophoroamidite linkages (see Eckstein, Oligonucleotides and Analogues: A Practical Approach, Oxford University Press (1992)), and peptide nucleic acid backbones and linkages (see, Egholm (1992) *J. Am. Chem. Soc.* 114:1895). Other analog nucleic acids include those with positively charged backbones (Denpcy et al. (1995) *Proc. Natl. Acad. Sci. USA* 92: 6097); non-ionic backbones (U.S. Pat. Nos. 5,386,023, 5,637,684, 5,602,240, 5,216,141 and 4,469,863) and non-ribose backbones, including those described in U.S. Pat. Nos. 5,235,033 and 5,034,506. Nucleic acids containing one or more carbocyclic sugars are also included within the definition of nucleic acids (see Jenkins et al. (1995) *Chem. Soc. Rev.* pp. 169-176), and analogs are also described in, e.g., Rawls, *C 8c E News* Jun. 2, 1997 page 35. These modifications of the ribose-phosphate backbone may be done to facilitate the addition of additional moieties such as labels, or to alter the stability and half-life of such molecules in physiological environments.

In addition to the naturally occurring heterocyclic bases that are typically found in nucleic acids (e.g., adenine, guanine, thymine, cytosine, and uracil), nucleotide analogs also may include non-naturally occurring heterocyclic bases, such as those described in, e.g., Seela et al. (1999) *Helv. Chim. Acta* 82:1640. Certain bases used in nucleotide analogs act as melting temperature (Tm) modifiers. For example, some of these include 7-deazapurines (e.g., 7-deazaguanine, 7-deazaadenine, etc.), pyrazolo[3,4-d]pyrimidines, propynyl-dN (e.g., propynyl-dU, propynyl-dC, etc.), and the like, see, e.g., U.S. Pat. No. 5,990,303. Other representative heterocyclic bases include, e.g., hypoxanthine, inosine, xanthine; 8-aza derivatives of 2-aminopurine, 2,6-diaminopurine, 2-amino-6-chloropurine, hypoxanthine, inosine and xanthine; 7-deaza-8-aza derivatives of adenine, guanine, 2-aminopurine, 2,6-diaminopurine, 2-amino-6-chloropurine, hypoxanthine, inosine and xanthine; 6-azacytidine; 5-fluorocytidine; 5-chlorocytidine; 5-iodocytidine; 5-bromocytidine; 5-methylcytidine; 5-propynylcytidine; 5-bromovinyluracil; 5-fluorouracil; 5-chlorouracil; 5-iodouracil; 5-bromouracil; 5-trifluoromethyluracil; 5-methoxymethyluracil; 5-ethynyluracil; 5-propynyluracil, and the like.

The terms nucleic acid and nucleic acid molecule also may generally refer to oligonucleotides, oligos, polynucleotides, genomic DNA, mitochondrial DNA (mtDNA), complementary DNA (cDNA), bacterial DNA, viral DNA, viral RNA, RNA, message RNA (mRNA), transfer RNA (tRNA), ribosomal RNA (rRNA), siRNA, catalytic RNA, clones, plasmids, M13, PI, cosmid, bacteria artificial chromosome (BAC), yeast artificial chromosome (YAC), amplified nucleic acid, amplicon, PCR product and other types of amplified nucleic acid, RNA/DNA hybrids and PNAs, all of which can be in either single- or double-stranded form, and unless otherwise limited, would encompass known analogs of natural nucleotides that can function in a similar manner as naturally occurring nucleotides and combinations and/or mixtures thereof. Thus, the term "nucleotides" refers to both naturally-occurring and modified/nonnaturally-occurring nucleotides, including nucleoside tri, di, and monophosphates as well as monophosphate monomers present within polynucleic acid or oligonucleotide. A nucleotide may also be a ribo; 2'-deoxy; 2',3'-deoxy as well as a vast array of other nucleotide mimics that are well-known in the art. Mimics include chain-terminating nucleotides, such as 3'-0-methyl, halogenated base or sugar substitutions; alternative sugar structures including nonsugar, alkyl ring structures; alternative bases including inosine; deaza-modified; chi, and psi, linker-modified; mass label-modified; phosphodiester modifications or replacements including phosphorothioate, methylphosphonate, boranophosphate, amide, ester, ether; and a basic or complete internucleotide replacements, including cleavage linkages such a photocleavable nitrophenyl moieties.

A "nucleoside" refers to a nucleic acid component that comprises a base or basic group (comprising at least one homocyclic ring, at least one heterocyclic ring, at least one aryl group, and/or the like) covalently linked to a sugar moiety (a ribose sugar or a deoxyribose sugar), a derivative of a sugar moiety, or a functional equivalent of a sugar moiety (e.g. a carbocyclic ring). For example, when a nucleoside includes a sugar moiety, the base is typically linked to a 1'-position of that sugar moiety. As described above, a base can be a naturally occurring base or a non-naturally occurring base. Exemplary nucleosides include ribonucleosides, deoxyribonucleosides, dideoxyribonucleosides and carbocyclic nucleosides.

A "purine nucleotide" refers to a nucleotide that comprises a purine base, whereas a "pyrimidine nucleotide" refers to a nucleotide that comprises a pyrimidine base.

A "modified nucleotide" refers to rare or minor nucleic acid bases, nucleotides and modifications, derivations, or analogs of conventional bases or nucleotides and includes synthetic nucleotides having modified base moieties and/or modified sugar moieties (see, Protocols for Oligonucleotide Conjugates, *Methods in Molecular Biology*, Vol. 26 (Suhier Agrawal, Ed., Humana Press, Totowa, N.J., (1994)); and Oligonucleotides and Analogues, A Practical Approach (Fritz Eckstein, Ed., IRL Press, Oxford University Press, Oxford).

"Oligonucleotide" as used herein refers to linear oligomers of natural or modified nucleosidic monomers linked by phosphodiester bonds or analogs thereof. Oligonucleotides include deoxyribonucleosides, ribonucleosides, anomeric forms thereof, PNAs, and the like, capable of specifically binding to a target nucleic acid. Usually monomers are linked by phosphodiester bonds or analogs thereof to form oligonucleotides ranging in size from a few monomeric units, e.g., 3-4, to several tens of monomeric units, e.g., 40-60. Whenever an oligonucleotide is represented by a sequence of letters, such as "ATGCCTG," it will be understood that the nucleotides are in 5'-3' order from left to right and that "A" denotes deoxyadenosine, "C" denotes deoxycytidine, "G" denotes deoxyguanosine, "T" denotes deoxythymidine, and "U" denotes the ribonucleoside, uridine, unless otherwise noted. Usually oligonucleotides comprise the four natural deoxynucleotides; however, they may also comprise ribonucleosides or non-natural nucleotide analogs. Where an enzyme has specific oligonucleotide or polynucleotide substrate requirements for activity, e.g., single stranded DNA, RNA/DNA duplex, or the like, then selection of appropriate composition for the oligonucleotide or polynucleotide substrates is well within the knowledge of one of ordinary skill.

As used herein "oligonucleotide primer", or simply "primer", refers to a polynucleotide sequence that hybridizes to a sequence on a target nucleic acid template and may facilitate the detection or amplification of a target nucleic acid. In amplification processes, an oligonucleotide primer serves as a point of initiation of nucleic acid synthesis. In non-amplification processes, an oligonucleotide primer may be used to create a structure that is capable of being cleaved by a cleavage agent. Primers can be of a variety of lengths and are often less than 50 nucleotides in length, for example 12-25 nucleotides, in length. The length and sequences of primers for use in PCR can be designed based on principles known to those of skill in the art.

The term "oligonucleotide probe" as used herein refers to a polynucleotide sequence capable of hybridizing or annealing to a target nucleic acid of interest and allows for the specific detection of the target nucleic acid.

Nucleic acids are "extended" or "elongated" when additional nucleotides are incorporated into the nucleic acids, for example by a nucleotide incorporating biocatalyst, at the 3' end of a nucleic acid.

As used herein, the terms "hybridization" and "annealing" and the like are used interchangeably and refer to the base-pairing interaction of one polynucleotide with another polynucleotide (typically an antiparallel polynucleotide) that results in formation of a duplex or other higher-ordered structure, typically termed a hybridization complex. The primary interaction between the antiparallel polynucleotide molecules is typically base specific, e.g., A/T and G/C, by Watson/Crick and/or Hoogsteen-type hydrogen bonding. It is not a requirement that two polynucleotides have 100% complementarity over their full length to achieve hybridization. In some aspects, a hybridization complex can form from intermolecular interactions, or alternatively, can form from intramolecular interactions.

The term "complementary" means that one nucleic acid is identical to, or hybridizes selectively to, another nucleic acid molecule. Selectivity of hybridization exists when hybridization occurs that is more selective than total lack of specificity. Typically, selective hybridization will occur when there is at least about 55% identity over a stretch of at least 14-25 nucleotides, preferably at least 65%, more preferably at least 75%, and most preferably at least 90%. Preferably, one nucleic acid hybridizes specifically to the other nucleic acid. See M. Kanehisa, Nucleic Acids Res. 12:203 (1984).

A primer that is "perfectly complementary" has a sequence fully complementary across the entire length of the primer and has no mismatches. The primer is typically perfectly complementary to a portion (subsequence) of a target sequence and/or target nucleic acid. A "mismatch"

refers to a site at which the nucleotide in the primer and the nucleotide in the target nucleic acid with which it is aligned are not complementary. The term "substantially complementary" when used in reference to a primer means that a primer is not perfectly complementary to its target sequence; instead, the primer is only sufficiently complementary to hybridize selectively to its respective strand at the desired primer-binding site.

The term "target nucleic acid" as used herein is intended to mean any nucleic acid whose presence is to be detected, measured, amplified, and/or subject to further assays and analyses. A target nucleic acid may comprise any single and/or double-stranded nucleic acid. Target nucleic acids can exist as isolated nucleic acid fragments or be a part of a larger nucleic acid fragment. Target nucleic acids can be derived or isolated from essentially any source, such as cultured microorganisms, uncultured microorganisms, complex biological mixtures, biological samples, tissues, sera, ancient or preserved tissues or samples, environmental isolates or the like. Further, target nucleic acids include or are derived from cDNA, RNA, genomic DNA, cloned genomic DNA, genomic DNA libraries, enzymatically fragmented DNA or RNA, chemically fragmented DNA or RNA, physically fragmented DNA or RNA, or the like. In exemplary embodiments, a target nucleic acid may comprise a whole genome. In exemplary embodiments, a target nucleic acid may comprise the entire nucleic acid content of a sample and/or biological sample. In exemplary embodiments, a target nucleic acid may comprise circulating or cell-free DNA's, e.g., circulating tumor DNA ("ctDNA") present in individuals with cancer or circulating fetal or circulating maternal DNA ("cfDNA") fragments present in plasma or serum of pregnant women. Target nucleic acids can come in a variety of different forms including, for example, simple or complex mixtures, or in substantially purified forms. For example, a target nucleic acid can be part of a sample that contains other components or can be the sole or major component of the sample. Also a target nucleic acid can have either a known or unknown sequence.

The term "amplification reaction" refers to any in vitro means for amplifying the copies of a target sequence of nucleic acid.

The terms "amplification" and "amplifying" the like refer generally to any process that results in an increase in the copy number of a molecule or set of related molecules. Components of an amplification reaction may include, but are not limited to, e.g., primers, a polynucleotide template, nucleic acid polymerase, nucleotides, dNTPs and the like. The term "amplifying" typically refers to an "exponential" increase in target nucleic acid. However, "amplifying" as used herein can also refer to linear increases in the numbers of a select target sequence of nucleic acid. Amplification typically starts from a small amount of a target nucleic acid (e.g. a single copy of a target nucleic acid), where the amplified material is typically detectable. Amplification of target nucleic acid encompasses a variety of chemical and enzymatic processes. The generation of multiple DNA copies from one or a few copies of a target nucleic acid may be effected by a polymerase chain reaction (PCR), a hot start PCR, a strand displacement amplification (SDA) reaction, a transcription mediated amplification (TMA) reaction, a nucleic acid sequence-based amplification (NASBA) reaction, or a ligase chain reaction (LCR). Amplification is not limited to the strict duplication of the starting target nucleic acid. For example, the generation of multiple cDNA molecules from a limited amount of viral RNA in a sample using RT-PCR is a form of amplification. Furthermore, the generation of multiple RNA molecules from a single DNA molecule during the process of transcription is also a form of amplification. Amplification may optionally followed by additional steps, for example, but not limited to, labeling, sequencing, purification, isolation, hybridization, size resolution, expression, detecting and/or cloning.

The term "target microbe" as used herein is intended to mean any unicellular or multicellular microbe, found in blood, plasma, other body fluids, samples such as biological samples, and/or tissues, e.g., one associated with an infectious condition or disease. Examples thereof include bacteria, archaea, eukaryotes, viruses, yeasts, fungi, protozoan, amoeba, and/or parasites. As used herein, the term "biomarker" or "biomarker of interest" refers to a biological molecule found in blood, plasma, other body fluids, and/or tissues that is a sign of a normal or abnormal process, or of a condition or disease (such as cancer). A biomarker may be used to see how well the body responds to a treatment for a disease or condition. In the context of cancer, a biomarker refers to a biological substance that is indicative of the presence of cancer in the body. A biomarker may be a molecule secreted by a tumor or a specific response of the body to the presence of cancer. Genetic, epigenetic, proteomic, glycomic, and imaging biomarkers can be used for cancer diagnosis, prognosis, and epidemiology. Such biomarkers can be assayed in non-invasively collected biofluids like blood or serum. Several gene and protein based biomarkers have already been used in patient care including but, not limited to, AFP (Liver Cancer), BCR-ABL (Chronic Myeloid Leukemia), BRCA1/BRCA2 (Breast/Ovarian Cancer), BRAF V600E (Melanoma/Colorectal Cancer), CA-125 (Ovarian Cancer), CA19.9 (Pancreatic Cancer), CEA (Colorectal Cancer), EGFR (Non-small-cell lung carcinoma), HER-2 (Breast Cancer), KIT (Gastrointestinal stromal tumor), PSA (Prostate Specific Antigen) (Prostate Cancer), S100 (Melanoma), and many others. Biomarkers may be useful as diagnostics (to identify early stage cancers) and/or prognostics (to forecast how aggressive a cancer is and/or predict how a subject will respond to a particular treatment and/or how likely a cancer is to recur). Biomarkers of interest include, but are not limited to, such oncology biomarkers as AKAP4, ALK, APC, AR, BRAF, BRCA1, BRCA2, CCND1, CCND2, CCND3, CD274, CDK4, CDK6, CFB, CFH, CFI, DKK1, DPYD, EDNRB, EGFR, ERBB2, EPSTI1, ESR1, FCRL5, FGFR1, FGFR2, FGFR3, FLT3, FN14, HER2, HER4, HERC5, IDH1, IDH2, IDO1, KIF5B, KIT, KRAS, LGR5, LIV1, LY6E, LYPD3, MACC1, MET, MRD, MSI, MSLN, MUC16, MYC, NaPi3b, NRAS, PDGFRA, PDCD1LG2, RAF1, RNF43, NTRK1, NTSR1, OX40, PIK3CA, RET, ROS1, Septin 9, TERT, TFRC, TROP2, TP53, TWEAK, and UGT1A1.

Further exemplary biomarkers of interest may include Her2, bRaf, an ERBB2 amplification, a P13KCA mutation, a FGFR2 amplification, a p53 mutation, a BRCA mutation, a CCND1 amplification, a MAP2K4 mutation, an ATR mutation, or any other biomarker the expression of which is correlated to a specific cancer; at least one of AFP, ALK, BCR-ABL, BRCA1/BRCA2, BRAF, V600E, Ca-125, CA19.9, EGFR, Her-2, KIT, PSA, S100, KRAS, ER/Pr, UGT1A1, CD30, CD20, F1P1L1-PDGRFa, PDGFR, TMPT, and TMPRSS2; or at least one biomarker selected from ABCB5, AFP-L3, Alpha-fetoprotein, Alpha-methyl acyl-CoA racemase, BRCA1, BRCA2, CA 15-3, CA 242, Ca 27-29, CA-125, CA15-3, CA19-9, Calcitonin, Carcinoembryonic antigen, Carcinoembryonic antigen peptide-1, Des-gamma carboxy prothrombin, Desmin, Early prostate cancer antigen-2, Estrogen receptor, Fibrin degradation product, Glucose-6-phosphate isomerase, an HPV antigen such as vE6, E7, L1, L2 or p16INK4a Human chorionic gonadotropin, IL-6, Keratin 19, Lactate dehydrogenase, Leucyl aminopeptidase, Lipotropin, Metanephrines, Neprilysin, NMP22, Normetanephrine, PCA3, Prostate-specific antigen, Prostatic acid phosphatase, Synaptophysin, Thyroglobulin, TNF, a transcription factor selected from ERG, ETV1 (ER81), FLI1, ETS1, ETS2, ELK1, ETV6 (TEL1), ETV7 (TEL2), GABPa, ELF1, ETV4 (E1AF; PEA3), ETV5 (ERM), ERF, PEA3/E1AF, PU.1, ESE1/ESX, SAP1 (ELK4), ETV3 (METS), EWS/FLI1, ESE1, ESE2 (ELF5), ESE3, PDEF, NET (ELK3; SAP2), NERF (ELF2), or FEV. XXX, Tumor-associated glycoprotein 72, c-kit, SCF, pAKT, pc-kit, and Vimentin. Alternatively, or in addition the biomarker of interest may be an immune checkpoint inhibitor such as, but not limited to, CTLA-4, PDL1, PDL2, PD1, B7-H3, B7-H4, BTLA, HVEM, KIR, TIM3, GAL9, GITR, LAG3, VISTA, KIR, 2B4, TRPO2, CD160, CGEN-15049, CHK 1, CHK2, A2aR, TL1A, and B-7 family ligands or a combination thereof or is a ligand of a checkpoint protein selected from the group consisting of CTLA-4, PDL1, PDL2, PD1, B7-H3, B7-H4, BTLA, HVEM, TIM3, GAL9, LAG3, VISTA, KIR, 2B4, CD160, CGEN-15049, CHK1, CHK2, A2aR, B-7 family ligands, or a combination thereof. Further exemplary biomarkers may include, but are not limited to including, any one or more biomarkers associated with acute lymphoblastic leukemia (etv6, am11, cyclophilin b), B cell lymphoma (Ig-idiotype), glioma (E-cadherin, .alpha.-catenin, .beta.-catenin, .gamma.-catenin, p120 ctn), bladder cancer (p21ras), biliary cancer (p21ras), breast cancer (MUC family, HER2/neu, c-erbB-2), cervical carcinoma (p53, p21ras), colon carcinoma (p21ras, HER2/neu, c-erbB-2, MUC family), colorectal cancer (Colorectal associated antigen (CRC)-C017-1A/GA733, APC), choriocarcinoma (CEA), epithelial cell cancer (cyclophilin b), gastric cancer (HER2/neu, c-erbB-2, ga733 glycoprotein), hepatocellular cancer (.alpha.-fetoprotein), Hodgkin's lymphoma (Imp-1, EBNA-1), lung cancer (CEA, MAGE-3, NY-ESO-1), lymphoid cell-derived leukemia (cyclophilin b), melanoma (p5 protein, gp75, oncofetal antigen, GM2 and GD2 gangliosides, Melan-A/MART-1, cdc27, MAGE-3, p21ras, gp100.sup.Pmel117), myeloma (MUC family, p21ras), non-small cell lung carcinoma (HER2/neu, c-erbB-2), nasopharyngeal cancer (Imp-1, EBNA-1), ovarian cancer (MUC family, HER2/neu, c-erbB-2), prostate cancer (Prostate Specific Antigen (PSA) and its antigenic epitopes PSA-1, PSA-2, and PSA-3, PSMA, HER2/neu, c-erbB-2, ga733 glycoprotein), renal cancer (HER2/neu, c-erbB-2), squamous cell cancers of the cervix and esophagus (viral products such as human papilloma virus proteins), testicular cancer (NY-ESO-1), and/or T cell leukemia (HTLV-1 epitopes).

The term "sample" as used herein includes a specimen or culture (e.g., microbiological cultures) that includes nucleic acids and/or a target nucleic acid. The term "sample" is also meant to include biological, environmental, and chemical samples, as well as any sample whose analysis is desired. A sample may include a specimen of synthetic origin. A sample may include one or more microbes from any source from which one or more microbes may be derived. A "biological sample" may include, but is not limited to, whole blood, serum, plasma, umbilical cord blood, chorionic villi, amniotic fluid, cerebrospinal fluid, spinal fluid, lavage fluid (e.g., bronchioalveolar, gastric, peritoneal, ductal, ear, arthroscopic), biopsy sample, urine, feces, sputum, saliva, nasal mucous, prostate fluid, semen, lymphatic fluid, bile, tears, sweat, breast milk, breast fluid, embryonic cells and fetal cells. The biological sample may be blood, and may be plasma. As used herein, the term "blood" encompasses whole blood or any fractions of blood, such as serum and plasma as conventionally defined. Blood plasma refers to the fraction of whole blood resulting from centrifugation of blood treated with anticoagulants. Blood serum refers to the watery portion of fluid remaining after a blood sample has coagulated. Environmental samples include environmental material such as surface matter, soil, water and industrial samples, as well as samples obtained from food and dairy processing instruments, apparatus, equipment, utensils, disposable and non-disposable items.

A "representative" sample may comprise the different subpopulations of a sample, e.g., a sample comprising cancer cells comprised within a tumor. A "representative" sample alternatively may comprise the different subpopulations within a normal and/or control sample, e.g., normal or control cells, or may comprise a mixed sample of test and normal/control sample, e.g., tumor cells and normal cells, respectively. Further advantageously, these representative samples may be used in a plurality of assay methods, without compromising the ability to use the specimen in traditional diagnostic assays. In exemplary embodiments, representative samples may be produced by analyzing a sample, e.g., a sample comprising tumor cells, using the devices and methods described herein. In some embodiments, a representative sample may be analyzed by the devices and methods described herein. Moreover, representative samples produced by analyzing a sample using the devices and methods described herein may be used in several different assay formats simultaneously in order to detect the presence of even minor sub-populations of sample within a sample, e.g., a tumor or lymph node.

The term "target analyte" as used herein is intended to mean any analyte whose presence is to be detected, measured, separated, concentrated, and/or subject to further assays and analyses. In exemplary embodiments, said analyte may be, but is not limited to, any ion, molecular, nucleic acid, biomarker, cell or population of cells, e.g., desired cells, and the like, whose detection, measurement, separation, concentration, and/or use in further assays is desired. In exemplary embodiments, a target analyte may be derived from any of the samples described herein.

The term "analysis" generally refers to a process or step involving physical, chemical, biochemical, or biological analysis that includes characterization, testing, measurement, optimization, separation, synthesis, addition, filtration, dissolution, or mixing.

The term "chemical" refers to a substance, compound, mixture, solution, emulsion, dispersion, molecule, ion, dimer, macromolecule such as a polymer or protein, biomolecule, precipitate, crystal, chemical moiety or group, particle, nanoparticle, reagent, reaction product, solvent, or fluid any one of which may exist in the solid, liquid, or gaseous state, and which is typically the subject of an analysis.

The term "protein" generally refers to a set of amino acids linked together usually in a specific sequence. A protein can be either naturally-occurring or man-made. As used herein, the term "protein" includes amino acid sequences that have been modified to contain moieties or groups such as sugars, polymers, metalloorganic groups, fluorescent or light-emitting groups, moieties or groups that enhance or participate in a process such as intramolecular or intermolecular electron transfer, moieties or groups that facilitate or induce a protein into assuming a particular conformation or series of conformations, moieties or groups that hinder or inhibit a protein from assuming a particular conformation or series of conformations, moieties or groups that induce, enhance, or inhibit protein folding, or other moieties or groups that are incorporated into the amino acid sequence and that are intended to modify the sequence's chemical, biochemical, or biological properties. As used herein, a protein includes, but is not limited to, enzymes, structural elements, antibodies, hormones, electron carriers, and other macromolecules that are involved in processes such as cellular processes or activities. Proteins typically have up to four structural levels that include primary, secondary, tertiary, and quaternary structures.

For purposes of the present disclosure, it will be understood that when a given component such as a layer, region, liquid or substrate is referred to herein as being disposed or formed "on", "in" or "at" another component, that given component can be directly on the other component or, alternatively, intervening components (e.g., one or more buffer layers, interlayers, electrodes or contacts) can also be present. It will be further understood that the terms "disposed on" and "formed on" are used interchangeably to describe how a given component is positioned or situated in relation to another component. Hence, the terms "disposed on" and "formed on" are not intended to introduce any limitations relating particular methods of material transport, deposition, or fabrication.

The term "communicate" is used herein to indicate a structural, functional, mechanical, electrical, optical, thermal, or fluidic relation, or any combination thereof, between two or more components or elements. As such, the fact that one component is said to communicate with a second component is not intended to exclude the possibility that additional components may be present between, and/or operatively associated or engaged with, the first and the second component.

As used herein, a "subject" refers to a mammalian subject (such as a human, rodent, non-human primate, canine, bovine, ovine, equine, feline, etc.) to be treated and/or one from whom a biological sample is obtained.

The term "tumor" refers to a mass or a neoplasm, which itself is defined as an abnormal new growth of cells that usually grow more rapidly than normal cells and will continue to grow if not treated sometimes resulting in damage to adjacent structures. Tumor sizes can vary widely. A tumor may be solid or fluid-filled. A tumor can refer to benign (not cancerous, generally harmless), pre-malignant (pre-cancerous), or malignant (cancerous) growths. The dividing line between cancerous, pre-cancerous, and cancerous growths is not always clear (sometimes determining which is which may be arbitrary, especially if the tumor is in the middle of the spectrum), but there are general properties of each type of growth. Benign tumors are non-malignant/non-cancerous tumors. A benign tumor is usually localized, and does not spread (metastasize) to other parts of the body. Most benign tumors respond well to treatment. However, if left untreated, some benign tumors can grow large and lead to serious disease because of their size. In this way, benign tumors can mimic malignant tumors and, thus, are sometimes treated. A premalignant or precancerous tumor is not yet malignant, but it is primed to become so. Malignant tumors are cancerous growths. They are often resistant to treatment, may spread to other parts of the body, and sometimes recur after removal. "Cancer" is another term for a malignant growth (a malignant tumor or neoplasm).

The virulence of different tumors varies. Certain cancers can be relatively easy to treat and/or cure, whereas other cancers are more aggressive. Tumor virulence may be determined, at least in part, by differential gene expression. In cancerous cells (cells comprising a pre-malignant and/or malignant tumor), the mechanisms that allow a cell to activate or silence genes are damaged. As a result, there is often aberrant activation of genes specific to other tissues and/or to other stages of development. For example, in lung cancers, tumorous cells that express genes specific to the production of spermatozoids, which should be silent, are extremely virulent (a high-risk cancer that exhibits increased proliferative abilities and a facility to hide from the body's immune system). It has also been shown that in almost all cancers, tens of specific genes in the germline and the placenta are aberrantly activated. See, e.g., Rousseaux et al., Ectopic Activation of Germline and Placental Genes Identifies Aggressive Metastasis-Prone Lung Cancers. *Science Translational Medicine* (2013) 5(186): 186. Accordingly, as the upregulation or downregulation of genes may be associated with a virulent form of a particular cancer, it is possible to be able to predict, at the diagnosis stage, which cancers have a high risk of recurrence and a fatal prognosis, even in cases where the tumor is adequately treated, at an early stage of its development.

"Resistivity", also known as "electrical resistivity", "specific electrical resistance", or "volume resistivity" is used as conventionally understood in the art and generally refers to a property of a material that quantifies how strongly that material opposes the flow of electric current. A low resistivity typically indicates a material that may readily allow the flow of electric current. Resistivity is commonly represented by the Greek letter ρ (rho). The SI unit of electrical resistivity is the ohm-metre (Ω·m).

"Conductivity", also known as "electrical conductivity" or "specific conductance", generally refers to the reciprocal of electrical resistivity, and typically measures a material's ability to conduct an electric current. It is commonly represented by the Greek letter σ (sigma), but κ (kappa) (especially in electrical engineering) or γ (gamma) are also occasionally used. Its SI unit is siemens per metre (S/m).

"Detecting" a sample within the context of an epitachophoresis device, system or machine may comprise detecting its position at one, several, or many points throughout the device. Detection may generally occur by any one or more means that do not interfere with desired device, system, or machine function and with methods performed using said device, system, or machine. In some embodiments, detection encompasses any means of electrical detection, e.g., through the detection of conductivity, resistivity, voltage, current, and the like. Furthermore, in some embodiments, detection may comprise any one or more of the following: electrical detection, thermal detection, optical detection, spectroscopic detection, photochemical detection, biochemical detection, immunochemical detection, and/or chemical detection.

A "robotic liquid handler" or "liquid handler" is a robotic system, used for automation in chemical or biochemical laboratories that dispenses a selected quantity of reagent, samples or other liquid to a designated container. Some versions can dispense an allotted volume of liquid from a motorized pipettor or syringe; some systems can also manipulate the position of the dispensers and containers (often a Cartesian coordinate robot) and/or integrate additional laboratory devices or add-ons, such as microplate readers, heat sealers, heater/shakers, bar code readers, spectrophotometric or separation devices and instruments, storage devices, waste containers and incubators. In addition to the motorized pipettor or syringe, robotic liquid handlers also can have trays for sample wells or trays for holding sample vials, trays of pipette tips that fit the pipettor, and containers of solvents. In some embodiments, the biological samples for use with the present devices, systems, and methods can be in sample wells, vials, or any other sample container generally used on robotic liquid handlers currently or developed in the future. The methods, devices, and systems described herein may employ a robotic liquid handler capable of manipulating the position of pipette tips on the Cartesian, 3-axis movements, typically implemented by means of an arm, and having multi-pipetting capabilities. To further reduce human interaction, it is also desirable to have spectrophotometric or separation instruments integrated with the handler. Exemplary robotic liquid handlers include the Microlab® STARm, STARlet, STARplus, VANTAGE Liquid Handling System®, or NIMBUS® from Hamilton® Company; Bravo Automated Liquid Handling Platform from Agilent®; the epMotion® from Eppendorf®; the Biomek® 4000, i5, i7, NX or FX from Beckman Coulter®; the PIPETMAX®, PIPETMAN®, VERITY® systems, or ASPEC® systems from Gilson™; the Fluent®, Freedom EVO®, or D300e Digital Dispenser from Tecan®; PAL® systems from CTC Analytics; or the MPS from GERSTEL®. In some embodiments, the automated liquid handlers for use in the methods or systems of the invention are those which are capable of being modified to perform pipetting. The liquid handler may also be integrated with a variety of other in vitro diagnostic methods and devices, including e.g. sequencing, purification, and separation-mass spectrometric instruments. Any commercially available robotic liquid handler can be used and/or modified to work in conjunction with the devices, methods, and systems for sample analysis described herein, e.g., those used to effect ETP.

The term "pipette tip" is a term of art, and refers to a conical tube with a larger end, called the "hub" herein, and a narrow end, called the "delivery tip" herein, which is precisely engineered for accurate sampling and delivery of fluids. The hub fits over the barrel of the pipette or robotic liquid handler, typically by friction fit. The interior diameter of the tip hub must be slightly larger than the barrel of the pipettor and the inside taper of the tip must also match the taper of the pipette barrel. Most manufacturers of hand held pipettors and robotic liquid handler systems make pipettors that will utilize universal tips. The hub is located at the proximal end of the pipette tip and the delivery tip is located at the distal end. The pipette tip fits onto the barrel of the micropipettes in an air-tight manner, such that when the plunger of the pipette is pressed and released, a vacuum is applied, and fluid is pulled into the pipette tip. That fluid can be delivered to any receptacle as needed by again depressing the plunger. Some pipette tips are sealed to the barrel of the pipettes through the use of gaskets rather than the taper of the pipette tip. Some robotic pipette tips are not friction fitted, but use an expandable o-ring to make the air tight seal required for liquid pipetting. As such, pipette tips are available in a range of sizes to fit different pipettes. Preferably, the pipette tip has one or more ridges on an outer surface near the hub, such that the ridge(s) allow the tip to be stored on a platform having an array of holes, the ridges preventing the conical tip for sinking too far into the hole and risk getting stuck. Such ridges are common on pipette tips. Common ridge styles include an annular ridge that completely circumnavigates the pipette tip, and a plurality of vertical fins, which provide strength, support the tip on the hole, and also minimize materials and weight. Combinations are also common. In some embodiments, the ridges are used to store the pipette tip on the neck of the housing. In some embodiments, any one or more types of pipette tips known in the art may be used in conjunction with the devices, methods, and systems described herein to produce a desired result.

The term "robotic pipette tip" is a pipette tip whose inner taper in the hub is such as to fit a robotic liquid handler. Most frequently there is no difference between a robotic pipette tip and a pipette tip for a hand-held pipettor, but in some instances there can be size differences. A "wide bore pipette tip" is a pipette tip whose delivery tip has a wider orifice than standard traditional or robotic pipette tips of similar volume size. Typically, the distal end orifice is much larger than the standard tips. The wide bore pipette tip can have a hub capable of fitting a standard pipettor or robotic liquid handler. The term "filter pipette tip" refers to a pipette tip, either standard or robotic, that has been modified to have a filter, screen, or frit located at the distal (bottom) end near the narrow opening. The filter pipette tip can optionally include a substrate, a sorbent, a barrier, or a combination thereof, and optionally a gasket. The term "tip-on-tip" refers to the configuration of a 'top' pipette tip fitted inside a second 'bottom' pipette tip. The top pipette tip is typically a standard or wide bore pipette tip and the bottom pipette tip is the filter pipette tip, with optional substrate, sorbent, barrier, or a combination thereof. The top pipette tip does not have to be wide bore, but wide bore allows for mixing of sample solutions that contain solid particulate matter and/or are viscous. In some embodiments, any one or more types of robotic pipette tips known in the art may be used in conjunction with the devices, methods, and systems described herein to produce a desired result.

The term "automated" as used herein refers to a situation where it is not necessary to carry out any one or more steps of a procedure or method, e.g., sample collection, "by hand", i.e. manually, but wherein said desired step or procedure, e.g., sample collection, may be performed by one or more suitable devices or systems, such as robot(s), liquid handling robots, and/or other (e.g. acoustic) liquid transfer device, which is/are programmed prior to carrying out one or more steps such that the corresponding steps and pattern(s), in particular the collection step, are carried out in an automated fashion according to what has been programmed. In some embodiments, it is also automated (e.g. by using a robot) to store collected sample or to transfer collected sample immediately to another system or device for further purification, processing, analysis, or other IVD method.

The term "moiety" as used herein encompasses any suitable sample for analysis in a system, device, or method described herein. Such a sample may comprise any biological sample, environmental sample, industrial sample, substance, liquid, solid, gas, suspension, colloid, chemical, mixture, buffer, solvent, analyte, electrolyte, solution, nucleic acid, polypeptide, metal, fluid, reactant, reagent, detectable label, dye, inorganic ion, organic ion, salt, polymer, peptide, polysaccharide, cell, bacterium, and/or virus.

In a sample analysis device or system, the term "sample collection volume" refers to a volume of sample intended for collection, e.g., by a robotic liquid handler, during or following analysis. In a device for effecting epitachophoresis, or a system comprising such a device, the sample collection volume is the volume intended for collection that comprises sample during or following epitachophoresis. In some embodiments, the sample collection volume may be located in the central well of a device or system described herein. In some embodiments, the sample collection volume may be located anywhere that permits collection of the desired sample. In some embodiments, the sample collection volume may be anywhere between the sample loading area and the leading electrolyte electrode/collection reservoir. The sample collection volume may be comprised by any suitable area, container, well, or space of the device or system. In some embodiments, the sample collection volume is comprised by a well, membrane, compartment, vial, pipette, or the like. In some embodiments, the sample collection volume may be formed by the space within or between components of the device or system, e.g. the space between two gels or a hole in a gel.

Devices and Methods

The present disclosure generally describes novel devices and methods for sample analysis, wherein said devices and methods comprise effecting epitachophoresis. In exemplary embodiments, said devices and methods comprise use of concentric or polygonal disk (e.g., circular) designs to effect epitachophoresis, in contrast to the capillary or microfluidic channel designs which may often be used for conventional isotachophoresis. The devices and methods of the present disclosure confer numerous advantageous properties and features, as discussed herein. For example, the architecture of devices for epitachophoresis enable the analysis of large sample volumes, e.g., 15 mL or more of a sample and/or biological sample, whereas conventional capillary or microfluidic techniques are generally only equipped to handle microliter scale volumes. Furthermore, the present devices and methods allow for whole genome and/or whole nucleic acid content extraction from a sample and/or biological sample, whereas such an extraction would be difficult when using conventional capillary or microfluidic based devices and methods, in particular ITP-based capillary or microfluidic devices and methods. Additionally, the highly efficient extraction of target nucleic acids attained through use of the devices and methods described herein is helpful for down-stream in vitro diagnostic (IVD) methods, in which the amount of target nucleic acid, e.g., DNA and/or RNA, directly correlates with the sensitivity that may be achieved in said down-stream IVD assay. Sometimes, spin columns or magnetic glass particles that bind nucleic acids on their surface conventionally may be used in order to effect extraction of nucleic acids. As compared to these conventional approaches, the devices and methods described herein may confer any one or more of the following advantages: higher extraction yields (potentially loss-less) compared to column- or bead-based extraction methods; a simpler device setup compared to the larger footprint for the MagNA Pure or other benchtop instruments; potentially faster sample turn-around and high parallelizability as compared to other devices applied to similar uses; easy integration with other microfluidics-based systems for down-stream processing of extracted nucleic acids. Moreover, a flat channel may generally be used in devices and methods described herein, and said channel architecture generally may have a favorable heat transfer capability as compared to the narrow channels that may generally be used in capillary and/or microfluidic devices. As such, use of said flat channel may prevent over-heating, or boiling, of a sample and/or focused sample. Furthermore, the devices and methods described herein often allow for gentle sample collection, which typically may be an important feature when performing whole genome extraction, extraction of microbes, extraction of desired target cells such as stem cells, tumor cells, e.g., circulating tumor cells, or other rare cells wherein cell functionality is desirably preserved, or other labile analytes. Generally, conventional whole genome extraction may feature use of a pipette, which may shear genomic DNA. In some embodiments, the devices and methods described herein allow for obtaining sample without the need for potentially damaged pipetting in some exemplary embodiments wherein damage of a sample through pipetting may be a concern. In further embodiments, the devices and methods described herein may allow for whole genome extraction wherein shearing and/or damaging of any portion of the whole genome may not occur or be minimal as a result of using said devices and methods.

Furthermore, the present disclosure generally relates to devices and methods for sample analysis. The devices and methods for sample analysis, as described herein, generally pertain to effecting epitachophoresis using said devices or methods. Devices for effecting epitachophoresis generally comprise an arrangement of one or more electrodes sufficient for effecting said epitachophoresis. In exemplary embodiments, said devices comprise a polygonal or circular geometry. During use of such exemplary devices for epitachophoresis-based analysis of a sample, an epitachophoresis zone of the device may move from the edge of the polygon or circle towards the center of the polygon or circle. Said polygon may be selected from a triangle, quadrilateral, pentagon, hexagon, heptagon, octagon, nonagon, decagon, and/or said polygon may have 3, 4, 5, 6, 7, 8, 9, 10-20, 20-50 or 50-100 or more sides. Furthermore, in exemplary embodiments, devices for effecting epitachophoresis may comprise any device dimensions, e.g., diameter, e.g., depth, that facilitates analysis of a desired sample volume. In exemplary embodiments, the size of a device may scale with the volume used. In some embodiments, a device may comprise a diameter ranging from about 1 mm or more to about 20 mm or more.

In exemplary embodiments, electric current may be applied in said devices through one or more high voltage connections and a ground connection in the center of the system. In further exemplary embodiments, devices for sample analysis as described herein may comprise glass, ceramics, and/or plastics. In some instances, plastics may include such plastics as polypropylene, polytetrafluoroethylene (commercially available as TEFLON®), Poly(methyl methacrylate) ("PMMA"), and/or Polydimethylsiloxane ("PDMS"), for example. When using glass and/or ceramics in particular, these materials may result in improved heat transfer properties that can be beneficial during device operation. For example, as the flat channel of a circular or concentric ITP, i.e., an ETP device, device has a favorable heat transfer capability compared to a narrow channel, over-heating (or boiling) of focused material can be prevented. Additionally, in further embodiments, current/voltage programming may also suitable for adjusting the Joule heating of the device.

In exemplary embodiments, devices for sample analysis may comprise a two dimensional arrangement of one or more electrodes, wherein said arrangement is sufficient for effecting epitachophoresis. In further exemplary embodiments, said one or more electrodes may comprise one or more ring-shaped (circular) electrodes, and/or said one or more electrodes may be arranged in a polygonal shape. Said polygon may be selected from a triangle, quadrilateral, pentagon, hexagon, heptagon, octagon, nonagon, decagon, and/or said polygon may have 3, 4, 5, 6, 7, 8, 9, 10-20, 20-50 or 50-100 or more sides. In exemplary embodiments, said one or more electrodes of said devices may be arranged such that said arrangement comprises a diameter or width that ranges from about 1 mm to about 20 mm. In further exemplary embodiments, an arrangement of one more electrodes of said devices may comprise an electrode at the center of said devices. In some embodiments, said one or more electrodes of said devices may comprise a platinum plated and/or gold-plated stainless steel ring; one or more stainless steel electrodes; and/or one or more graphite electrodes. Furthermore, said one or more electrodes may comprise wire electrodes in some embodiments. In exemplary embodiments, said arrangement of one or more electrodes may comprise an arrangement of more than one regularly spaced electrodes. In some embodiments, said arrangement of one or more electrodes may comprise a non-linear, contiguous arrangement of more than one electrodes. In some embodiments, said arrangement of one or more electrodes may comprise a single wire electrode formed into a desired shape, e.g., a circle. In some embodiments, said arrangement of one or more electrodes may comprise an array of wire electrodes. In exemplary embodiments, a device for sample analysis may be a disposable device. Said disposable device may comprise stainless steel and/or graphite electrodes. In other exemplary embodiments, a device for sample analysis may function as a bench-top instrument, i.e., the device may comprise a workstation and/or may be re-usable.

Moreover, in further exemplary embodiments, devices for sample analysis as described herein may comprise dimensions that accommodate 1 µL or less, 1 µL or more, 10 µL or more, 100 µL or more, 1 mL or more, 4 mL, or more, 5 mL or more, 10 mL or more, or 15 mL or more of sample volume. In exemplary embodiments, said volume may be about 15 mL. In exemplary embodiments, said sample may be injected into the device through an opening in the top of said device. In further embodiments, use of said devices may result in a focused sample that collects in the center of the device, and furthermore in some embodiments said sample may be collected from the center of said device. In some embodiments, sample may be collected by punching out the gel at the center of the device which may contain the focused sample. In some embodiments, sample may be collected in a tube located at the center of the device. In some embodiments, sample may be collected by pipetting out the focused sample once it reaches the center of the device. In exemplary embodiments, said sample may comprise a target analyte. In further embodiments, application of electricity to said device may focus a target analyte comprised by a sample into a focused zone, and furthermore said target analyte may be collected from said device after epitachophoresis. In further exemplary embodiments, a sample for analysis using any device or method of epitachophoresis described herein may comprise a biological sample, such as blood and/or plasma. Said blood and/or plasma may comprise a target analyte, e.g., a target nucleic acid. In some embodiments, the volume of said blood and/or said plasma may be about 4 mL. Said blood and/or plasma may be derived from a subject. In exemplary embodiments, a sample for analysis using any device or method of epitachophoresis described herein may comprise one or more biomarkers that may be separated and/or focused and/or collected from said device.

Furthermore, said devices for sample analysis may further comprise a leading electrolyte and a trailing electrolyte in exemplary embodiments. In exemplary embodiments, all common electrolytes known to those skilled in the art that are used for isotachophoresis may be used with the present devices when the leading ions have a higher effective electrophoretic mobility than that of the sample ion(s) of interest. Correspondingly, the opposite may generally be true for the selected terminating ions. In exemplary embodiments, said devices may be used for cationic separation/epitachophoresis (positive mode) or for anionic separation/epitachophoresis (negative mode). In further exemplary embodiments, common leading electrolytes for anionic separation using epitachophoresis may include, for example, chloride, sulfate, or formate, buffered to desired pH with a suitable base, e.g., histidine, TRIS, creatinine, and the like. In some instances, chloride may be used as the leading ion in anionic isotachophoresis, as it has very high electrophoretic mobility and is present in most biological samples. Concentrations of leading electrolyte for epitachophoresis for anionic separation may range from 5 mM-1 M with respect to the leading ion. Correspondingly, said terminating ions then often may include MES, TAPS, MOPS, HEPES, acetate, glutamate and other anions of weak acids and low mobility anions. Concentrations of said terminating electrolyte for epitachophoresis in positive mode range from: 5 mM-10 M with respect to the terminating ion. In some embodiments, as the device may be operated either in positive mode (separation/concentration of cationic species) or in a negative mode (separation/concentration of anionic species), said devices for sample analysis may be useful for a wide range of analytes that range from, for example, small inorganic and organic ions to large biopolymers including peptides, proteins, polysaccharides and DNA or even particles including bacteria and viruses.

In some embodiments, for cationic separation common leading ions for epitachophoresis generally may include, for example: potassium, ammonium or sodium with acetate or formate being the most common buffering counterions. Reaction hydroxonium ion moving boundary then serves as a universal terminating electrolyte formed by any weak acid.

In some embodiments, in both positive and negative modes, the increase of the concentration of the leading ion may result in proportional increase of the sample zone at the expense of increased electric current (power) for a given applied voltage. Typical concentrations generally are in the 10-20 mM range; however, higher concentrations may also be used.

In further exemplary embodiments, a device for sample analysis may comprise a leading electrolyte that is stabilized by a gel, viscous additive, and/or otherwise hydrodynamically separated from the terminating electrolyte. Said gel or hydrodynamic separation may prevent mixing of the leading and terminating electrolytes during device operation. Additionally, said gel may comprise an uncharged material or any other material that forms a gel, such as, for example, agarose, polyacrylamide, pullulans, and the like. In particular this includes all types of hydrogels. In some embodiments the gel may be resistant to changes in pH, e.g., acid or base-stable gels. In further embodiments, said device may comprise a leading electrolyte, e.g., one stabilized by a gel, viscous additive, and/or otherwise hydrodynamically separated from the terminating electrolyte, whose diameter ranges from a thickness (height) of about 10 µm to about 20 mm. In some embodiments, the maximum thickness may generally be a thickness that may result in a uniform electric field over the entirety of said thickness. In embodiments where the thickness may be such that the electric field is non-uniform, the electric field may not vary linearly, however, the basic principles of epitachophoresis may still apply and separation, concentration, focusing, and/or collection of a target analyte may still occur as desired. In some embodiments, a thickness of greater than 20 mm may be used, and a curved device architecture may be used to obtain linear behavior. In some embodiments, the leading and/or trailing electrolyte may comprise an electrolyte with a desired buffering capacity. For example, the leading electrolyte may comprise an electrolyte whose buffering capacity minimizes and/or negates any changes in pH that may occur as a result of effecting epitachophoresis, such that the pH over all of the epitachophoresis zones may be nearly the same, or the same.

For example, HCl histidine may be used as a leading electrolyte with desirable buffering capacity. Furthermore, in some embodiments, a pH stable gel may be used.

In some embodiments, said device may comprise an electrode in a leading electrolyte reservoir connected with a concentrator by a tube. Said tube may be connected directly or closed on one end by a semipermeable membrane. Furthermore, said concentrator may be connected on-line to other devices, such as, for example, capillary analyzers, chromatography, PCR devices, enzymatic reactors, and the like. Additionally, said tube may be used to supply a countercurrent flow of the leading electrolyte in an arrangement without a gel containing said leading electrolyte.

In exemplary embodiments, a device for sample analysis may comprise a gel, or other material which may be used to stabilize a leading electrolyte. In further embodiments, a device for sample analysis may comprise a gel, and said gel may help to avoid unwanted sample contamination. For example, a device for sample analysis may be used to extract ctDNA, and said gel may be used to help avoid contamination of ctDNA with genomic DNA. To avoid said unwanted contamination, the gel may be of such a composition so as to allow ctDNA, but not genomic DNA, to migrate through said gel. Such a principle may be applied to other sample analyses where it may be beneficial to avoid contamination of a sample of interest/target analyte. In further embodiments, mesh polymers and/or porous materials may be used in a similar manner as to a gel in devices for sample analysis, such as, for example, filter paper or hydrogels. The selection of said mesh polymer and/or porous material may be that which helps to effect a desired separation/concentration and/or to prevent undesired sample contamination. For example a material may be selected that does not permit passage/migration of proteins but can allow passage/migration of target nucleic acids. In further exemplary embodiments, a device for sample analysis may not feature a gel and still may effect epitachophoresis for sample analysis that may feature focusing and/or concentrating and/or collecting of a target analyte and/or desired sample.

In exemplary embodiments, a device for sample analysis may comprise at least one electrolyte reservoir, at least two electrolyte reservoirs, or at least three electrolyte reservoirs. In some embodiments, a sample may be mixed with leading electrolyte and then loaded into said device. In some embodiments, a sample may be mixed with trailing electrolyte and then loading into said device. In further embodiments, a sample may be mixed with a conducting solution and loaded into said device. Furthermore, in some embodiments, a sample may contain suitable terminating ions for epitachophoresis and may be loaded into said device. Use of such a sample may eliminate a terminating electrolyte zone. In some embodiments, sample may be loaded through an opening in the device, e.g., an opening in the top of the device, e.g., an opening in the side of the device. In some embodiments, sample may be loaded in the space between the gel and the circular electrode of an ETP device.

In further exemplary embodiments, said device may be used to concentrate a target analyte, e.g., from about 2 fold or more to about 1000 fold or more. In some embodiments, said target analyte may comprise a target nucleic acid. In further embodiments, said target analyte may comprise small inorganic and organic ions, peptides, proteins, polysaccharides, DNA, or microbes such as bacteria and/or viruses.

Moreover, in further exemplary embodiments, devices for sample analysis as described herein may be operated using a constant current, a constant voltage, or a constant power. When operating a device using a circular architecture, e.g., devices comprising one or more circular electrodes, and further using constant current, the epitachophoresis Boundary Velocity equation for calculating velocity v at a distance d from the start with a radius r is given by: $v_{(d)}=u_L I/2\pi(r-d) h\kappa_L = \text{Constant}/(r-d)$. When operating a device using a circular architecture, e.g., devices comprising one or more circular electrodes, and using constant voltage, the epitachophoresis Boundary Velocity equation for calculating velocity v at a distance d from the start with a radius r is given by: $v_L u_L U\kappa_T/[(r-d)\kappa_T + \kappa_L d]$. When operating a device using a circular architecture, e.g., devices comprising one or more circular electrodes, and using constant power, the epitachophoresis Boundary Velocity equation for calculating velocity v at a distance d from the start with a radius r is given by: $E_L \approx \sqrt{P/(r-d)\kappa_L S}$. In further embodiments, the voltage or current or power that may be used to effect epitachophoresis in said device may be varied in discrete stages. For example, current or voltage or power may be applied at a first value to allow for separation and grouping of electrolytes and/or charged species within a device and/or during effecting any of the methods described herein, and after said separation and grouping occurs, the current or voltage or power may be applied at a second value to increase or to decrease the rate of epitachophoresis, as may be desired for a analysis of a given sample. In embodiments wherein a non-circular polygonal architecture is used, the electric field may not vary linearly as in the case of circular or spherical architectures. Furthermore, in embodiments where a non-continuous arrangement of electrodes may be used, the electric field may vary in such a manner as to produce a star-shaped arrangement of electrolyte and/or sample. For example, if an array of point-based electrodes which form a circular shape are used in a device for sample analysis, the resulting zones of electrolyte and/or sample, etc., may form a star shape rather than a circle as a result of the electric field generated by the point electrode-based array.

In further exemplary embodiments, a device for sample analysis may be used to extract nucleic acids from a sample, e.g., a biological sample. Said sample may comprise whole blood or blood plasma. Said sample may comprise a cell culture from which target analytes may be harvested, such as a whole genome. Said nucleic acids may comprise one or more target nucleic acids, e.g., tumor DNA and/or ctDNA. In exemplary embodiments, a device for sample analysis may be used to focus and collect tumor DNA and/or circulating tumor DNA (ctDNA), and/or circulating cfDNA, e.g., those present in blood or plasma from pregnant women, and/or circulating DNAs expressing proteins over or under-expressed in specific conditions which may then optionally be subjected to further downstream analyses, such as nucleic acid sequencing and/or other in vitro diagnostic applications. Such downstream in vitro applications include by way of example disease detection such as cancer diagnosis and/or cancer prognosis and/or cancer staging, detection of infectious conditions, paternity analysis, detection of fetal chromosomal abnormalities such as aneuploidy, detection of fetal genetic traits, detection of pregnancy-related conditions, detection of autoimmune or inflammatory conditions, among a myriad of other potential uses.

In exemplary embodiments, a device for sample analysis may be used to focus and to collect a target nucleic acid, and said target nucleic acid may be of any desired size. For example, said target nucleic acid may be 5 nt or less, 10 nt or less, 20 nt or less, 30 nt or less, 50 nt or less, 100 nt or less, 1000 nt or less, 10,000 nt or less, 100,000 nt or less, 1,000,000 nt or less, or 1,000,000 nt or more. In some embodiments, said device may be used to extract target nucleic acids from cell-free DNA. Furthermore, in exemplary embodiments, said device may be used to concentrate and collect a target analyte from a sample. Said sample may comprise a biological sample. In further embodiments, said target analyte may used for one or more downstream in vitro diagnostic applications. Furthermore, in exemplary embodiments a device for sample analysis may be connected on-line to other devices, such as, for example, capillary analyzers, chromatography, PCR devices, enzymatic reactors, and the like, and/or any other device that may be used to effect further sample analysis, e.g., a device associated with IVD applications. In further exemplary embodiments, a device for sample analysis may be used in a workflow with nucleic acid sequencing library preparation. Moreover, in further embodiments, a device for sample analysis may be used with liquid handling robots that may optionally be used to effect downstream analysis of a sample that may have been focused and/or collected from said device.

In additional exemplary embodiments, use of said device may result in any one or more of the following: higher extraction yields (potentially loss-less) compared to column- or bead-based extraction methods; a simpler device setup compared to the larger footprint for the MagNA Pure or other benchtop instruments; potentially faster sample turnaround and high parallelizability as compared to other devices applied to similar uses; easy integration with other microfluidics-based systems for down-stream processing of extracted nucleic acids.

Furthermore, the present disclosure generally pertains to a method of sample analysis which comprises effecting epitachophoresis for analysis of said sample. Said method may be effected by using any of the devices for sample analysis described herein. In exemplary embodiments, said method further comprises: a. providing a device for effecting epitachophoresis, such as those described herein; b. providing a sample on said device, wherein said sample comprises one or more target analytes; c. providing a leading electrolyte and a trailing electrolyte on said device; d. performing epitachophoresis using said device; and e. collecting said one or more target analytes. In exemplary embodiments, said device for sample analysis may comprise a polygonal or circular geometry. In further exemplary embodiments, the epitachophoresis zone of the device may move from the edge of the polygon or circle towards the center of the polygon or circle during epitachophoresis. Said polygon may be selected from a triangle, quadrilateral, pentagon, hexagon, heptagon, octagon, nonagon, decagon and/or said polygon may have 3, 4, 5, 6, 7, 8, 9, 10-20, 20-50 or 50-100 or more sides. Furthermore, in exemplary embodiments, said devices may comprise any device dimensions, e.g., diameter, e.g., depth, that facilitates analysis of a desired sample volume. In exemplary embodiments, the size of said device may scale with the volume used. In exemplary embodiments, said device may comprise a diameter ranging from about 1 mm or more to about 20 mm or more.

In exemplary embodiments, said method of sample analysis may comprise use of epitachophoresis which may be effected by using a two-dimensional arrangement of one or more electrodes. In some embodiments, said method may comprise effecting epitachophoresis by using one or more ring-shaped (circular) electrode and/or by using one or more electrodes arranged in a polygonal shape. Said polygon may be selected from a triangle, quadrilateral, pentagon, hexagon, heptagon, octagon, nonagon, decagon and/or said polygon may have 3, 4, 5, 6, 7, 8, 9, 10-20, 20-50 or 50-100 or more sides. In exemplary embodiments, the diameter or width of said arrangement of electrodes may range from about 10 mm to about 20 mm. Furthermore, in some embodiments of said method of sample analysis said method may further comprise use of an electrode at the center of the device for effecting epitachophoresis. In exemplary embodiments of said method, one or more electrodes that may be used to effect epitachophoresis may comprise one or more platinum plated and/or gold-plated stainless steel ring; one or more stainless steel electrodes; and/or one or more graphite electrodes. In some embodiments of said method, one or more wire electrodes may be used to effect epitachophoresis. In exemplary embodiments of said method, an arrangement of more than one regularly spaced electrodes may be used to effect epitachophoresis. In further embodiments, electric current may be applied through one or more high voltage connections and a ground connection in the center of the system during methods of sample analysis as described herein. In some embodiments, said arrangement of one or more electrodes may comprise a non-linear, contiguous arrangement of more than one electrodes. In some embodiments, said arrangement of one or more electrodes may comprise a single wire electrode formed into a desired shape, e.g., a circle. In some embodiments, said arrangement of one or more electrodes may comprise an array of wire electrodes. In exemplary embodiments of said method, a device for effecting said methods of sample analysis may be a disposable device. Said disposable device may comprise stainless steel and/or graphite electrodes. In other exemplary embodiments of said methods, a device for sample analysis according to the methods described herein may function as a bench-top instrument, i.e., the device may comprise a workstation and/or may be re-usable.

Moreover, in further exemplary embodiments, said method may use 1 µL or less, 1 µL or more, 10 µL or more, 100 µL or more, 1 mL or more, 4 mL or more, 5 mL or more, 10 mL or more, or 15 mL or more of sample volume. In some embodiments, said volume may be about 15 mL. In exemplary embodiments, sample may be injected into the device through an opening in the top when practicing the methods described herein. In further exemplary embodiments of said method, a sample may be focused and said sample may collect in the center of the device. In some embodiments of said method, sample may be collected by punching out the gel at the center of a device for sample analysis which may contain the focused sample. In some embodiments of said methods, sample may be collected in a tube located at the center of a device for sample analysis. In some embodiments of said method, sample may be collected by pipetting out the focused sample once it reaches the center of the device for sample analysis. In exemplary embodiments, the focused sample may comprise a target analyte. In further exemplary embodiments of said method, a sample may be collected from the center of the device following epitachophoresis. In further embodiments, application of electricity to effect said method focuses a target analyte comprised by a sample into a focused zone. Said target analyte may then be collected after epitachophoresis. In further exemplary embodiments of the methods described herein, a sample for analysis using any device or method of epitachophoresis described herein may comprise a biological sample, such as blood and/or plasma. Said blood and/or plasma may comprise a target analyte, e.g., a target nucleic acid. In some embodiments, the volume of said blood and/or said plasma may be about 4 mL. Said blood and/or plasma may be derived from a subject. In exemplary embodiments, a sample for analysis using any method of epitachophoresis described herein may comprise one or more biomarkers that may be separated and/or focused and/or collected.

In further embodiments, said method further may comprise use of a leading electrolyte and a trailing electrolyte. Furthermore, in some embodiments, said epitachophoresis may be used for cationic separation/epitachophoresis (positive mode) and/or anionic separation/epitachophoresis (negative mode). In further exemplary embodiments, common leading electrolytes for anionic separation using epitachophoresis may include, for example, chloride, sulfate, or formate, buffered to desired pH with a suitable base, e.g., histidine, TRIS, creatinine, and the like. Furthermore, concentrations of said leading electrolyte for epitachophoresis for anionic separation may range from 5 mM-1 M with respect to the leading ion. Correspondingly, said terminating ions then often may include MES, MOPS, HEPES, acetate, glutamate and other anions of weak acids and low mobility anions. Concentrations of said terminating electrolyte for epitachophoresis in positive mode range from: 5 mM-10 M with respect to the terminating ion. In some embodiments, as the device may be operated either in positive mode (separation/concentration of cationic species) or in a negative mode (separation/concentration of anionic species), said methods for sample analysis may be useful for a wide range of analytes that range from, for example, mall inorganic and organic ions to large biopolymers including peptides, proteins, polysaccharides and DNA or even particles including bacteria and viruses.

In some embodiments, for cationic separation common leading ions for epitachophoresis generally may include, for example: potassium, ammonium or sodium with acetate or formate being the most common buffering counterions. Reaction hydroxonium ion moving boundary then serves as a universal terminating electrolyte formed by any weak acid.

In some embodiments, in both positive and negative modes, the increase of the concentration of the leading ion may result in proportional increase of the sample zone at the expense of increased electric current (power) for a given applied voltage. Typical concentrations generally are in the 10-20 mM range; however, higher concentrations may also be used.

In some embodiments, said method may comprise use of a leading electrolyte that is stabilized by a gel, viscous additive, or otherwise hydrodynamically separated from the terminating electrolyte. Said gel or hydrodynamic separation may prevent mixing of the leading and terminating electrolytes during device operation. Additionally, said gel may comprise an uncharged material, such as, for example, agarose, polyacrylamide, pullulans, and the like. In some embodiments, said method may comprise use of a leading electrolyte whose diameter ranges from a thickness (height) of about 10 μm to about 20 mm. In some embodiments, the maximum thickness may generally be a thickness that may result in a uniform electric field over the entirety of said thickness. In embodiments where the thickness may be such that the electric field is non-uniform, the electric field may not vary linearly, however, the basic principles of epitachophoresis should still apply and separation, concentration, focusing, and/or collection of a target analyte may still occur as desired. In some embodiments, a thickness of greater than 20 mm may be used, and a curved or spherical device architecture may be used to obtain linear behavior.

In exemplary embodiments of the methods for sample analysis described herein, a method for sample analysis may comprise use of a gel in conjunction with epitachophoresis, which may be used to stabilize a leading electrolyte in a device for sample analysis according to said methods. In further embodiments of said methods, a method may comprise use of a gel, and said gel may help to avoid unwanted sample contamination. For example, a method for sample analysis may be used to extract ctDNA, and said gel may be used to help avoid contamination of ctDNA with genomic DNA. To avoid said unwanted contamination, the gel may be of such a composition so as to allow ctDNA, but not genomic DNA, to migrate through said gel. Such a principle may be applied to other sample analyses where it may be beneficial to avoid contamination of a sample of interest/target analyte. In further embodiments, mesh polymers and/or porous materials may be used in a similar manner as to a gel in methods for sample analysis, such as, for example, filter paper or hydrogels. The selection of said mesh polymer and/or porous material may be that which helps to effect a desired separation/concentration and/or to prevent undesired sample contamination. For example a material may be selected that does not permit passage/migration of proteins but will allow passage/migration of target nucleic acids. In further exemplary embodiments, a method for sample analysis may not feature a gel and still may effect epitachophoresis for sample analysis that may feature focusing and/or concentrating and/or collecting of a target analyte and/or desired sample.

In further embodiments of a method of sample analysis, after effecting said epitachophoresis, capillary analyzers, chromatography, PCR devices, enzymatic reactors, and the like may be used to further evaluated a concentrated sample that results from said method. In some embodiments of said method, a leading electrolyte may first be loaded into a device for effecting circular or concentric isotachophoresis and may be followed by loading of sample mixed with terminating electrolyte. In further embodiments of said method, a sample may be mixed with the leading electrolyte and loaded into a device for effecting epitachophoresis and may be followed by loading of a terminating electrolyte. In further embodiments of said method, a sample may be mixed with a conducting solution and then loaded into a device for effecting epitachophoresis. In exemplary embodiments of said method, a sample that contains suitable terminating ions for epitachophoresis may be loaded into a device for effecting epitachophoresis, and use of said sample may eliminate a terminating electrolyte zone.

In exemplary embodiments, said method may concentrate a target analyte, e.g. from about 2 fold or more to about 1000 fold or more. In exemplary embodiments, said target analyte may comprise a target nucleic acid. In further exemplary embodiments, said target analyte may comprise small inorganic and organic ions, peptides, proteins, polysaccharides, DNA, bacteria and/or viruses.

In further embodiments, said method of sample analysis may be effected by using constant current, constant voltage, or constant power. When using constant current and a method comprising use of a device for sample analysis that further comprises a circular architecture, e.g., devices comprising one or more circular electrodes, the Epitachophoresis Boundary Velocity equation for calculating velocity v at a distance d from the start with a radius r is given by: $v_{(d)}=u_L I/2\pi(r-d)h\kappa_L=\text{Constant}/(r-d)$. When using constant voltage and a method comprising use of a device for sample analysis that further comprises a circular architecture, e.g., devices comprising one or more circular electrodes, the Epitachophoresis Boundary Velocity equation for calculating velocity v at a distance d from the start with a radius r is given by: $v_L=u_L U\kappa_T/[(r-d)\kappa_T+\kappa_L d]$. When using constant power and a method comprising use of a device for sample analysis that further comprises a circular architecture, e.g., devices comprising one or more circular electrodes, the Epitachophoresis Boundary Velocity equation for calculating velocity v at a distance d from the start with a radius r is given by: $E_L \approx \sqrt{P/(r-d)\kappa_L S}$. In further embodiments, the voltage or current or power that may be used to effect epitachophoresis may be varied in discrete stages. For example, current or voltage or power may be applied at a first value to allow for separation and grouping of electrolytes and/or charge species within a device and/or during effecting any of the methods described herein, and after said separation and grouping occurs, the current or voltage or power may be applied at a second value to increase or to decrease the rate of epitachophoresis, as may be desired for a analysis of a given sample. In embodiments where a non-circular polygonal architecture is used, the electric field may not vary linearly as in the case of circular architectures. Furthermore, in embodiments wherein a non-continuous arrangement of electrodes may be used, the electric field may vary in such a manner as to produce a star-shaped arrangement of electrolyte and/or sample. For example, if an array of point-based electrodes which form a circular shape are used in a method for sample analysis, the resulting zones of electrolyte and/or sample, etc., may form a star shape rather than a circle as a result of the electric field generated by the point electrode-based array.

In further embodiments, a method of sample analysis may comprise extraction of nucleic acids from a sample, e.g., a biological sample. Said sample may comprise whole blood or blood plasma. Said sample may comprise a cell culture from which target analytes may be harvested, such as a whole genome. Said nucleic acids may comprise one or more target nucleic acids, e.g., tumor DNA and/or ctDNA and/or cfDNA. In exemplary embodiments, a method for sample analysis may comprise focusing and collecting tumor DNA and/or circulating tumor DNA (ctDNA) and/or circulating cell-free DNA, e.g., cell-free fetal DNAs (cfDNA), which may then optionally be subjected to further downstream analyses, such as sequencing and/or other in vitro diagnostic applications. In exemplary embodiments, a method for sample analysis may comprise focusing and collecting a target nucleic acid, and said target nucleic acid may be of any desired size. For example, said target nucleic acid may be 5 nt or less, 10 nt or less, 20 nt or less, 30 nt or less, 50 nt or less, 100 nt or less, 1000 nt or less, 10,000 nt or less, 100,000 nt or less, 1,000,000 nt or less, or 1,000,000 nt or more. In further embodiments, said method may be used to extract target nucleic acids from cell-free DNA. Moreover, in some embodiments, said method may be used to concentrate and collect a target analyte from a sample. In some embodiments, said sample may comprise a biological sample. In further embodiments, said target analyte may be used for one or more downstream in vitro diagnostic applications. Furthermore, in exemplary embodiments a method for sample analysis may comprise use of a device for sample analysis in accordance with the methods described herein, and further wherein said device may be connected on-line to other devices, such as, for example, capillary analyzers, chromatography, PCR devices, enzymatic reactors, and the like, and/or any other device that may be used to effect further sample analysis, e.g., a device associated with IVD applications. In further exemplary embodiments, a method for sample analysis may be used in a workflow with nucleic acid sequencing library preparation. Moreover, in further embodiments, a method for sample analysis may be used with liquid handling robots that may optionally be used to effect downstream analysis of a sample that may have been focused and/or collected from a device for sample analysis used in accordance with said method.

In exemplary embodiments, said method may result in any one or more of the following: higher extraction yields (potentially loss-less) compared to column- or bead-based extraction methods; a simpler device setup compared to the larger footprint for the MagNA Pure or other benchtop instruments; potentially faster sample turn-around and high parallelizability as compared to other devices applied to similar uses; easy integration with other microfluidics-based systems for down-stream processing of extracted nucleic acids.

In further embodiments, a device and/or method for epitachophoresis may focus and allow for collection of a target analyte in any desired amount of time that allows for a desired focusing and collection to occur. In some embodiments, the time to effect focusing and collection as described herein can be from about 1 minute to about 30 minutes. In some embodiments, the time to effect a method as described herein can be about 15 min.

Systems, Devices, and Methods of Epitachophoresis with Sample Detection

Furthermore, the present disclosure generally relates to devices, methods, and systems for sample analysis, wherein said devices, methods, and systems comprise effecting epitachophoresis and sample detection. The systems, devices and methods described herein are particularly suitable for automation using robotic liquid handlers. The systems, devices and methods discussed herein are compatible with constant voltage, constant current, and constant power modes of epitachophoresis as described above and any one or more of the devices, systems, and methods discussed herein as well as any downstream applications, e.g., IVD applications, such as those discussed herein.

Types of Detection

Sample detection may be effected according to any known method of sample detection. Detection may proceed by any of a variety of known methods, including electrical detection, spectrophotometric or optical tracking, e.g., spectrophotometric or optical tracking of radioactive or fluorescent markers, or other methods which track a molecule based upon size, charge or affinity. In preferred embodiments, one or more samples are detected via electrical detection. The electrical detection may comprise detection of conductivity, resistivity, current, voltage, and/or other electrical properties. In some embodiments, this sample detection may be effected by a conductivity or resistivity detector. In some embodiments, detection may comprise detection through spectroscopic, photochemical, biochemical, immunochemical, electrical, optical, thermal, or chemical means. Time-dependent transport properties of the sample collection volume may be measured by any suitable technique. The transport properties may be a function of the medium used to transport the target analyte, solutes (for example, ions) in the liquid, the target analyte itself (for example, chemical structure of the monomers), or labels on the target analyte. Exemplary transport properties include current, conductance, resistance, capacitance, charge, concentration, optical properties (for example, UV, fluorescence and Raman scattering), and chemical structure. In some embodiments, the transport property is conductivity. In some embodiments, voltage feedback from a power supply may be used for detection. For example, voltage feedback from a power supply may be used to monitor the position of target analytes and/or focused zones, such as those comprising nucleic acid molecules, during an ETP run. In some embodiments, detection may comprise optical detection comprising visualization of colored dyes during an ETP run. For example, a colored dye, such as a chromatic dye, that comprises a lower electrophoretic mobility as compared to the target analyte, may be added to a sample to enable tracking of the target analyte, e.g., nucleic acid molecules, during an ETP run. The ETP run can be stopped once the colored dye reaches the collection well, as this would be indicative that the target analyte and/or focused zone comprising the target analyte had been collected. In some embodiments, such colored dyes may include, but are not limited to including, any one or more of the following: Brilliant blue FCF, Indigo carmine, Sunset yellow FCF, Allura red, Fast green FCF, Patent blue V and Carmoisine. In some embodiments, colored dyes and fluorescent dyes may be used in combination to effect sample detection. In some embodiments, sample detection may be effected by thermal imaging, such as by using an infrared-based thermal imaging camera. In some instances, a temperature change, such as a temperature increase, near the collection zone of an ETP device may indicate collection of a focused zone and/or target analyte. In some instances, voltage measurements and thermal imaging may be used to effect sample detection. In some instances, the trend of the voltage change over time may be similar to that of the temperature change over time. In some embodiments, sample detection may be effected by more than one detection means. For example, thermal imaging and voltage feedback from a power supply may be used for detection. Furthermore, thermal imaging and voltage feedback from a power supply and optical detection may be used for detection.

Types of Detectors

The systems, devices and methods may comprise one or more detectors or sensors, such as optical detectors, reflectance sensors, infrared (IR) detectors, electrical detectors, thermal sensors, flow sensors, and pressure sensors, including detectors described further in this disclosure. Optical detectors can include but are not limited to three-axis point detectors, complementary metal-oxide semiconductor (CMOS) detectors, charge-coupled device (CCD) detectors, photodiode light sensors, photoresistors, photomultiplier tubes, and phototransistors. Electrical detectors can include electrodes or other detectors capable of detecting a voltage, voltage differential, current, charge, conductivity, resistivity, or other electrical property. Electrical detectors can be used to detect the passage of a focused zone of extracted or purified nucleic acids, for example by detecting a change in conductivity at the interface between trailing electrolytes and leading electrolytes. Thermal sensors can include infrared (IR) sensors, probe temperature sensors, thermistors, negative temperature coefficient (NTC) thermistors, resistance temperature detectors (RTDs), thermocouples, semiconductor-based sensors, or the like.

The systems, devices, and methods may comprise one or more electrical or electronic measuring devices, including an ammeter (ampermeter), a capacitance meter, a curve tracer, a cos phi meter, a distortion meter, an electricity meter, an ESR meter, a frequency counter, a leakage tester, an LCR meter, a microwave power meter, a multimeter, a network analyzer, an ohmmeter, an oscilloscope, a psophometer, a Q meter, a signal analyzer, a signal generator, a spectrum analyser, a sweep generator, a transistor tester, a tube tester, a wattmeter, a vectorscope, a video signal generator, a voltmeter, and a VU meter.

The one or more detectors or sensors can be simultaneously or independently operated and controlled. In some instances, a single location may have a dedicated sensor, for example a conductivity or voltage sensor, which operates independently of other sensors dedicated to other points on the system or device. Feedback from the independent sensor may be used to independently control one or more electric fields on the system or device. For example, a sensor may detect a change in voltage over time within the collection well and feedback from that sensor may be used to control the current within the system or device. A second sensor may act on a second location in a similar, but independent, manner. In some instances, a sensor may detect a change in electrical properties (e.g. conductivity or current) over time within a well and feedback from that sensor may be used to control the voltage or power within the system or device. In some instances, the systems, devices, and methods may comprise more than one sensor, optionally more than one type of sensor, e.g., an electrical sensor and a thermal sensor, provided that the systems, devices, and methods may still effect the desired sample analysis.

A conductivity detector for use within the systems, devices and methods of the invention may be designed according to known principles of conductivity detection. Conductivity probes may measure via amperometric, potentiometric, inductive, or toroidal means. Equivalently, the detector associated with the systems, devices, and methods may measure other features related to conductivity, such as resistivity (the inverse of conductivity) or total dissolved solids (TDS, related to conductivity by a factor depending on the solution). Conductivity measurements may cover a wide range of solution conductivity values from pure water (typically less than $1 \times 10^{-7}$ S/cm) to values of greater than 1 S/cm for concentrated solutions. Because conductivity and resistivity are reciprocal, systems, devices, and methods described as measuring one of these properties will be understood to measure the other as well.

Generally, a solution comprising a sample, electrolyte, and/or analyte will conduct an electrical current if two electrodes are inserted into the solution (or applied across the top of a gel comprising the solution) and a potential is applied across the electrodes. The more current conducted by the solution, the higher is its electrical conductivity. Ohm's Law applies, so that:

$$V=IR,$$

where V is the applied potential (volts), I is the current (amps) and R is the resistance (ohms). The resistance of the solution can be determined by several factors, including the concentration and type of ionic species in the solution, and the temperature. The conductance of the solution, G, (having the units of Siemens, which are represented by the symbol S) is given by the reciprocal of resistance:

$$G = \frac{1}{R}.$$

Conductance may also be provided in the units of reciprocal ohms (mhos). The resistivity (ρ) in units of ohms-cm is given by:

$$\rho = \frac{AR}{L},$$

where A is the cross-sectional area (cm$^2$) of the electrodes inserted into the solution, and L (cm) is the distance between them. The inverse of resistivity is the conductivity, K, which has units of S/cm, and is also referred to as the specific conductance.

$$\kappa = \frac{L}{AR} = \frac{LG}{A}$$

As shown through the above formulas, measurement of one electrical property of a solution, sample, or analyte may be equivalent to measurement of other electrical properties through known equations and relationships. The present methods, devices, and systems therefore encompass any form of electrical detection for use in combination with sample epitachophoresis.

Conductivity detectors may be any of those known in the art. Such detectors generally operate under the following principle: under the influence of a potential gradient, the ion/analyte in solution can carry an electric charge, and thus if a voltage is applied across two electrodes situated in the solution, a current will flow between the electrodes and the solution is said to be conducting. Such a method can be used to detect target analytes. In some embodiments, in conductivity detectors, it is generally the resistance of the solution that is actually monitored, and it is the change in electrical resistance of the mobile phase in the presence of a solute that provides the output from the detector. For this reason, the functioning of the detector is often considered in terms of resistance measurement. In some embodiments, a conductivity detector cell comprises two electrodes across which an AC potential is applied. The electrical capacity of the cell may be minimized by ensuring that the surface area of the electrodes is small. Generally, choice of electrode and potential will be optimized to increase the signal to noise ratio without interfering with detection function. In some embodiments, the potential difference is 1-2 V. In some embodiments, the potential difference is less than 1 V, approximately 1 V, 1-2 V, or greater than 2 V. Electrode sizes will generally be less than 1 mm. In some embodiments, the electrode surface area is less than 1 µm, less than 10 µm, less than 50 µm, less than 100 µm, less than 500 µm, less than 1 mm, or greater than 1 mm. Electrodes may be formed of any suitable substance as known in the art, e.g., platinum (Pt), carbon, graphite, etc. In other embodiments, the detector may not directly contact the solution, sample, or analyte to be measured, e.g., capacitively-coupled contactless conductivity detector (C4D). The electrodes of the conductivity detector may be placed in any suitable location throughout the apparatus for effecting epitachophoresis. In some embodiments, the location of the detector is particularly selected to signal the collection of target analyte, e.g., near the elution reservoir.

In some embodiments, a method for measuring the position of an ETP band is to measure the voltage or the resistance between any two points in the system or device, such as between the driving electrode and the ground electrode. In systems with more than two electrodes, this measurement may be taken between any pair of electrodes. This measurement can be made readily, as the voltage driving electrophoresis/epitachophoresis may also be the measurement voltage in constant power mode. Throughout the epitachophoresis process, the voltage can increase as the trailing ion fills the system or device. However, the elution reservoir can have a large cross-section, so the contribution to overall resistance can be small. Hence, changes in the buffer conductivity in this region may not strongly impact the overall channel resistance, and the voltage can stop rising when the ETP zone enters the elution reservoir. This can be used as a signal to stop applying current and end the run.

In some embodiments, to assess this voltage change, the derivative of voltage can be calculated. In some embodiments, the Lanzcos differentiation method can be used to suppress high frequency noise. Thresholds can be set for the derivative, and when the derivative passes the threshold, a trigger may be performed. In some cases, introducing additional triggers can improve the robustness of the control. In some cases only some of these triggers are used to change the driving current, while others may be used to mark time points in the run, which can improve the timing of the final triggers.

In some embodiments, a method for detecting the position of an ETP band is to make a localized measurement of the conductivity. This can be done using a capacitively coupled contactless conductivity detector (C4D). This method can use high frequency alternating current to pass through the wall of the sample collection well and couple to the electrolyte. This localized measurement can be taken at the elution reservoir itself. This technique can reduce or remove the ambiguity associated with measurements taken over the entire channel. In this technique, the end of run trigger can be chosen as soon as a change is seen in the conductivity at the elution reservoir conductivity detector. C4D detection can be performed with electrodes placed below the elution volume.

In some embodiments, maximizing the electrode area can reduce the necessary driving frequency. For example, driving frequencies can be used from about 100 kHz to about 10 MHz, with electrode contact pads between about 0.2 mm2 and about 50 mm2. C4D sensors can be implemented with electrical components including resistors, capacitors, a diode bridge, and high-frequency operational amplifiers, with a high frequency signal source such as from a direct digital synthesizer.

In some embodiments, a method for detecting the position of an ETP band is to make a localized measurement of temperature near the elution reservoir. This measurement can be made with temperature sensors including a thermocouple or an infrared temperature sensor. The sensor can be placed under the channel near the elution reservoir and can monitor the temperature over time. When the lower-mobility trailing ions displace the higher-mobility leading ions (e.g. the LE-TE interface of the ETP zone), the electric field in the channel can increase, and the temperature can rise. During isotachophoresis and epitachophoresis, lower mobility trailing electrolyte ions and higher mobility leading electrolyte ions may meet at an ITP or ETP interface. The ETP interface may comprise the sample analyte, e.g., nucleic acids, concentrated between the leading electrolyte ions and trailing electrolyte ions. A temperature rise can detect the presence of the ETP interface between the higher-mobility leading ions and the lower-mobility trailing ions, and thus also indicates the presence of the sample there between. This temperature rise can be 1-10° C.

However, alternatively, in some embodiments, an inventive system, device, or method described herein is characterized by having no or only minimal temperature fluctuations over the course of the epitachophoresis run.

Detector Positions

The sample detector component(s) of the system, device, or method may be positioned anywhere within the sample analysis area, e.g., anywhere from the sample loading to the sample collecting compartments of the device. In some embodiments, the sample detection occurs close to or within the sample collecting compartment of the system or device. In some embodiments, the detection occurs within the sample collection volume. In some embodiments, the detection occurs below the sample collection volume. In some embodiments, the detection occurs within the LE reservoir beneath the sample collection volume.

In some embodiments, one or more detectors may be integrated with the device for effecting epitachophoresis. For example, in some embodiments, one or more detectors are part of a bottom plate or bottom substrate that may be connected to a top plate or top substrate for effecting epitachophoresis. In some embodiments, one or more detectors may be part of a top plate or substrate integrated with a bottom plate or substrate for effecting epitachophoresis. In some embodiments, one or more detector probes may be incorporated into a bottom substrate, with detection occurring near or within the central pillar of the bottom substrate. In some embodiments, one or more detector probes may be incorporated into a top substrate, with detection occurring near or within the central pillar of the top substrate. In some embodiments, this detection may occur below, above, near, or in contact with the sample collection volume or the container comprising the sample collection volume, e.g., a semi-permeable membrane, compartment, tube, well, or the like.

In embodiments where the detector and the device for effecting epitachophoresis are inter-connecting components, these components may be connected via any suitable means. In some embodiments, the components may be connected via physical or chemical means. In some embodiments, the components are connected via magnets. In some embodiments, O-rings, spacers, insulation, or other such components may be used to prevent leakage between the detection and epitachophoresis components.

In some embodiments, there may be one or more sample detection components for use with the present system, device, or method. In some embodiments, there is a single detector. In some embodiments, there are one or more detectors. In some embodiments, there are two or more detectors. In some embodiments, there may be sample detection at several or more discrete locations throughout the system or device. In some embodiments, there may be numerous sample detection locations. In some embodiments, there may be continuous sample detection between any two locations throughout the system or device. In some embodiments, one or more detectors may be incorporated into the device and/or system itself. In some embodiments, one or more detectors may contact the device and/or system. In some embodiments, one or more detectors one or more detectors may be incorporated into the device and/or system itself and one or more detectors may contact the device and/or system as well.

Automation, Robots, Liquid Handling

The present invention is also directed to high throughput sample analysis devices comprising numerous individual components effecting epitachophoresis with sample detection. In some embodiments, during or following epitachophoresis, a system, device, or method of the present invention may comprise automated sample collection. The automated sample collection may be triggered by a detection of target analyte near or within the sample collection volume. The detection of the target analyte may be direct or indirect, e.g., the target analyte may be detected based on its physical, biochemical, optical, mechanical, or other properties or the target analyte may be indirectly detected. Indirect detection may comprise detecting a transition between the leading and trailing electrolytes through, e.g., electrical detection. More generally, any detection method that comprises detection of the focused zone of sample or a transition between the LE and TE zones may be used to detect sample. Such detection may then be used to trigger automated liquid handling. In some embodiments, the system, device, or method may include a robot assembly configured to move in at least one of an x-y direction, an x-y-z direction, or a rotary direction and which may include an automated liquid handler. The automated liquid handler may aspirate and dispense a volume of a liquid between two or more vessels within the system to transport the liquid between two or more stations or physical locations within the system. The systems, devices, and methods described herein may be compatible with any commercially available liquid handling robot, e.g., Hamilton® Liquid Handling Robot or Tecan® Liquid Handling Robot, e.g., Tecan Fluent®, Tecan Freedom EVO®, or Tecan D300e Digital Dispenser robot.

In some embodiments, the method is one, wherein an automated liquid handler is used, wherein the automated liquid handler comprises 24-, 48-, 96-, or 384-well manifold liquid handling head compatible with microtiter plates to transfer solutions from one location to another.

In some embodiments, automated sample plating or streaking may be employed in connection with the systems and methods described herein. There are commercially available, automated plating devices that are suitable for streaking or plating in a laboratory standard petri dish format. The following devices based on streaking may be included within the systems described herein: PREVI® Isola (BioMerieux), PetriPlater™ (Scirobotics) and InoqulA™ (BD Biosciences). There is also the option of relying on automatically generated serial dilutions and plating, e.g. the easySpiral Dilute® (Interscience).

In some embodiments, the liquid handling system may include one or more liquid handling machines, and may be in communication with and one or more processing devices. In some embodiments, the liquid handling machine may be any programmable machine, robot, or system or combination of programmable machines, robots, or systems suitable for dispensing and/or withdrawing fluids. In some embodiments, the liquid handling machine includes multiple dispensing nozzles and a deck space for supporting a plurality of plates or other storage devices. Automated liquid handling systems are generally well known in the art. An example is the Tecan® Freedom EVO® robotic workstation. This device enables automated liquid handling in a stand-alone instrument or in automated connection with an analytical system. A portable device for lysing and/or purifying biological samples is known from WO 2007/061943. The processing of nucleic acids is performed within a cartridge chamber using electrodes arranged on the two sides, thus processing biological material by electrolysis, electroporation, electro-osmosis, electrical kinetic or resistive heating. The cartridge further comprises sieving matrixes or membranes. By the use of adequate buffers and other reagents, in combination with the application of the electrodes, various reactions can be performed within the chamber, and desired products can be directed for example to collecting membranes. The cartridge itself can be placed into an integrated system comprising the required control elements and energy sources. In some embodiments, the present invention comprises a device capable of effecting epitachophoresis directing desired products to such collecting membranes for further processing by liquid handling robots.

In some embodiments, the liquid handling machine is configured for accurately pipetting and/or removing small volumes of fluid, e.g., 20 mL or more, 20 mL or less, 10 mL or less, 5 mL or less, 1 mL or less 500 μL or less, 250 μL or less, 100 μL or less, 50 μL or less, 10 μL or less, or 1 μL or less. In some embodiments, the liquid handling machine may include a fluid dispensing system, an aspiration system, and a communication system. In some embodiments, the fluid dispensing system may further include one or more fluid conduits and nozzles in communication with one or more fluid sources. In some embodiments, the aspiration system may include one or more fluid conduits in communication with a vacuum system and, optionally a waste disposal system. In some embodiments, the communication system may include one or more displays and inputs for inputting data to the machine. In some embodiments, the communication system may also include one or more components for communication through a communication network, such as but not limited to the Internet, an intranet, a local area network, a wireless local network, a wide area network, or another communication network, as well as combinations of networks.

In some embodiments, the processing device for use in combination with the liquid handling systems or other robots may be a personal computer, workstation, server, mobile device, mobile phone, processor, and/or other processing device. In some embodiments, the device may include one or more processors that process software or other machine-readable instructions and may include a memory to store the software or other machine-readable instructions and data. The memory may include volatile and/or non-volatile memory. In some embodiments, the device may further include or at least communicate with one or more data structures and/or databases.

Additionally, in some embodiments, the device may also include a communication system to communicate via a wireline and/or wireless communications, such as through the Internet, an intranet, and Ethernet network, a wireline network, a wireless network, and/or another communication network. In some embodiments, the processing device may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, and other data.

Samples

The devices, methods, and systems of the present invention may be used to analyze and detect any suitable sample or samples, such as those described herein. In some embodiments, the sample is a biological sample. In some embodiments, the biological sample is plasma, urine, blood, saliva, a tissue extraction, or a biopsy extraction, or a combination of any two or more biological samples. Samples comprising target analytes, e.g. nucleic acids, can be obtained from a subject by any number of means, including by taking bodily fluids, taking tissue, or by collecting cells/organisms The sample may comprise or be obtained from blood, urine, serum, lymph, saliva, anal and vaginal secretions, perspiration, semen, cerebrospinal fluid, seminal fluid, sputum, stool and tissue. Any tissue or body fluid specimen may be used as a sample for analysis according to the present disclosure. Nucleic acid molecules can also be isolated from cultured cells, such as a primary cell culture or a cell line. The cells or tissues from which nucleic acids are obtained can be infected with a virus or other intracellular pathogen. A sample can also be total RNA extracted from a biological specimen, a cDNA library, viral, or genomic DNA. A sample may also be isolated DNA from a non-cellular origin, e.g. amplified/isolated DNA from the freezer. The sample obtained may be comprised of a single type of cell/organism, or may be comprised multiple types of cells/organisms. The DNA can be extracted and prepared from the subject's sample. For example, the sample may be treated to lyse a cell comprising the polynucleotide, using known lysis buffers, sonication techniques, electroporation, and the like. The target DNA may be further purified to remove contaminants, such as proteins, by using alcohol extractions, cesium gradients, and/or column chromatography. Alternatively, the sample may be minimally altered or unaltered prior to analysis by epitachophoresis.

In exemplary embodiments, the inventive methods may comprise detection, extraction, concentration, and/or collection of a target analyte from a sample, e.g., a biological sample. In further exemplary embodiments, said method may comprise extraction of ctDNA from a sample and/or said method may comprise extraction of cfDNA from a sample, e.g., blood or plasma from a pregnant woman. In further exemplary embodiments, said method may comprise extraction, concentration, and/or collection of a target analyte from a sample, e.g., a biological sample, and said target analyte may be used for one or more downstream in vitro diagnostic applications.

Benefits of Automated Sample Analysis with Epitachophoresis and Detection

Sample detection in a system or method comprising a device effecting epitachophoresis may have one or more of the following benefits: ease of automation, ease of high throughput design, label free sample detection, many-fold sample concentration, minimal sample manipulation, convenient and rapid separation of sample from other components, lower sample loss, higher sample yield, fewer steps to obtain a substantially pure sample, larger quantities of low concentration samples, greater utility and accuracy for downstream sample analysis, less sample contamination.

In some embodiments, the system is particularly advantageous for allowing for label free, dye-free sample analysis, concentration, purification, and/or collection. Such a system can allow for the rapid analysis of samples without the need for expensive or time-consuming preparative steps. In some embodiments, the epitachophoretic separation of target analytes from other components of an analyzed sample is particularly advantageous for downstream processing, e.g., sequencing of nucleic acids.

In exemplary embodiments herein, systems and devices for sample analysis comprise systems and devices designed and fabricated based on ETP suitable for focusing of large sample volumes (e.g., up to 20 mL). The systems and devices provide high recovery and concentrate the DNA in a microliter volume collection cup for easy recovery for further use. For example, compared to existing solid phase DNA extraction methods, this ETP-based separation is simple and fast, producing high concentration factors without extensive surface interactions. In some embodiments, in a non-sieving separation medium, small and short DNA fragments can be focused in one zone. In some embodiments, only selected sizes can be focused or separated from other sample components using combinations of sieving media and buffer compositions for focusing only certain ranges of electrophoretic velocities. Generally, electrical detection of the sample allows for dye-free, label-free sample detection and eliminates the need for an additional sample cleaning step, such as the electrical detection described with regard to the devices, methods, and systems for sample analysis described herein.

Collection and/or Separation

The present invention is also directed to a system capable of separating two or more different samples or target analytes based on electrophoretic mobility. In some embodiments, numerous target analytes may be concentrated within the same focused zone and may be collected together. In some embodiments, different analytes may be separated based on electrophoretic mobility and collected separately from the sample collection volume. In some embodiments, various target analytes may be focused within one zone and others may be focused in one or more zones different from the first zone. For example, in an exemplary non-limiting embodiment, it is envisioned that DNA fragments between 1 and 500 bp could be focused in one zone, DNA fragments between 500 and 3000 bp could be focused in another zone, and larger DNA fragments (e.g. genomic DNA) could be focused in a third zone. In some embodiments, the inventive methods comprise epitachophoresis followed by additional sample purification steps to separate the target analytes from other material.

In some embodiments, focused zones may be very narrow (~100 m), and it may be advantageous to record transitions between LE and TE to indicate the position of the target analyte(s). In some embodiments, detection may indicate the location of one or more focused zones separately.

In some embodiments, the sample collection cup (or any other suitable container, e.g. vial, tray, well, pipette, etc. used for sample collection) volume may be 5 mL or more, 5 mL or less, 1 mL or less, 500 µL or less, 200 µL or less, 100 µL or less, 50 µL or less, 10 µL or less, 5 µL or less, or 1 µL or less. Preferably, the sample collection volume is selected to be small enough to allow for the desired increase in concentration of the target analyte. In some embodiments, the sample concentration may increase 2-fold or more, 5-fold or more, 10-fold or more, 15-fold or more, 20-fold or more, 25-fold or more, 30-fold or more, 35-fold or more, 40-fold or more, 45-fold or more, 50-fold or more, 100-fold or more, 150-fold or more, 200-fold or more, 500-fold or more, 1000-fold or more, 2000-fold or more, 2500-fold or more, 5000-fold or more, or 10,000-fold or more.

Feedback Control of Sample Collection

Epitachophoresis-based sample collection and/or purification may be conducted according to the present methods, such as those using the present systems and devices. In some embodiments, feedback control and process timing using sample detection (e.g. triggering) as described herein can be used to control and/or automate the epitachophoresis process. In some embodiments, sensors on the device (e.g., electrical sensors) can be used to detect the samples, for example based on conductivity (or e.g., fluorescence, UV, optical, thermal, electrical, etc. detection). In some embodiments, a conductivity change can be detected, which can be used to indicate timing for ending the ETP run, e.g., when the target analytes (e.g., nucleic acids) reach the sample collection volume (or elution point or other fixed point). In some embodiments, other detection methods described herein, such as temperature or driving voltage, can also be used to determine end of run timing or other triggers. For example, a conductivity or optical or temperature or voltage sensor may be used to control an electric field applied to a channel within the device in order to automate the ETP process. As an example, an electric field may be applied to a channel to begin ETP sample analysis and/or purification. In some embodiments, a sensed change in the measured quantity may be used to trigger various events, e.g., the start of ETP, the start of other sensing at a fixed location or locations, or the end of ETP. In some embodiments, the measured properties within the device may change as the ETP-focused zone or zones comprising confined sample(s) moves. Changes indicative of the ETP zone passing through specific features may be sensed by the sample detection apparatus or apparatuses and feedback may be used to alter the electric field, for example by reducing or terminating the run. In some embodiments, a change in conductivity may be detected as the ETP zone passes a conductivity sensor at or near the elution reservoir, and feedback from the sensor may be used to control the electric field, for example by removing it to end the ETP run. In some instances, the device can terminate the ETP run, for example based on a trigger signal. In some embodiments, the target analytes or desired sample (e.g., nucleic acids) may be positioned or isolated within the collection volume or elution reservoir or region when the ETP run is terminated. In some embodiments, voltage feedback from a power supply may be used for detection, i.e., to monitor the position of target analytes and/or focused zones, such as those comprising nucleic acid molecules, during an ETP run. In some embodiments, voltage feedback from a power supply may be used for detection and for subsequent triggering of a desired action during automated device operation, e.g., beginning or ending sample collection.

In some embodiments, detection may comprise optical detection comprising visualization of colored dyes during an ETP run. For example, a colored dye, such as a chromatic dye, that comprises a lower electrophoretic mobility as compared to the target analyte, may be added to a sample, to enable tracking of the target analyte, e.g., nucleic acid molecules, during an ETP run. The tracking of such dyes can be used to trigger events during an ETP run. For example, the ETP run can be triggered to be stopped once the colored dye reaches the collection well, as this would be indicative that the target analyte and/or focused zone comprising the target analyte had been collected.

In some embodiments, sample detection may be effected by thermal imaging, such as by using an infrared-based thermal imaging camera. In some instances, a temperature change, such as a temperature increase, near the collection zone of an ETP device may indicate collection of a focused zone and/or target analyte. In some embodiments, thermal detection may be used to trigger events during an ETP run. For example, a change in temperature near the collection zone may indicate collection of a target analyte and/or focused zone, and the increase may be used to start and/or stop the ETP run for collection of a target analyte and/or focused zone.

In some embodiments, the detection-based triggering of the end of the ETP run may also trigger other events, such as those that may help to maintain the elution volume for pipetting. In some embodiments, the device may close or block various channels or features, which can fix the elution volume to maintain a constant volume for the elution (e.g., by resisting or preventing flow into the LE reservoir or outlet reservoir during pipetting out of the eluted volume). Fixing the elution volume can aid ease of use and can help for reporting the concentration of the eluted sample material.

In some embodiments, the applied current may be stopped when the target ETP band is in the elution location (e.g., the sample collection volume, central well, LE electrolyte reservoir). The present disclosure provides techniques for assessing the target ETP band position, which can be used to trigger the end of a sample analysis run, e.g., sample purification run. These techniques can include measurement of driving voltage, measurement of conductivity, and measurement of temperature among other types of measurements.

In some embodiments, the system of the present invention is capable of (1) effecting epitachophoresis; (2) measuring via electrical detection the transition between LE and TE near or within the sample volume; (3) based on the detection of the transition from step (2), terminating the epitachophoresis run and initiating automated collection of the sample volume using an automated liquid handler.

In some embodiments, the system of the present invention is capable of (1) effecting epitachophoresis; (2) measuring via electrical detection the transition or transitions between two or more ETP bands near or within the sample volume; (3) based on the detection of the transition or transitions from step (2), terminating the epitachophoresis run and initiating automated collection of the sample volume using an automated liquid handler. The transition or transitions in step (2) may be transitions between LE and target analyte, target analyte and TE, LE and TE.

Additional Applications

Applications and/or uses of the invention disclosed herein may include, but not be limited to the following: 1. Assay of relative or absolute gene expression levels as indicated by mRNA, rRNA, and tRNA. This includes natural, mutated, and pathogenic nucleic acids and polynucleotides. 2. Assay of allelic expressions. 3. Haplotype assays and phasing of multiple SNPs within chromosomes. 4. Assay of DNA methylation state. 5. Assay of mRNA alternate splicing and level of splice variants. 6. Assay of RNA transport. 7. Assay of protein-nucleic acid complexes in mRNA, rRNA, and DNA. 8. Assay of the presence of microbe or viral content in food and environmental samples via DNA, rRNA, or mRNA. 9. Identification of microbe or viral content in food and environmental samples via DNA, rRNA, or mRNA. 10. Identification of pathologies via DNA, rRNA, or mRNA in plants, human, microbes, and animals. 11. Assay of nucleic acids in medical diagnosis. 12. Quantitative nuclear run off assays. 13. Assay of gene rearrangements at DNA and RNA levels, including, but not limited to those found in immune responses. 14. Assay of gene transfer in microbes, viruses and mitochondria. 15. Assay of genetic evolution. 16. Forensic assays.

Applications of Devices and Methods

In further exemplary embodiments, the devices and methods disclosed herein may be used for and/or with the following applications in accordance with the present disclosure.

In exemplary embodiments, the devices and methods described herein may be used in conjunction with IHC analysis of representative samples. For example, IHC analysis of representative samples from of lymph node tissue (e.g., prepared from surgically removed lymph nodes) can detect extremely small tumor micro-metastases through staining for epithelial markers combined with proliferation markers (for instance cytokeratin 8/18 dual IHC with Ki67), using markers that were positive in the primary tumor, using other markers of metastatic cells, or other diagnostic markers. The devices and methods described herein may be used to analyze pre-stained cells and/or may be used to selectively stain cells and/or may be used to separate, focus, and collect desired cells as identified by the presence of a desired marker/stain in conjunction with IHC analysis techniques in some embodiments. Furthermore, metastatic tumor cells can also be detected at the nucleic acid, such as by using a Next Generation Sequencing panel looking to identify cancer-associated mutations, including mutations present in the primary tumor. As described herein, in exemplary embodiments devices and methods disclosed herein may be used to separate, focus/concentrate, and collect such nucleic acids. Moreover, DNA purified from representative sampling from the primary and lymph nodes, as well as DNA from circulating tumor DNA from any distant metastatic cells could be separated, focused/concentrated, and/or collected in exemplary embodiments.

Based thereon, representative samples derived by exemplary embodiments of the inventive methods and devices described herein may facilitate and substantially improve the accuracy of detecting, diagnosing, and/or staging of different types of tumors, i.e., different solid tumors, irrespective of tumor tissue type, location, size or volume. Also, the present methods and devices potentially may be used to produce representative samples from supposed normal tissue samples or putative precancerous tissues (e.g., obtained from subjects at higher risk of developing cancer because of a genetic risk or a prior cancer) so as identify rare cell types such as cancer stem lines that may be present therein even before any sign of the disease has manifested in some embodiments.

In one aspect, the devices and methods described herein may provide for methods and devices for producing a biological sample suitable for assessing heterogeneity of cells within a tumor or lymph node and/or assessing the prognosis of a particular cancerous condition in a subject and/or determining an appropriate therapeutic protocol of a subject with a cancerous condition comprising (i) obtaining a tissue (such as a tumor sample or a lymph node) that comprises spatially distinct regions of the tissue or which comprises a whole tumor or a substantial portion thereof, and (ii) preparing the sample for analysis, and (iii) using said devices and methods to analyze the cells comprising said sample, e.g., separating, focusing/concentrating, and/or collecting desired cells.

In another aspect, the devices and methods described herein may provide devices and methods for producing a biological sample suitable for assessing heterogeneity of cells within a sample (such as a tumor sample or lymph node) and/or assessing the prognosis of a particular cancerous condition in a subject comprising (i) obtaining one or more intact biopsy samples from a solid tumor or a lymph node, preferably wherein each biopsy sample comprises at least about 100-200, 200-1000, 1000-5000, 10,000-100,000, 100,000-1,000,000 or more cells, (ii) preparing the sample for analysis, and (iii) using said devices and methods to analyze the cells comprising said sample, e.g., separating, focusing/concentrating, and/or collecting desired cells.

In another aspect, the devices and methods described herein may provide devices and methods for producing a biological sample suitable for assessing whether a subject comprises a virulent form of a particular cancer and/or whether a subject with cancer comprises a virulent form of that particular cancer comprising (i) obtaining one or more intact biopsy samples from a solid tumor or a lymph node, preferably wherein each biopsy sample comprises at least about 100-200, 200-1000, 1000-5000, 10,000-100,000, 100, 000-1,000,000 or more cells, and optionally fixed or preserved (such as a formalin, paraffin, or ethanol fixed or preserved sample), and (ii) preparing the sample for analysis, and (iii) using said devices and methods to analyze the cells comprising said sample, e.g., separating, focusing/concentrating, and/or collecting desired cells, and optionally isolating or detecting the expression of at least one biomarker. The upregulation (such as increased expression) or downregulation (such as decreased expression) of the biomarker is associated with a virulent form of the particular cancer.

In yet another aspect, the devices and methods described herein may provide devices and methods for characterizing a landscape within a heterogeneous tumor and/or detecting genetically distinct subclones within a heterogeneous tumor and/or identifying low prevalence events within a tumor and/or determining the prevalence of targets within a tumor comprising (i) obtaining a sample or samples of the tumor that encompasses spatially distinct regions of the tumor, (ii) preparing the sample for analysis, and (iii) using said devices and methods to analyze the cells comprising said sample, e.g., separating, focusing/concentrating, and/or collecting a target analyte, e.g., desired cells, optionally producing samples representative of the landscape of the heterogeneous tumor and suitable for characterizing the landscape of the tumor and/or detecting genetically distinct subclones within a heterogeneous tumor and/or identifying low prevalence events within a tumor and/or determining the prevalence of targets within a tumor.

In yet another aspect, the devices and methods described herein may provide devices and methods for detecting precancerous cells or cancerous cells in supposed normal tissues or putative precancerous tissues in a patient, e.g., one at risk of developing cancer because of a genetic mutation or previous cancer, comprising (i) obtaining a sample or samples of supposed normal tissues or putative precancerous tissues that encompass spatially distinct regions of the supposed normal tissues or putative precancerous tissues of the patient, (ii) preparing the sample for analysis, and (iii) using said devices and methods to analyze the cells comprising said sample, e.g., separating, focusing/concentrating, and/or collecting desired cells, wherein the sample of desired cells produced by the devices and/or method is suitable for detecting rare cancerous cells or cancer stem cells, e.g., even before any sign of disease has manifested in the patient.

In another aspect, the devices and methods described herein may provide devices and methods of using representative samples and portions thereof produced by the any of the foregoing methods in different assay formats, wherein these assays may be effected in high throughput, performed simultaneously or at different times or different locations, and/or by automation (fully automated or semi-automated).

In another aspect, the representative samples or portions thereof produced by the any of the foregoing devices and methods are stored for future use, e.g., frozen.

In another aspect, the devices and methods described herein may be used to produce representative samples, wherein said representative samples or portions thereof may be used to derive antibodies or antigens specific to a particular cancer cell or cell types in a patient sample which antibodies or antigens potentially may be used in personalized medicine, i.e., in the production of therapeutic or prophylactic cancer vaccines.

In exemplary embodiments, any of the devices and methods described herein may be used for detecting the expression of at least one biomarker, e.g., at least one lipid, protein, or nucleic acid biomarker, in the sample. Additionally, in further embodiments, said devices and methods may further include detecting the percentage of tumor cells in the sample or a portion or fraction thereof that express a particular biomarker or combination of biomarkers. Optionally, tumor stem cells and/or the relative frequency or percentage of tumor subclones in the sample or a portion or fraction thereof may be detected and/or isolated in some embodiments. Additionally, in further embodiments the devices and methods described herein may also be used for detecting a genetic target (such as a point mutation, a deletion, an addition, a translocation, a genetic fusion, or an amplification of a gene).

In some embodiments, any of the above devices and methods described herein may also be used to detect, isolate, and/or quantify specific immune cells (such as B lymphocytes, T lymphocytes, macrophages, NK cells, monocytes, or a combination thereof).

The samples used in conjunction with the subject devices and methods generally will be derived from a solid tumor or tumors. However, the devices and methods potentially also may also be effected with non-solid tumors, e.g., blood cancers. Such tumor or other tissue sample or samples used in the disclosed devices and methods may e.g., be derived from breast, colon, lung, pancreas, gall bladder, skin, bone, muscle, liver, kidney, cervix, ovarian, prostate, esophageal, stomach, or other organs, e.g., a breast cancer tumor, a lung cancer tumor, liver tumor, a prostate cancer tumor, a colon cancer tumor, a bladder cancer tumor, or a kidney cancer tumor, in some embodiments. In some embodiments, the tumor sample used may be of human origin.

Moreover, in some embodiments any of the above devices and methods may further comprise purifying nucleic acids (such as DNA or mRNA) from the sample or a portion or fraction thereof. The purified nucleic acids may be subject to Northern blot, DNA sequencing, PCR, RT-PCR, microarray profiling, differential display, or in situ hybridization. Also, the purified nucleic acid may be conjugated to a nanoparticle (such as quantum dots, paramagnetic nanoparticles, superparamagnetic nanoparticles, and metal nanoparticles, preferably alloyed quantum dots, including by way of example and without limitation, CdSe, ZnSSe, ZnSeTe, ZnSTe, CdSSe, CdSeTe, ScSTe, HgSSe, HgSeTe, HgSTe, ZnCdS, ZnCdSe, ZnCdTe, ZnHgS, ZnHgSe, ZnHgTe, CdHgS, CdHgSe, CdHgTe, ZnCdSSe, ZnHgSSe, ZnCdSeTe, ZnHgSeTe, CdHgSSe, CdHgSeTe, InGaAs, GaAlAs, and InGaN, by way of example).

It is also contemplated that any of the above devices and methods may further be used for purifying lipids from a sample or a portion or fraction thereof. The purified lipids may be subject to mass spectrometry or histochemistry.

Additionally, it is also contemplated that in some embodiments any of the above devices and methods may further comprise purifying proteins from a sample or a portion or fraction thereof. The purified proteins may be subject to Western blot, ELISA, immunoprecipitation, chromatography, mass spectrometry, microarray profiling, interferometry, electrophoretic staining, or immunohistochemical staining. Alternatively, or in addition to the foregoing, the purified proteins may be used to produce antisera specific to the tumor.

Moreover, it is contemplated that any of the above devices and methods may further comprise performing a genomic, transcriptomic, proteomic and/or metabolomic analysis on the sample or a portion or fraction thereof.

Furthermore, it is contemplated that any of the above devices and methods may further comprise affinity purifying specific cell types from the sample or a portion or fraction thereof. The specific cell types may contain a biomarker of interest.

The present disclosure also generally encompasses compositions produced by any of the devices and methods described herein.

Additionally, in some embodiments the results obtained by use of the foregoing devices and methods (such as the detection of rare genetic and/or epigenetic events, rare cells, etc.) or compositions produced by any of the foregoing devices and methods can be used in the selection of an appropriate therapeutic regimen for treating a subject. The therapeutic regimen can include any of chemotherapy, immunomodulator administration, radiation, cytokine administration, surgery, or a combination thereof. Moreover, the disclosed devices and methods can be used to select at least one therapeutic agent (such as an antibody, nucleic acid, small molecule or polypeptide that antagonizes, inhibits, or blocks the expression or functional activity of at least one detected biomarker) suitable for use in a subject whose tumor was the source for the representative sample analyzed by said devices and/or methods.

Additionally, a sample analyzed by said devices and/or methods, e.g., a target nucleic acid obtained using said devices and/or methods, may be suitable for use in additional diagnostic tests, such as whole genome sequencing, which may be important for future pharmacological and diagnostic discoveries and for personalized medicine. Said analyzed sample may be used for a variety of diagnostic protocols in order to identify rare tumor sub-clones and by extension improve clinical diagnostics and personalized cancer treatment. Also, the resultant analyzed sample may be used to derive antibodies or antigens useful in the development of therapeutic or prophylactic tumor vaccines.

The detection procedures for use in conjunction with the devices and methods for sample analysis described herein may furthermore comprise a cytochemical staining procedure rendering a chromogenic or fluorescent staining of cells or cell compartments. Such staining procedures are known to those of skill in the art and may for example comprise e.g. staining for acidophilic or basophilic structures, of subcellular regions (e.g. the nucleus, the mitochondria, the golgi, the cytoplasm etc.), of specific molecules (of chromosomes, of lipids, of glycoproteins, of polysaccharides etc.) in the cytological specimens. Fluorescence dyes such as DAPI, Quinacrin, Chromomycin, etc. may be employed. Furthermore, chromogenic dyes such as Azan, Acridin-orange, Hematoxylin, Eosin, Sudan-red, Thiazin-stains (Toluidin-blue, Thionin) may be applied. In other embodiments staining procedures such as Pap-staining, Giemsa-staining, Hematoxylin-Eosin staining, van-Gieson staining, Schiff-staining (using Schiff reagent), staining procedures employing precipitation of metals (such as e.g. of silver in staining procedures employing Silver Nitrate) or insoluble stains such as e.g. of Turnbulls-blue (or other insoluble metal cyanides), etc. may be used. It must be understood, that the named dyes and staining methods shall be examples for the applicable methods and that any other method known in the art may be applied in conjunction with the devices and methods for sample analysis described herein.

The staining procedures may produce chromogenic stains for light microscopic inspection or fluorescent stains for inspection under fluorescence microscopic conditions. In another embodiment radiation emitting procedures, procedures employing substances impairing the transmission of radiation or other contrast media for imaging of the cytological conditions in a sample (e.g. the generation of optical impression by means such as (micro-)autoradiographic or (micro-)radiographic picture generation) may be of use in conjunction with the devices and methods for sample analysis as described herein.

Any of the staining and imaging procedures may be used for analysis not only in microscopic procedures but also in automated analysis procedures such flow cytometry, automated microscopic (computerized or computer aided) analysis or any other method for analysis of stained cytological specimens. "Automated" or "Automatic" means activity substantially computer or machine driven and substantially free of human intervention.

Additional Methods for Use in Association with the Devices and Methods Described Herein Additional diagnostic methods may be applied to samples for analysis and/or analyzed by the devices and methods described herein, and compositions comprising sample for analysis and/or analyzed samples, including, but not limited to, ELISA-based detection of proteins, affinity purification of specific cell types, etc. In order to further illustrate the numerous diagnostic and therapeutic applications of the present disclosure, Applicants provide below an additional overview of various techniques that may be effected with the samples and subsamples or components isolated therefrom, e.g., cells, nucleic acids, proteins, lipids et al., that are for or have been analyzed using the devices and methods described herein.

A sample for analysis and/or analyzed by the devices and/or methods described herein may be subjected to further processing steps. These include, but are not limited to, further analytical techniques, such as those detailed in the present disclosure, including further diagnostic assays where applicable. The following methodologies may be used in conjunction with the samples for analysis and/or analyzed by the devices and methods described herein, which may result in information concerning the identities and biological properties of the sample, e.g., a cell contained with a heterogenous tumor cell population. The combined analyses provided by the devices and methods described herein and the techniques described below can allows for identification, detection, or characterization of even minor sub-clone populations within a sample, e.g., a tumor. These results can be informative for diagnosis, the selection of treatment methods, and patient management in some embodiments.

In exemplary embodiments, a sample for analysis and/or sample analyzed by the devices and methods described herein may be subjected to one or more of the following methods or steps: staining, immunohistochemical staining, flow cytometry, FACS, fluorescence-activated droplet sorting, image analysis, hybridization, DASH, molecular beacons, primer extension, microarrays, CISH, FISH, fiber FISH, quantitative FISH, flow FISH, comparative genomic hybridization, blotting, Western blotting, Southern blotting, Eastern blotting, Far-Western blotting, Southwestern blotting, Northwestern blotting, and Northern blotting, enzymatic assays, ELISA, ligand binding assays, immunoprecipitation, ChIP, ChIP-seq, ChIP-ChIP, radioimmunoassays, fluorescence polarization, FRET, surface plasmon resonance, filter binding assays, affinity chromatography, immunocytochemistry, electrophoretic assays, nucleic acid electrophoresis, polyacrylamide gel electrophoresis, native gel methods, free-flow electrophoresis, isoelectric focusing, immunoelectrophoresis, electrophoretic mobility shift assays, restriction fragment length polymorphism analysis, zymography, gene expression profiling, DNA profiling with PCR, DNA microarrays, serial analysis of gene expression, real-time polymerase chain reaction, differential display PCR, RNA-seq, mass spectrometry, DNA methylation detection, acoustic energy, lipidomic-based analyses, quantification of immune cells, detection of cancer-associated markers, affinity purification of specific cell types, DNA sequencing, next-generation sequencing, detection of cancer-associated fusion proteins, and detection of chemotherapy resistance-associated markers. Exemplary embodiments of these methods are described below, which are intended to illustrate these techniques. However, it is to be understood that variants and alternatives of these methodologies, and other methodologies, may be utilized.

Staining Techniques

Fluids can be applied for pretreatment (e.g., protein-crosslinking, exposing nucleic acids, etc.), denaturation, hybridization, washing (e.g., stringency washing), detection (e.g., linking a visual or marker molecule to a probe), amplifying (e.g., amplifying proteins, genes, etc.), counterstaining, or the like. In various embodiments, the substances include, without limitation, stains (e.g., hematoxylin solutions, eosin solutions, or the like), wetting agents, probes, antibodies (e.g., monoclonal antibodies, polyclonal antibodies, etc.), antigen recovering fluids (e.g., aqueous- or non-aqueous-based antigen retrieval solutions, antigen recovering buffers, etc.), solvents (e.g., alcohol, limonene, or the like), or the like. Stains include, without limitation, dyes, hematoxylin stains, eosin stains, conjugates of antibodies or nucleic acids with detectable labels such as haptens, enzymes or fluorescent moieties, or other types of substances for imparting color and/or for enhancing contrast. See WO2015197742 and WO2015150278, each of which is hereby incorporated by reference in its entirety.

The staining techniques may employ systems and methods for receiving a plurality of assay information along with a query for one or more features of interest, and projecting anatomical information from an anatomical assay onto an image of a staining assay, for example, an immunohistochemical (IHC) assay that is commonly registered with the anatomical assay, to locate or determine features appropriate for analysis. The anatomical information may be used to generate a mask that is projected on one or more commonly registered staining or IHC assays. A location of the feature of interest in the IHC assay may be correlated with the anatomical context provided by the mask, with any features of interest that match the anatomical mask being selected or indicated as appropriate for analysis. Furthermore, the anatomical mask may be partitioned into multiple regions, and multiple features of interest from multiple IHC assays may be correlated with each of these regions individually. Therefore, the disclosed devices and methods provide systematic, quantitative, and intuitive approaches for comprehensive multi-assay analysis, thereby overcoming the limiting ad-hoc or subjective visual analysis steps in the state of the art. See WO2015052128 which is hereby incorporated by reference in its entirety.

Typically, cancer samples are pathologically examined by fixing the cells onto microscopic slides and staining them using a variety of staining methods (e.g., morphological or cytogenetic stains). Stained specimens are then evaluated for the presence or absence of abnormal or cancerous cells and cell morphologies. Although providing only general information, histological staining methods are the most common methods currently practiced for the detection of cancerous cells in biological samples. Other staining methods often used for cancer detection include immunohistochemistry and activity stains. These methods are based on the presence or absence of specific antigens or enzymatic activities in cancerous cells. See WO2012152747 which is hereby incorporated by reference in its entirety.

Methods, kits, and systems for treating samples containing obfuscating pigments are disclosed. The method includes applying a clarifying reagent to the sample so that the obfuscating pigments within the sample are decolorized. Decolorizing the obfuscating pigments enhances pathologists' ability to examine the sample. In illustrative embodiments, an automated method of treating a sample mounted on a substrate to alleviate staining obfuscations associated with pigments within the sample is disclosed. The method includes placing the substrate upon which the sample is mounted on an automated instrument and applying a clarifying reagent so that the clarifying reagent contacts the sample and pigments within the sample are decolorized. The method further comprises applying a rinsing reagent so that the clarifying reagent is substantially removed from the sample and applying a chromogenic reagent so that the sample is specifically stained. Pigments within the sample are decolorized by the clarifying reagent so that the specifically stained sample is interpretable by a qualified reader. In other illustrative embodiments, disclosed is a kit for decolorizing obfuscating pigments in a sample. The kit includes a reagent bottle and a clarifying reagent deposited in the reagent bottle. The clarifying reagent comprises an aqueous solution of hydrogen peroxide and the reagent bottle is configured to be operably connected to an automated slide staining apparatus such that the automated slide staining apparatus controls the application of the clarifying reagent so that the clarifying reagent contacts the sample. In further illustrative embodiments, disclosed is a system for alleviating specific signal obfuscation for a histopathological sample containing pigments. The system includes an automated instrument, a clarifying reagent, and a chromogenic reagent. The automated instrument is configured to receive the histopathological sample adhered to a substrate, to deliver the clarifying reagent and the chromogenic reagent to the sample, and to provide heating and mixing to the clarifying reagent and the chromogenic reagent delivered to the sample. The clarifying reagent is configured to contact the histopathological sample and render the obfuscating pigments decolorized. The chromogenic reagent is configured to contact the histopathological sample and deposit a specific signal. See WO2014056812 which is hereby incorporated by reference in its entirety.

Immunostaining and in situ DNA analysis can be useful tools in histological diagnosis. Immunostaining can rely on the specific binding affinity of antibodies with epitopes in samples, and the increasing availability of antibodies which bind specifically with unique epitopes which are sometimes present only in certain types of diseased cells. Immunostaining may include a series of treatment steps conducted on a sample mounted on a glass slide to selectively highlight certain morphological indicators of disease states. In some instances, treatment steps can include pretreatment of the sample to reduce non-specific binding, antibody treatment and incubation, enzyme labeled secondary antibody treatment and incubation, substrate reaction with the enzyme and counterstain. The result can produce fluorescent or chromogenic highlighted areas of the sample having epitopes binding with the antibody. In some instances, in situ DNA analysis relies upon the specific binding affinity of probes with nucleotide sequences in cell or samples. Immunohistochemistry (IHC) or immunocytochemistry (ICC) can include the visualization of a cellular component in situ by detecting specific antibody-antigen interactions where the antibody has been tagged with a visible marker. IHC is sometimes referred to as the detection of antigens in tissues, while ICC is sometimes referred to as the detection of antigens in or on cultured cells (JAVOIS, Methods in Molecular Medicine, V. 115: Immunocytochemical Methods and Protocols, 2nd edition, (1999) Humana Press, Totowa, New Jersey, which is hereby incorporated by reference in its entirety), however, methods described as IHC or ICC may equally be applicable. The visible marker may be a fluorescent dye, colloidal metal, hapten, radioactive marker or an enzyme. Regardless of the method of preparation, maximal signal strength with minimal background or non-specific staining can be desirable to give optimal antigen visualization. See WO2013139555 which is hereby incorporated by reference in its entirety.

Based on early studies, miRNAs play a role in developmental regulation and cell differentiation in mammals, as well as cardiogenesis and lymphocyte development. In addition, miRNA are involved in other biological processes, such as hypoxia, apoptosis, stem cell differentiation, proliferation, inflammation, and response to infection. miRNA can be used to concurrently target multiple effectors of pathways involved in cell differentiation, proliferation and survival, key characteristics of oncogenesis. Several miRNAs have been linked to cancer. As a result, in-situ analysis of miRNA can be useful for cancer diagnosis and therapeutics, as miRNAs appear to act as oncogenes or tumor repressors. For example, many tumor cells have distinct miRNA expression patterns when compared with normal tissues. Studies using mice genetically altered to produce excess c-Myc—a protein with mutated forms implicated in several cancers—established that miRNA effects cancer development. Methods for detecting miRNA, as well as protein translated or otherwise regulated by miRNA, are highly desirable, particularly in automated methods for efficient and rapid detection. Prior methods for detecting miRNA do not detect both miRNA and its protein expression targets (potentially regulated by the miRNA) in the same sample. Exemplary methods typically require using protease-based cell conditioning to digest cellular components to expose nucleic acid targets. Furthermore, exemplary methods correlate levels of miRNA and protein levels using northern and western blots. Further, molecular approaches that "grind and bind" the sample can be utilized. Tissue-based approaches have been previously demonstrated. These methods generally include an enzymatic step. See WO2013079606 which is hereby incorporated by reference in its entirety.

Disclosed embodiments may utilize an automated method particularly suited for multiplexed detection of miRNA and proteins. In illustrative embodiments, the expression of the one or more proteins may be regulated by the miRNA. In another embodiment, the method enables the cellular context between the miRNA and the protein to be identified. The method may comprise, for example, using an automated system to apply to a sample (a) reagents suitable for detecting a miRNA target, (b) reagents suitable for detecting a protein target, and (c) reagents suitable for staining the miRNA target and the protein target. One aspect of the present embodiments concerns using non-enzymatic cell conditioning, i.e. avoiding protease-based cell conditioning, to preserve the protein targets. A cell conditioning step can involve treating the sample with a cell conditioning solution, such as a buffer having a slightly basic pH, including a Tris-based buffer having a pH from about 7.7 to about 9, at a temperature greater than ambient, such as from about 80° C. to about 95° C. The automated method can detect the miRNA and protein targets simultaneously or sequentially, although better staining results typically are obtained by first detecting and staining the miRNA and then detecting and staining the protein target. A more particular disclosed embodiment first comprises performing non-enzymatic cell conditioning on the sample. The sample is then contacted with a nucleic acid specific binding moiety selected for a particular miRNA target, followed by detecting the miRNA specific binding moiety. The sample is then contacted with a protein specific binding moiety selected for a protein target, followed by detecting the protein specific binding moiety. In certain embodiments, the nucleic acid specific binding moiety is a locked nucleic acid (LNA) probe conjugated to a detectable moiety, such as an enzyme, a fluorophore, a luminophore, a hapten, a fluorescent nanoparticle, or combinations thereof. Certain suitable haptens are common in the art, such as digoxigenin, dinitrophenyl, biotin, fluorescein, rhodamine, bromodeoxyuridine, mouse immunoglobulin, or combinations thereof. Other suitable haptens were specifically developed by Ventana Medical Systems, Inc., including haptens selected from oxazoles, pyrazoles, thiazoles, benzofurazans, triterpenes, ureas, thioureas, rotenoids, coumarins, cyclolignans, heterobiaryls, azoaryls, benzodiazepines, and combinations thereof. Haptens can be detected using an anti-hapten antibody. In certain disclosed embodiments, the anti-hapten antibody is detected by an anti-species antibody-enzyme conjugate, wherein the enzyme is any suitable enzyme, such as alkaline phosphatase or horseradish peroxidase. See WO2013079606 which is hereby incorporated by reference in its entirety.

Counterstaining is a method of post-treating samples after they have already been stained with agents to detect one or more targets, such that their structures can be more readily visualized under a microscope. For example, a counterstain is optionally used prior to coverslipping to render an immunohistochemical stain more distinct. Counterstains differ in color from a primary stain. Numerous counterstains are well known, such as hematoxylin, eosin, methyl green, methylene blue, Giemsa, Alcian blue, DAPI, and Nuclear Fast Red. In some examples, more than one stain can be mixed together to produce the counterstain. This provides flexibility and the ability to choose stains. For example, a first stain can be selected for the mixture that has a particular attribute, but yet does not have a different desired attribute. A second stain can be added to the mixture that displays the missing desired attribute. For example, toluidine blue, DAPI, and pontamine sky blue can be mixed together to form a counterstain. See WO2012116949 which is hereby incorporated by reference in its entirety.

Hematoxylin is a naturally-occurring compound found in the red heartwood of trees of the genus Hematoxylon. Hematoxylin itself is colorless in aqueous solution and is not the active ingredient that stains tissue components. Rather, an oxidation product of hematoxylin, hematein, becomes the active staining component of a hematoxylin dye solution, particularly upon complexation with a mordant. Hematein is produced naturally through exposure to air and sunlight. The natural process is termed "ripening," and can take 3 or more months to provide a solution suitable for staining cells. Automated staining procedures and systems use mechanical systems to deliver staining solutions to a biological sample. Standard hematein staining procedures utilized a premixed stock containing both the hematoxylin/hematein and a mordant. See WO2012096842 which is hereby incorporated by reference in its entirety.

Immunostaining typically utilizes a series of treatment steps conducted on a sample mounted on a glass slide to highlight by selective staining certain morphological indicators of disease states. Typical steps include pretreatment of the sample to reduce non-specific binding, antibody treatment and incubation, enzyme labeled secondary antibody treatment and incubation, substrate reaction with the enzyme to produce a fluorophore or chromophore highlighting areas of the sample having epitopes binding with the antibody, counterstaining, and the like. Each of these steps is separated by multiple rinse steps to remove unreacted residual reagent from the prior step. Incubations are conducted at elevated temperatures, usually around 40° C., and the samples typically are continuously protected from dehydration. In situ DNA analysis uses the specific binding affinity of probes with unique nucleotide sequences in samples and similarly involves a series of process steps, with a variety of reagents and process temperature requirements. See WO2011139976 which is hereby incorporated by reference in its entirety.

Immunohistochemistry (IHC) Staining

Immunohistochemistry or IHC staining of a sample (or immunocytochemistry, which is the staining of cells), is perhaps the most commonly applied immunostaining technique. While the first cases of IHC staining used fluorescent dyes (see immunofluorescence), other non-fluorescent methods using enzymes such as peroxidase (see immunoperoxidase staining) and alkaline phosphatase are now used. These enzymes are capable of catalyzing reactions that give a coloured product that is easily detectable by light microscopy. Alternatively, radioactive elements can be used as labels, and the immunoreaction can be visualized by autoradiography. Preparation or fixation can contribute to the preservation of cell morphology and architecture. Inappropriate or prolonged fixation may significantly diminish the antibody binding capability. Many antigens can be successfully demonstrated in formalin-fixed sample. The detection of many antigens can be improved by antigen retrieval methods that act by breaking some of the protein cross-links formed by fixation to uncover hidden antigenic sites. This can be accomplished by heating for varying lengths of times (heat induced epitope retrieval or HIER) or using enzyme digestion (proteolytic induced epitope retrieval or PIER).

"Immunohistochemistry (IHC)" refers to a method of determining the presence or distribution of an antigen (such as a protein) in a sample (such as a pancreatic cancer sample) by detecting interaction of the antigen with a specific binding agent, such as an antibody. A sample including an antigen (such as a target antigen) is incubated with an antibody under conditions permitting antibody-antigen binding. Antibody-antigen binding can be detected by means of a detectable label conjugated to the antibody (direct detection) or by means of a detectable label conjugated to a secondary antibody, which is raised against the primary antibody (e.g., indirect detection). Exemplary detectable labels that can be used for IHC include, but are not limited to, radioactive isotopes, fluorochromes (such as fluorescein, fluorescein isothiocyanate, and rhodamine), haptens, enzymes (such as horseradish peroxidase or alkaline phosphatase), and chromogens (such as 3,3'-diaminobenzidine or Fast Red). In some examples, IHC is utilized to detect the presence of or determine the amount of one or more proteins in a sample, for example, a pancreatic cancer sample. See WO2013019945, which is hereby incorporated by reference in its entirety.

Immunohistochemistry, or IHC, refers to the process of localizing antigens, such as a protein, in cells of a sample and using the antigens to promote specific binding of antibodies to the particular antigens. This detection technique has the advantage of being able to show exactly where a given protein is located within the sample. It is also an effective way to examine the samples themselves. The use of small molecules such as haptens, to detect antigens and nucleic acids has become a prominent method in IHC. Haptens, in combination with anti-hapten antibodies are useful for detecting particular molecular targets. For example, specific binding moieties such as primary antibodies and nucleic acid probes can be labeled with one or more hapten molecules, and once these specific binding moieties are bound to their molecular targets they can be detected using an anti-hapten antibody conjugate that includes an enzyme as part of a chromogenic based detection system or a detectable label such as a fluorescent label. Binding of the detectable anti-hapten antibody conjugate to a sample indicates the presence of the target in a sample. Digoxigenin, present exclusively in *Digitalis* plants as a secondary metabolite, is an example of a hapten that has been utilized in a variety of molecular assays. U.S. Pat. No. 4,469,797 discloses using immunoassays to determine digoxin concentrations in blood samples based upon the specific binding of anti-digoxin antibodies to the drug in the test sample. U.S. Pat. No. 5,198,537 describes a number of additional digoxigenin derivatives that have been used in immunological tests, such as immunoassays. For in situ assays such as immunohistochemical (IHC) assays and in situ hybridization (ISH) assays of samples, especially multiplexed assays of such samples, it is highly desirable to identify and develop methods which provide desirable results without background interference. One such method involves the use of Tyramide Signal Amplification (TSA), which is based on the patented catalyzed reporter deposition (CARD). U.S. Pat. No. 6,593,100, which is hereby incorporated by reference in its entirety, discloses enhancing the catalysis of an enzyme in a CARD or tyramide signal amplification (TSA) method by reacting a labeled phenol conjugate with an enzyme, wherein the reaction is carried out in the presence of an enhancing reagent. See WO2012003476, which is hereby incorporated by reference in its entirety, as are the foregoing publications.

Embodiments of methods for using the hapten conjugates may be utilized. In general the method may include the steps of a) immobilizing a peroxidase on a target in a sample, wherein the peroxidase is capable of reacting with a peroxidase-activatable aryl moiety, e.g., tyramine or a tyramine derivative, b) contacting the sample with a solution comprising a hapten conjugate, wherein the hapten conjugate comprises a hapten bound to a peroxidase-activatable aryl moiety as described above, and c) contacting the sample with a solution comprising peroxide, whereby the hapten conjugate reacts with the peroxidase and the peroxide, forming a covalent bond to the immobilized peroxidase or proximal to the immobilized peroxidase; and d) locating the target in the sample by detecting the hapten. See WO2012003476, which is hereby incorporated by reference in its entirety.

Flow Cytometry

Flow cytometry is a laser-based, biophysical technology employed in cell counting, cell sorting, biomarker detection and protein engineering, by suspending cells in a stream of fluid and passing them by an electronic detection apparatus. It allows simultaneous multiparametric analysis of the physical and chemical characteristics of up to thousands of particles per second. Flow cytometry is routinely used in the diagnosis of health disorders, especially blood cancers, but has many other applications in basic research, clinical practice and clinical trials. A common variation is to physically sort particles based on their properties, so as to purify populations of interest.

Fluorescence-Activated Cell Sorting (FACS)

Fluorescence-activated cell sorting (FACS) is a specialized type of flow cytometry. It provides a method for sorting a heterogeneous mixture of cells into two or more containers, one cell at a time, based upon the specific light scattering and fluorescent characteristics of each cell. It is a useful scientific instrument as it provides fast, objective and quantitative recording of fluorescent signals from individual cells as well as physical separation of cells of particular interest. The cell suspension is entrained in the center of a narrow, rapidly flowing stream of liquid. The flow is arranged so that there is a large separation between cells relative to their diameter. A vibrating mechanism causes the stream of cells to break into individual droplets. The system is adjusted so that there is a low probability of more than one cell per droplet. Just before the stream breaks into droplets, the flow passes through a fluorescence measuring station where the fluorescent character of interest of each cell is measured. An electrical charging ring is placed just at the point where the stream breaks into droplets. A charge is placed on the ring based on the immediately prior fluorescence intensity measurement, and the opposite charge is trapped on the droplet as it breaks from the stream. The charged droplets then fall through an electrostatic deflection system that diverts droplets into containers based upon their charge. In some systems, the charge is applied directly to the stream, and the droplet breaking off retains charge of the same sign as the stream. The stream is then returned to neutral after the droplet breaks off.

Fluorescence-Activated Droplet Sorting of Single Cells

Compartmentalization of single cells in droplets enables the analysis of proteins released from or secreted by cells, thereby overcoming one of the major limitations of traditional flow cytometry and fluorescence-activated cell sorting. An example of this approach is a binding assay for detecting antibodies secreted from single mouse hybridoma cells. Secreted antibodies are detected after only 15 min by co-compartmentalizing single mouse hybridoma cells, a fluorescent probe and single beads coated with anti-mouse IgG antibodies in 50-pl droplets. The beads capture the secreted antibodies and, when the captured antibodies bind to the probe, the fluorescence becomes localized on the beads, generating a clearly distinguishable fluorescence signal that enables droplet sorting at ~200 Hz as well as cell enrichment. The microfluidic system described is easily adapted for screening other intracellular, cell-surface or secreted proteins and for quantifying catalytic or regulatory activities. In order to screen ~1 million cells, the microfluidic operations may be completed in 2-6 h; the entire process, including preparation of microfluidic devices and mammalian cells, may be completed in 5-7 d. See Mazutis et al. (2013). "Single-cell analysis and sorting using droplet-based microfluidics". Nat. Protoc. 8: 870-891, which is hereby incorporated by reference in its entirety.

Image Analysis

The samples may be analyzed by systems and computer-implemented methods for automatic immune cell detection that is of assistance in clinical immune profile studies. The automatic immune cell detection method involves retrieving a plurality of image channels from a multi-channel image such as an RGB image or biologically meaningful unmixed image. See WO2015177268, which is hereby incorporated by reference in its entirety.

An image analysis algorithm and/or system may be utilized that automatically computes an immune score from a set images of multiplex IHC slides and/or fluorescent stained slides. The image analysis algorithm involves a computer-implemented method for counting a number of types of cells in a single sample that has been stained with a multiplex assay, comprising: imaging the sample that has been stained with the multiplex assay that includes lymphocyte markers CD3, CD8, CD20, FoxP3, and tumor detection markers; un-mixing the image of single sample that has been stained with a multiplex assay into separate image channels for each marker of the multiplex assay; identifying regions of interest in each image channel based on intensity information in each channel, wherein regions of low intensity in each channel are removed, and regions of high intensity represent cell signals; generating a single surrogated image, wherein the surrogated image is a combination of the image channel information of all the lymphocyte markers; applying a cell detection algorithm, wherein the cell detection algorithm is a membrane finding algorithm or a nucleus finding algorithm; identifying features of the lymphocytes and combinations of lymphocytes in each image channel or image of combined channels, or a transformed image such as gray-scale or absorbance image, or a surrogated image; training a classification algorithm based on features of known lymphocytes and lymphocyte combinations; applying the trained algorithm to features of the lymphocytes and combinations of lymphocytes in each image channel or in each image of combined channels, or in a transformed image such as grayscale or absorbance image, or in a surrogated image, that were identified to classify the detected cells as at least one of false positive cells, CD3 only T-cells, CD3 and CD8 T-cells, FP3 T-cells; and CD20 B-cells; counting a number of each different type of cell classified; generating a score of the sample, wherein the score is based on the number of each type of cell counted. See WO2015124737, which is hereby incorporated by reference in its entirety.

Exemplary embodiments may include utilizing systems and methods that include a two-step classification method. Operations disclosed herein include dividing a WS image into a plurality of patches, and first classifying each patch using a "soft" classification, such as SVM, and generating a confidence score and a label for each patch. The location of each patch, its features, and its type obtained as classification result, and its confidence score can be stored in a database. The second classification step includes comparing the low-confidence patches with the high-confidence patches in the database and using similar patches to augment the spatial coherence of the patches in the database. In other words, for each low-confidence patch, neighboring high-confidence patches make larger contributions towards refining the labels for each patch, which improves the segmentation accuracy in the low-confidence patches. In contrast to existing adaptive/active learning techniques for growing training databases, the disclosed operations are less concerned with growing a single training database and are instead focused on treating each test image independently while adaptively improving the classification accuracy based on the labeling confidence information for the image under analysis. In other words, a confident label patch database is generated for each image, and similarity retrieval operations are performed within the image to refine the classification results for low-confidence patches. See WO2015113895, which is hereby incorporated by reference in its entirety.

Exemplary embodiments may include utilizing methods of detecting and scoring mesothelin (MSLN) expression, such as MSLN protein expression. In particular examples the methods include contacting a sample that includes tumor cells with a MSLN protein-specific binding agent (such as an antibody). Exemplary tumors that express MSLN include but are not limited to ovarian cancer, lung cancer (e.g., non-small cell lung carcinomas, NSCLCs), pancreatic cancer, and mesothelioma. Expression of MSLN protein in the tumor cells is detected or measured, for example using microscopy and immunohistochemistry (IHC). The sample is scored on a scale of 0 to 3+ for MSLN protein expression. For example, it is determined whether at least 10% of the tumor cells (such as at least about 10% of the tumor cells) in the sample are stained with the protein-specific binding agent (e.g., have detectable MSLN protein expression). The sample is assigned a score of zero for MSLN protein expression if less than 10%> (such as less than about 10%>) of the tumor cells are stained with the specific binding agent. The sample is assigned a score of 1+ for MSLN protein expression if at least 10% of the tumor cells (such as at least about 10% of the tumor cells) in the sample are stained with the protein-specific binding agent (e.g., have detectable MSLN protein expression), but less than 10%> of the tumor cells (such as less than about 10%) are stained with the specific binding agent at an intensity of 2+ or higher. The sample is assigned a score of 2+ for MSLN protein expression if at least 10% of the tumor cells (such as at least about 10% of the tumor cells) in the sample are stained with the protein-specific binding agent (e.g., have detectable MSLN protein expression) at an intensity of 2+ or higher and a majority of the stained tumor cells stain with 2+ intensity. The sample is assigned a score of 3+ for MSLN protein expression if at least 10% of the tumor cells (such as at least about 10% of the tumor cells) in the sample are stained with the protein-specific binding agent (e.g., have detectable MSLN protein expression) at an intensity of 2+ or higher and a majority of the stained tumor cells stain with 3+ intensity and at least 10% of the tumor cells (such as at least about 10% of the tumor cells) in the sample are stained with the protein-specific binding agent (e.g., have detectable MSLN protein expression) with 3+ intensity. See WO2015032695, which is hereby incorporated by reference in its entirety.

Hybridization

In situ hybridization (ISH) involves contacting a sample containing a target nucleic acid (e.g., a genomic target nucleic acid) in the context of a metaphase or interphase chromosome preparation (such as a sample mounted on a slide) with a labeled probe specifically hybridizable or specific for the target nucleic acid (for example, one or more of the probes disclosed herein). The slides are optionally pretreated, e.g., to remove materials that can interfere with uniform hybridization. The chromosome sample and the probe are both treated, for example by heating to denature the double stranded nucleic acids. The probe (formulated in a suitable hybridization buffer) and the sample are combined, under conditions and for sufficient time to permit hybridization to occur (typically to reach equilibrium). The chromosome preparation is washed to remove excess probe, and detection of specific labeling of the target is performed using standard techniques. See WO2015124702, which is hereby incorporated by reference in its entirety.

Other methods of detecting cancerous cells utilize the presence of chromosomal aberrations in cancer cells. In particular, the deletion or multiplication of copies of whole chromosomes or chromosomal segments, and higher levels of amplifications of specific regions of the genome are common occurrences in cancer. Chromosomal aberrations are often detected using cytogenetic methods such as Giemsa-stained chromosomes (G-banding) or fluorescent in situ hybridization (FISH). See WO2012152747, which is hereby incorporated by reference in its entirety.

The presently disclosed technology provides improved methods for increased specificity in analyzing the molecular mechanisms of a cancer. Thus, in certain embodiments, the technology relates to a multivariate cancer diagnostic method wherein said method determines the presence of both molecular markers and phenotypic morphometric markers at the cellular level in a single cell or single sample containing cells, said method comprising:

a. obtaining molecular marker data from a single sample from a subject comprising a single cell or cells;

b. obtaining quantitative cell morphology data from the same single cell or cells as used in step (a) to provide a multivariable analysis of said single sample, the multivariable data set comprising both quantitative cell morphology data from step (b) and molecular marker data from step (a); and c. comparing the multivariable analysis data set obtained in step (b) with a reference multivariable analysis data set created by obtaining both molecular marker data and quantitative cell morphology data from cancer and non-cancer cell samples taken from individuals with known clinical outcome.

The comparison results of step (c) provide a prediction of a clinical outcome from the subject defined by specific combinations of features and markers statistically associated with cancer progression, occurrence, metastases or other feature of clinical outcome seen in the reference multivariable analysis data set. See WO2012152747, which is hereby incorporated by reference in its entirety.

Exemplary embodiments may include utilizing technology provides information for determining pathological prognosis states of cancer by using fluorescent labeling of molecular markers in conjunction with specialized imaging approaches involving spectrally-resolved detection and data pre-processing. The technology provides an imaging approach that can acquire and analyze nuclear morphology on a sample that is prepared for detection of molecule-specific probes on a sample within a single data acquisition cycle. This imaging approach employs a combination of labeling, acquisition, pre-processing and analysis technologies. A multidimensional image is collected and analyzed to separate and distinguish different analyte channels of interest by emission wavelength. The subsequent analyte channels represent different aspects of the data that quantify the morphology and genetic rearrangement, genetic expression and/or protein expression of the cell. See WO2012152747, which is hereby incorporated by reference in its entirety.

Exemplary embodiments may include utilizing a system, method, and kit for visualizing a nucleus. A sample can be pretreated with a protease to permeabilize the nucleus, and then incubated with a nanoparticle/DNA-binding moiety conjugate. The DNA-binding moiety includes at least one DNA-binding molecule. The conjugate binds to DNA within the nucleus, and the nanoparticle is visualized, thereby visualizing the nucleus. Computer and image analysis techniques are used to evaluate nuclear features such as chromosomal distribution, ploidy, shape, size, texture features, and/or contextual features. The method may be used in combination with other multiplexed tests on the sample, including fluorescence in situ hybridization. See WO2012116949, which is hereby incorporated by reference in its entirety.

Fluorescence in situ hybridization (FISH) is a technique that can be used to detect and localize the presence or absence of specific DNA sequences on chromosomes. FISH uses fluorescent probes that bind to only those parts of the chromosome with which they show a high degree of sequence similarity. FISH also can be used to detect particular mRNA sequences within a sample. See WO2012116949, which is hereby incorporated by reference in its entirety.

Numerous procedures for FISH, CISH, and SISH are known in the art. For example, procedures for performing FISH are described in U.S. Pat. Nos. 5,447,841; 5,472,842; and 5,427,932; CISH is described in U.S. Pat. No. 6,942,970, and additional detection methods are provided in U.S. Pat. No. 6,280,929, the disclosures of which are incorporated in their entirety herein by reference. Numerous reagents and detection schemes can be employed in conjunction with FISH, CISH, and SISH procedures to improve sensitivity, resolution, or other desirable properties. As discussed above, probes labeled with fluorophores (including fluorescent dyes and quantum dots) can be directly optically detected when performing FISH. Alternatively, the probe can be labeled with a non-fluorescent molecule, such as a hapten [such as the following non-limiting examples: biotin, digoxigenin, DNP, and various oxazoles, pyrrazoles, thiazoles, nitroaryls, benzofurazans, triterpenes, ureas, thioureas, rotenones, coumarin, coumarin-based compounds, Podophyllotoxin, Podophyllotoxin-based compounds, and combinations thereof), ligand or other indirectly detectable moiety. Probes labeled with such non-fluorescent molecules (and the target nucleic acid sequences to which they bind) can then be detected by contacting the sample (e.g., the cell sample to which the probe is bound) with a labeled detection reagent, such as an antibody (or receptor, or other specific binding partner) specific for the chosen hapten or ligand. The detection reagent can be labeled with a fluorophore (e.g., quantum dot) or with another indirectly detectable moiety, or can be contacted with one or more additional specific binding agents (e.g., secondary or specific antibodies), which can in turn be labeled with a fluorophore. Optionally, the detectable label is attached directly to the antibody, receptor (or other specific binding agent). Alternatively, the detectable label is attached to the binding agent via a linker, such as a hydrazide thiol linker, a polyethylene glycol linker, or any other flexible attachment moiety with comparable reactivities. For example, a specific binding agent, such as an antibody, a receptor (or other anti-ligand), avidin, or the like can be covalently modified with a fluorophore (or other label) via a heterobifunctional polyalkyleneglycol linker such as a heterobifunctional polyethyleneglycol (PEG) linker. A heterobifunctional linker combines two different reactive groups selected, e.g., from a carbonyl-reactive group, an amine-reactive group, a thiol-reactive group and a photo-reactive group, the first of which attaches to the label and the second of which attaches to the specific binding agent. In other examples, the probe, or specific binding agent (such as an antibody, e.g., a primary antibody, receptor or other binding agent) is labeled with an enzyme that is capable of converting a fluorogenic or chromogenic composition into a detectable fluorescent, colored or otherwise detectable signal (e.g., as in deposition of detectable metal particles in SISH). As indicated above, the enzyme can be attached directly or indirectly via a linker to the relevant probe or detection reagent. Examples of suitable reagents (e.g., binding reagents) and chemistries [(e.g., linker and attachment chemistries) are described in U.S. Patent Application Publication Nos. 2006/0246524; 2006/0246523, and 2007/0117153, the disclosures of which are incorporated in their entirety herein by reference. See WO2015124702, which is hereby incorporated by reference in its entirety.

Said methods may allow for the detection of more than one (e.g., 2, 3, 4, etc.) different targets. In some embodiments, different detectable labels and/or detection systems may be used for each of the targets such that each can be individually detected in a single sample. Any appropriate detectable label and/or detection system may be used. More specifically, systems for bright field in situ hybridization are contemplated. In some embodiments, the system comprises a probe set comprising X unique 2'-0-methyl RNA probes specific to a target RNA, wherein X>2 (e.g., X=2, X=3, X=4, X=5, etc.), the probes target X distinct portions within the target RNA. Each 2'-0-methyl RNA probe may be conjugated with at least one detectable moiety. The detectable moiety may be adapted to bind a reactive chromogen conjugate system (e.g. tyramide chromogen conjugate system) for signal amplification. In some embodiments, the 2'-0-methyl RNA probes each comprise between 15 to 30 nucleotides, between 20 to 50 nucleotides, between 40 to 80 nucleotides, between 20 to 100 nucleotides, or between 20 to 200 nucleotides in length. See WO2015124738, which is hereby incorporated by reference in its entirety.

The specimen can be a breast cell sample processed according to an in situ hybridization (ISH) protocol. The ISH protocol can provide visualization of specific nucleic acid sequences (e.g., DNA, mRNA, etc.) in cell preparations by hybridizing complementary strands of nucleotides (e.g., probes) to the sequence of interest. The ISH protocol can include, without limitation, a dual SISH and Red ISH protocol, single Red ISH protocol, single SISH protocol, or the like. See WO2013113707, which is hereby incorporated by reference in its entirety.

Dynamic Allele-Specific Hybridization (DASH)

Dynamic allele-specific hybridization (DASH) genotyping takes advantage of the differences in the melting temperature in DNA that results from the instability of mismatched base pairs. The process can be vastly automated and encompasses a few simple principles. In the first step, a genomic segment is amplified and attached to a bead through a PCR reaction with a biotinylated primer. In the second step, the amplified product is attached to a streptavidin column and washed with NaOH to remove the unbiotinylated strand. An allele-specific oligonucleotide is then added in the presence of a molecule that fluoresces when bound to double-stranded DNA. The intensity is then measured as temperature is increased until the melting temperature (Tm) can be determined. A SNP will result in a lower than expected Tm. Because DASH genotyping is measuring a quantifiable change in Tm, it is capable of measuring all types of mutations, not just SNPs. Other benefits of DASH include its ability to work with label free probes and its simple design and performance conditions.

Molecular Beacons

Molecular beacons make use of a specifically engineered single-stranded oligonucleotide probe. The oligonucleotide is designed such that there are complementary regions at each end and a probe sequence located in between. This design allows the probe to take on a hairpin, or stem-loop, structure in its natural, isolated state. Attached to one end of the probe is a fluorophore and to the other end a fluorescence quencher. Because of the stem-loop structure of the probe, the fluorophore is in close proximity to the quencher, thus preventing the molecule from emitting any fluorescence. The molecule is also engineered such that only the probe sequence is complementary to the genomic DNA that will be used in the assay (Abravaya et al. (April 2003). "Molecular beacons as diagnostic tools: technology and applications". Clin. Chem. Lab. Med. 41 (4): 468-74). If the probe sequence of the molecular beacon encounters its target genomic DNA during the assay, it will anneal and hybridize. Because of the length of the probe sequence, the hairpin segment of the probe will be denatured in favor of forming a longer, more stable probe-target hybrid. This conformational change permits the fluorophore and quencher to be free of their tight proximity due to the hairpin association, allowing the molecule to fluoresce. If on the other hand, the probe sequence encounters a target sequence with as little as one non-complementary nucleotide, the molecular beacon will preferentially stay in its natural hairpin state and no fluorescence will be observed, as the fluorophore remains quenched.

Primer Extension

Primer extension is a two-step process that first involves the hybridization of a probe to the bases immediately upstream of the SNP nucleotide followed by a 'mini-sequencing' reaction, in which DNA polymerase extends the hybridized primer by adding a base that is complementary to the SNP nucleotide. This incorporated base is detected and determines the SNP allele (Syvanen, Nat Rev Genet. 2001 December; 2(12):930-42). Because primer extension is based on the highly accurate DNA polymerase enzyme, the method is generally very reliable. Primer extension is able to genotype most SNPs under very similar reaction conditions making it also highly flexible. The primer extension method is used in a number of assay formats. These formats use a wide range of detection techniques that include MALDI-TOF Mass spectrometry (see Sequenom) and ELISA-like methods. Generally, there are two main approaches which use the incorporation of either fluorescently labeled dideoxynucleotides (ddNTP) or fluorescently labeled deoxynucleotides (dNTP). With ddNTPs, probes hybridize to the target DNA immediately upstream of SNP nucleotide, and a single, ddNTP complementary to the SNP allele is added to the 3' end of the probe (the missing 3-hydroxyl in didioxynucleotide prevents further nucleotides from being added). Each ddNTP is labeled with a different fluorescent signal allowing for the detection of all four alleles in the same reaction. With dNTPs, allele-specific probes have 3' bases which are complementary to each of the SNP alleles being interrogated. If the target DNA contains an allele complementary to the probe's 3' base, the target DNA will completely hybridize to the probe, allowing DNA polymerase to extend from the 3' end of the probe. This is detected by the incorporation of the fluorescently labeled dNTPs onto the end of the probe. If the target DNA does not contain an allele complementary to the probe's 3' base, the target DNA will produce a mismatch at the 3' end of the probe and DNA polymerase will not be able to extend from the 3' end of the probe. The benefit of the second approach is that several labeled dNTPs may get incorporated into the growing strand, allowing for increased signal.

Microarrays

The core principle behind microarrays is hybridization between two DNA strands, the property of complementary nucleic acid sequences to specifically pair with each other by forming hydrogen bonds between complementary nucleotide base pairs. A high number of complementary base pairs in a nucleotide sequence results in tighter non-covalent bonding between the two strands. After washing off non-specific bonding sequences, only strongly paired strands will remain hybridized. Fluorescently labeled target sequences that bind to a probe sequence generate a signal that depends on the hybridization conditions (such as temperature), and washing after hybridization. Total strength of the signal, from a spot (feature), depends upon the amount of target sample binding to the probes present on that spot. Microarrays use relative quantitation in which the intensity of a feature is compared to the intensity of the same feature under a different condition, and the identity of the feature is known by its position.

Nucleic acid arrays (also known as oligonucleotide arrays, DNA microarrays, DNA chips, gene chips, or biochips) have become powerful analytical tools. A nucleic acid array is essentially a systematic distribution of oligonucleotides on a surface, for example, in rows and columns. Oligonucleotides can be either physically or covalently adhered to a surface. One approach for physically adhering oligonucleotides to a surface involves drying oligonucleotide solutions as they contact the surface. After drying or otherwise fixing, the oligonucleotides are confined in a "spot" on the surface. The drying approach began with the production of very low density arrays called "dot blots." Dot blots can be made by manually depositing drops of oligonucleotides on a solid surface and drying. Most dot blots involve fewer than about 20 different oligonucleotides spots arranged in rows and columns. Advancing past dot blots, micro-spotting approaches used mechanical or robotic systems to create a multiplicity of microscopic spots. The small size of the spots enabled much higher dot densities. For example, micro-spotting was used to deposit tens of thousands of spots onto a microscope slide. According to a different approach, oligonucleotides have been directly synthesized on a substrate or support. Mask-less photolithography and digital optical chemistry techniques are techniques for directly synthesizing nucleic acids on a support; these approaches have been used to generate very high density arrays (for example, U.S. Pat. No. 7,785,863, which is hereby incorporated by reference in its entirety). Similarly, mask-less photolithography has been used to manufacture peptide arrays (see, for example, Singh-Gasson et al. Maskless fabrication of light-directed oligonucleotide microarrays using a digital micromirror array. Nat Biotechnol 1999, 17:974-978, which is hereby incorporated by reference in its entirety). Digital optical chemistry has been used that create arrays with millions of discrete areas each containing a population of unique oligonucleotides. Nucleic acid and peptide arrays include an array of areas (referred to as "dots" herein) on a substrate surface, each area designated for a particular oligonucleotide or peptide. The "array density" is essentially the number of rows and columns of dots distributed in a given area. A high density array has a larger number of rows and columns in a given area. As the nucleic acid and peptide array industries have developed, the availability of high density arrays has also increased. As the number of dots in a given area increases, the size of each dot is reduced. For example, one dot in an array having millions of unique oligonucleotides or peptides distributed across the area of a microscope slide would be approximately 100 pm2. The small size of this dot creates technical challenges in reading and understanding the results of using the array. For example, while a 100 pm2 dot may be visually observed in isolation, humans cannot visually resolve two or more 100 pm2 dots in close proximity without magnification. Thus, the manufacture and use of high density arrays has advanced to the stage that users can no longer read the array visually. Because the arrays include vast numbers (millions) of closely arrayed dots in a small area, sophisticated imaging devices detect signals from the array and software is used to interpret the data. Furthermore, highly sensitive detection methods may be utilized. Fluorescence imaging, being a highly sensitive technique, has become the standard approach for detecting hybridization events. Fluorescence imaging of these arrays generally uses microscopes equipped with filters and cameras. Fluorescence generally cannot be visually resolved without the aid of these devices. The highly complex fluorescence images are processed using software because the volume of data is high and its presentation is not cognizable. For example, U.S. Pat. No. 6,090,555 to Fiekowsky, et al. describes a complex process involving computer assisted alignment and deconvolution of fluorescence images acquired from a nucleic acid array. While the ability to perform massively parallel genomic or proteomic investigations is of great value, nucleic acid and peptide arrays have been limited in applicability by the difficulty in detecting and deciphering binding events. Furthermore, the use of fluorescence creates many hurdles to the general applicability of arrays due to fluorescence signals degrading over time and the complexity of the accompanying fluorescence detection hardware. The present disclosure relates to a device and a method of using the device to detect target molecules, the device including an oligonucleotide or peptide array. The device includes a plurality of binding molecules bound to a substrate surface. The binding molecules are designed to bind to a target molecule. Binding of the target and the binding molecules can be identified through examination of the device. In some embodiments, the device enables the detection of a hybridization event between a target nucleic acid and an immobilized oligonucleotide. In other embodiments, the device enables the detection of a binding event between a target polypeptide and an immobilized peptide. In illustrative embodiments, a device comprises a substrate with at least one substrate surface, and a plurality of immobilized oligonucleotides or peptides bound to the substrate surface, wherein the plurality of immobilized oligonucleotides or peptides are patterned on the substrate surface to form at least one optically decipherable pattern. See WO2013110574, which is hereby incorporated by reference in its entirety.

Exemplary embodiments may include utilizing a device for the detection of one or more target compounds. One type of target compound of particular interest is target nucleic acids or target oligonucleotides. Another type of target compound of particular interest is target polypeptides. For embodiments including immobilized oligonucleotides, target nucleic acids would commonly be understood to be the target molecule type. However, those of ordinary skill in the art appreciate that immobilized oligonucleotides provide a binding partner for oligonucleotide-binding moiety conjugates that are capable of detecting a variety of other target compounds. For example, using the immobilized oligonucleotide, an antibody-oligonucleotide conjugate could be immobilized on the device to transform the device into an antibody microarray. An antibody microarray could be used to detect a protein target of interest. Similarly, embodiments that include immobilized peptides, the target molecule type could include antibodies, proteins, or enzymes. However, the underlying peptides could also be modified by using conjugates of the peptide binding moiety and a molecular targeting moiety. Furthermore, while the present disclosure specifically discloses immobilized oligonucleotides and peptides, those are merely exemplary immobilized detection moieties. There are many other useful immobilized detection moieties that may be incorporated into a device as described herein, without departing from the concept as disclosed herein. For example, the detection moieties may include aptamers, ligands, chelators, carbohydrates, and man-made equivalents thereof. See WO2013110574, which is hereby incorporated by reference in its entirety.

Methods of isolating CTCs can include the use of antibodies specific for EpCAM, ERG, PSMA, or combinations thereof. The isolated CTCs are applied to a glass slide or other substrate and fixed (for example using methods known in the art). Novel spreading methods using prostate-specific antibodies as discussed herein may also be used to isolate CTCs and apply them to a substrate, such as a glass slide, before fixation. The mounted and fixed CTCs are then contacted with one or more nucleic acid probes specific for ERG, PTEN, and CEN-10, for example under conditions sufficient for the nucleic acid probes to hybridize to their complementary sequence in the CTCs. The nucleic acid probes are labeled, for example with one or more quantum dots. For example, the nucleic acid probe(s) specific for ERG, PTEN, and CEN-10 can each labeled with a different quantum dot, to permit one to distinguish the probes from one another. After allowing the nucleic acid probes to hybridize to ERG, PTEN, and CEN-10, signals from the one or more quantum dots on the one or more nucleic acid probes are detected, for example by using spectral imaging. The signals are then analyzed, to determine whether in the isolated CTCs, one or more ERGs are rearranged, whether one or more PTEN genes are deleted, and whether CEN-10 is detected. Based on whether one or more ERGs is rearranged, whether one or more PTEN genes is deleted, and whether CEN-10 is detected, the prostate cancer is characterized. See WO2013101989, which is hereby incorporated by reference in its entirety.

Chromogenic In Situ Hybridization (CISH)

Chromogenic in situ hybridization (CISH) is a cytogenetic technique that combines the chromogenic signal detection method of immunohistochemistry (IHC) techniques with in situ hybridization. It was developed around the year 2000 as an alternative to fluorescence in situ hybridization (FISH) for detection of HER-2/neu oncogene amplification. CISH is similar to FISH in that they are both in situ hybridization techniques used to detect the presence or absence of specific regions of DNA. However, CISH is much more practical in diagnostic laboratories because it uses bright-field microscopes rather than the more expensive and complicated fluorescence microscopes used in FISH.

Probe design for CISH may be very similar to that for FISH with differences in labelling and detection. FISH probes are generally labelled with a variety of different fluorescent tags and can only be detected under a fluorescence microscope, whereas CISH probes are labelled with biotin or digoxigenin and can be detected using a bright-field microscope after other treatment steps have been applied. CISH probes are approximately 20 nucleotides in length and are designed for DNA targets. They are complementary to the targeted sequence and bind to it after a denaturation and hybridization step. Only a few CISH probes are available commercially, so for most applications they have to be extracted, amplified, sequenced, labelled and mapped from bacterial artificial chromosomes (BACs). BACs were developed during the Human Genome Project as it was necessary to isolate and amplify short fragments of human DNA for sequencing purposes. Nowadays, BACs can be selected and positioned on the human genome using public databases such as the UCSC Genome Browser. This ensures optimal complementarity and sequence specificity. DNA is extracted from the BAC clones and amplified using a polymerase-based technique, such as degenerate oligonucleotide primed (DOP)-PCR. Next, the clones are sequenced and their position on the genome is verified. Probe labelling can be carried out by using either random priming or nick translation to incorporate biotin or digoxigenin.

Preparation of samples, hybridization of probes, and detection: The sample may include chromosomes in interphase or metaphase. Samples are securely attached to a surface, such as a glass slide. The sample may undergo pepsin digestion to ensure the target is accessible. 10-20 µL of probe is added, the sample is covered with a coverslip which is sealed with rubber cement, and the slide is heated to 97° C. for 5-10 minutes to denature the DNA. The slide is then placed in a 37° C. oven overnight so that the probe can hybridize. On the next day, the sample is washed and a blocker for nonspecific protein binding sites is applied. If horseradish peroxidase (HRP) is going to be used, the sample must be incubated in hydrogen peroxide to suppress endogenous peroxidase activity. If digoxigenin was used as a probe label, an anti-digoxigenin fluorescein primary antibody followed by a HRP-conjugated anti-fluorescein secondary antibody are then applied. If biotin was used as a probe label, non-specific binding sites must first be blocked using bovine serum albumin (BSA). Then, HRP-conjugated streptavidin is used for detection. HRP then converts diaminobenzidine (DAB) into an insoluble brown product, which can be detected in a bright-field microscope under 40- to 60-fold magnification. A counterstain such as hematoxylin and eosin can be used to make the product more visible.

Molecular cytogenetic techniques, such as chromogenic in situ hybridization (CISH) combine visual evaluation of chromosomes (karyotypic analysis) with molecular techniques. Molecular cytogenetics methods are based on hybridization of a nucleic acid probe to its complementary nucleic acid within a cell. A probe for a specific chromosomal region will recognize and hybridize to its complementary sequence on a metaphase chromosome or within an interphase nucleus (for example in a sample). Probes have been developed for a variety of diagnostic and research purposes. Sequence probes hybridize to single copy DNA sequences in a specific chromosomal region or gene. These are the probes used to identify the chromosomal critical region or gene associated with a syndrome or condition of interest. On metaphase chromosomes, such probes hybridize to each chromatid, usually giving two small, discrete signals per chromosome. Hybridization of sequence probes, such as repeat depleted probes or unique sequence probes, has made possible detection of chromosomal abnormalities associated with numerous diseases and syndromes, including constitutive genetic anomalies, such as microdeletion syndromes, chromosome translocations, gene amplification and aneuploidy syndromes, neoplastic diseases as well as pathogen infections. Most commonly these techniques are applied to standard cytogenetic preparations on microscope slides. In addition, these procedures can be used on slides of fixed cells or other nuclear isolates. For example, these techniques are frequently used to characterize tumor cells for both diagnosis and prognosis of cancer. Numerous chromosomal abnormalities have been associated with the development of cancer (for example, aneuploidies such as trisomy 8 associated with certain myeloid disorders; translocations such as the BCR/ABL rearrangement in chronic myelogenous leukemia; and amplifications of specific nucleic acid sequences associated with neoplastic transformation). Molecular techniques can augment standard cytogenetic testing in the detection and characterization of such acquired chromosomal anomalies. Systems for dual color CISH have been introduced. These include the Dako DuoCISH™ system and the Zyto Vision ZytoDot® 2C system. Both of these systems use separate enzymes (alkaline phosphatase and horseradish peroxidase) for the two color detection steps.

In some embodiments systems and processes for chromogenic in situ hybridization (CISH), and in particular to methods which prevent interference between two or more color detection systems in a single assay, and further relates to processes for scoring assays utilizing break-apart probes are contemplated. See WO2011133625, which is hereby incorporated in its entirety.

Fluorescence In Situ Hybridization (FISH)

Fluorescence in situ hybridization (FISH) is a cytogenetic technique that uses fluorescent probes that bind to only those parts of the chromosome with a high degree of sequence complementarity. It was developed by biomedical researchers in the early 1980s and is used to detect and localize the presence or absence of specific DNA sequences on chromosomes. Fluorescence microscopy can be used to find out where the fluorescent probe is bound to the chromosomes. FISH is often used for finding specific features in DNA for use in genetic counseling, medicine, and species identification. FISH can also be used to detect and localize specific RNA targets (such as mRNA, lncRNA and miRNA) in cells, circulating tumor cells, and samples. In this context, it can help define the spatial-temporal patterns of gene expression within cells.

Probes: RNA and DNA: RNA probes can be designed for any gene or any sequence within a gene for visualization of mRNA, lncRNA and miRNA in cells. FISH is used by examining the cellular reproduction cycle, specifically interphase of the nuclei for any chromosomal abnormalities. This technique [FISH] allows the analysis of a large series of archival cases much easier to identify the pinpointed chromosome by creating a probe with an artificial chromosomal foundation that will attract similar chromosomes. The hybridization signals for each probe when a nucleic abnormality is detected. Each probe for the detection of mRNA and lncRNA is composed of 20 oligonucleotide pairs, each pair covering a space of 40-50 bp. For miRNA detection, the probes use proprietary chemistry for specific detection of miRNA and cover the entire miRNA sequence. Probes are often derived from fragments of DNA that were isolated, purified, and amplified for use in the Human Genome Project. The size of the human genome is so large, compared to the length that could be sequenced directly, that it was necessary to divide the genome into fragments. (In the eventual analysis, these fragments were put into order by digesting a copy of each fragment into still smaller fragments using sequence-specific endonucleases, measuring the size of each small fragment using size-exclusion chromatography, and using that information to determine where the large fragments overlapped one another.) To preserve the fragments with their individual DNA sequences, the fragments were added into a system of continually replicating bacteria populations. Clonal populations of bacteria, each population maintaining a single artificial chromosome, are stored in various laboratories around the world. The artificial chromosomes (BAC) can be grown, extracted, and labeled, in any lab. These fragments are on the order of 100 thousand base-pairs, and are the basis for most FISH probes.

Preparation and hybridization process—RNA: Cells can be permeabilized to allow target accessibility. FISH has also been successfully done on unfixed cells. A target-specific probe, composed of 20 oligonucleotide pairs, hybridizes to the target RNA(s). Separate but compatible signal amplification systems enable the multiplex assay (up to two targets per assay). Signal amplification is achieved via a series of sequential hybridization steps. At the end of the assay the samples are visualized under a fluorescence microscope.

Preparation and hybridization process—DNA: First, a probe is constructed. The probe must be large enough to hybridize specifically with its target but not so large as to impede the hybridization process. The probe is tagged directly with fluorophores, with targets for antibodies or with biotin. Tagging can be done in various ways, such as nick translation, or PCR using tagged nucleotides. Then, an interphase or metaphase chromosome preparation is produced. The chromosomes are firmly attached to a substrate, usually glass. Repetitive DNA sequences must be blocked by adding short fragments of DNA to the sample. The probe is then applied to the chromosome DNA and incubated for approximately 12 hours while hybridizing. Several wash steps remove all un-hybridized or partially hybridized probes. The results are then visualized and quantified using a microscope that is capable of exciting the dye and recording images. If the fluorescent signal is weak, amplification of the signal may be necessary in order to exceed the detection threshold of the microscope. Fluorescent signal strength depends on many factors such as probe labeling efficiency, the type of probe, and the type of dye. Fluorescently tagged antibodies or streptavidin are bound to the dye molecule. These secondary components are selected so that they have a strong signal.

Fiber FISH

In an alternative technique to interphase or metaphase preparations, fiber FISH, interphase chromosomes are attached to a slide in such a way that they are stretched out in a straight line, rather than being tightly coiled, as in conventional FISH, or adopting a chromosome territory conformation, as in interphase FISH. This is accomplished by applying mechanical shear along the length of the slide, either to cells that have been fixed to the slide and then lysed, or to a solution of purified DNA. A technique known as chromosome combing is increasingly used for this purpose. The extended conformation of the chromosomes allows dramatically higher resolution—even down to a few kilobases.

Quantitative FISH (Q-FISH)

Quantitative Fluorescent in situ hybridization (Q-FISH) is a cytogenetic technique based on the traditional FISH methodology. In Q-FISH, the technique uses labelled (Cy3 or FITC) synthetic DNA mimics called peptide nucleic acid (PNA) oligonucleotides to quantify target sequences in chromosomal DNA using fluorescent microscopy and analysis software.

Flow FISH

Flow-FISH is a cytogenetic technique to quantify the copy number of specific repetitive elements in genomic DNA of whole cell populations via the combination of flow cytometry with cytogenetic fluorescent in situ hybridization staining protocols. Flow-FISH was first published in 1998 by Rufer et al. as a modification of another technique for analyzing telomere length, Q-FISH, that employs peptide nucleic acid probes of a 3'-CCCTAACCCTAACCCTAA-5' sequence labeled with a fluorescein fluorophore to stain telomeric repeats on prepared metaphase spreads of cells that have been treated with colcemid, hypotonic shock, and fixation to slides via methanol/acetic acid treatment (protocol available online). Images of the resultant fluorescent spots could then be analyzed via a specialized computer program (method and software available from the Flintbox Network) to yield quantitative fluorescence values that can then be used to estimate actual telomere length. The fluorescence yielded by probe staining is considered to be quantitative because PNA binds preferentially to DNA at low ionic salt concentrations and in the presence of formamide, thus the DNA duplex may not reform once it has been melted and annealed to PNA probe, allowing the probe to saturate its target repeat sequence (as it is not displaced from the target DNA by competing anti sense DNA on the complementary strand), thus yielding a reliable and quantifiable readout of the frequency of PNA probe target at a given chromosomal site after washing away of unbound probe.

Comparative Genomic Hybridization

Comparative genomic hybridization is a molecular cytogenetic method for analyzing copy number variations (CNVs) relative to ploidy level in the DNA of a test sample compared to a reference sample, without the need for culturing cells. The aim of this technique is to quickly and efficiently compare two genomic DNA samples arising from two sources, which are most often closely related, because it is suspected that they contain differences in terms of either gains or losses of either whole chromosomes or sub-chromosomal regions (a portion of a whole chromosome). This technique was originally developed for the evaluation of the differences between the chromosomal complements of solid tumor and normal tissue samples, and has an improved resolution of 5-10 megabases compared to the more traditional cytogenetic analysis techniques of Giemsa banding and fluorescence in situ hybridization (FISH) which are limited by the resolution of the microscope utilized.

Blotting

Exemplary blotting techniques that may be utilized include Western, Southern, Eastern, Far-western, Southwestern, Northwestern, and Northern blotting, as further described in the following sections and as known in the art.

Western Blotting

The western blot (sometimes called the protein immunoblot) is a widely used analytical technique used to detect specific proteins in a sample or extract. It uses gel electrophoresis to separate native proteins by 3-D structure or denatured proteins by the length of the polypeptide. The proteins are then transferred to a membrane (typically nitrocellulose or PVDF), where they are stained with antibodies specific to the target protein. The gel electrophoresis step is included in western blot analysis to resolve the issue of the cross-reactivity of antibodies.

Southern Blotting

Southern blotting combines transfer of electrophoresis-separated DNA fragments to a filter membrane and subsequent fragment detection by probe hybridization. Hybridization of the probe to a specific DNA fragment on the filter membrane indicates that this fragment contains DNA sequence that is complementary to the probe. The transfer step of the DNA from the electrophoresis gel to a membrane permits easy binding of the labeled hybridization probe to the size-fractionated DNA. It also allows for the fixation of the target-probe hybrids, which may be utilized for analysis by autoradiography or other detection methods. Southern blots performed with restriction enzyme-digested genomic DNA may be used to determine the number of sequences (e.g., gene copies) in a genome. A probe that hybridizes only to a single DNA segment that has not been cut by the restriction enzyme will produce a single band on a Southern blot, whereas multiple bands will likely be observed when the probe hybridizes to several highly similar sequences (e.g., those that may be the result of sequence duplication). Modification of the hybridization conditions (for example, increasing the hybridization temperature or decreasing salt concentration) may be used to increase specificity and decrease hybridization of the probe to sequences that are less than 100% similar.

Eastern Blotting

The eastern blot is a biochemical technique used to analyze protein post translational modifications (PTM) such as lipids, phospho-moieties, and glycoconjugates. It is most often used to detect carbohydrate epitopes. Thus, eastern blotting can be considered an extension of the biochemical technique of western blotting. Multiple techniques have been described by the term eastern blotting, most use proteins blotted from SDS-PAGE gel on to a PVDF or nitrocellulose membrane. Transferred proteins are analyzed for post-translational modifications using probes that may detect lipids, carbohydrate, phosphorylation or any other protein modification. Eastern blotting should be used to refer to methods that detect their targets through specific interaction of the PTM and the probe, distinguishing them from a standard Far-western blot. In principle, eastern blotting is similar to lectin blotting (i.e. detection of carbohydrate epitopes on proteins or lipids).

Far-Western Blotting

Far-western blotting employs non-antibody proteins to probe the protein(s) of interest on the blot. In this way, binding partners of the probe (or the blotted) protein may be identified. The probe protein is often produced in E. coli using an expression cloning vector. Proteins in a cell lysate containing prey proteins are firstly separated by SDS or native PAGE, and transferred to a membrane, as in a standard WB. The proteins in the membrane are then denatured and renatured. The membrane is then blocked and probed, usually with purified bait protein(s). The bait proteins are detected on spots in the membrane where a prey protein is located, if the bait proteins and the prey protein together form a complex. The probe protein can then be visualized through the usual methods—it may be radio-labelled; it may bear a specific affinity tag like His or FLAG for which antibodies exist; or there may be a protein specific antibody (to the probe protein).

Southwestern Blotting

Southwestern blotting, based along the lines of Southern blotting (which was created by Edwin Southern) and first described by B. Bowen, J. Steinberg and colleagues in 1980, is a lab technique which involves identifying and characterizing DNA-binding proteins (proteins that bind to DNA) by their ability to bind to specific oligonucleotide probes. The proteins are separated by gel electrophoresis and are subsequently transferred to nitrocellulose membranes similar to other types of blotting. "Southwestern blot mapping" is performed for rapid characterization of both DNA-binding proteins and their specific sites on genomic DNA. Proteins are separated on a polyacrylamide gel (PAGE) containing sodium dodecyl sulfate (SDS), renatured by removing SDS in the presence of urea, and blotted onto nitrocellulose by diffusion. The genomic DNA region of interest is digested by restriction enzymes selected to produce fragments of appropriate but different sizes, which are subsequently end-labeled and allowed to bind to the separated proteins. The specifically bound DNA is eluted from each individual protein-DNA complex and analyzed by polyacrylamide gel electrophoresis. Evidence that specific DNA binding proteins may be detected by this technique has been presented. Moreover, their sequence-specific binding allows the purification of the corresponding selectively bound DNA fragments and may improve protein-mediated cloning of DNA regulatory sequences.

Northwestern Blotting

Running a Northwestern blot involves separating the RNA binding proteins by gel electrophoresis, which will separate the RNA binding proteins based upon their size and charge. Individual samples can be loaded in to the agarose or polyacrylamide gel (usually an SDS-PAGE) in order to analyze multiple samples at the same time. Once the gel electrophoresis is complete, the gel and associated RNA binding proteins are transferred to a nitrocellulose transfer paper. The newly transferred blots are then soaked in a blocking solution; non-fat milk and bovine serum albumin are common blocking buffers. This blocking solution assists with preventing non-specific binding of the primary and/or secondary antibodies to the nitrocellulose membrane. Once the blocking solution has adequate contact time with the blot, a specific competitor RNA is applied and given time to incubate at room temperature. During this time, the competitor RNA binds to the RNA binding proteins in the samples that are on the blot. The incubation time during this process can vary depending on the concentration of the competitor RNA applied; though incubation time is typically one hour. After the incubation is complete, the blot is usually washed at least 3 times for 5 minutes each wash, in order to dilute out the RNA in the solution. Common wash buffers include Phosphate buffered saline (PBS) or a 10% Tween 20 solution. Improper or inadequate washing will affect the clarity of the development of the blot. Once washing is complete the blot is then typically developed by x-ray or similar autoradiography methods.

Northern Blotting

A general Northern blotting procedure starts with extraction of total RNA from a sample e.g., from cells. Eukaryotic mRNA can then be isolated through the use of oligo (dT) cellulose chromatography to isolate only those RNAs with a poly(A) tail. RNA samples are then separated by gel electrophoresis. Since the gels are fragile and the probes are unable to enter the matrix, the RNA samples, now separated by size, are transferred to a nylon membrane through a capillary or vacuum blotting system. A nylon membrane with a positive charge is the most effective for use in northern blotting since the negatively charged nucleic acids have a high affinity for them. The transfer buffer used for the blotting usually contains formamide because it lowers the annealing temperature of the probe-RNA interaction, thus eliminating the need for high temperatures, which could cause RNA degradation. Once the RNA has been transferred to the membrane, it is immobilized through covalent linkage to the membrane by UV light or heat. After a probe has been labeled, it is hybridized to the RNA on the membrane. Experimental conditions that can affect the efficiency and specificity of hybridization include ionic strength, viscosity, duplex length, mismatched base pairs, and base composition. The membrane is washed to ensure that the probe has bound specifically and to prevent background signals from arising. The hybrid signals are then detected by X-ray film and can be quantified by densitometry. To create controls for comparison in a northern blot samples not displaying the gene product of interest can be used after determination by microarrays or RT-PCR.

Enzymatic

A proximity detection method is described that utilizes enzymatic biotinylation to detect targets in a sample potentially using automated staining platforms. One disclosed embodiment comprises contacting the sample with a first conjugate comprising a biotin ligase and a first specific binding moiety that binds proximally to the first target; contacting the sample with a second conjugate comprising a biotin ligase substrate and a second specific binding moiety that binds proximally to the second target; subjecting the sample to conditions that allow biotinylation of the biotin ligase substrate by the biotin ligase when the first target and the second target have a proximal arrangement; and detecting biotinylation of the biotin ligase substrate. The conditions that allow biotinylation of the substrate include addition of biotin and ATP. The method also may comprise contacting the sample with a streptavidin-enzyme conjugate. Signal amplification also can be used. See WO2014139980, which is hereby incorporated by reference in its entirety.

Enzyme-Linked Immunosorbent Assay (ELISA)

Performing an ELISA involves at least one antibody with specificity for a particular antigen. The sample with an unknown amount of antigen is immobilized on a solid support (usually a polystyrene microtiter plate) either non-specifically (via adsorption to the surface) or specifically (via capture by another antibody specific to the same antigen, in a "sandwich" ELISA). After the antigen is immobilized, the detection antibody is added, forming a complex with the antigen. The detection antibody can be covalently linked to an enzyme, or can itself be detected by a secondary antibody that is linked to an enzyme through bio-conjugation. Between each step, the plate is typically washed with a mild detergent solution to remove any proteins or antibodies that are non-specifically bound. After the final wash step, the plate is developed by adding an enzymatic substrate to produce a visible signal, which indicates the quantity of antigen in the sample.

Ligand Binding Assays

The method of analyzing a sample known or suspected of containing circulating CTCs can include an imaging step. In one example, imaging includes imaging immunofluorescence of the CTC identification reagents (for example by detecting the label associated with each antibody used). In another example, imaging includes using multi-spectral bandpass filters. The immunofluorescence can emanate from antibodies labeled directly or indirectly with fluorophores or the immunofluorescence can result from exciting the fluorophores with spectrally filtered visible light. In one embodiment, the spectrally filtered visible light includes a first selected range to excite a first fluorophore and a second selected range to excite a second fluorophore, wherein the first selected range does not significantly excite the second fluorophore and the second selected range does not significantly excite the first fluorophore. Imaging the sample can include acquiring a first immunofluorescence image of the sample excited by the first selected range and acquiring a second immunofluorescence image of the sample excited by the second selected range (and acquiring additional immunofluorescence images for each label if more than two CTC identification reagents were used) and locating or identifying the CTCs by locating or visualizing the CTC identification reagents, which can include comparing or overlaying the first immunofluorescence image and the second immunofluorescence image (and additional images if so obtained). For example, imaging the first immunofluorescence image can identify CK+ cells, and the second immunofluorescence image can identify CD45+ cells, wherein comparing or overlaying includes identifying cells that are CK+ and CD45−. In another embodiment, locating the CTCs by locating the CTC identification reagents includes algorithmically analyzing the first immunofluorescence image and the second immunofluorescence image (and additional immunofluorescence image s if obtained) using a computer. In one embodiment, algorithmically analyzing includes digitally interrogating the images to measure cell size, cell compartment localization of markers, and/or intensity of marker expression. See WO2013101989, which is hereby incorporated by reference in its entirety.

Immunoprecipitation (IP)

The liquid phase ligand binding assay of Immunoprecipitation (IP) is a method that is used to purify or enrich a specific protein, or a group of proteins, using an antibody from a complex mixture. The extract of disrupted cells or samples can be mixed with an antibody against the antigen of interest, which produces the antigen-antibody complex. When antigen concentration is low, the antigen-antibody complex precipitation can take hours or even days and becomes hard to isolate the small amount of precipitate formed. The enzyme-linked immunosorbent assay (ELISA) or Western blotting are two different ways that the purified antigen (or multiple antigens) can be obtained and analyzed. This method involves purifying an antigen through the aid of an attached antibody on a solid (beaded) support, such as agarose resin. The immobilized protein complex can be accomplished either in a single step or successively. IP can also be used in conjunction with biosynthetic radioisotope labeling. Using this technique combination, one can determine if a specific antigen is synthesized by a sample or by a cell.

Chromatin Immunoprecipitation (ChIP)

Chromatin Immunoprecipitation (ChIP) is a type of immunoprecipitation experimental technique used to investigate the interaction between proteins and DNA in the cell. It aims to determine whether specific proteins are associated with specific genomic regions, such as transcription factors on promoters or other DNA binding sites, and possibly defining cistromes. ChIP also aims to determine the specific location in the genome that various histone modifications are associated with, indicating the target of the histone modifiers.

Chromatin Immunoprecipitation Sequencing (ChIP-Seq)

ChIP-sequencing, also known as ChIP-seq, is a method used to analyze protein interactions with DNA. ChIP-seq combines chromatin immunoprecipitation (ChIP) with massively parallel DNA sequencing to identify the binding sites of DNA-associated proteins. It can be used to map global binding sites precisely for any protein of interest. ChIP-seq is used primarily to determine how transcription factors and other chromatin-associated proteins influence phenotype-affecting mechanisms. Determining how proteins interact with DNA to regulate gene expression is essential for fully understanding many biological processes and disease states. This epigenetic information is complementary to genotype and expression analysis. ChIP-seq technology is currently seen primarily as an alternative to ChIP-chip which can utilize a hybridization array. This necessarily introduces some bias, as an array is restricted to a fixed number of probes. Sequencing, by contrast, is thought to have less bias, although the sequencing bias of different sequencing technologies is not yet fully understood. Specific DNA sites in direct physical interaction with transcription factors and other proteins can be isolated by chromatin immunoprecipitation. ChIP produces a library of target DNA sites bound to a protein of interest in vivo. Massively parallel sequence analyses are used in conjunction with whole-genome sequence databases to analyze the interaction pattern of any protein with DNA, or the pattern of any epigenetic chromatin modifications. This can be applied to the set of ChIP-able proteins and modifications, such as transcription factors, polymerases and transcriptional machinery, structural proteins, protein modifications, and DNA modifications. As an alternative to the dependence on specific antibodies, different methods have been developed to find the superset of all nucleosome-depleted or nucleosome-disrupted active regulatory regions in the genome, like DNase-Seq and FAIRE-Seq.

ChIP-On-Chip (ChIP-ChIP)

ChIP-on-chip (also known as ChIP-chip) is a technology that combines chromatin immunoprecipitation ('ChIP') with DNA microarray ("chip"). Like regular ChIP, ChIP-on-chip is used to investigate interactions between proteins and DNA in vivo. Specifically, it allows the identification of the cistrome, sum of binding sites, for DNA-binding proteins on a genome-wide basis. Whole-genome analysis can be performed to determine the locations of binding sites for almost any protein of interest. As the name of the technique suggests, such proteins are generally those operating in the context of chromatin. The most prominent representatives of this class are transcription factors, replication-related proteins, like Origin Recognition Complex Protein (ORC), histones, their variants, and histone modifications. The goal of ChIP-on-chip is to locate protein binding sites that may help identify functional elements in the genome. For example, in the case of a transcription factor as a protein of interest, one can determine its transcription factor binding sites throughout the genome. Other proteins allow the identification of promoter regions, enhancers, repressors and silencing elements, insulators, boundary elements, and sequences that control DNA replication. If histones are subject of interest, it is believed that the distribution of modifications and their localizations may offer new insights into the mechanisms of regulation. One of the long-term goals ChIP-on-chip was designed for is to establish a catalogue of (selected) organisms that lists all protein-DNA interactions under various physiological conditions. This knowledge would ultimately help in the understanding of the machinery behind gene regulation, cell proliferation, and disease progression. Hence, ChIP-on-chip offers not only huge potential to complement our knowledge about the orchestration of the genome on the nucleotide level, but also on higher levels of information and regulation as it is propagated by research on epigenetics.

Radioimmunoassay

Radioimmunoassay (RIA) is a very sensitive in vitro assay technique used to measure concentrations of antigens (for example, hormone levels in blood) by use of antibodies. As such, it can be seen as the inverse of a radiobinding assay, which quantifies an antibody by use of corresponding antigens. Classically, to perform a radioimmunoassay, a known quantity of an antigen is made radioactive, frequently by labeling it with gamma-radioactive isotopes of iodine, such as 125-I, attached to tyrosine. This radiolabeled antigen is then mixed with a known amount of antibody for that antigen, and as a result, the two specifically bind to one another. Then, a sample of serum from a patient containing an unknown quantity of that same antigen is added. This causes the unlabeled (or "cold") antigen from the serum to compete with the radiolabeled antigen ("hot") for antibody binding sites. As the concentration of "cold" antigen is increased, more of it binds to the antibody, displacing the radiolabeled variant, and reducing the ratio of antibody-bound radiolabeled antigen to free radiolabeled antigen. The bound antigens are then separated from the unbound ones, and the radioactivity of the bound antigen remaining in the supernatant is measured using a gamma counter.

This method can be used for any biological molecule in principle and is not restricted to serum antigens, nor is it required to use the indirect method of measuring the free antigen instead of directly measuring the captured antigen. For example, if it is undesirable or not possible to radiolabel the antigen or target molecule of interest, an RIA can be done if two different antibodies that recognize the target are available and the target is large enough (e.g., a protein) to present multiple epitopes to the antibodies. One antibody would be radiolabeled as above while the other would remain unmodified. The RIA would begin with the "cold" unlabeled antibody being allowed to interact and bind to the target molecule in solution. Preferably, this unlabeled antibody is immobilized in some way, such as coupled to an agarose bead, coated to a surface, etc. Next, the "hot" radiolabeled antibody is allowed to interact with the first antibody-target molecule complex. After extensive washing, the direct amount of radioactive antibody bound is measured and the amount of target molecule quantified by comparing it to a reference amount assayed at the same time. This method is similar in principle to the non-radioactive sandwich ELISA method.

Fluorescence Polarization

Fluorescence polarization is synonymous with fluorescence anisotropy. This method measures the change in the rotational speed of a fluorescent-labeled ligand once it is bound to the receptor. Polarized light is used in order to excite the ligand, and the amount of light emitted is measured. Depolarization of the emitted light depends on the size of the present ligand. If a small ligand is used, it will have a large depolarization, which will rapidly rotate the light. If the ligand utilized is of a larger size, the resulting depolarization will be reduced. An advantage of this method is that it may only include one labeling step. However, if this method is used at low nanomolar concentrations, results may be precise.

Förster Resonance Energy Transfer (FRET)

Forster Resonance Energy Transfer (also referred to as fluorescence resonance energy transfer) utilizes energy transferred between the donor and the acceptor molecules that are in close proximity, e.g., a donor- and acceptor-fluorophore, or a fluorophore and a quencher. FRET uses a fluorescence labeled ligand like FP. Energy transfer within FRET begins by exciting the donor. The dipole-dipole interaction between the donor and the acceptor molecule transfers the energy from the donor to the acceptor molecule. Interactions between or among molecules to which the donor and acceptors can be monitored by detecting the fluorescence spectra associated with the entry transfer, or absence thereof. For example, if a ligand is bound to a receptor-antibody complex, then the acceptor will emit light. The energy transfer depends on the distance between the donor and acceptor, such that the presence or absence of the transfer indicates the molecular distance. Typically, a distance smaller than 10 nm allows efficient energy transfer between the acceptor and donor, though greater or lesser distances may be used depending on the particular molecules involved.

Surface Plasmon Resonance (SPR)

Surface Plasmon Resonance (SPR) does not require labeling of the ligand. Instead, it works by measuring the change in the angle at which the polarized light is reflected from a surface (refractive index). The angle is related to the change in mass or layer of thickness, such as immobilization of a ligand changing the resonance angle, which increases the reflected light. The device for which SPR is derived includes a sensor chip, a flow cell, a light source, a prism, and a fixed angle position detector.

Filter-Binding Assays

Filter assays are solid phase ligand binding assays that use filters to measure the affinity between two molecules. In a filter binding assay, the filters are used to trap cell membranes by sucking the medium through them. This rapid method occurs at a fast speed in which filtration and a recovery can be achieved for the found fraction. Washing filters with a buffer removes residual unbound ligands and any other ligands present that are capable of being washed away from the binding sites. The receptor-ligand complexes present while the filter is being washed will not dissociate significantly because they will be completely trapped by the filters. Characteristics of the filter are important for each job being done. A thicker filter is useful to get a more complete recovery of small membrane pieces, but may require a longer wash time. It is recommended to pretreat the filters to help trap negatively charged membrane pieces. Soaking the filter in a solution that would give the filter a positive surface charge would attract the negatively charged membrane fragments.

Affinity Chromatography

Affinity chromatography is a method of separating biochemical mixtures based on a highly specific interaction such as that between antigen and antibody, enzyme and substrate, or receptor and ligand. The stationary phase is typically a gel matrix, often of agarose; a linear sugar molecule derived from algae. Usually the starting point is an undefined heterogeneous group of molecules in solution, such as a cell lysate, growth medium or blood serum. The molecule of interest will have a well-known and defined property, and can be exploited during the affinity purification process. The process itself can be thought of as an entrapment, with the target molecule becoming trapped on a solid or stationary phase or medium. The other molecules in the mobile phase will not become trapped as they do not possess this property. The stationary phase can then be removed from the mixture, washed and the target molecule released from the entrapment in a process known as elution. Possibly the most common use of affinity chromatography is for the purification of recombinant proteins.

Immunoaffinity: Another use for the procedure is the affinity purification of antibodies from blood serum. If serum is known to contain antibodies against a specific antigen (for example if the serum comes from an organism immunized against the antigen concerned) then it can be used for the affinity purification of that antigen. This is also known as Immunoaffinity Chromatography. For example if an organism is immunized against a GST-fusion protein it will produce antibodies against the fusion-protein, and possibly antibodies against the GST tag as well. The protein can then be covalently coupled to a solid support such as agarose and used as an affinity ligand in purifications of antibody from immune serum. For thoroughness the GST protein and the GST-fusion protein can each be coupled separately. The serum is initially allowed to bind to the GST affinity matrix. This will remove antibodies against the GST part of the fusion protein. The serum is then separated from the solid support and allowed to bind to the GST-fusion protein matrix. This allows any antibodies that recognize the antigen to be captured on the solid support. Elution of the antibodies of interest is most often achieved using a low pH buffer such as glycine pH 2.8. The eluate is collected into a neutral tris or phosphate buffer, to neutralize the low pH elution buffer and halt any degradation of the antibody's activity. This is a nice example as affinity purification is used to purify the initial GST-fusion protein, to remove the undesirable anti-GST antibodies from the serum and to purify the target antibody. A simplified strategy is often employed to purify antibodies generated against peptide antigens. When the peptide antigens are produced synthetically, a terminal cysteine residue is added at either the N- or C-terminus of the peptide. This cysteine residue contains a sulfhydryl functional group which allows the peptide to be easily conjugated to a carrier protein (e.g. Keyhole Limpet Hemocyanin (KLH)). The same cysteine-containing peptide is also immobilized onto an agarose resin through the cysteine residue and is then used to purify the antibody. Most monoclonal antibodies have been purified using affinity chromatography based on immunoglobulin-specific Protein A or Protein G, derived from bacteria.

Immunocytochemistry (ICC)

Immunocytochemistry (ICC) is a common laboratory technique that is used to anatomically visualize the localization of a specific protein or antigen in cells by use of a specific primary antibody that binds to it. The primary antibody allows visualization of the protein under a fluorescence microscope when it is bound by a secondary antibody that has a conjugated fluorophore. ICC allows researchers to evaluate whether or not cells in a particular sample express the antigen in question. In cases where an immunopositive signal is found, ICC also allows researchers to determine which sub-cellular compartments are expressing the antigen. There are many methods to obtain immunological detection on samples, including those tied directly to primary antibodies or antisera. A direct method involves the use of a detectable tag (e.g., fluorescent molecule, gold particles, etc.) directly to the antibody that is then allowed to bind to the antigen (e.g., protein) in a cell. Alternatively, there are many indirect methods. In one such method, the antigen is bound by a primary antibody which is then amplified by use of a secondary antibody which binds to the primary antibody. Next, a tertiary reagent containing an enzymatic moiety is applied and binds to the secondary antibody. When the quaternary reagent, or substrate, is applied, the enzymatic end of the tertiary reagent converts the substrate into a pigment reaction product, which produces a color (many colors are possible; brown, black, red, etc.,) in the same location that the original primary antibody recognized that antigen of interest. Some examples of substrates used (also known as chromogens) are AEC (3-Amino-9-EthylCarbazole), or DAB (3,3'-Diaminobenzidine). Use of one of these reagents after exposure to the necessary enzyme (e.g., horseradish peroxidase conjugated to an antibody reagent) produces a positive immunoreaction product. Immunocytochemical visualization of specific antigens of interest can be used when a less specific stain like H&E (Hematoxylin and Eosin) cannot be used for a diagnosis to be made or to provide additional predictive information regarding treatment (in some cancers, for example). Alternatively the secondary antibody may be covalently linked to a fluorophore (FITC and Rhodamine are the most common) which is detected in a fluorescence or confocal microscope. The location of fluorescence will vary according to the target molecule, external for membrane proteins, and internal for cytoplasmic proteins. In this way immunofluorescence is a powerful technique when combined with confocal microscopy for studying the location of proteins and dynamic processes (exocytosis, endocytosis, etc.).

Gene Expression Profiling

Exemplary gene expression profiling techniques that may be utilized include DNA profiling with PCR, DNA microarrays, SAGE, real-time PCR, differential display PCR, and RNA-seq, as further described in the following sections and as known in the art.

DNA Profiling with PCR

The polymerase chain reaction (PCR) process mimics the biological process of DNA replication, but confines it to specific DNA sequences of interest. With the invention of the PCR technique, DNA profiling took huge strides forward in both discriminating power and the ability to recover information from very small (or degraded) starting samples. PCR greatly amplifies the amounts of a specific region of DNA. In the PCR process, the DNA sample is denatured into the separate individual polynucleotide strands through heating. Two oligonucleotide DNA primers are used to hybridize to two corresponding nearby sites on opposite DNA strands in such a fashion that the normal enzymatic extension of the active terminal of each primer (that is, the 3' end) leads toward the other primer. PCR uses replication enzymes that are tolerant of high temperatures, such as the thermostable Taq polymerase. In this fashion, two new copies of the sequence of interest are generated. Repeated denaturation, hybridization, and extension in this fashion produce an exponentially growing number of copies of the DNA of interest. Instruments that perform thermal cycling are now readily available from commercial sources. This process can produce a million-fold or greater amplification of the desired region in 2 hours or less.

DNA Microarray

The core principle behind microarrays is hybridization between two DNA strands, the property of complementary nucleic acid sequences to specifically pair with each other by forming hydrogen bonds between complementary nucleotide base pairs. A high number of complementary base pairs in a nucleotide sequence means tighter non-covalent bonding between the two strands. After washing off non-specific bonding sequences, only strongly paired strands will remain hybridized. Fluorescently labeled target sequences that bind to a probe sequence generate a signal that depends on the hybridization conditions (such as temperature), and washing after hybridization. Total strength of the signal, from a spot (feature), depends upon the amount of target sample binding to the probes present on that spot. Microarrays use relative quantitation in which the intensity of a feature is compared to the intensity of the same feature under a different condition, and the identity of the feature is known by its position.

Serial Analysis of Gene Expression (SAGE)

Serial analysis of gene expression (SAGE) is a technique used by molecular biologists to produce a snapshot of the messenger RNA population in a sample of interest in the form of small tags that correspond to fragments of those transcripts. Briefly, SAGE experiments proceed as follows:

The mRNA of an input sample (e.g., a tumour) is isolated and a reverse transcriptase and biotinylated primers are used to synthesize cDNA from mRNA.

The cDNA is bound to Streptavidin beads via interaction with the biotin attached to the primers, and is then cleaved using a restriction endonuclease called an anchoring enzyme (AE). The location of the cleavage site and thus the length of the remaining cDNA bound to the bead will vary for each individual cDNA (mRNA).

The cleaved cDNA downstream from the cleavage site is then discarded, and the remaining immobile cDNA fragments upstream from cleavage sites are divided in half and exposed to one of two adapter oligonucleotides (A or B) containing several components in the following order upstream from the attachment site: 1) Sticky ends with the AE cut site to allow for attachment to cleaved cDNA; 2) A recognition site for a restriction endonuclease known as the tagging enzyme (TE), which cuts about 15 nucleotides downstream of its recognition site (within the original cDNA/mRNA sequence); 3) A short primer sequence unique to either adapter A or B, which will later be used for further amplification via PCR.

After adapter ligation, cDNA are cleaved using TE to remove them from the beads, leaving only a short "tag" of about 11 nucleotides of original cDNA (15 nucleotides minus the 4 corresponding to the AE recognition site).

The cleaved cDNA tags are then repaired with DNA polymerase to produce blunt end cDNA fragments.

These cDNA tag fragments (with adapter primers and AE and TE recognition sites attached) are ligated, sandwiching the two tag sequences together, and flanking adapters A and B at either end. These new constructs, called ditags, are then PCR amplified using anchor A and B specific primers.

The ditags are then cleaved using the original AE, and allowed to link together with other ditags, which will be ligated to create a cDNA concatemer with each ditag being separated by the AE recognition site.

These concatemers are then transformed into bacteria for amplification through bacterial replication.

The cDNA concatemers can then be isolated and sequenced using modern high-throughput DNA sequencers, and these sequences can be analyzed with computer programs which quantify the recurrence of individual tags.

Real-Time Polymerase Chain Reaction

A real-time polymerase chain reaction is a laboratory technique of molecular biology based on the polymerase chain reaction (PCR). It monitors the amplification of a targeted DNA molecule during the PCR, i.e. in real-time, and not at its end, as in conventional PCR. Real-time PCR can be used quantitatively (Quantitative real-time PCR), semi-quantitatively, i.e. above/below a certain amount of DNA molecules (Semi quantitative real-time PCR) or qualitatively (Qualitative real-time PCR). Two common methods for the detection of PCR products in real-time PCR are: (1) non-specific fluorescent dyes that intercalate with any double-stranded DNA, and (2) sequence-specific DNA probes consisting of oligonucleotides that are labelled with a fluorescent reporter which permits detection only after hybridization of the probe with its complementary sequence. Real-time PCR is carried out in a thermal cycler with the capacity to illuminate each sample with a beam of light of at least one specified wavelength and detect the fluorescence emitted by the excited fluorophore. The thermal cycler is also able to rapidly heat and chill samples, thereby taking advantage of the physicochemical properties of the nucleic acids and DNA polymerase. The PCR process generally consists of a series of temperature changes that are repeated 25-50 times. These cycles normally consist of three stages: the first, at around 95° C., allows the separation of the double chain; the second, at a temperature of around 50-60° C., allows the binding of the primers with the DNA template; the third, at between 68-72° C., facilitates the polymerization carried out by the DNA polymerase. Due to the small size of the fragments the last step is usually omitted in this type of PCR as the enzyme is able to increase their number during the change between the alignment stage and the denaturing stage. In addition, in four steps PCR the fluorescence is measured during short temperature phase lasting only a few seconds in each cycle, with a temperature of, for example, 80° C., in order to reduce the signal caused by the presence of primer dimers when a non-specific dye is used. The temperatures and the timings used for each cycle depend on a wide variety of parameters, such as: the enzyme used to synthesize the DNA, the concentration of divalent ions and deoxyribonucleotides (dNTPs) in the reaction and the bonding temperature of the primers.

Differential Display PCR

Differential display (also referred to as DDRT-PCR or DD-PCR) is the technique where a researcher can compare and identify changes in gene expression at the mRNA level between any pair of eukaryotic cell samples. The assay may be extended to more than one pair, if needed. The paired samples will have morphological, genetic or other experimental differences for which the researcher wishes to study the gene expression patterns, hoping to elucidate the root cause of the particular difference or specific genes that are affected by the experiment. The concept of differential display is to use a limited number of short arbitrary primers in combination with the anchored oligo-dT primers to systematically amplify and visualize most of the mRNA in a cell. After its invention in the early 1990s, differential display became a common technique for identifying differentially expressed genes at the mRNA level. Different streamlined DD-PCR protocols have been proposed including fluorescent DD process as well as radioactive labeling, which offers high accuracy and readout.

RNA-Sequencing (RNA-Seq)

RNA sequencing (RNA-seq), also called whole transcriptome shotgun sequencing (WTSS), is a technology that uses the capabilities of next-generation sequencing to reveal a snapshot of RNA presence and quantity from a genome at a given moment in time.

RNA 'Poly(A)' Library RNA-seq: Creation of a sequence library can change from platform to platform in high throughput sequencing, where each has several kits designed to build different types of libraries and adapting the resulting sequences to the specific requirements of their instruments. However, due to the nature of the template being analyzed, there are commonalities within each technology. Frequently, in mRNA analysis the 3' polyadenylated (poly(A)) tail is targeted in order to ensure that coding RNA is separated from noncoding RNA. This can be accomplished simply with poly (T) oligos covalently attached to a given substrate. Presently many studies utilize magnetic beads for this step. Studies including portions of the transcriptome outside poly(A) RNAs have shown that when using poly(T) magnetic beads, the flow-through RNA (non-poly(A) RNA) can yield important noncoding RNA gene discovery which would have otherwise gone unnoticed. Also, since ribosomal RNA represents over 90% of the RNA within a given cell, studies have shown that its removal via probe hybridization increases the capacity to retrieve data from the remaining portion of the transcriptome. The next step is reverse transcription. Due to the 5' bias of randomly primed-reverse transcription as well as secondary structures influencing primer binding sites, hydrolysis of RNA into 200-300 nucleotides prior to reverse transcription reduces both problems simultaneously. However, there are trade-offs with this method where although the overall body of the transcripts are efficiently converted to DNA, the 5' and 3' ends are less so. Depending on the aim of the study, researchers may choose to apply or ignore this step.

Small RNA/non-coding RNA sequencing: When sequencing RNA other than mRNA, the library preparation is modified. The cellular RNA is selected based on the desired size range. For small RNA targets, such as miRNA, the RNA is isolated through size selection. This can be performed with a size exclusion gel, through size selection magnetic beads, or with a commercially developed kit. Once isolated, linkers are added to the 3' and 5' end then purified. The final step is cDNA generation through reverse transcription.

Direct RNA Sequencing: As converting RNA into cDNA using reverse transcriptase has been shown to introduce biases and artifacts that may interfere with both the proper characterization and quantification of transcripts, single molecule Direct RNA Sequencing (DRSTM) technology was under development by Helicos (now bankrupt). DRSTM sequences RNA molecules directly in a massively-parallel manner without RNA conversion to cDNA or other biasing sample manipulations such as ligation and amplification. Once the cDNA is synthesized it can be further fragmented to reach the desired fragment length of the sequencing system.

(Protein) Mass Spectrometry

Protein mass spectrometry refers to the application of mass spectrometry to the study of proteins. Mass spectrometry is an important emerging method for the characterization of proteins. The two primary methods for ionization of whole proteins are electrospray ionization (ESI) and matrix-assisted laser desorption/ionization (MALDI). In keeping with the performance and mass range of available mass spectrometers, two approaches are used for characterizing proteins. In the first, intact proteins are ionized by either of the two techniques described above, and then introduced to a mass analyzer. This approach is referred to as "top-down" strategy of protein analysis. In the second, proteins are enzymatically digested into smaller peptides using a protease such as trypsin. Subsequently these peptides are introduced into the mass spectrometer and identified by peptide mass fingerprinting or tandem mass spectrometry. Hence, this latter approach (also called "bottom-up" proteomics) uses identification at the peptide level to infer the existence of proteins. Whole protein mass analysis is primarily conducted using either time-of-flight (TOF) MS, or Fourier transform ion cyclotron resonance (FT-ICR). These two types of instrument are preferable here because of their wide mass range, and in the case of FT-ICR, its high mass accuracy. Mass analysis of proteolytic peptides is a much more popular method of protein characterization, as cheaper instrument designs can be used for characterization. Additionally, sample preparation is easier once whole proteins have been digested into smaller peptide fragments. The most widely used instrument for peptide mass analysis are the MALDI time-of-flight instruments as they permit the acquisition of peptide mass fingerprints (PMFs) at high pace (1 PMF can be analyzed in approx. 10 sec). Multiple stage quadrupole-time-of-flight and the quadrupole ion trap also find use in this application.

Mass spectrometry CMS has been increasingly used for bioanalytical analyses. Mass spectrometry is well suited for multiplexing because mass differentiation allows many simultaneous detection channels. However, complex biomolecules, such as DNA, have complex mass spectra and may be difficult to detect in a matrix due to relatively poor sensitivity. MS is an analytical technique that measures the mass-to-charge ratio of charged species. It can be used for determining the chemical composition of a sample or molecule. Samples analyzed by mass spectrometry are ionized to generate charged molecules or atoms, separated according to their mass-to-charge ratios, and detected. The technique is used both qualitatively and quantitatively according to various applications. Inductively coupled plasmas OCP) are a type of plasma source in which the energy is supplied by electric currents which are produced by electromagnetic induction, that is, by time-varying magnetic fields. ICP can be used as an ionization source for mass spectrometry. The combination of inductively-coupled plasma and mass spectrometry is referred to as ICP-MS. Mass spectral imaging (MSI) is an application of mass spectrometry that involves analyzing chemical information with spatial information such that the chemical information can be visualized as a chemical image or map. By generating a chemical map, compositional differences across the sample surface can be elucidated. Laser ablation is the process of removing material from a solid surface by irradiating it with a laser beam. Laser ablation has been used as a means of sampling materials for mass spectrometry, in particular for mass spectral imaging. According to one embodiment, a system for sample mass spectral imaging includes a laser ablation sampler, an inductively-coupled plasma ionizer, a mass spectrometer, and a computer. Illustratively, the laser ablation sampler comprises a laser, a laser ablation chamber, and a sample platform configured such that the laser can irradiate a sample positioned on the sample platform to form an ablated sample, wherein the laser and the sample platform are coordinated by the computer. The laser ablation sampler and inductively-coupled plasma ionizer are operably connected so that the ablated sample can be transferred from the laser ablation sampler into the inductively-coupled plasma ionizer, thereby evaporating, vaporizing, atomizing, and ionizing the ablated sample to form an atomic ion population having a mass-to-charge ratio distribution. The mass spectrometer is operably connected to the inductively-coupled plasma ionizer so that the ion population can be transferred from the inductively-coupled plasma ionizer to the mass spectrometer, wherein the mass spectrometer separates the ion population according to the mass-to-charge ratio distribution, thereby generating mass-to-charge ratio data. The computer is configured to accept location inputs and communicate with the laser ablation sampler so as to ablate the sample according to the location inputs and it is configured to relate the mass-to-charge ratio data to a location on the sample according to the location inputs. In further illustrative embodiments, the system further comprises a registration system configured to determine the position of the sample, thereby enabling automatic relation of the location inputs to the location on the sample upon which the laser is configured to irradiate. In illustrative embodiments, a composition for multiplexed sample LA-ICP-MS assays includes a mass tag and a specific binding moiety conjugated to the mass tag. The mass tag includes a population of atoms of a first kind that is detectably distinct from elements endogenous to a sample. In one embodiment, the population of atoms of the first kind is a non-endogenous stable isotope of an element. In another embodiment, the population of atoms is configured as a colloidal particle. See WO2014079802, which is hereby incorporated by reference in its entirety.

A method for detecting a target in a sample concerns contacting a sample with an enzyme-specific binding moiety conjugate selected to recognize the target. The sample then is contacted with a mass tag precursor conjugate, comprising a mass tag precursor and an enzyme substrate, a tyramine moiety, or a tyramine derivative, and an optional linker. The mass tag precursor conjugate undergoes reaction with the enzyme or with the product of the enzymatic reaction to produce precipitated mass tags, covalently bound mass tags, or non-covalently bound mass tags. The sample is exposed to an energy source, which provides sufficient. energy to produce a mass code from the mass tag. After ionization, the mass code can be detected using a detection method, such as mass spectrometry. In some embodiments, the sample is exposed to a first solution comprising the enzyme-specific binding moiety conjugate and a second solution comprising the mass tag precursor conjugate. Enzyme moieties of the enzyme-specific binding moiety can be selected from oxidoreductase enzymes (e.g. peroxidases), phosphatases (e.g. alkaline phosphatase), lactamases (e.g. β-lactamase), and galactosidases (e.g. β-D-galactosidase, β-galactosidase). Specific binding moieties can be selected from a protein, a polypeptide, an oligopeptide, a peptide, a nucleic acid, DNA, RNA, an oligosaccharide, a polysaccharide, and monomers thereof. Particular disclosed embodiments concern using alkaline phosphatase-antibody conjugates and horseradish peroxidase-antibody conjugates. In some disclosed embodiments, a specific binding moiety recognizes the target. In other disclosed embodiments, the specific binding moiety recognizes a primary antibody bound to the target. In some embodiments, depositing a mass tag includes immobilizing an enzyme at a target, and contacting the sample with an enzyme substrate moiety and a mass tag precursor. The enzyme substrate moiety reacts with the enzyme and the mass tag precursor to produce and deposit a mass tag at the target. When two or more targets are present in the sample, mass tags are deposited sequentially at each target as described above. After a mass tag is deposited, the corresponding enzyme is deactivated prior to depositing a subsequent mass tag at a subsequent target. In other disclosed embodiments, the enzyme reacts with a mass tag precursor-tyramine conjugate or a mass tag precursor tyramine derivative conjugate to deposit, typically covalently, the mass tag proximal to the target. In some embodiments, immobilizing an enzyme at a target includes contacting the sample with a conjugate comprising a specific binding moiety and an enzyme. In certain embodiments, the specific binding moiety is an antibody. The specific binding moiety is capable of recognizing and binding directly to the target or to another specific binding moiety previously bound to the target. In particular embodiments, the first enzyme, the second enzyme, and any additional enzyme are the same. See WO2012003478, which is hereby incorporated by reference in its entirety.

DNA Methylation Detection

Recently, methods of diagnosing cancer through the measurement of DNA methylation have been suggested. DNA methylation occurs mainly on the cytosine of CpG islands in the promoter region of a specific gene to interfere with the binding of transcription factors, thus silencing the expression of the gene. Thus, detecting the methylation of CpG islands in the promoter of tumor inhibitory genes greatly assists in cancer research. Recently, an attempt has been actively made to determine promoter methylation, by methods such as methylation-specific PCR (hereinafter referred to as MSP) or automatic DNA sequencing, for the diagnosis and screening of cancer. See WO2009069984A2, which is hereby incorporated by reference in its entirety.

Acoustic Energy

At least some embodiments are directed to methods and systems for analyzing a specimen. The specimen can be analyzed based on its properties. These properties include acoustic properties, mechanical properties, optical properties, or the like that may be static or dynamic during processing. In some embodiments, the properties of the specimen are continuously or periodically monitored during processing to evaluate the state and condition of the specimen. Based on obtained information, processing can be controlled to enhance processing consistency, reduce processing times, improve processing quality, or the like. Acoustics can be used to analyze soft objects, such as samples. When an acoustical signal interacts with a sample, the transmitted signal depends on several mechanical properties of the sample, such as elasticity and firmness. As samples that have been placed into fixative (e.g., formalin) become more heavily cross-linked, the speed of transmission will change according to the properties of the sample. In some embodiments, a status of a biological sample can be monitored based on a time of flight of acoustic waves. The status can be a density status, fixation status, staining status, or the like. Monitoring can include, without limitation, measuring changes in sample density, cross-linking, decalcification, stain coloration, or the like. The biological sample can be non-fluidic samples, such as bone, or other type of sample. In some embodiments, methods and systems are directed to using acoustic energy to monitor a specimen. Based on interaction between the acoustic energy in reflected and/or transmission modes, information about the specimen may be obtained. Acoustic measurements can be taken. Examples of measurements include acoustic signal amplitude, attenuation, scatter, absorption, time of flight (TOF) in the specimen, phase shifts of acoustic waves, or combinations thereof. The specimen, in some embodiments, has properties that change during processing. In some embodiments, a fixative is applied to the specimen. As the specimen becomes more fixed, mechanical properties (e.g., elasticity, stiffness, etc.) change due to molecular cross-linking. These changes can be monitored using sound speed measurements via TOF. Based on the measurements, a fixative state or other histological state of the specimen can be determined. To avoid under-fixation or over-fixation, the static characteristics of the sample, dynamic characteristics of the sample, or both can be monitored. Characteristics of the sample include transmission characteristics, reflectance characteristics, absorption characteristics, attenuation characteristics, or the like. In certain embodiments, a method for evaluating a sample includes analyzing acoustic wave speed before, during and/or after sample processing. This is accomplished by first establishing a baseline measurement for a fresh, unfixed samples by delivering an acoustic wave from a transmitter to the sample taken from a subject. The baseline TOF acoustic wave is detected using a receiver. After or during processing the sample, a second acoustic wave is delivered from the transmitter to the sample. The second TOF acoustic wave is detected using the receiver after the second acoustic wave has traveled through the sample. Sound speeds in the sample are compared based on the first TOF and the second TOF to determine a change in speed. These measurements can be unique for each sample analyzed and therefore used to establish a baseline for each sample. Additional TOF measurements can be used to determine TOF contributions attributable to the media, measurement channel, or the like. In some embodiments, the TOF of the media is measured when no specimen is present to determine a baseline TOF of the media. See WO2011109769, which is hereby incorporated by reference in its entirety.

Lipidomics

Lipidomics research involves the identification and quantification of the thousands of cellular lipid molecular species and their interactions with other lipids, proteins, and other metabolites. Investigators in lipidomics examine the structures, functions, interactions, and dynamics of cellular lipids and the changes that occur during perturbation of the system. Lipidomic analysis techniques can include mass spectrometry (MS), nuclear magnetic resonance (NMR) spectroscopy, fluorescence spectroscopy, dual polarization interferometry and computational methods. In lipidomic research, data quantitatively describing the spatial and temporal alterations in the content and composition of different lipid molecular species is accrued after perturbation of cells through changes in its physiological or pathological state. Information obtained from these studies facilitates mechanistic insights into changes in cellular function.

Quantification of Immune Cells

Immune cell quantification in samples can occur through using epigenetic-based, quantitative real-time PCR assisted cell counting (qPACC). The methylation status of the chromatin structure of either actively expressed or silenced genes is the basis of the epigenetic-based cell identification and quantification technology. Discovery of cell type specific removal of methyl groups (demethylation) from the 5'-carbon of the cytosine base in the dinucleotide cytosine phosphate guanine permits precise and robust quantification of immune cells from only small amounts of human blood or tissue samples. These epigenetic biomarkers located on genomic DNA are stably associated with cells of interest. Kleen and Yuan (November 2015). "Quantitative real-time PCR assisted cell counting (qPACC) for epigenetic-based immune cell quantification in blood and tissue". J. Immunother. Cancer 46 (3).

Detection of Cancer-Associated Markers

Detection of "tumor markers", including but not limited to proteins, antigens, enzymes, hormones, DNA mutations, and carbohydrates associated with the presence of a cancer, using techniques such as but not limited to RNA, DNA, or protein sequencing, is of importance for the correct diagnosis of a cancer-type, and for selection of the appropriate method of treatment. Such markers include but are not limited to alpha fetoprotein (often associated with but not limited to germ cell tumors and hepatocellular carcinomas), CA 15-3 (often associated with but not limited to breast cancer), CA27-29 (often associated with but not limited to breast cancer), CA19-9 (often associated with but not limited to pancreatic cancer, colorectal cancer and other types of gastrointestinal cancer), CA-125 (often associated with but not limited to ovarian cancer, endometrial cancer, fallopian tube cancer, lung cancer, breast cancer and gastrointestinal cancer), calcitonin (often associated with but not limited to medullary thyroid carcinoma), calretinin (often associated with but not limited to mesothelioma, sex cord-gonadal stromal tumour, adrenocortical carcinoma, synovial sarcoma), carcinoembryonic antigen (often associated with but not limited to gastrointestinal cancer, cervix cancer, lung cancer, ovarian cancer, breast cancer, urinary tract cancer), CD34 (often associated with but not limited to hemangiopericytoma/solitary fibrous tumor, pleomorphic lipoma, gastrointestinal stromal tumor, dermatofibrosarcoma protuberans), CD99MIC 2 (often associated with but not limited to Ewing sarcoma, primitive neuroectodermal tumor, hemangiopericytoma/solitary fibrous tumor, synovial sarcoma, lymphoma, leukemia, sex cord-gonadal stromal tumor), CD117 (often associated with but not limited to gastrointestinal stromal tumor, mastocytosis, seminoma), chromogranin (often associated with but not limited to neuroendocrine tumor), chromosomes 3, 7, 17, and 9p21 (often associated with but not limited to bladder cancer), various types of cytokeratin (often associated with but not limited to many types of carcinoma and some types of sarcoma), desmin (often associated with but not limited to smooth muscle sarcoma, skeletal muscle sarcoma, and endometrial stromal sarcoma), epithelial membrane antigen (often associated with but not limited to various types of carcinoma, meningioma, and some types of sarcoma), Factor VIII/CD31 FL1 (often associated with but not limited to vascular sarcoma), glial fibrillary acidic protein (often associated with but not limited to glioma (astrocytoma, ependymoma)), gross cystic disease fluid protein (often associated with but not limited to breast cancer, ovarian cancer, and salivary gland cancer), HMB-45 (often associated with but not limited to melanoma, PEComa (for example angiomyolipoma), clear cell carcinoma, adrenocortical carcinoma), human chorionic gonadotropin (often associated with but not limited to gestational trophoblastic disease, germ cell tumor, and choriocarcinoma), immunoglobulin (often associated with but not limited to lymphoma, leukemia), inhibin (often associated with but not limited to sex cord-gonadal stromal tumour, adrenocortical carcinoma, hemangioblastoma), various types of keratin (often associated with but not limited to carcinoma, some types of sarcoma), various types of lymphocyte markers (often associated with but not limited to lymphoma, leukemia), MART-1 (Melan-A) (often associated with but not limited to melanoma, steroid-producing tumors (adrenocortical carcinoma, gonadal tumor)), Myo D1 (often associated with but not limited to rhabdomyosarcoma, small, round, blue cell tumor), muscle-specific actin (MSA) (often associated with but not limited to myosarcoma (leiomyosarcoma, rhabdomyosarcoma)), neurofilament (often associated with but not limited to neuroendocrine tumor, small-cell carcinoma of the lung), neuron-specific enolase (often associated with but not limited to neuroendocrine tumor, small-cell carcinoma of the lung, breast cancer), placental alkaline phosphatase (PLAP) (often associated with but not limited to seminoma, dysgerminoma, embryonal carcinoma), prostate-specific antigen (often associated with but not limited to prostate cancer), PTPRC (CD45) (often associated with but not limited to lymphoma, leukemia, histiocytic tumor), S100 protein (often associated with but not limited to melanoma, sarcoma (neurosarcoma, lipoma, chondrosarcoma), astrocytoma, gastrointestinal stromal tumor, salivary gland cancer, some types of adenocarcinoma, histiocytic tumor (dendritic cell, macrophage)), smooth muscle actin (SMA) (often associated with but not limited to gastrointestinal stromal tumor, leiomyosarcoma, PEComa), synaptophysin (often associated with but not limited to neuroendocrine tumor), thyroglobulin (often associated with but not limited to a postoperative marker of thyroid cancer), thyroid transcription factor-1 (often associated with but not limited to all types of thyroid cancer, lung cancer), Tumor M2-PK (often associated with but not limited to colorectal cancer, breast cancer, renal cell carcinoma, lung cancer, pancreatic cancer, esophageal cancer, stomach cancer, cervical cancer, ovarian cancer), vimentin (often associated with but not limited to sarcoma, renal cell carcinoma, endometrial cancer, lung carcinoma, lymphoma, leukemia, melanoma), ALK gene rearrangements (often associated with but not limited to non-small-cell lung cancer and anaplastic large cell lymphoma), Beta-2-microglobulin (B2M) (often associated with but not limited to Multiple myeloma, chronic lymphocytic leukemia, and some lymphomas), Beta-human chorionic gonadotropin (Beta-hCG) (often associated with but not limited to choriocarcinoma and germ cell tumors), BRCA1 and BRCA2 gene mutations (often associated with but not limited to ovarian cancer), BCR-ABL fusion gene (Philadelphia chromosome) (often associated with but not limited to chronic myeloid leukemia, acute lymphoblastic leukemia, and acute myelogenous leukemia), BRAF V600 mutations (often associated with but not limited to Cutaneous melanoma and colorectal cancer), CD20 (often associated with but not limited to Non-Hodgkin lymphoma), Chromogranin A (CgA) (often associated with but not limited to Neuroendocrine tumors), Circulating tumor cells of epithelial origin (CELLSEARCH®) (often associated with but not limited to Metastatic breast, prostate, and colorectal cancers), Cytokeratin fragment 21-1 (often associated with but not limited to lunch cancer), EGFR gene mutation analysis (often associated with but not limited to non-small-cell lung cancer), Estrogen receptor (ER)/progesterone receptor (PR) (often associated with but not limited to breast cancer), HE4 (often associated with but not limited to ovarian cancer), KRAS gene mutation analysis (often associated with but not limited to Colorectal cancer and non-small cell lung cancer), Lactate dehydrogenase (often associated with but not limited to Germ cell tumors, lymphoma, leukemia, melanoma, and neuroblastoma), Neuron-specific enolase (NSE) (often associated with but limited to Small cell lung cancer and neuroblastoma), Nuclear matrix protein 22 (often associated with but not limited to bladder cancer), Programmed death ligand 1 (PD-L1) (often associated with but not limited to non-small-cell lung cancer), Urokinase plasminogen activator (uPA) and plasminogen activator inhibitor (PAI-1) (often associated with but not limited to breast cancer), 5-Protein signature (OVA1®) (often associated with but not limited to ovarian cancer), 21-Gene signature (Oncotype DX®) (often associated with breast cancer), 70-Gene signature (Mammaprint®) (often associated with but not limited to breast cancer), and HER2/neu gene amplification or overexpression (often associated with but not limited to breast cancer, ovarian cancer, gastroesophageal junction adenocarcinoma, stomach cancer, non-small-cell lung cancers and uterine cancer). Additional biomarkers associated with tumors may include but are not limited to a P13KCA mutation, a FGFR2 amplification, a p53 mutation, a BRCA mutation, a CCND1 amplification, a MAP2K4 mutation, an ATR mutation, or any other biomarker the expression of which is correlated to a specific cancer; at least one of AFP, ALK, BCR-ABL, BRCA1/BRCA2, BRAF, V600E, Ca-125, CA19.9, EGFR, Her-2, KIT, PSA, S100, KRAS, ER/Pr, UGT1A1, CD30, CD20, F1P1L1-PDGRFa, PDGFR, TMPT, and TMPRSS2; or at least one biomarker selected from ABCB5, AFP-L3, Alpha-fetoprotein, Alpha-methyl acyl-CoA racemase, BRCA1, BRCA2, CA 15-3, CA 242, Ca 27-29, CA-125, CA15-3, CA19-9, Calcitonin, Carcinoembryonic antigen, Carcinoembryonic antigen peptide-1, Des-gamma carboxy prothrombin, Desmin, Early prostate cancer antigen-2, Estrogen receptor, Fibrin degradation product, Glucose-6-phosphate isomerase, an HPV antigen such as vE6, E7, L1, L2 or p16INK4a Human chorionic gonadotropin, IL-6, Keratin 19, Lactate dehydrogenase, Leucyl aminopeptidase, Lipotropin, Metanephrines, Neprilysin, NMP22, Normetanephrine, PCA3, Prostate-specific antigen, Prostatic acid phosphatase, Synaptophysin, Thyroglobulin, TNF, a transcription factor selected from ERG, ETV1 (ER81), FLI1, ETS1, ETS2, ELK1, ETV6 (TEL1), ETV7 (TEL2), GABPα, ELF1, ETV4 (E1AF; PEA3), ETV5 (ERM), ERF, PEA3/E1AF, PU.1, ESE1/ESX, SAP1 (ELK4), ETV3 (METS), EWS/FLI1, ESE1, ESE2 (ELF5), ESE3, PDEF, NET (ELK3; SAP2), NERF (ELF2), or FEV. XXX, Tumor-associated glycoprotein 72, c-kit, SCF, pAKT, pc-kit, and Vimentin. Alternatively, or in addition the biomarker of interest may be an immune checkpoint inhibitor such as, but not limited to, CTLA-4, PDL1, PDL2, PD1, B7-H3, B7-H4, BTLA, HVEM, KIR, TIM3, GAL9, GITR, LAG3, VISTA, KIR, 2B4, TRPO2, CD160, CGEN-15049, CHK 1, CHK2, A2aR, TL1A, and B-7 family ligands or a combination thereof or is a ligand of a checkpoint protein selected from the group consisting of CTLA-4, PDL1, PDL2, PD1, B7-H3, B7-H4, BTLA, HVEM, TIM3, GAL9, LAG3, VISTA, KIR, 2B4, CD160, CGEN-15049, CHK1, CHK2, A2aR, B-7 family ligands, or a combination thereof. Additional markers may include but is not limited to the detection of at least one biomarker associated with acute lymphoblastic leukemia (etv6, am11, cyclophilin b), B cell lymphoma (Ig-idiotype), glioma (E-cadherin, .alpha.-catenin, .beta.-catenin, .gamma.-catenin, p120 ctn), bladder cancer (p21ras), biliary cancer (p21ras), breast cancer (MUC family, HER2/neu, c-erbB-2), cervical carcinoma (p53, p21ras), colon carcinoma (p21ras, HER2/neu, c-erbB-2, MUC family), colorectal cancer (Colorectal associated antigen (CRC)-C017-1A/GA733, APC), choriocarcinoma (CEA), epithelial cell cancer (cyclophilin b), gastric cancer (HER2/neu, c-erbB-2, ga733 glycoprotein), hepatocellular cancer (.alpha.-fetoprotein), Hodgkin's lymphoma (Imp-1, EBNA-1), lung cancer (CEA, MAGE-3, NY-ESO-1), lymphoid cell-derived leukemia (cyclophilin b), melanoma (p5 protein, gp75, oncofetal antigen, GM2 and GD2 gangliosides, Melan-A/MART-1, cdc27, MAGE-3, p21ras, gp100.sup.Pmel117), myeloma (MUC family, p21ras), non-small cell lung carcinoma (HER2/neu, c-erbB-2), nasopharyngeal cancer (Imp-1, EBNA-1), ovarian cancer (MUC family, HER2/neu, c-erbB-2), prostate cancer (Prostate Specific Antigen (PSA) and its antigenic epitopes PSA-1, PSA-2, and PSA-3, PSMA, HER2/neu, c-erbB-2, ga733 glycoprotein), renal cancer (HER2/neu, c-erbB-2), squamous cell cancers of the cervix and esophagus (viral products such as human papilloma virus proteins), testicular cancer (NY-ESO-1), and/or T cell leukemia (HTLV-1 epitopes).

Precise targeting of specific aspects of kinase cascades is now known to provide previously unattainable breakthroughs for disease therapies. The importance of the protein kinase family is underscored by the numerous disease states that arise due to disregulation of kinase activity. Aberrant cell signaling by many of these protein and lipid kinases can lead to diseases, such as cancer. Several protein serine/threonine and tyrosine kinases are known to be activated in cancer cells and to drive tumour growth and progression. The technology described herein provides methods for enriching (or isolating) kinases, for example ATP-dependent kinases, utilizing one or more kinase capture agents. Examples of kinase capture agents include, but are not limited to, relatively non-selective protein kinase inhibitors, substrates or pseudosubstrates. The methods are useful, for example, for profiling of kinomes by tandem mass spectrometry. Although many highly selective and potent small molecule kinase inhibitors have been previously identified, as is described herein above, a large number of relatively non-selective small molecule kinase inhibitors have also been identified. For the methods described herein, use of relatively non-selective small molecule kinase inhibitors reduces the need for tailoring purification procedures for individual kinases, and amplifies the analytical signal obtained by enriching enzymes normally present in cells, tissues and bodily fluids at only catalytic concentrations. However, it will be recognized that selective small molecule kinase inhibitors also can be useful in these kinase analysis methods. In addition, a combination of a non-selective and a selective small molecule kinase inhibitor can be useful in these methods. Furthermore, a kinase capture agent (or more than one kinase capture agent) can also be combined with a phosphatase capture agent to enrich (or isolate) kinases and phosphatases concurrently. The methods described herein also can be applied to multiplexed analysis of protein kinases and/or phosphatases by tandem mass spectrometry from a single or multiple specimens. The technology described herein provides a method for analyzing a population of kinases, such as a kinome. The method involves separating kinases from a sample using one or more kinase capture agents, proteolytically digesting a protein sample to constituent peptides (for example with a protease such as trypsin), supplementing the obtained peptides with rationally designed calibrator peptides relating to particular protein kinase peptide sequences that contain scissile aspartate-proline (DP) bonds, and quantifying the native peptides derived from the kinase population by tandem mass spectrometry. See WO2007131191, which is hereby incorporated by reference in its entirety.

Affinity Purification of Specific Cell Types

Putative circulating tumor cells have now been reported in multiple human tumors including AML, CML, multiple myeloma, brain tumors, breast tumors, melanoma, and prostate cancer, colon cancer, and gastric cancer. In principle, circulating tumor cells can be identified by several experimental strategies. Many circulating tumor cells appear to express the cell surface markers that identify their normal counterparts. This observation provides a relatively simple enrichment procedure utilizing either flow cytometry-based cell sorting or microbeads-based affinity purification of the cells. See Schawb, M. Encyclopedia of Cancer, $3^{rd}$ edition, Springer-Verlag Berlin Heidelberg, 2011.

DNA Sequencing

In further exemplary embodiments, the sample, or one or more cells thereof, may be subjected to DNA sequencing. DNA sequencing may be targeted, e.g., to particular genes, regions, regulatory sequences, introns, exons, SNPs, potential fusions, etc., e.g., to detect sequences associated with cancer or pertinent to the diagnosis thereof. DNA sequencing may also be conducted on the entire genome or a significant portion thereof. Exemplary sequencing methods that may be utilized include, without limitation thereto, Sanger sequencing and dye-terminator sequencing, as well as next-generation sequencing (NGS) technologies such as pyrosequencing, nanopore sequencing, micropore-based sequencing, nanoball sequencing, MPSS, SOLID, Solexa, Ion Torrent, Starlite, SMRT, tSMS, sequencing by synthesis, sequencing by ligation, mass spectrometry sequencing, polymerase sequencing, RNA polymerase (RNAP) sequencing, microscopy-based sequencing, microfluidic Sanger sequencing, microscopy-based sequencing, RNAP sequencing, tunnelling currents DNA sequencing, and in vitro virus sequencing. See WO2014144478, WO2015058093, WO2014106076 and WO2013068528, each of which is hereby incorporated by reference in its entirety.

DNA sequencing technologies have advanced exponentially. Most recently, high-throughput sequencing (or next-generation sequencing) technologies parallelize the sequencing process, producing thousands or millions of sequences at once. In ultra-high-throughput sequencing as many as 500,000 sequencing-by-synthesis operations may be run in parallel. Next-generation sequencing lowers the costs and greatly increases the speed over the industry standard dye-terminator methods.

Pyrosequencing amplifies DNA inside water droplets in an oil solution (emulsion PCR), with each droplet containing a single DNA template attached to a single primer-coated bead that then forms a clonal colony. The sequencing machine contains many pico liter-volume wells each containing a single bead and sequencing enzymes. Pyrosequencing uses luciferase to generate light for detection of the individual nucleotides added to the nascent DNA, and the combined data are used to generate sequence read-outs. See Margulies, M et al. 2005, Nature, 437, 376-380, which is hereby incorporated by reference in its entirety. Pyrosequencing sequencing is a sequencing-by-synthesis technology that utilizes also utilizes pyrosequencing. Pyrosequencing sequencing of DNA involves two steps. In the first step, DNA is sheared into fragments of approximately 300-800 base pairs, and the fragments are blunt ended. Oligonucleotide adaptors are then ligated to the ends of the fragments. The adaptors serve as primers for amplification and sequencing of the fragments. The fragments can be attached to DNA capture beads, e.g., streptavidin-coated beads using, e.g., Adaptor B, which contains 5'-biotin tag. The fragments attached to the beads are PCR amplified within droplets of an oil-water emulsion. The result is multiple copies of clonally amplified DNA fragments on each bead. In the second step, the beads are captured in wells (pico-liter sized). Pyrosequencing is performed on each DNA fragment in parallel. Addition of one or more nucleotides generates a light signal that is recorded by a CCD camera in a sequencing instrument. The signal strength is proportional to the number of nucleotides incorporated. Pyrosequencing makes use of pyrophosphate (PPi) which is released upon nucleotide addition. PPi is converted to ATP by ATP sulfurylase in the presence of adenosine 5' phosphosulfate. Luciferase uses ATP to convert luciferin to oxyluciferin, and this reaction generates light that is detected and analyzed. In another embodiment, pyrosequencing is used to measure gene expression. Pyrosequecing of RNA applies similar to pyrosequencing of DNA, and is accomplished by attaching applications of partial rRNA gene sequencings to microscopic beads and then placing the attachments into individual wells. The attached partial rRNA sequence is then amplified in order to determine the gene expression profile. Sharon Marsh, Pyrosequencing® Protocols in Methods in Molecular Biology, Vol. 373, 15-23 (2007).

Another example of a sequencing technique that can be used is nanopore sequencing (Soni G V and Meller, A *Clin Chem* 53: 1996-2001, 2007, which is hereby incorporated by reference in its entirety). A nanopore is a small hole, of the order of 1 nanometer in diameter. Immersion of a nanopore in a conducting fluid and application of a potential across it results in a slight electrical current due to conduction of ions through the nanopore. The amount of current which flows is sensitive to the size of the nanopore. As a DNA molecule passes through a nanopore, each nucleotide on the DNA molecule obstructs the nanopore to a different degree. Thus, the change in the current passing through the nanopore as the DNA molecule passes through the nanopore represents a reading of the DNA sequence. See Bayley, Clin Chem. 2015 January; 61(1):25-31, which is hereby incorporated by reference in its entirety.

Another example of a DNA and RNA detection techniques that may be used is SOLiD™ technology (Applied Biosystems). SOLiD™ technology systems is a ligation based sequencing technology that may utilized to run massively parallel next generation sequencing of both DNA and RNA. In DNA SOLiD™ sequencing, genomic DNA is sheared into fragments, and adaptors are attached to the 5' and 3' ends of the fragments to generate a fragment library. Alternatively, internal adaptors can be introduced by ligating adaptors to the 5' and 3' ends of the fragments, circularizing the fragments, digesting the circularized fragment to generate an internal adaptor, and attaching adaptors to the 5' and 3' ends of the resulting fragments to generate a mate-paired library. Next, clonal bead populations are prepared in microreactors containing beads, primers, template, and PCR components. Following PCR, the templates are denatured and beads are enriched to separate the beads with extended templates. Templates on the selected beads are subjected to a 3' modification that permits bonding to a glass slide. The sequence can be determined by sequential hybridization and ligation of partially random oligonucleotides with a central determined base (or pair of bases) that is identified by a specific fluorophore. After a color is recorded, the ligated oligonucleotide is cleaved and removed and the process is then repeated.

In other embodiments, SOLiD™ Serial Analysis of Gene Expression (SAGE) is used to measure gene expression. Serial analysis of gene expression (SAGE) is a method that allows the simultaneous and quantitative analysis of a large number of gene transcripts, without the need of providing an individual hybridization probe for each transcript. First, a short sequence tag (about 10-14 bp) is generated that contains sufficient information to uniquely identify a transcript, provided that the tag is obtained from a unique position within each transcript. Then, many transcripts are linked together to form long serial molecules, that can be sequenced, revealing the identity of the multiple tags simultaneously. The expression pattern of any population of transcripts can be quantitatively evaluated by determining the abundance of individual tags, and identifying the gene corresponding to each tag. For more details see, e.g. Velculescu et al., Science 270:484487 (1995); and Velculescu et al., Cell 88:24351 (1997, the contents of each of which are incorporated by reference herein in their entirety).

Another sequencing technique that can be used includes, for example, Helicos True Single Molecule Sequencing (tSMS) (Harris T. D. et al. (2008) Science 320: 106-109). In the tSMS technique, a DNA sample is cleaved into strands of approximately 100 to 200 nucleotides, and a polyA sequence is added to the 3' end of each DNA strand. Each strand is labeled by the addition of a fluorescently labeled adenosine nucleotide. The DNA strands are then hybridized to a flow cell, which contains millions of oligo-T capture sites that are immobilized to the flow cell surface. The templates can be at a density of about 100 million templates/cm. The flow cell is then loaded into an instrument, e.g., HeliScope sequencer, and a laser illuminates the surface of the flow cell, revealing the position of each template. A CCD camera can map the position of the templates on the flow cell surface. The template fluorescent label is then cleaved and washed away. The sequencing reaction begins by introducing a DNA polymerase and a fluorescently labeled nucleotide. The oligo-T nucleic acid serves as a primer. The polymerase incorporates the labeled nucleotides to the primer in a template directed manner. The polymerase and unincorporated nucleotides are removed. The templates that have directed incorporation of the fluorescently labeled nucleotide are detected by imaging the flow cell surface. After imaging, a cleavage step removes the fluorescent label, and the process is repeated with other fluorescently labeled nucleotides until the desired read length is achieved. Sequence information is collected with each nucleotide addition step. Further description of tSMS is shown for example in Lapidus et al. (U.S. Pat. No. 7,169,560), Lapidus et al. (U.S. patent application number 2009/0191565), Quake et al. (U.S. Pat. No. 6,818,395), Harris (U.S. Pat. No. 7,282,337), Quake et al. (U.S. patent application number 2002/0164629), and Braslavsky, et al., PNAS (USA), 100: 3960-3964 (2003), each of which is incorporated by reference herein in its entirety.

Another example of a sequencing technology that may be used includes the single molecule, real-time (SMRT) technology of Pacific Biosciences to sequence both DNA and RNA. In SMRT, each of the four DNA bases is attached to one of four different fluorescent dyes. These dyes are phospho-linked. A single DNA polymerase is immobilized with a single molecule of template single stranded DNA at the bottom of a zero-mode waveguide (ZMW). A ZMW is a confinement structure which enables observation of incorporation of a single nucleotide by DNA polymerase against the background of fluorescent nucleotides that rapidly diffuse in an out of the ZMW (in microseconds). It takes several milliseconds to incorporate a nucleotide into a growing strand. During this time, the fluorescent label is excited and produces a fluorescent signal, and the fluorescent tag is cleaved off. Detection of the corresponding fluorescence of the dye indicates which base was incorporated. The process is repeated. In order to sequence RNA, the DNA polymerase is replaced with a reverse transcriptase in the ZMW, and the process is followed accordingly.

Another example of a sequencing technique that can be involves using a chemical-sensitive field effect transistor (chemFET) array to sequence DNA (for example, as described in US Patent Application Publication No. 20090026082). In one example of the technique, DNA molecules can be placed into reaction chambers, and the template molecules can be hybridized to a sequencing primer bound to a polymerase. Incorporation of one or more triphosphates into a new nucleic acid strand at the 3' end of the sequencing primer can be detected by a change in current by a chemFET. An array can have multiple chemFET sensors. In another example, single nucleic acids can be attached to beads, and the nucleic acids can be amplified on the bead, and the individual beads can be transferred to individual reaction chambers on a chemFET array, with each chamber having a chemFET sensor, and the nucleic acids can be sequenced.

Another example of a sequencing technique that can be used involves using an electron microscope (Moudrianakis E. N. and Beer M. Proc Natl Acad Sci USA. 1965 March; 53:564-71). In one example of the technique, individual DNA molecules are labeled using metallic labels that are distinguishable using an electron microscope. These molecules are then stretched on a flat surface and imaged using an electron microscope to measure sequences.

DNA nanoball sequencing is a type of high throughput sequencing technology used to determine the entire genomic sequence of an organism. The method uses rolling circle replication to amplify small fragments of genomic DNA into DNA nanoballs. Unchained sequencing by ligation is then used to determine the nucleotide sequence. This method of DNA sequencing allows large numbers of DNA nanoballs to be sequenced per run. See WO2014122548 and Drmanac et al., Science. 2010 Jan. 1; 327(5961):78-81; Porreca, Nat Biotechnol. 2010 January; 28(1):43-4, each of which is hereby incorporated by reference in its entirety.

Massively Parallel Signature Sequencing (MPSS) was one of the earlier next-generation sequencing technologies. MPSS uses a complex approach of adapter ligation followed by adapter decoding, reading the sequence in increments of four nucleotides.

Polony sequencing combines an in vitro paired-tag library with emulsion PCR, an automated microscope, and ligation-based sequencing chemistry to sequence an *E. coli* genome. The technology was also incorporated into the Applied Biosystems SOLiD platform.

In Solexa sequencing, DNA molecules and primers are first attached on a slide and amplified with polymerase so that local clonal colonies, initially coined "DNA colonies", are formed. To determine the sequence, four types of reversible terminator bases (RT-bases) are added and non-incorporated nucleotides are washed away. Unlike pyrosequencing, the DNA chains are extended one nucleotide at a time and image acquisition can be performed at a delayed moment, allowing for large arrays of DNA colonies to be captured by sequential images taken from a single camera.

SOLiD technology employs sequencing by ligation. Here, a pool of all possible oligonucleotides of a fixed length are labeled according to the sequenced position. Oligonucleotides are annealed and ligated; the preferential ligation by DNA ligase for matching sequences results in a signal informative of the nucleotide at that position. Before sequencing, the DNA is amplified by emulsion PCR. The resulting beads, each containing single copies of the same DNA molecule, are deposited on a glass slide. The result is sequences of quantities and lengths comparable to Solexa sequencing.

In Ion Torrent™ sequencing, DNA is sheared into fragments of approximately 300-800 base pairs, and the fragments are blunt ended. Oligonucleotide adaptors are then ligated to the ends of the fragments. The adaptors serve as primers for amplification and sequencing of the fragments. The fragments can be attached to a surface and is attached at a resolution such that the fragments are individually resolvable. Addition of one or more nucleotides releases a proton (H+), which signal detected and recorded in a sequencing instrument. The signal strength is proportional to the number of nucleotides incorporated. Ion Torrent data may also be output as a FASTQ file. See U.S. publication numbers 2009/0026082, 2009/0127589, 2010/0035252, 2010/0137143, 2010/0188073, 2010/0197507, 2010/0282617, 2010/0300559, 2010/0300895, 2010/0301398, and 2010/0304982, each of which is hereby incorporated by reference in its entirety.

Detection of Cancer-Associated Fusion Proteins

Fusion genes can contribute to tumor formation because fusion genes can produce much more active abnormal protein than non-fusion genes. Often, fusion genes are oncogenes that cause cancer; these include BCR-ABL, TEL-AML1 (ALL with t(12; 21)), AML1-ETO (M2 AML with t(8; 21)), and TMPRSS2-ERG with an interstitial deletion on chromosome 21, often occurring in prostate cancer. In the case of TMPRSS2-ERG, by disrupting androgen receptor (AR) signaling and inhibiting AR expression by oncogenic ETS transcription factor, the fusion product regulate the prostate cancer. Most fusion genes are found from hematological cancers, sarcomas, and prostate cancer. Oncogenic fusion genes may lead to a gene product with a new or different function from the two fusion partners. Alternatively, a proto-oncogene is fused to a strong promoter, and thereby the oncogenic function is set to function by an upregulation caused by the strong promoter of the upstream fusion partner. The latter is common in lymphomas, where oncogenes are juxtaposed to the promoters of the immunoglobulin genes. Oncogenic fusion transcripts may also be caused by trans-splicing or read-through events. Presence of certain chromosomal aberrations and their resulting fusion genes is commonly used within cancer diagnostics in order to set a precise diagnosis. Chromosome banding analysis, fluorescence in situ hybridization (FISH), and reverse transcription polymerase chain reaction (RT-PCR) are common methods employed at diagnostic laboratories for identification of cancer-associated fusion proteins.

Detection of Chemotherapy Resistance Markers

Drug resistance is a cause of the failure of chemotherapy of malignant tumors, resistance being either preexisting (intrinsic resistance) or induced by the drugs (acquired resistance). The detection of resistant markers are based on but not limited to the identification of carcinoma-associated fibroblasts through immunohistochemistry and flow cytometry, aldehyde dehydrogenase 1, cleaved caspase 3, cyclooxygenase 2, phosphorylated Akt, Ki-67, and H2AX proteins using immunohistochemical staining, P-glycoprotein expression, hyaluronan, (the major glycosaminoglycan component of the extracellular matrix), gain in 3q26.2, and losses in 6q11.2-12, 9p22.3, 9p22.2-22.1, 9p22.1-21.3, Xp22.2-22.12, Xp22.11-11.3, and Xp11.23-11.1 as identified through whole genome array comparative genomic hybridization, LRP overexpression as identified through immunostaining, HGF and c-MET which are gene products related to the microRNA MiR-193a-5p using RNA sequencing, CD44 overexpression identified through cell sorting, and trichostatin A, a potent inhibitor of histone deactylases. Chemotherapy resistance markers may often take the form of overexpression of a protein, identification of this overexpression at either/or the DNA, RNA, or protein level using techniques such as but not limited to DNA sequencing, RNA sequencing, and protein sequencing. Some chemotherapy resistance markers take the form of epigenetic changes, and the identification of these alterations through DNA pyrosequencing can be of particular use to identification of chemotherapy resistance markers. Additionally, mutations to genes may directly affect the expression of the gene product, potentially leading to the formation of cancerous cells, and the identification of gene mutations through DNA sequencing is of high utility. At present, resistance is usually diagnosed during treatment after a long period of drug administration. Methods for a rapid assessment of drug resistance exist currently. Three classes of test procedures are generally used: fresh tumor cell culture tests, cancer biomarker tests and positron emission tomography (PET) tests. Drug resistance can be diagnosed before treatment in-vitro with fresh tumor cell culture tests, and after a short time of treatment in-vivo with PET tests. See Lippert, T. et al. (2011). "Current status of methods to assess cancer drug resistance". Int. J. Med. Sci. 8 (3): 245-253.

Use of Representative Samples for the Production of Tumor Specific Antigens or Tumor Specific Antibodies and Antitumor Vaccines As mentioned supra, another application of the subject samples is for the isolation of tumor cells and antigens derived therefrom which may be used in the production of tumor specific antibodies or in the manufacture of cancer or tumor vaccines.

One approach to cancer vaccination is to separate proteins from cancer cells and immunize cancer patients against those proteins, in the hope of stimulating an immune reaction that could kill the cancer cells. Therapeutic cancer vaccines are being developed for the treatment of breast, lung, colon, skin, kidney, prostate, and other cancers. In fact, one such vaccine developed by Dendreon Corporation for treating prostate cancer received U.S. Food and Drug Administration (FDA) approval for use in the treatment of advanced prostate cancer patients on Apr. 29, 2010. The approval of this vaccine Provenge® has stimulated renewed interest in this type of therapy.

For example, tumor cells or proteolytically-cleaved cell surface antigens derived from tumor cells identified may be used in developing effective therapeutic or prophylactic tumor vaccines. These antigens may be naked or multimerized or conjugated to other moieties, e.g., other proteins, adjuvants or loaded onto cells, e.g., dendritic cells. It has been shown that the proteolytic treatment of live cancer cells can release antigenic targets that are sufficient to induce an anti-cancer immune response that exceeds that of untreated cancer cells in vitro. (Lokhov et al., J Cancer 20101:230-241).

In particular tumor vaccines containing one or a cocktail of different antigens derived from tumor cells isolated from a particular patient sample are contemplated, essentially the production of a "personalized cancer vaccine" so that a patient may be treated with immune stimulating moieties specific to their particular tumor type. In general these vaccines will comprise an effective amount of such antigens to generate an effective immune response, e.g., an antigen specific CTL response against tumor cells expressing the particular antigens. As mentioned, in some instances these antigens may be loaded onto other moieties, e.g., dendritic cells. Generally such vaccines will also comprise other immune adjuvants, e.g., cytokines, TLR agonists, TNF/R agonists or antagonists, agents that modulate checkpoint inhibitors and the like.

Also, in some embodiments the present disclosure further contemplates the use of such antigens for the production of antisera and monoclonal antibodies. These antibodies may be used for diagnostic purposes, i.e., for the detection of tumor cells or antigens in samples. Alternatively such antibodies, particularly human or humanized antibodies specific to such tumor antigens may be used therapeutically in the treatment of cancers that express these antigens. Methods of making antibodies for potential use in therapy are well known in the art.

EXAMPLES

Example 1: Devices for Epitachophoresis

Devices for epitachophoresis generally use a concentric or polygonal disk architecture, for example, as depicted in FIG. 1-FIG. 4. Glass or ceramics are used for fabrication of the system (i.e. material for concentric or polygonal disks) as these materials result in improved heat transfer properties that are beneficial during device operation. For example, as the flat channel of an epitachophoresis device has a favorable heat transfer capability compared to a narrow channel, over-heating (or boiling) of the focused material is generally prevented. Current/voltage programming is also suitable for adjusting the Joule heating of the device. Plastic materials are also used for device fabrication, such as, for example, polypropylene, polytetrafluoroethylene (commercially available as TEFLON®), Poly(methyl methacrylate) ("PMMA"), and/or Polydimethylsiloxane ("PDMS"), and the like. In general, devices are fabricated of such dimensions that accommodate a desired sample volume, such as milliliter-scale sample volumes, for example, up to 15 mL.

Figure 2B:
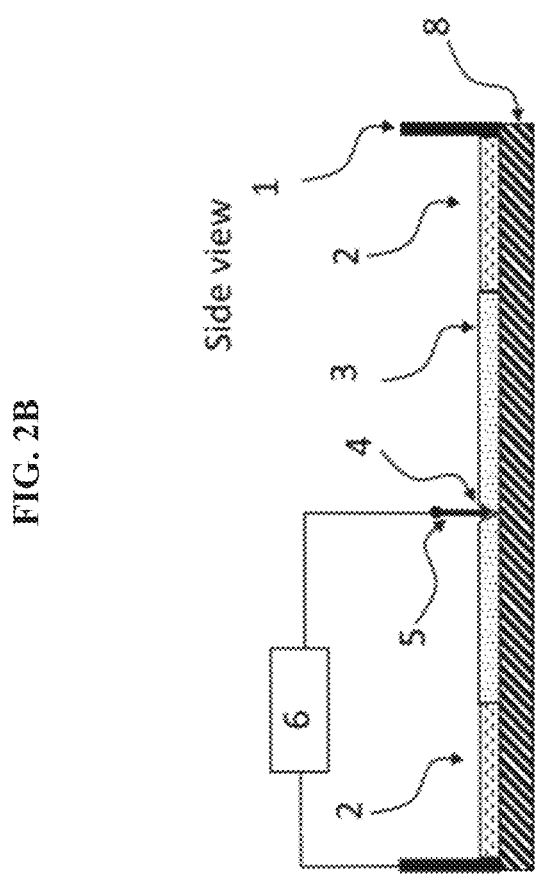
FIG. 2B provides a schematic representation of a side view of an exemplary device for effecting epitachophoresis.
Figure 3:
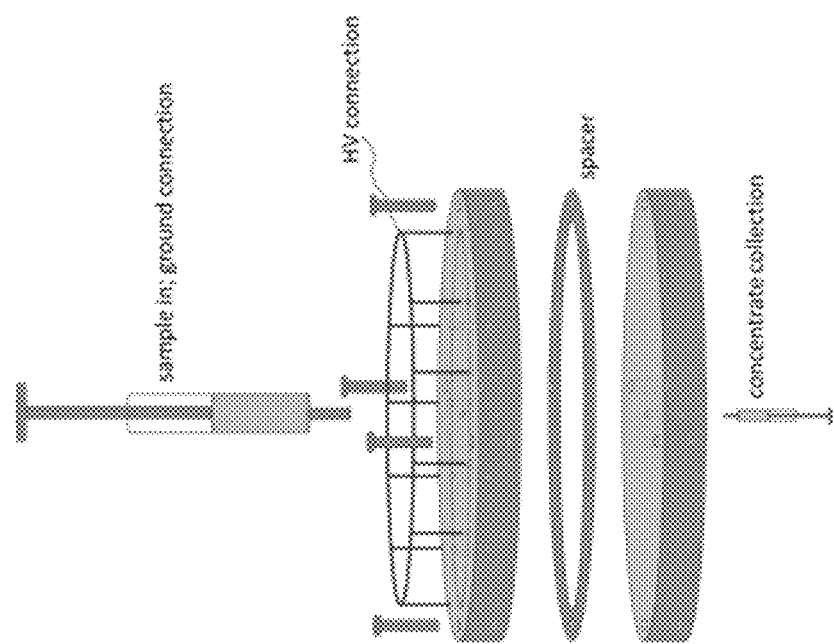
FIG. 3 provides a schematic representation of an exemplary device for effecting epitachophoresis.
Figure 4:
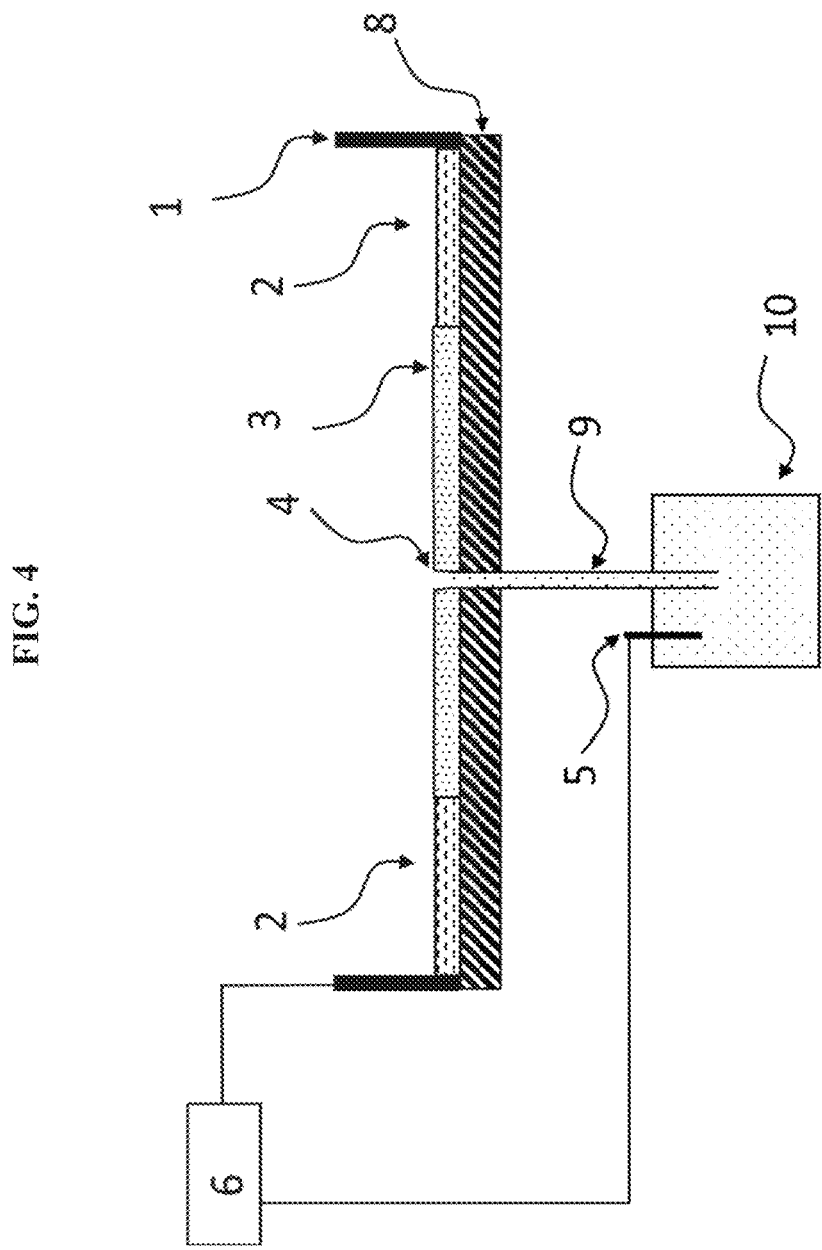
FIG. 4 provides a schematic representation of an exemplary device for effecting epitachophoresis.

Referring to FIG. 1-FIG. 3, two concentric disks are separated by a spacer, thereby forming a flat channel for epitachophoresis sample processing. Electric current is applied through multiple high voltage connections (HV connection) and the ground connection in the center of the system (see FIG. 1 and FIG. 3, for example). In some instances, the sample is injected into the device through an opening in the device, e.g., the top or the side (see, for example, FIG. 3). Application of electricity focuses the target analyte of a sample as a concentric ring that migrates to the center of the disk (discussed further below), and the target analyte is then collected through a syringe at the bottom of the device (see, for example, FIG. 3). As presented in FIG. 2A (top view) and FIG. 2B, a preferred device setup consists of an outer circular electrode (1), terminating electrolyte (2), and leading electrolyte (3). In general, the diameter of the outer circular electrode (1) is about 10-200 mm and the diameter of the leading electrolyte ranges from a thickness (height) of about 10 μm to about 20 mm. The leading electrolyte is stabilized by a gel, viscous additive, or otherwise hydrodynamically separated from the terminating electrolyte, such as, for example, by a membrane. The gel or hydrodynamic separation prevents mixing of the leading and terminating electrolytes during device operation. Also, in some devices mixing is prevented by using very thin (<100 um) layers of electrolytes, as is discussed further below in Example 2.

Referring to FIG. 2A-FIG. 2B, in the center of the leading electrolyte is an electrode reservoir (4) with electrode (5). The assembly of the electrodes (1, 5) and electrolytes (2, 3) is placed on a flat, electrically insulating support (8). The electrolyte reservoir (4) is used for removal of the concentrated sample solution following a separation process, such as by pipetting the sample out of the reservoir, for example.

In an alternative arrangement (see FIG. 4) the center electrode (5) is moved to a leading electrolyte reservoir (10) connected with the concentrator by a tube (9). The tube (9) is connected directly or closed on one end by a semipermeable membrane (not shown). This arrangement facilitates the collection by stopping migration of large molecules according the properties of the membrane used. This arrangement simplifies the sample collection and provides means of connecting the concentrator on-line to other devices, such as, for example, capillary analyzers, chromatography, PCR devices, enzymatic reactors, and the like. The tube (9) can also be used to supply a countercurrent flow of the leading electrolyte in an arrangement without a gel containing leading electrolyte.

In general, the gel for the leading electrolyte stabilization is formed by any uncharged material such as, for example agarose, polyacrylamide, pullulans, and the like. In some devices, the top surface is left open, or in some devices the top surface is closed, depending on the nature of the separation to be performed. If closed, the material used to cover the device is preferably a heat conducting, insulating material so as to prevent evaporation during the operation of an epitachophoresis device.

In general, the ring (circular) electrode is preferentially a gold-plated or platinum-plated stainless-steel ring as this allows for maximum chemical resistance and electric field uniformity. Alternatively, stainless steel and graphite electrodes may be used in some devices, particularly for disposable devices. Also, the ring (circular) electrode can be substituted with other moieties which provide similar function, e.g., an array of wire electrodes. Moreover, a 2-dimensional array of regularly spaced electrodes may additionally or alternatively be used in epitachophoresis devices. An array of regularly spaced electrodes in a circular orientation may also be used in epitachophoresis devices. Furthermore, other electrode configurations may be also used to effect different electric field shapes based on the desired sample separation (e.g., for directing the focused zones). Such configurations are described as polygon arrangements of electrodes. When divided into electrically separated segments, a switched electric field is created for time dependent shape of the driving electric field. Such an arrangement facilitates sample collection in some devices.

Example 2: Epitachophoresis Device Operation

Figure 5:
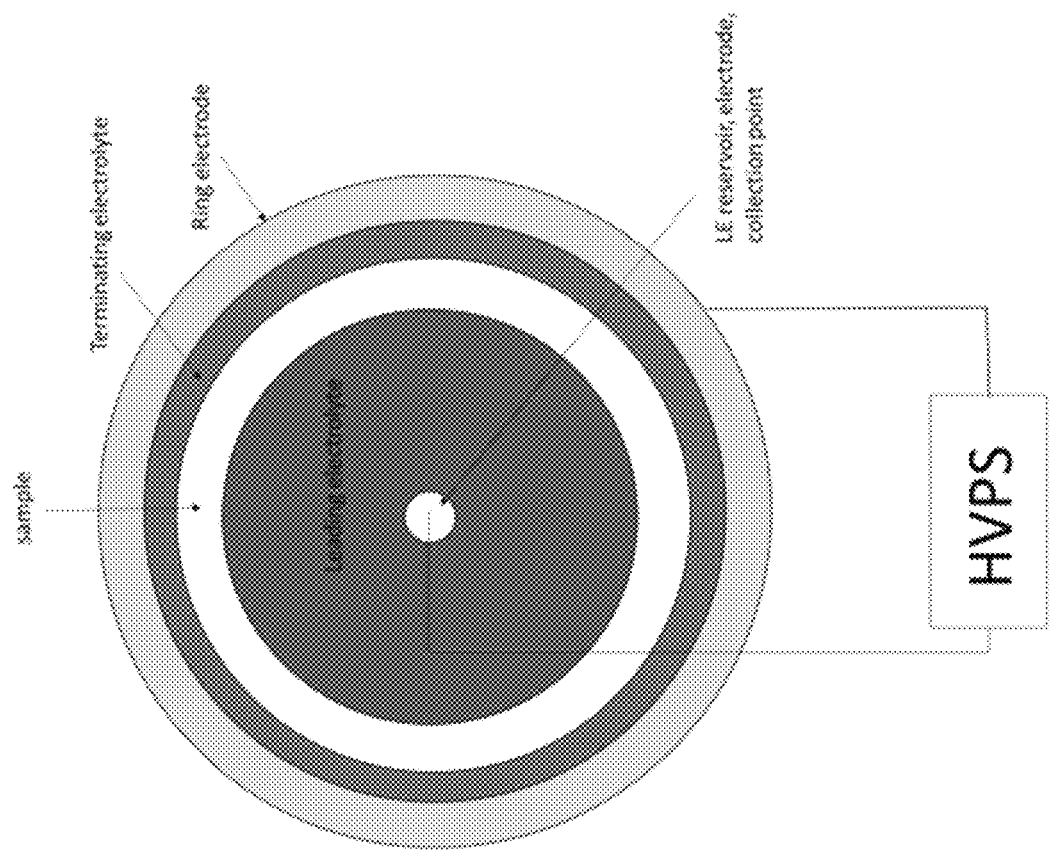
FIG. 5 provides a schematic representation of an exemplary device for effecting epitachophoresis wherein the sample is loaded in between loading the leading and terminating electrolytes.

Epitachophoresis devices, such as those of the designs presented in FIG. 1-FIG. 4, are operated in either a two electrolyte reservoir arrangement, with the leading electrolyte followed by sample mixed with terminating electrolyte or with the sample mixed with the leading electrolyte followed by the terminating electrolyte, or in a three electrolyte reservoirs arrangement, as is presented in FIG. 5. In such an arrangement, the sample may be mixed with any conducting solution. Alternatively, when the sample contains suitable terminating ions the terminating electrolyte zone can be eliminated. Referring to FIG. 2A-FIG. 2B, upon filling the terminating electrolyte reservoir (2) with a mixture of sample and suitable terminating electrolyte and turning on the electric power supply (6), the ions start moving towards the center electrode (5) and form zones at the boundary between leading and terminating electrolytes (7). The concentrations of the sample zones during the migration adjust according to general isotachophoretic principles [Foret, F., Krivankova, L., Bocek, P., *Capillary Zone Electrophoresis. Electrophoresis Library*, (Editor Radola, B. J.) VCH, Verlagsgessellschaft, Weinheim, 1993.]. Thus, the low concentrated sample ions are concentrated and highly concentrated ones are diluted. Once the sample zone enters the electrolyte reservoir (4) the separation process is stopped, and the focused material is collected in the center of the device. In practice, final concentrations of migrating zones have a concentration comparable to that of the leading ion. Typically, concentration factors of anywhere from 2 to 1000 or even more are achieved using epitachophoresis.

In a three-electrolyte reservoir arrangement, the sample is applied in between the leading and terminating electrolytes (see, for example, FIG. 5), and such an arrangement results in slightly faster sample concentration and separation as compared to a two electrolyte reservoir arrangement.

To avoid mixing, the leading electrolyte and the trailing electrolyte are stabilized by a neutral (uncharged) viscous media, e.g., agarose gel (see, for example, FIG. 2A-FIG. 2B, 3, which represents the leading electrolyte optionally contained within a gel or hydrodynamically separated from the terminating electrolyte).

All common electrolytes known to those skilled in the art that are used for isotachophoresis can be used with the present epitachophoresis devices when the leading ions have a higher effective electrophoretic mobility than that of the sample ion(s) of interest. The opposite is true for the selected terminating ions.

The device is operated either in positive mode (separation/concentration of cationic species) or in negative mode (separation/concentration of anionic species). The most common leading electrolytes for anionic separation using epitachophoresis include, for example, chloride, sulfate, or formate, buffered to desired pH with a suitable base, e.g., histidine, TRIS, creatinine, and the like. Concentrations of the leading electrolyte for epitachophoresis for anionic separation range from 5 mM-1 M with respect to the leading ion. Terminating ions then often include MES, MOPS, HEPES, acetate, glutamate and other anions of weak acids and low mobility anions. Concentrations of the terminating electrolyte for epitachophoresis in positive mode range from: 5 mM-10 M with respect to the terminating ion.

For cationic separation common leading ions for epitachophoresis include, for example: potassium, ammonium or sodium with acetate or formate being the most common buffering counterions. Reaction hydroxonium ion moving boundary then serves as a universal terminating electrolyte formed by any weak acid.

In both positive and negative modes, the increase of the concentration of the leading ion results in proportional increase of the sample zone at the expense of increased electric current (power) for a given applied voltage. Typical concentrations are in the 10-20 mM range; however, higher concentrations are also possible.

Furthermore, in cases where only zone electrophoretic separation is sufficient, the device can be operated with only one background electrolyte.

Current and/or voltage programming is suitable for adjusting the migration velocity of the sample. It should be noted that in this concentric arrangement, the cross-section area changes during the migration and the velocity of the zone movement is not constant in time. Thus, this arrangement does not strictly follow the isotachophoretic principle where the zones migrate with constant velocities. According to the mode of operation of the electric power supply (6) three basic cases may be distinguished: 1. Separation at Constant Current; 2. Separation at Constant Voltage; and 3. Separation at Constant Power.

Variables for the equations described below are as follows: d=distance migrated (d<0; r>); E=electric field strength; H=Electrolyte (gel) height; I=electric current; J=electric current density; κ=electrolyte conductivity;

r=radius; S=cross-section area; u=electrophoretic mobility; v=velocity; and X=length from the center electrode to epitachophoresis boundary.

In the common mode of operation that uses constant electric current supplied by a high voltage power supply (HVPS), the migrating zone is accelerated as it moves closer to the center due to increasing current density. In an exemplary separation at constant current and using a device comprising a circular architecture, e.g., a device comprising one or more circular electrodes, the relative velocity at a distance, d, depends only on the mobility (conductivity) of the leading electrolyte, as is demonstrated by the derivation of the epitachophoresis boundary velocity at v at the distance d from the start radius r as follows:

General Equations:

$$U = IR \text{ or } E = J/\kappa \text{ (Ohm's Law)}$$

$$E = U/X \text{ (electric field stength)}$$

$$J = E\kappa \Rightarrow I = \frac{SU\kappa}{X}; R = X/\kappa S$$

$$v = uE$$

$$S = 2\pi XH$$

Epitachophoresis Boundary Velocity v at the distance d from the start with radius r:

$$v_{(d)} = u_L I/2\pi(r-d)h\kappa_L = \text{Constant}/(r-d)$$

Figure 6A:
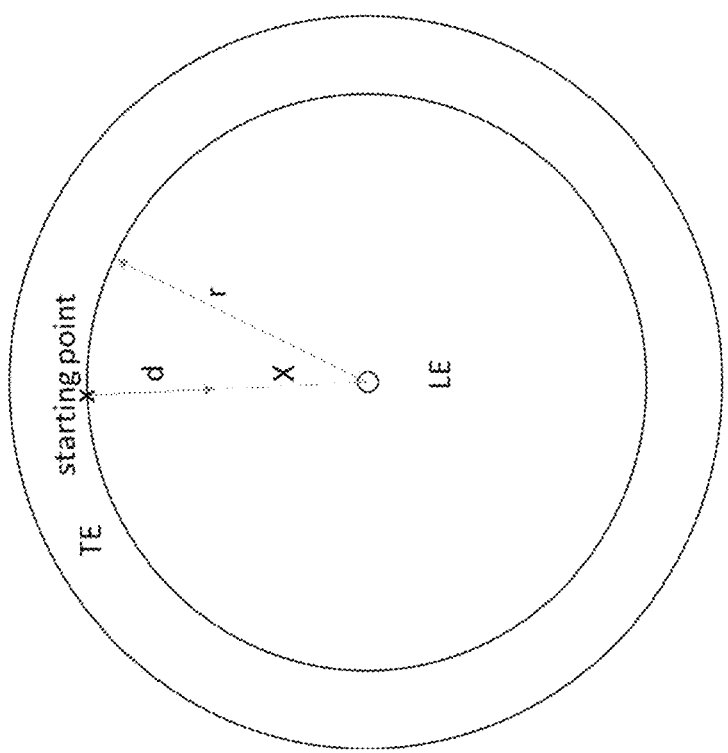
FIG. 6A provides a schematic representation of a device for effecting epitachophoresis and is referred to for the equations described in Example 2.
Figure 6B:
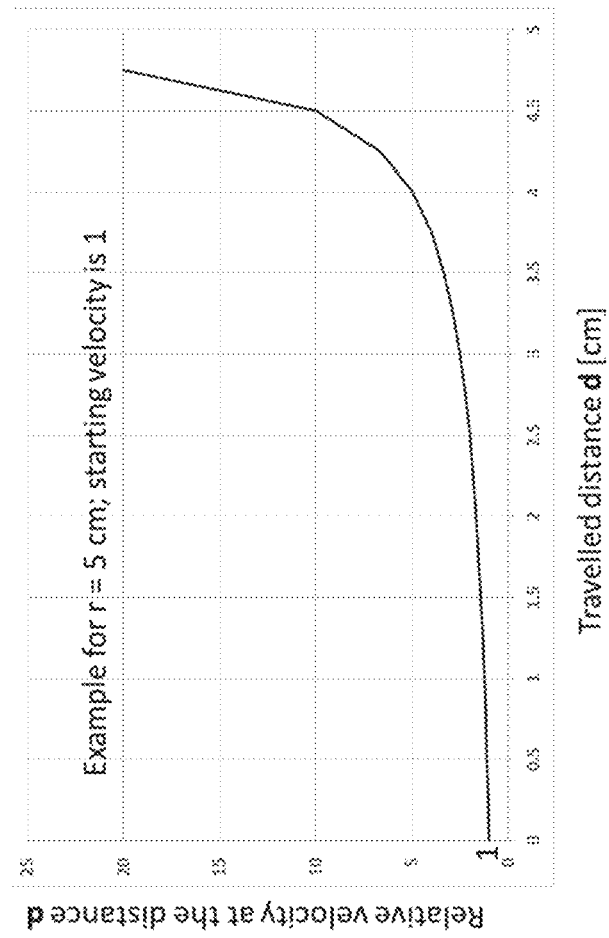
FIG. 6B provides a graph representing the travelled distance d in cm vs. the relative velocity at the distance d when an exemplary device for epitachophoresis (FIG. 6A) is operated using constant current. For the data presented in FIG. 6B, a radius value of 5 and starting velocity value of 1 were used.

For a plot of the relationship of the distance traveled (d) vs. the relative velocity at the distance d at constant current, see FIG. 6B.

With regard to separation at constant voltage and using a device comprising a circular architecture, e.g., a device comprising one or more circular electrodes, the relative velocity at a distance, d, depends on the mobilities (conductivities) of both the LE and TE, as is demonstrated by the derivation of the epitachophoresis boundary velocity at v at the distance d from the start radius r as follows:

General Equations:

$$U = IR \text{ or } E = J/\kappa \text{ (Ohm's Law)}$$

$$E = U/X \text{ (electric field stength)}$$

$$J = E\kappa \Rightarrow I = \frac{SU\kappa}{X}; R = X/\kappa S$$

Calculation of the Boundary Velocity:

$$U_L = U - U_T = U - IR_T$$

$$U_L = U - Id/S\kappa_T$$

$$U_L = U - U_L\kappa_L d/(r-d)\kappa_T$$

$$U_L = U(r-d)\kappa_T/[(r-d)\kappa_T + \kappa_L d]$$

$$E_L = U_L/(r-d)$$

$$E_L = U\kappa_T/[(r-d)\kappa_T + \kappa_L d]$$

$$v_L = u_L E_L$$

$$v_L = u_L U\kappa_T/[(r-d)\kappa_T + \kappa_L d]$$

Figure 6C:
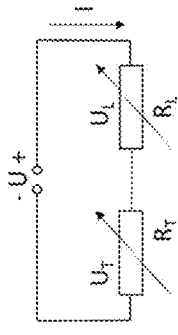
FIG. 6C provides a graph representing the travelled distance d in cm vs. the relative velocity at the distance d when an exemplary device for epitachophoresis (FIG. 6A) is operated using constant voltage. For the data presented in FIG. 6C, a radius value of 5 and starting velocity value of 1 were used.
Figure 6C:
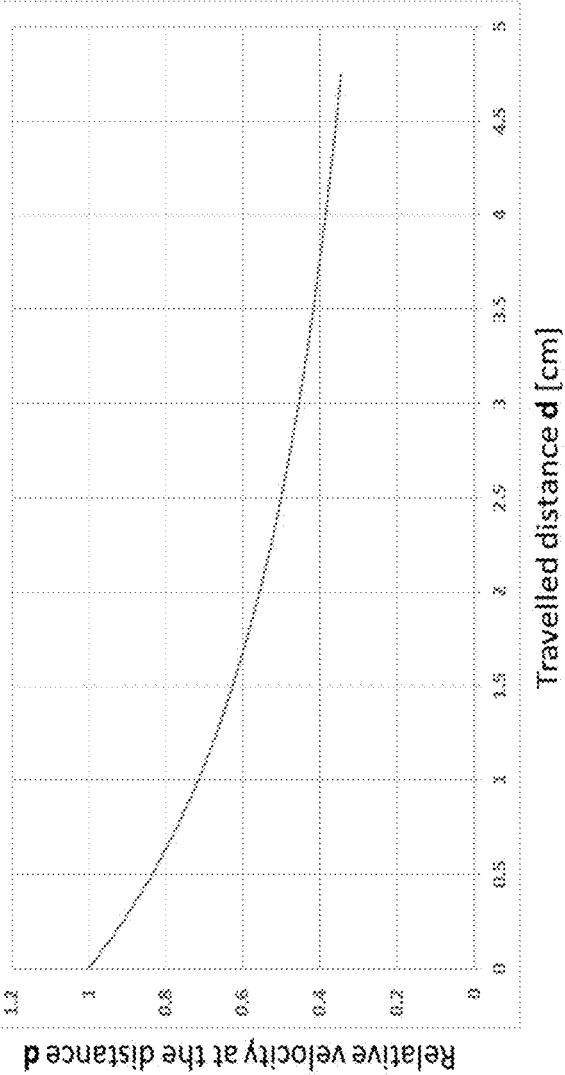

For a plot of the relationship of the distance traveled (d) vs. the relative velocity at the distance d at constant voltage, see FIG. 6C.

With regard to separation at constant power and a device comprising a circular architecture e.g., a device comprising one or more circular electrodes, the relative velocity at a distance, d, depends on the mobilities (conductivities) of both the LE and TE, as is demonstrated by the derivation of the epitachophoresis boundary velocity at v at the distance d from the start radius r as follows:

General Equations:

$$P = UI = I^2 R \text{ (electric power)}$$

$$U = IR \text{ or } E = J/\kappa \text{ (Ohm's Law)}$$

$$E = U/X \text{ (electric field strength)}$$

$$J = E\kappa \Rightarrow I = SU\kappa/X; R = X/\kappa S$$

Calculation of the Boundary Velocity:

$$P = P_L + P_T$$

$$P = I^2(R_L + R_T)$$

$$P = I^2\left(\frac{r-d}{\kappa_L S} + \frac{d}{\kappa_T S}\right)$$

$$I = \sqrt{P/\left[\frac{r-d}{\kappa_L S} + \frac{d}{\kappa_T S}\right]}$$

$$U_L = IR_L = I(r-d)/\kappa_L S$$

$$E_L = \frac{U_L}{r-d} = I/\kappa_L S$$

$$E_L = \sqrt{P/\left[(r-d)\kappa_L S + \frac{d\kappa_L^2 S}{\kappa_T}\right]}$$

$\kappa$ Is a Small Number, Thus:

$$E_L \approx \sqrt{P/(r-d)\kappa_L S}$$

Figure 6D:
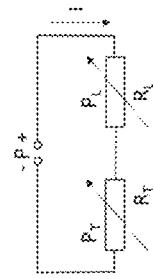
FIG. 6D provides a graph representing the travelled distance d in cm vs. the relative velocity at the distance d when an exemplary device for epitachophoresis (FIG. 6A) is operated using constant power. For the data presented in FIG. 6D, a radius value of 5 and starting velocity value of 1 were used.
Figure 6D:
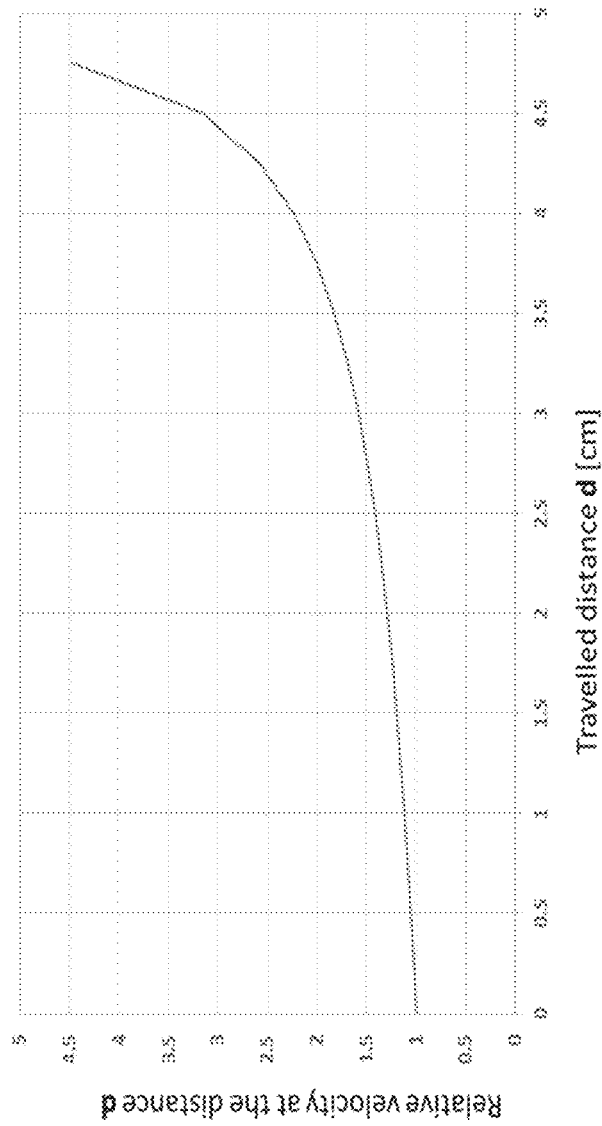

For a plot of the relationship of the distance traveled (d) vs. the relative velocity at the distance d at constant power, see FIG. 6D.

Example 3: ETP Using an Exemplary Device

Figure 7:
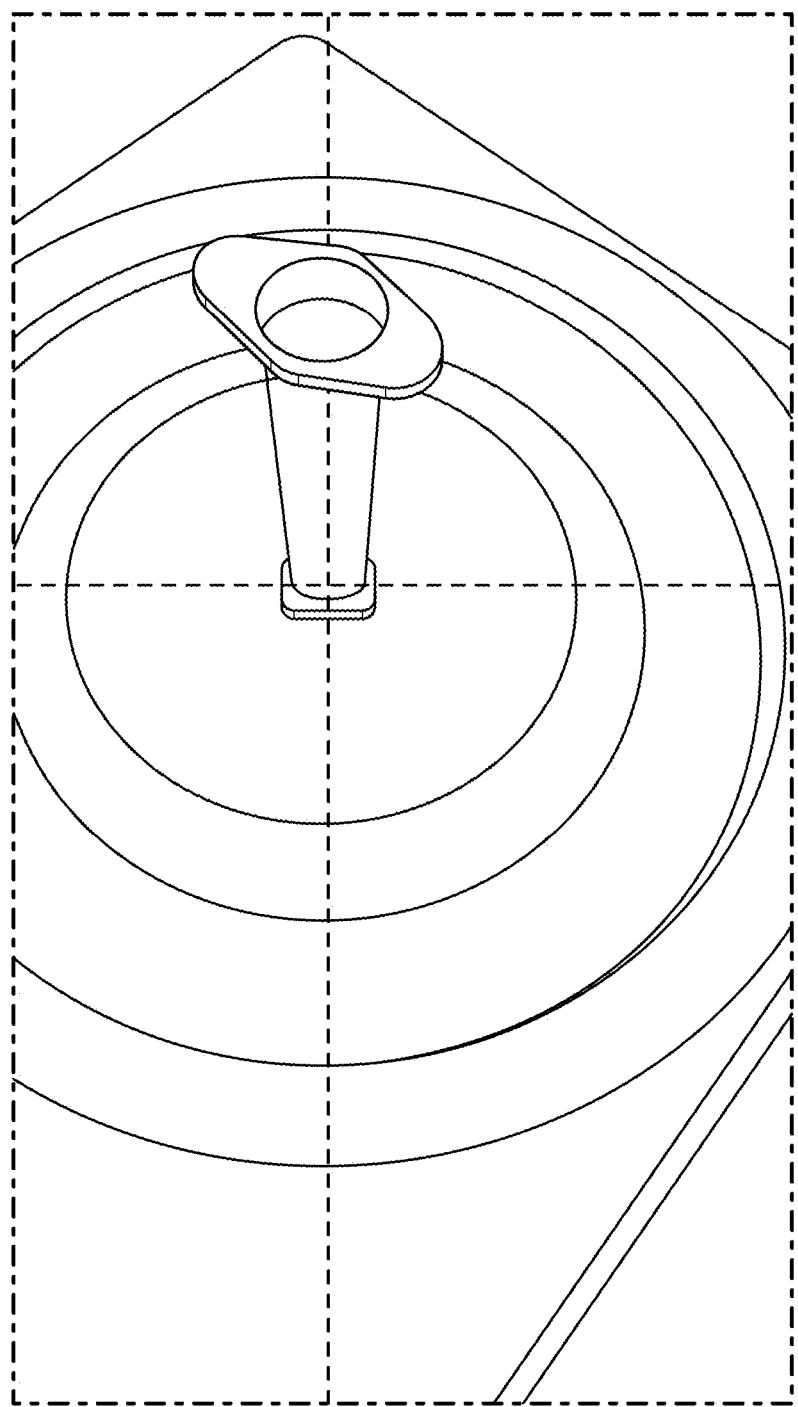
FIG. 7 provides an image of an epitachophoresis device that was used to concentrate a sample in accordance with Example 3.

An epitachophoresis device, as presented in FIG. 7, was used to perform an epitachophoresis separation that focused sulfanilic acid (SPADNS) into a concentric ring. 1 W constant power was applied to effect epitachophoresis in the epitachophoresis device.

Referring to FIG. 7, SPADNS was focused into a concentric ring-shaped focused zone, which can be seen as the red zone of FIG. 7. The upper half of the red circle showed that the height of the zone was approximately 5 mm. As the epitachophoresis zone moved from the edge towards the center of the device, eventually the focused zone of the SPADNS entered the center of the device and was collected in the center of the device, thereby demonstrating focusing and recovery of a desired sample using epitachophoresis.

Example 4: ETP Using an Exemplary Device

An epitachophoresis device (FIG. 8A) was used to perform epitachophoresis to focus sulfanilic acid (SPADNS). The device of FIG. 8A had a circular architecture and a circular gold electrode with a diameter of 10.2 cm·10 mM HCl-histidine (pH 6.25) was used as the leading electrolyte and was contained in 10 mL of an 0.3% agarose gel which had a diameter of 5.8 cm. 15 mL of 10 mM MES Tris (pH 8.00) was used as the trailing electrolyte. The syringe reservoir of the device contained the leading electrolyte HCl His (pH 6.25) at a concentration of 100 mM. 300 µL of SPADNS at a concentration of 0.137 mM was prepared in trailing electrolyte and loaded into the space between the gel and the circular electrode of the device. To effect epitachophoresis, a constant power of 1 W was used.

Figure 8C:
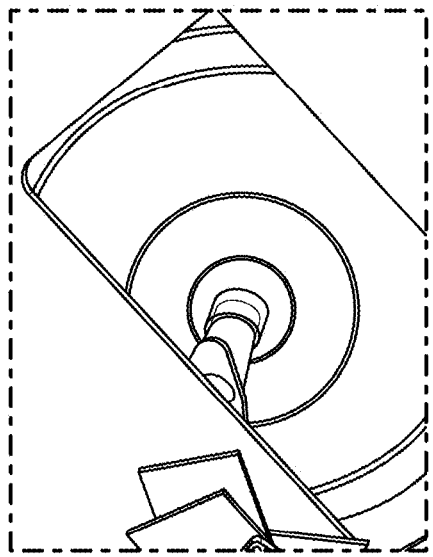
FIG. 8C provides an image of an exemplary device for epitachophoresis that was used to focus a sample into a focused zone in accordance with Example 4.
Figure 8B:
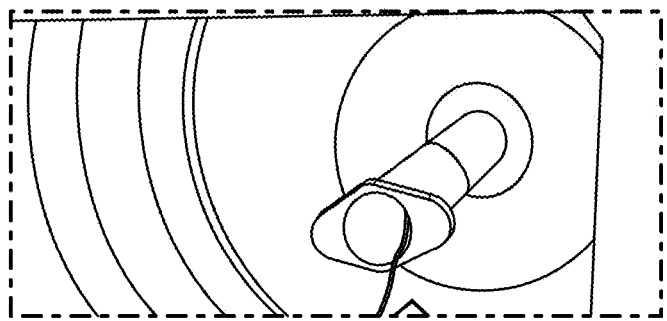
FIG. 8B provides an image of an exemplary device for epitachophoresis that was used to focus a sample into a focused zone in accordance with Example 4.

Referring to FIG. 8B, SPADNS was focused into a concentric ring-shaped focused zone, which can be seen as the red zone of FIG. 8B. As the epitachophoresis zone moved from the edge towards the center of the device, eventually the focused zone of the SPADNS entered the center of the device and was collected in the center of the device, thereby demonstrating focusing and recovery of a desired sample using epitachophoresis.

Figure 8A:
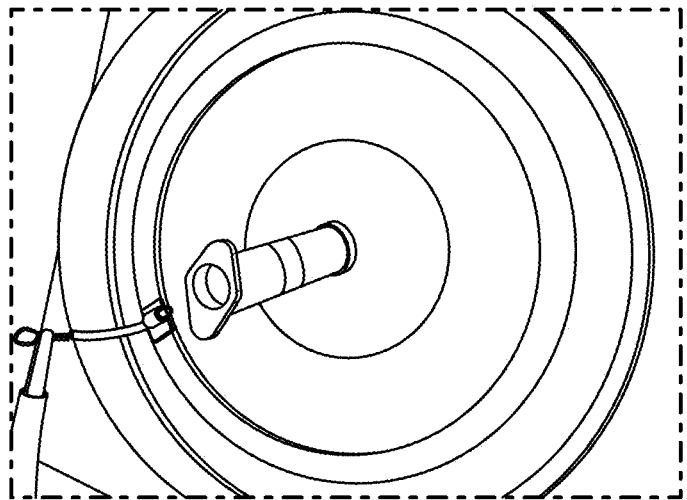
FIG. 8A provides an image of an exemplary device for epitachophoresis that was used in accordance with Example 4.

Furthermore, the epitachophoresis device of FIG. 8A was used to perform epitachophoresis to focus a 30 nt oligomer (ROX-oligo). The device of FIG. 8A had a circular architecture and a circular gold electrode with a diameter of 10.2 cm·10 mM HCl-histidine (pH 6.25) was used as the leading electrolyte was contained in 10 mL of an 0.3% agarose gel which had a diameter of 5.8 cm. 15 mL of 10 mM MES Tris (pH 8.00) was used as the trailing electrolyte. The syringe reservoir of the device contained the leading electrolyte HCl His (pH 6.25) at a concentration of 100 mM. 75 µL of ROX-oligo at a concentration of 100 µM was prepared in trailing electrolyte and loaded into the device. To effect epitachophoresis, a constant power of 1 W was used.

Referring to FIG. 8C, ROX-oligo was focused into a concentric ring-shaped focused zone, which can be seen as the blue zone of FIG. 8C. As the epitachophoresis zone moved from the edge towards the center of the device, eventually the focused zone of the ROX-oligo entered the center of the device and was collected in the center of the device, thereby demonstrating focusing and recovery of a desired sample using epitachophoresis.

Example 5: ETP Using an Exemplary Device

Figure 9A:
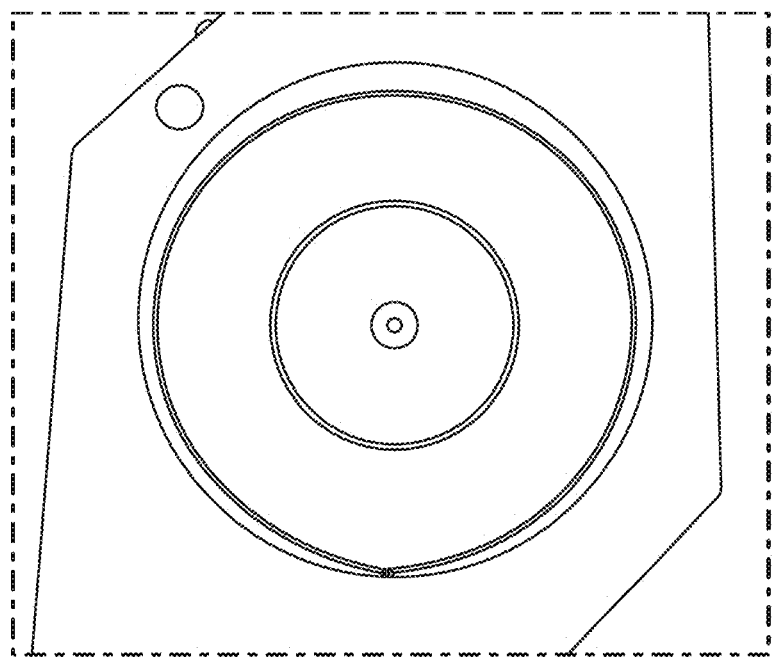
FIG. 9A provides an image of an exemplary device for epitachophoresis that was used in accordance with Example 5.
Figure 9C:
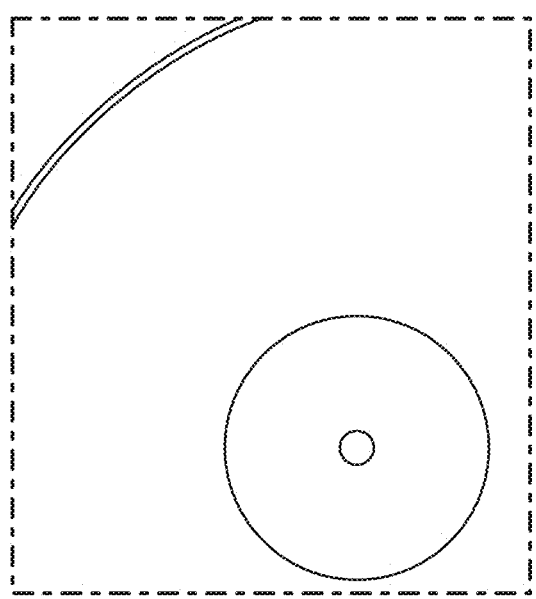
FIG. 9C provides an image of an exemplary device for epitachophoresis that was used to focus a sample into a focused zone in accordance with Example 5.
Figure 9B:
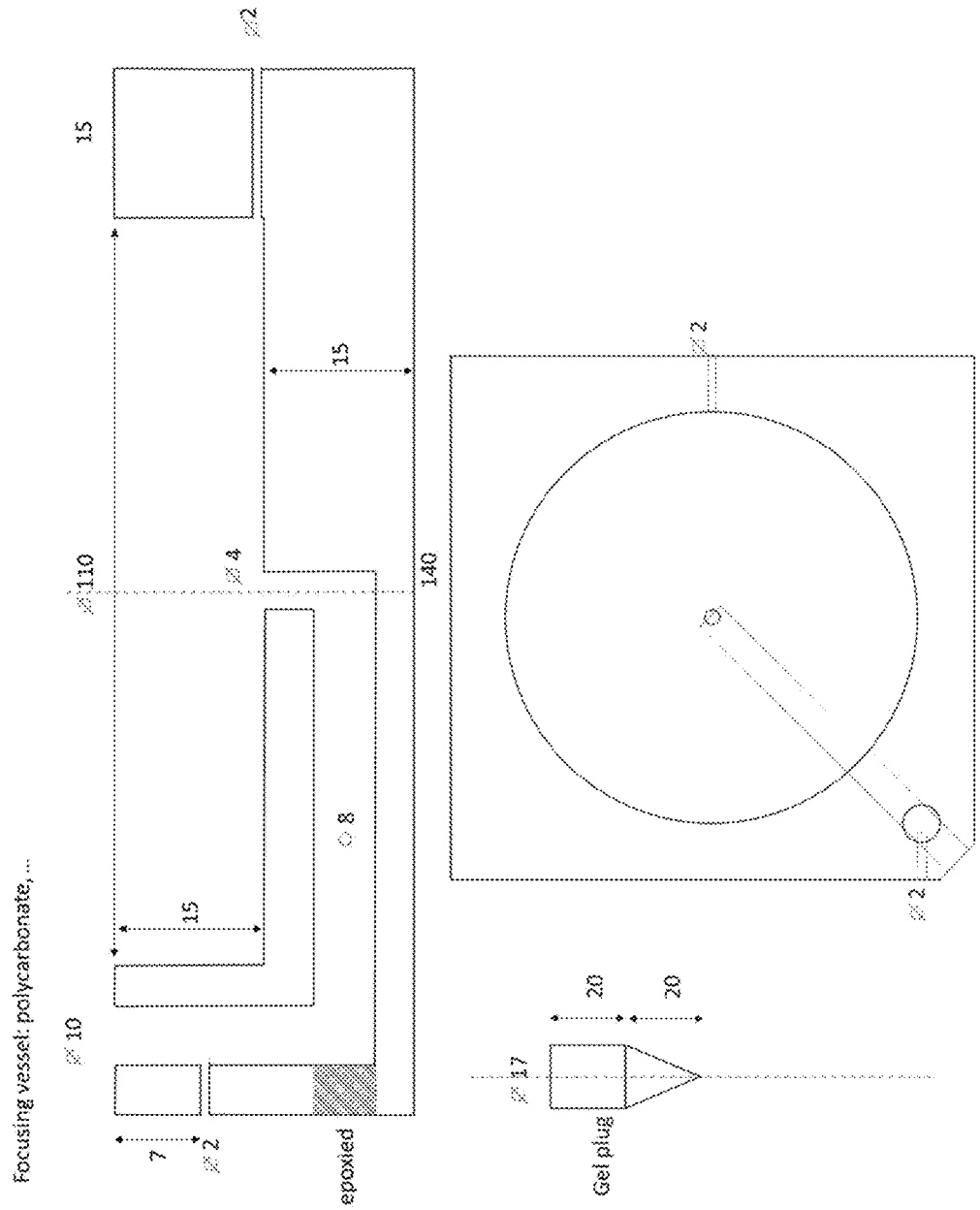
FIG. 9B provides a schematic representation of an exemplary device for epitachophoresis that was used in accordance with Example 5.
Figure 9D:
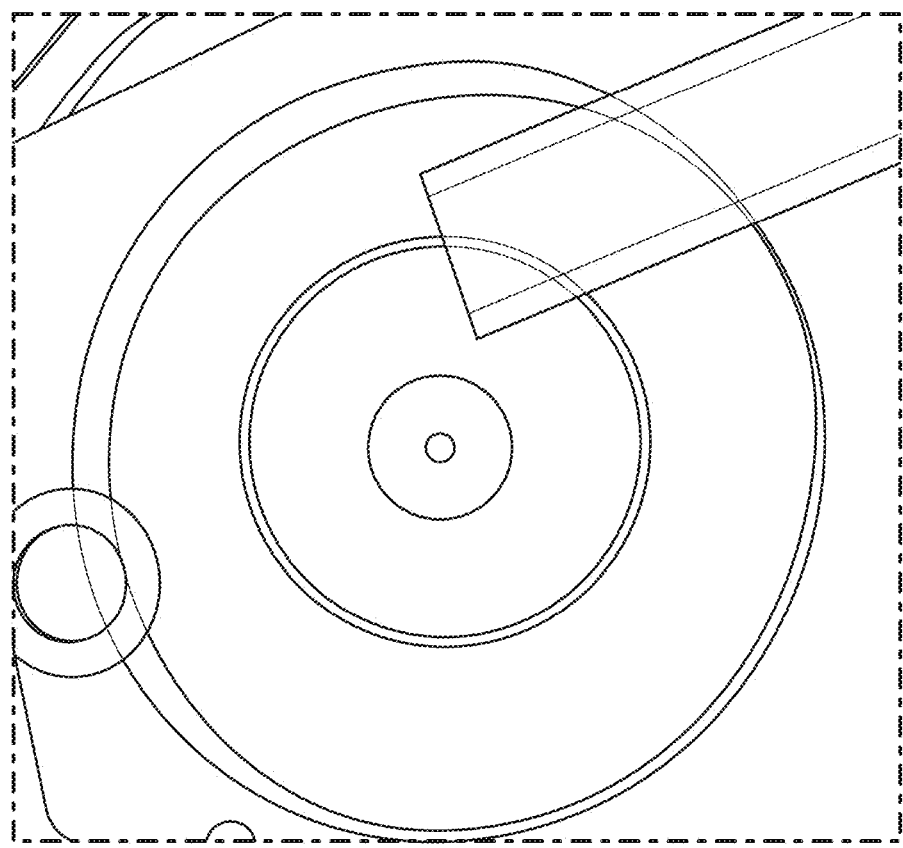
FIG. 9D provides an image of an exemplary device for epitachophoresis that was used to focus a sample into a focused zone in accordance with Example 5.

An epitachophoresis device (FIG. 9A-FIG. 9B) was used to perform epitachophoresis to focus sulfanilic acid (SPADNS), which was subsequently collected from said device (FIG. 9C-FIG. 9D). The device of FIG. 9A-FIG. 9B had a circular architecture and a circular stainless-steel wire electrode with a diameter of 11.0 cm. Referring to FIG. 9B, the numbers of the schematic represent dimensions in millimeters. 20 mM HCl-histidine (pH 6.20) was used as the leading electrolyte. Either 5 mL of 10 mM MES Tris (pH 8.00) was used as trailing electrolyte with an 0.3% agarose gel in LE, wherein the gel had a diameter of 8.9 cm (FIG. 9C) and was formed prior to introduction of TE, or 15 mL of 10 mM MES Tris (pH 8.00) was used as trailing electrolyte with an 0.3% gel in LE, wherein the gel had a diameter of 5.8 cm (FIG. 9D) and was formed prior to introduction of TE. The electrode reservoir of the device contained leading electrolyte HCl His (pH 6.25) at a concentration of 100 mM.

Referring to FIG. 9C, 150 µL of SPADNS at a concentration of 0.137 mM was prepared in 15 mL of trailing electrolyte and loaded into the device. To effect epitachophoresis, a constant power of 2 W was used. SPADNS was focused into a concentric ring-shaped focused zone, which can be seen as the red zone of FIG. 9C. As the epitachophoresis zone moved from the edge towards the center of the device, eventually the focused zone of the SPADNS entered the center of the device and was collected in the center of the device, thereby demonstrating focusing and recovery of a desired sample using epitachophoresis. The recovered SPADNS had a 40-fold absorbance increase as compared to the absorbance of the initial 15 mL SPADNS-containing sample.

Referring to FIG. 9D, 150 µL of SPADNS at a concentration of 0.137 mM was prepared in 15 mL of trailing electrolyte and loaded into the device. To effect epitachophoresis, a constant power of 2 W was used. SPADNS was focused into a concentric ring-shaped focused zone, which can be seen as the red zone of FIG. 9D. As the epitachophoresis zone moved from the edge towards the center of the device, eventually the focused zone of the SPADNS entered the center of the device and was collected in the center of the device, thereby demonstrating focusing and recovery of a desired sample using epitachophoresis. The recovered SPADNS had a 40-fold absorbance increase as compared to the absorbance of the initial 15 mL SPADNS-containing sample.

The epitachophoresis device of FIG. 9A-FIG. 9B was also used to perform epitachophoresis to focus SPADNS from a physiological saline solution in a device that did not use a gel. 20 mM HCl-histidine (pH 6.20) was used as the leading electrolyte. 13 mL of 10 mM MES Tris (pH 8.00) was used as trailing electrolyte, which was further mixed with 3 mL of 0.9% NaCl. The electrode reservoir of the device contained leading electrolyte HCl Histidine (pH 6.25) at a concentration of 100 mM.

Figure 10:
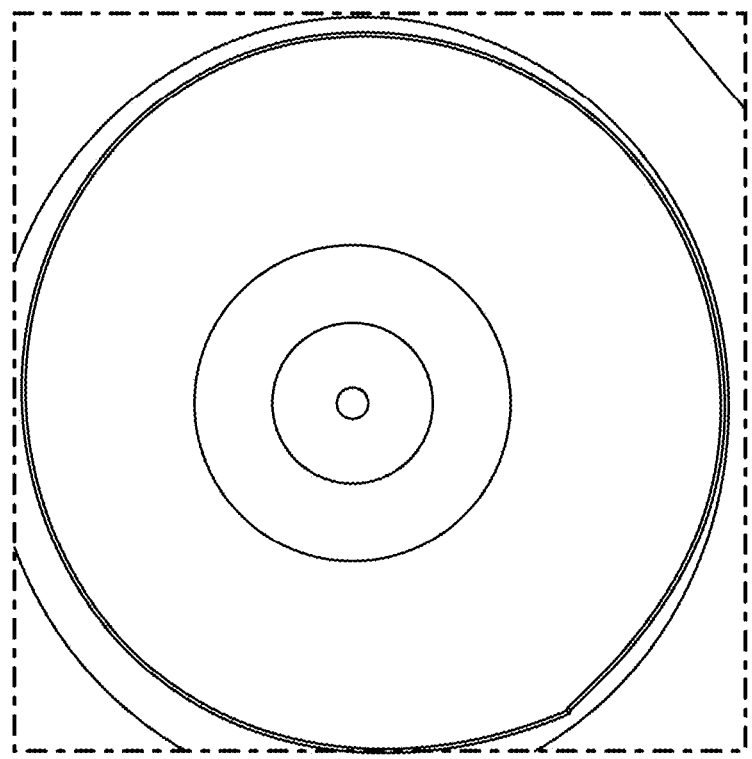
FIG. 10 provides an image of an exemplary device for epitachophoresis that was used to focus a sample into a focused zone in accordance with Example 5.

Referring to FIG. 10, 150 µL of SPADNS at a concentration of 0.137 mM was prepared in 13 mL of trailing electrolyte mixed with 3 mL of 0.9% NaCl and loaded into the device. To effect epitachophoresis, a constant power of 2 W was used. SPADNS was focused into a concentric ring-shaped focused zone, which can be seen as the red zone of FIG. 10. As the epitachophoresis zone moved from the edge towards the center of the device, eventually the focused zone of the SPADNS entered the center of the device and was collected in the center of the device, thereby demonstrating focusing and recovery of a desired sample using epitachophoresis.

The epitachophoresis device of FIG. 9A-FIG. 9B was also used to perform epitachophoresis to separate and to focus SPADNS and Patent Blue dye with acetic acid as a spacer. 20 mM HCl-histidine (pH 6.20) was used as the leading electrolyte. 5 mL of 10 mM MES Tris (pH 8.00) was used as trailing electrolyte, which was further mixed with 150 µL of 10 mm acetic acid, 150 µL of 0.1 mM Patent Blue dye, and 150 µL of 0.137 mM SPADNS. The effective mobility values ($10^{-9}$ $m^2$/Vs) of SPADNS, acetic acid, and Patent Blue dye were 55, 42, 7, and 32, respectively. The electrode reservoir of the device contained leading electrolyte HCl His (pH 6.25) at a concentration of 100 mM. No gel was used in the channel of this device for this experiment however gel was present on the top of the device platform.

Figure 11:
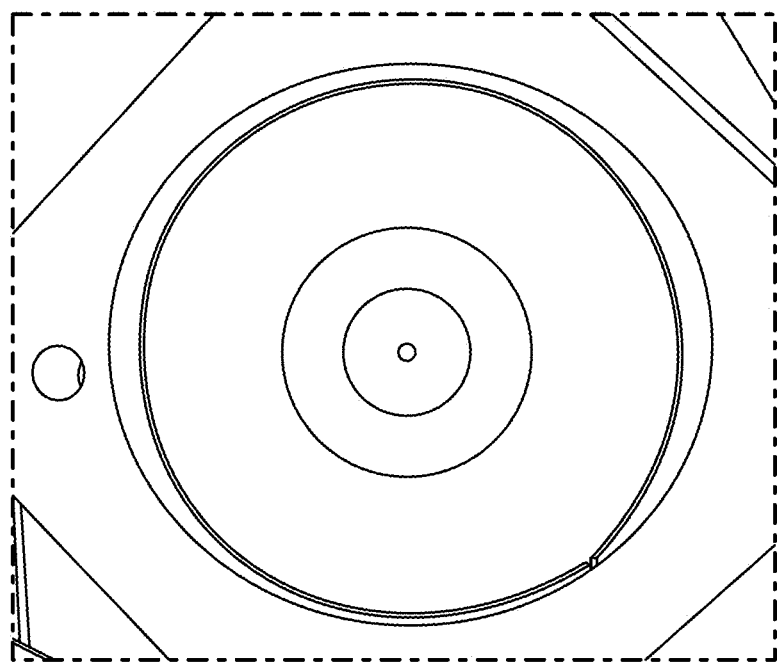
FIG. 11 provides an image of an exemplary device for epitachophoresis that was used to separate and to focus two different samples into focused zones in accordance with Example 5.

Referring to FIG. 11, the mixture of trailing electrolyte, SPADNs, acetic acid, and Patent Blue dye was loaded into the device. To effect epitachophoresis, a constant power of 2 W was used. SPADNS was focused into a concentric ring-shaped focused zone, which can be seen as the red zone/inner zone of FIG. 11, and Patent Blue dye was focused into a concentric ring-shaped focused zone as well, which can be seen as the blue zone/outer zone of FIG. 11. As the epitachophoresis zones moved from the edge towards the center of the device, eventually the focused zones of the SPADNS and the Patent Blue dye entered the center of the device sequentially and may be collected separately in the center of the device, thereby demonstrating separation, focusing and recovery of a desired samples using epitachophoresis.

Example 6: Device for ETP

Figure 12:
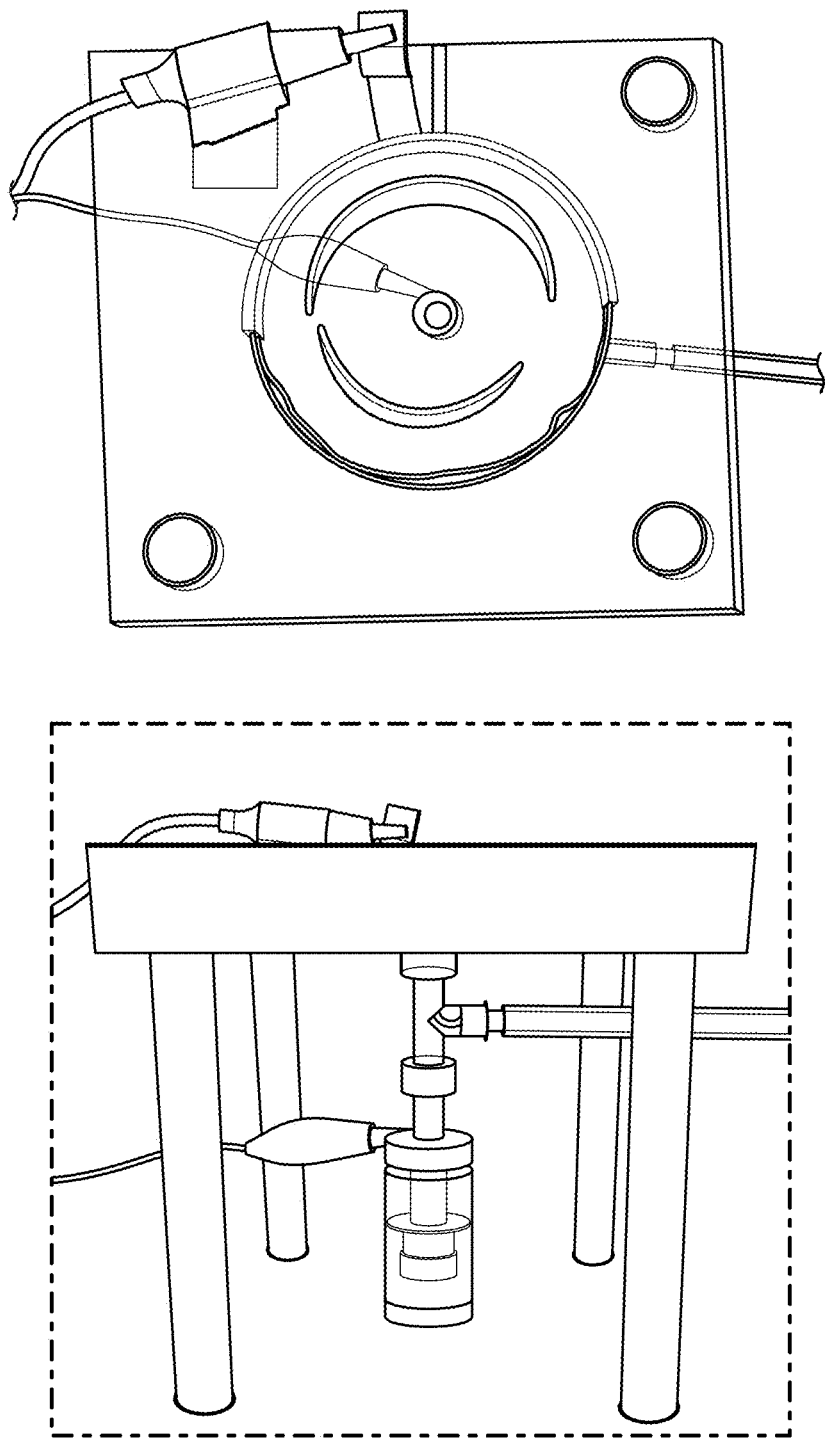
FIG. 12 provides an image of an exemplary device for epitachophoresis in accordance with Example 6.

An epitachophoresis device was designed for effecting epitachophoresis (FIG. 12). The device of FIG. 12 had a circular architecture and a circular copper tape electrode with a diameter of 5.8 cm.

Figure 13A:
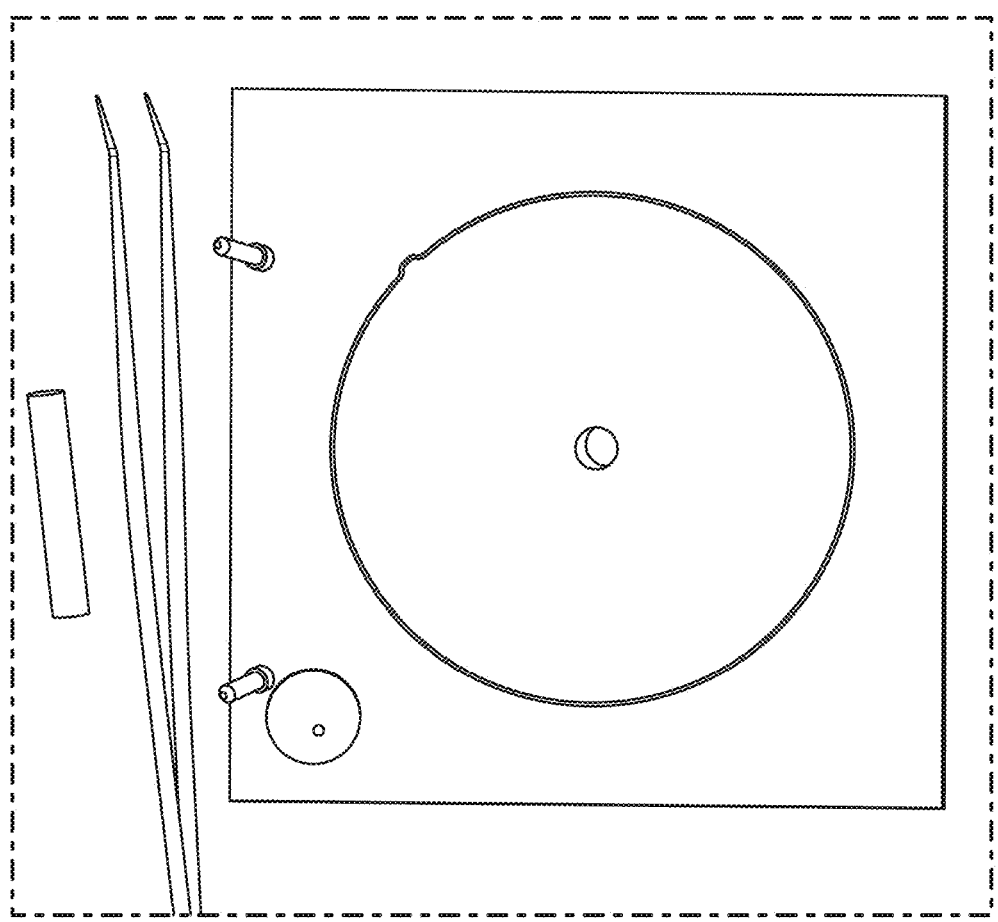
FIG. 13A provides an image of an exemplary epitachophoresis device in accordance with Example 7.
Figure 13B:
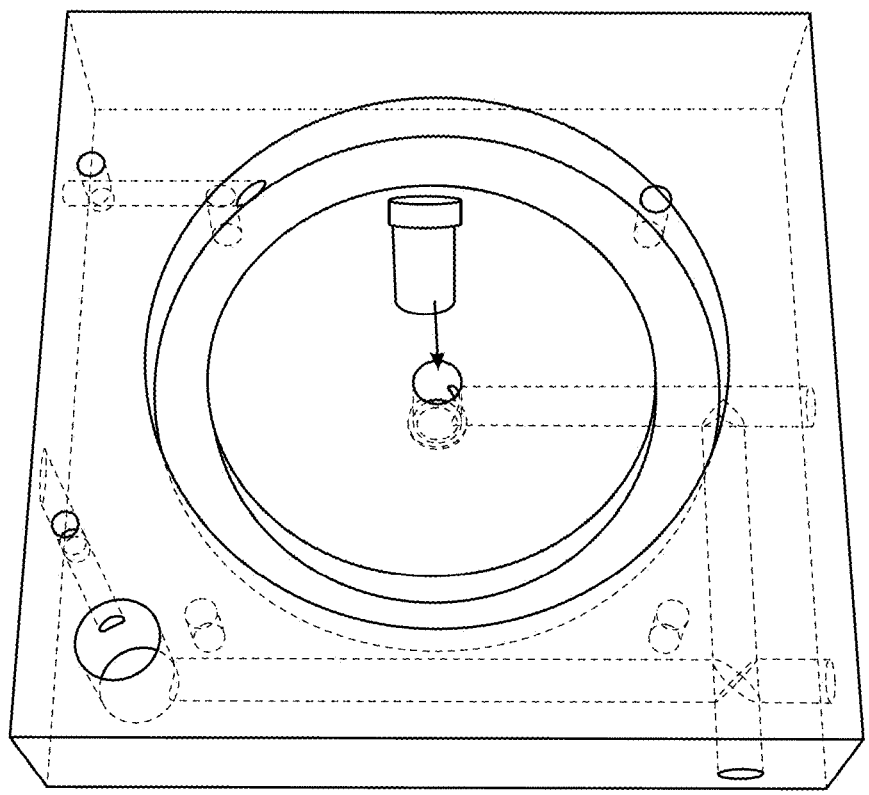
FIG. 13B provides a schematic of an exemplary epitachophoresis device in accordance with Example 7. "a" corresponds to the central collection well and "b" corresponds to the leading electrolyte reservoir.

Example 7: Exemplary System for Effecting Epitachophoresis with Conductivity-Based Sample Detection Device Construction In accordance with previous examples, an epitachophoresis device with a large sample volume capacity was machined with a circular separation channel. FIG. 13A and FIG. 13B show two views of the structure of the device. The wire ring electrode (1 mm diameter stainless steel wire; radius of 55 mm) was attached on the edge of the circular separation compartment. The sample volume was defined by the space between the ring electrode and an agarose stabilized leading electrolyte disk (radius of 35 mm). Thus, the applicable sample volume was 5.7 ml for every mm of its height. The second electrode was placed in the leading electrolyte reservoir on the side of the device. The ring electrode was connected to the upper banana type connector shown in FIG. 13A. The bottom banana connector was attached to a 3 cm long, 0.4 mm diameter platinum wire electrode positioned in the leading electrode reservoir ("b" in the scheme shown in FIG. 13B). To prevent possible interferences from electrolysis products, migrating out from the leading electrolyte reservoir towards the center collection well ("a" in the scheme shown in FIG. 13B), a 9 mm ID internal channel with a total length of 20 cm long was drilled inside the device. The side openings after drilling of the device were plugged by silicon septa. The central collection well with the diameter of 9 mm was drilled through the device and closed from the bottom by a moving Ertacetal® rod sealed by a rubber o-ring.

For every analysis, a plastic vial with a semipermeable membrane (Slide-A-Lyzer™ MINI Dialysis Units 2000 Da MWCO, Thermo Fisher Scientific, USA) was inserted into the central collection well after filling it with the leading electrolyte all the way to the leading electrode reservoir. To minimize the volume, the Slide-A-Lyser was cut in half by a razor blade creating a collection cup with a volume of less than 200 microliters. Next a 0.3% agarose gel disk (70 mm diameter, 4 mm thick) with a central 8 mm hole was prepared in the leading electrolyte, positioned in the center of the device and covered by a 75×1 mm round glass plate also having a center 8 mm hole to avoid bubble accumulation. Although various electrophoretic separation modes may be applied (e.g., zone electrophoresis, isoelectric focusing, or displacement electrophoresis), we have used epitachophoresis with an electrolyte system comprising leading (LE) and terminating (TE) electrolytes. The sample solution in the terminating electrolyte was applied by a syringe into the space between the gel disk and ring electrode. The polarity of the electric current connection was selected so that anionic sample components migrated from the ring electrode towards the collection well in the device center. After the focused sample zone entered the collection cup, the electric current was turned off, and the sample was pipetted out for further use. The empty collection cup was lifted up by the moving rod and discarded.

Electrodriven Separation Conditions

Separations were performed in negative mode, where Cl$^-$ ion served as leading ion (effective mobility $79.1 \times 10^{-9}$ m$^2$ V$^{-1}$ s$^{-1}$). Leading electrolyte (LE) contained 100 mM HCl-Histidine buffer at pH 6.2 and terminating electrolyte (TE) contained 10 mM TAPS titrated by TRIS to pH 8.30. The agarose stabilized leading electrolyte disk was prepared in 20 mM leading electrolyte (HCl-Histidine; pH 6.25). All buffers were prepared in deionized water. The power supply was provided by a PowerPac 3000 (BioRad), which was run at constant power mode at 2 W (this corresponds approximately to 16 mA and 120 V at beginning of the analysis). Analysis took approximately 1 hour (≈10 mA and 200 V at the end of analysis).

Sample Detection

Figure 14A:
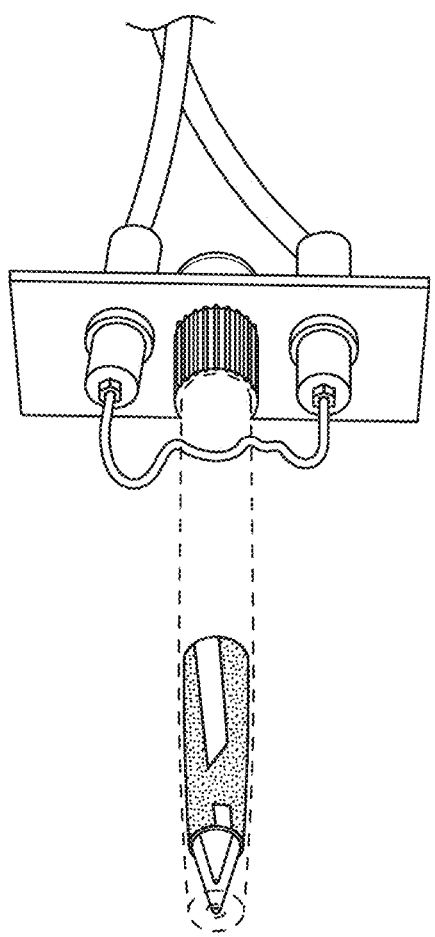
FIG. 14A provides an image of an exemplary conductivity measurement probe for use in an epitachophoresis device in accordance with Example 7.
Figure 14B:
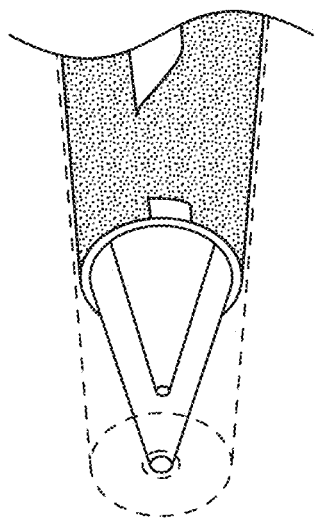
FIG. 14B provides an image showing a closer view of the conductivity measurement probe shown in FIG. 14A.

For detecting the samples, a surface resistivity detection cell was constructed and connected to the conductivity detector of a commercial ITP instrument (Villa Labeco, Sp.N.Ves, Slovakia). The detection cell was prepared as follows: two platinum (Pt) wires (300 μm×2 cm long) were attached to connectors matching the ITP instrument. The opposite ends of the Pt wires were inserted into a 1 mL pipette tip, which was then filled by a quick setting epoxy resin. Finally, 1 mm of the pipette tip with the epoxy wires embedded inside was cut by a razor blade exposing flat epoxy surface with two round Pt electrodes. See FIG. 14A and FIG. 14B. The detection cell was mounted in a laboratory stand gently touching the surface of the agarose gel disk close to the collection vial, as exemplified in FIG. 15A. This system for detection was employed to generate the conductivity trace of FIG. 15B and FIG. 17B.

Figure 16A:
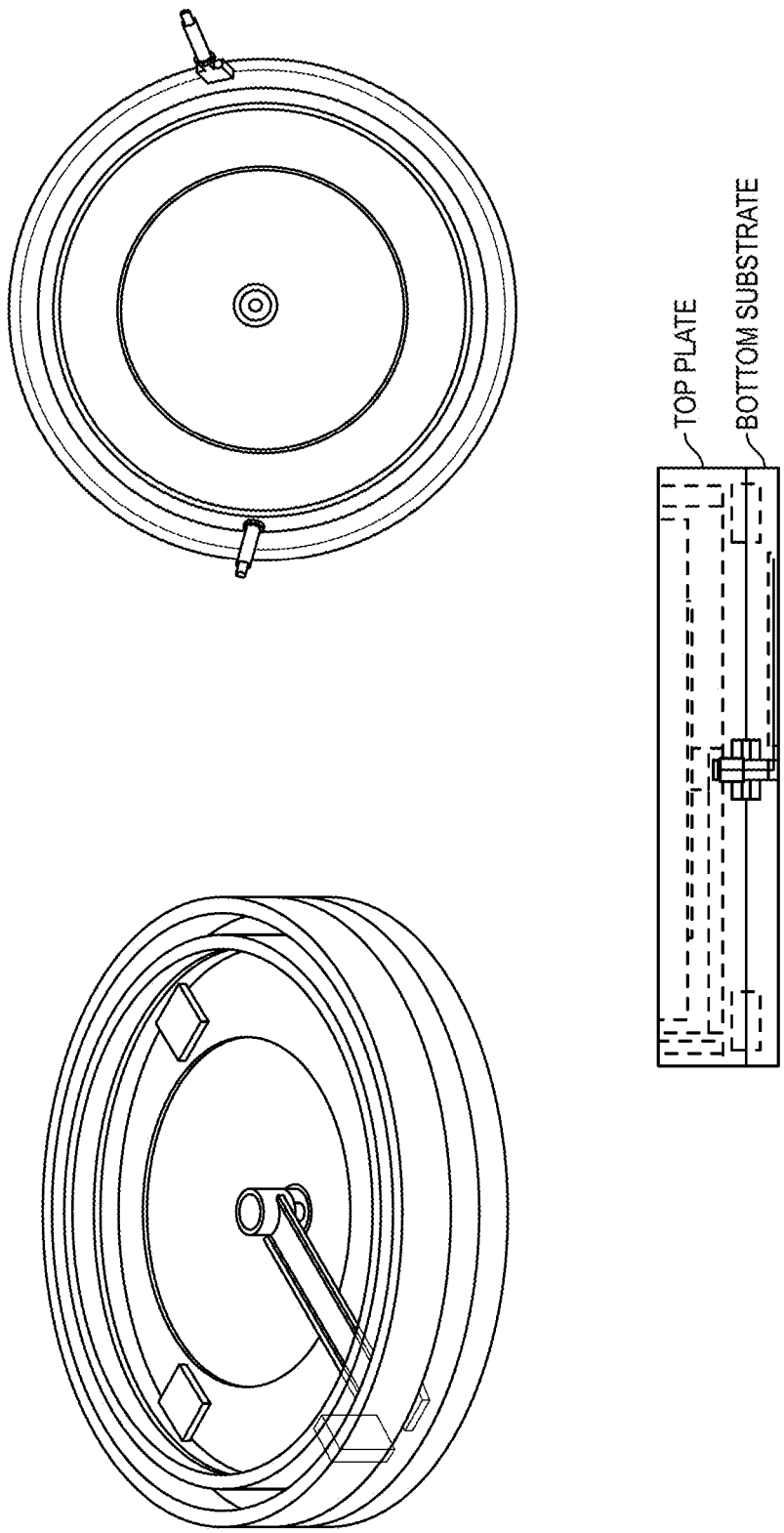
FIG. 16A provides images of an exemplary epitachophoresis device with conductivity detecting probes placed underneath the semipermeable membrane in accordance with Example 7.
Figure 16B:
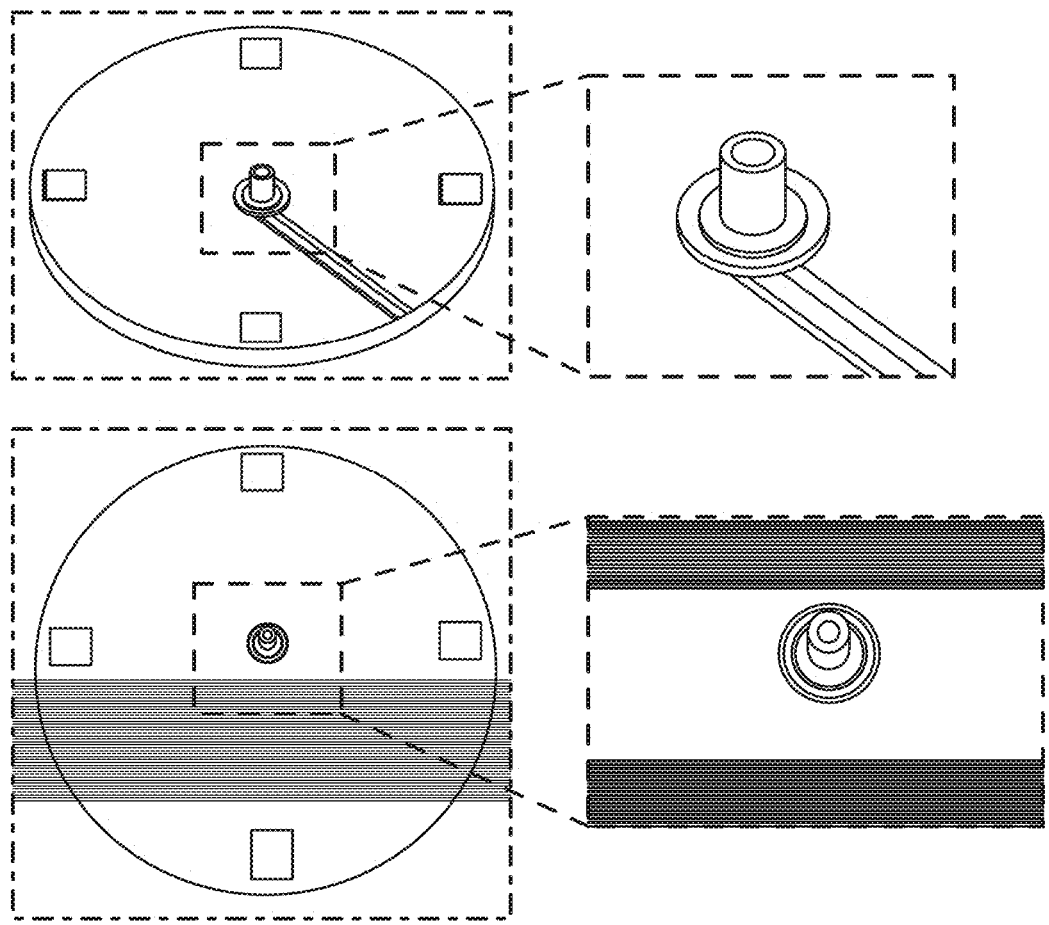
FIG. 16B provides images of an exemplary bottom substrate incorporating two conductivity detecting probes connected through dedicated channels within the central pillar.

Another exemplary system was also constructed for sample detection during epitachophoresis. In this system, surface resistivity detection probes consisting of two platinum (Pt) wires with a diameter of 500 μm were incorporated within the bottom substrate (i.e., bottom plate) of an epitachophoresis device, as shown in FIG. 16A and FIG. 16B. The tips of the wires were within proximity of the semipermeable membrane from the bottom via dedicated channels within the central pillar on the bottom substrate. The opposite ends of the wires were connected to the conductivity detector of a commercial ITP instrument (Villa Labeco, Sp.N.Ves, Slovakia). The top plate, serving as the epitachophoresis device, was assembled with the bottom substrate using magnets, while the o-ring (see FIG. 16B) enabled complete sealing between the two substrates in order to prevent any leakage.

Chemicals

Buffer components: L-histidine monohydrochloride monohydrate (99%), L-histidine (99%), N-tris(hydroxymethyl)methyl-3-aminopropanesulfonic acid (TAPS; 99.5%) and tris-(hydroxymethyl)aminomethane (TRIS; 99.8%) were purchased form Sigma-Aldrich (USA). Agarose NEEO ultra-quality Roti® garose with low electroendosmosis was purchased from Carl Roth (Germany). Acetic acid and anionic dye Patent blue V sodium salt were from Sigma-Aldrich; red anionic dye SPADNS (1,8-dihydroxy-2-(4-sulfophenylazo)naphthalene-3,6-disulfonic acid trisodium salt was from Lachema, Brno, Czech Republic.

Focusing of SPADNS and Patent Blue

Figure 15A:
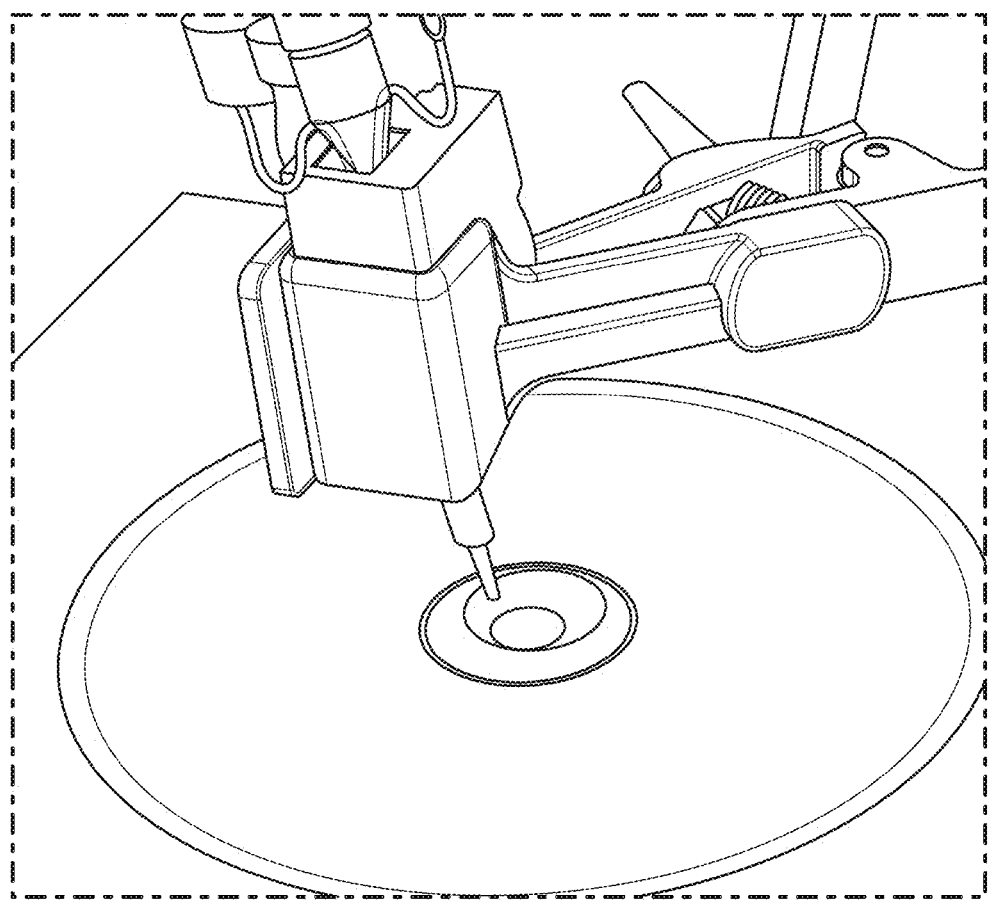
FIG. 15A provides an image of an exemplary epitachophoresis device with a conductivity probe in accordance with Example 7.
Figure 15B:
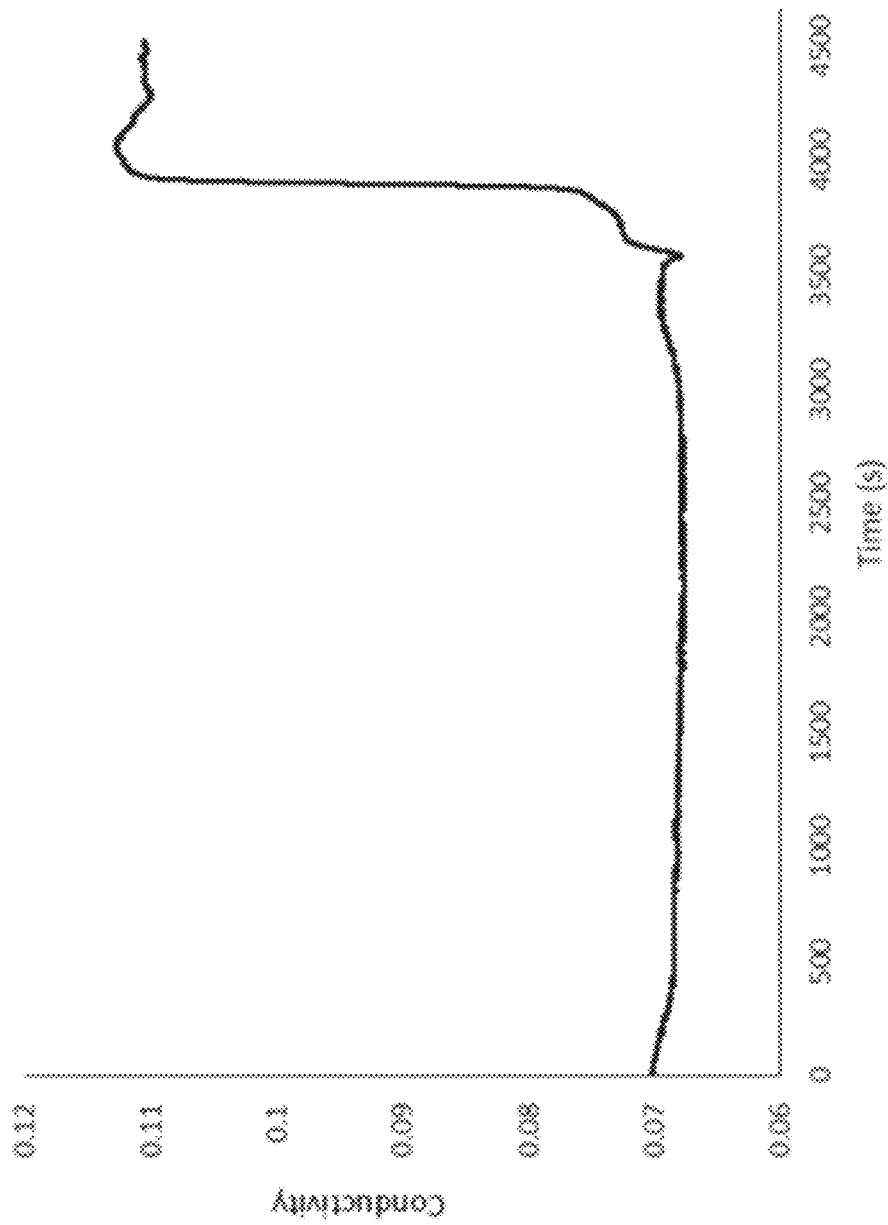
FIG. 15B provides a conductivity trace for a run of an exemplary epitachophoresis device in accordance with Example 7.

To test the above-described exemplary device comprising epitachophoresis and electrical sample detection, the device was used to focus and detect test analytes: SPADNS and Patent Blue. Leading electrolyte (LE): HCl-HIS buffered to pH 6.2. Trailing electrolyte (TE): TAPS-TRIS buffered to pH 8.3. The gel was formed from 20 ml of polyacrylamide gel 6% in 20 mM LE. 100 mM LE was added to the electrode reservoir. Sample solution: 15 ml of 10 mM TE+150 µL 0.1 mM SPADNS+150 µL 0.1 mM Patent blue. The sample solution in the terminating electrolyte was applied by a syringe into the space between the gel disk and ring electrode. The device was run in constant power mode with P=2 W. FIG. 15A provides an image of the focusing of the SPADNS and Patent Blue, showing the conductivity sample detection near the sample collection well. FIG. 15B provides the conductivity trace for this sample focusing and shows a marked change in conductivity/resistivity that was due to the transition between LE and TE, which encompassed the focused zone of sample (SPADNS and Patent blue).

DNA Analysis

Low molecular weight dsDNA ladder labeled with Fluorescein (ten fragments from 75 base pairs—bp to 1622 bp) was from Bio-Rad, USA. The DNA concentration in the collected fraction was evaluated using Qubit fluorometer (Invitrogen, Carlsbad, CA, USA) by using the high sensitivity dsDNA Qubit quantitation assay kit. The concentration of the target molecule in the sample was reported by a fluorescent dye emitting only when bound to the DNA. The collected fractions were further analyzed using the chip CGE-LIF instrument Agilent 2100 Bioanalyzer (Agilent, Santa Clara, CA, United States). This analysis provided size information of the collected DNA fragments in the sample using the high sensitivity DNA reagent kit (Agilent, United States).

DNA Focusing

Figure 17A:
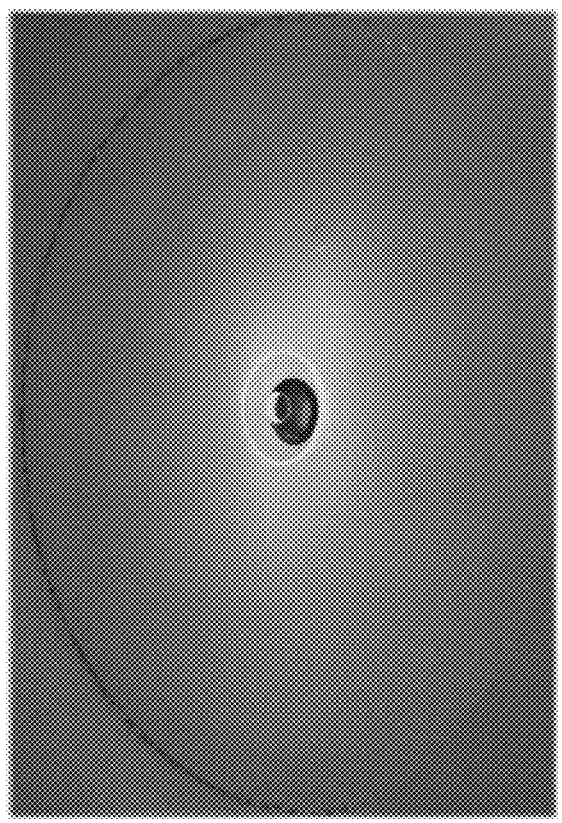
FIG. 17A provides an image of an exemplary epitachophoresis device, demonstrating the focusing of a fluorescein-labeled DNA ladder sample in accordance with Example 7.
Figure 17B:
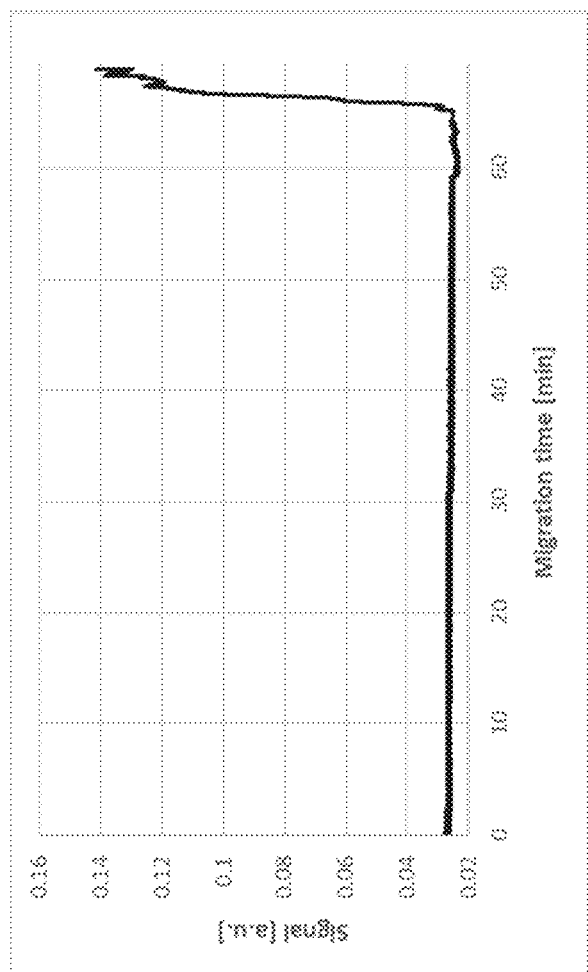
FIG. 17B provides a trace showing the resistivity change of the LE/TE transition monitored by a surface conductivity cell for a run of an exemplary epitachophoresis device in accordance with Example 7.
Figure 17C:
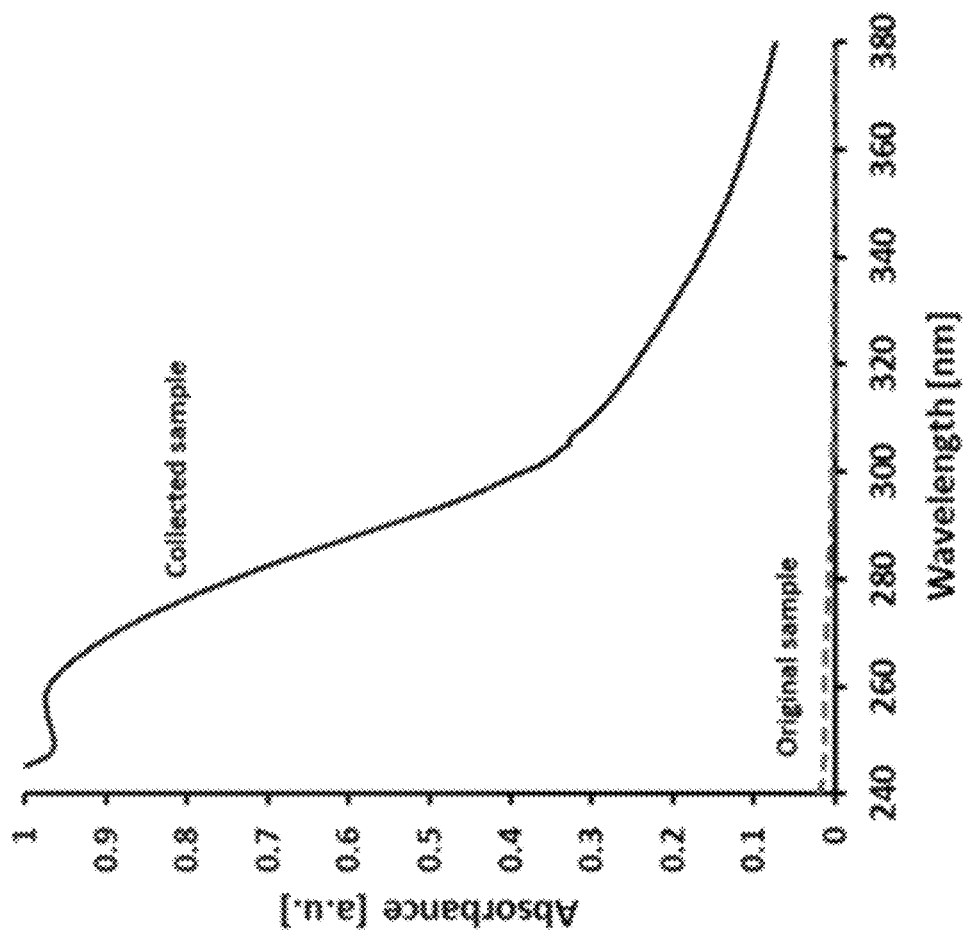
FIG. 17C provides absorbance spectra of the original sample and the collected fraction for the DNA ladder sample before and after an epitachophoresis run in accordance with Example 7.
Figure 17D:
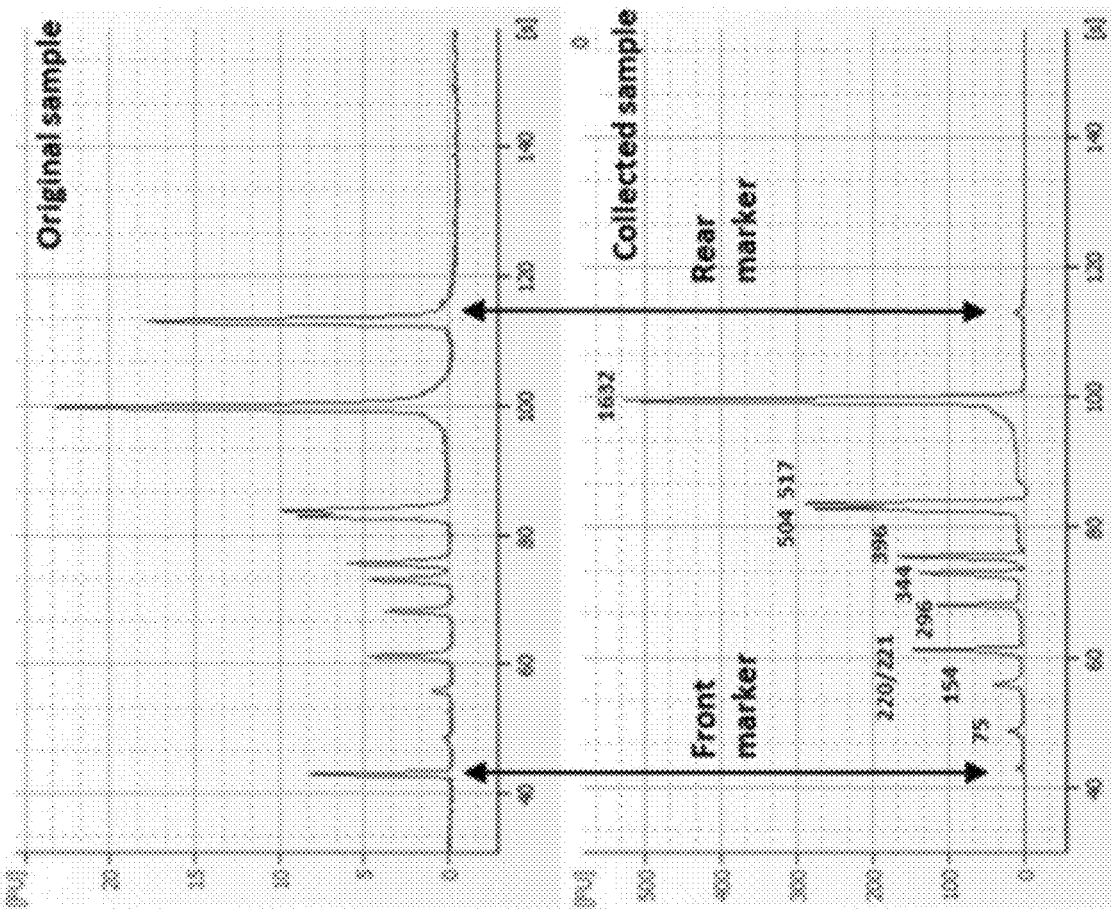
FIG. 17D provides electropherograms for the DNA ladder sample before and after an epitachophoresis run, as measured via Bioanalyzer separations in accordance with Example 7.

Electrophoretic mobilities of DNA fragments above 50 bp are approximately $37 \times 10^{-9}$ m$^2$/Vs in free solution, and short fragments (~20-50 bp) may deviate by only ~10%. Based on these mobilities, we designed a discontinuous electrolyte system suitable for focusing of all sample DNA fragments into a single concentrated zone. For experimental testing, we selected a fluorescein labeled low molecular range DNA ladder with fragment sizes ranging from 75 to 1632 bp. The fluorescence of the sample with only one fluorophore per DNA fragment was illuminated by a 2 cm radius laser beam (FIG. 17A). The surface resistivity detection was used to indicate the transition of the LE/TE boundary close to the collection well (conductivity trace shown in FIG. 17B). The overall change in resistivity from LE to TE was used as an indicator of the sample location. Based on this change, the voltage was turned off and separation was stopped. The collected fraction was analyzed by both UV spectrometry (absorbance measurements) (FIG. 17C) and Bioanalyzer-based analysis (FIG. 17D). The lower signal intensity of the front and rear markers in FIG. 17D (added at the same amount to the initial sample and to the final sample according the manufacturer's instructions) was due to the higher DNA concentration in the collected fraction. In both cases the ~30× concentration increase in the collected fraction corresponded to the decrease of the sample volume from the starting 15 mL to the sample collection volume of 280 µL in this exemplary embodiment. The volume of the migrating DNA zone prior to entering the collection cup was much smaller (~3 µL) and the final fraction concentration depends mainly on the volume of the selected collection vial.

Example 8: ETP with Voltage-Based Sample Detection

In the present example, three independent ETP runs were performed to focus and collect cfDNA from 1 mL of plasma using an ETP device, and the voltage was measured during the time course of each of the three independent ETP runs. Each of the three ETP runs was 75 minutes in length. The power level at the beginning of each ETP run was 6 W. The power level was subsequently lowered to 3 W at 30 min., and then lowered to 2 W at 60 min. The results obtained during each of the three independent ETP runs are presented in FIG. 18.

Figure 18:
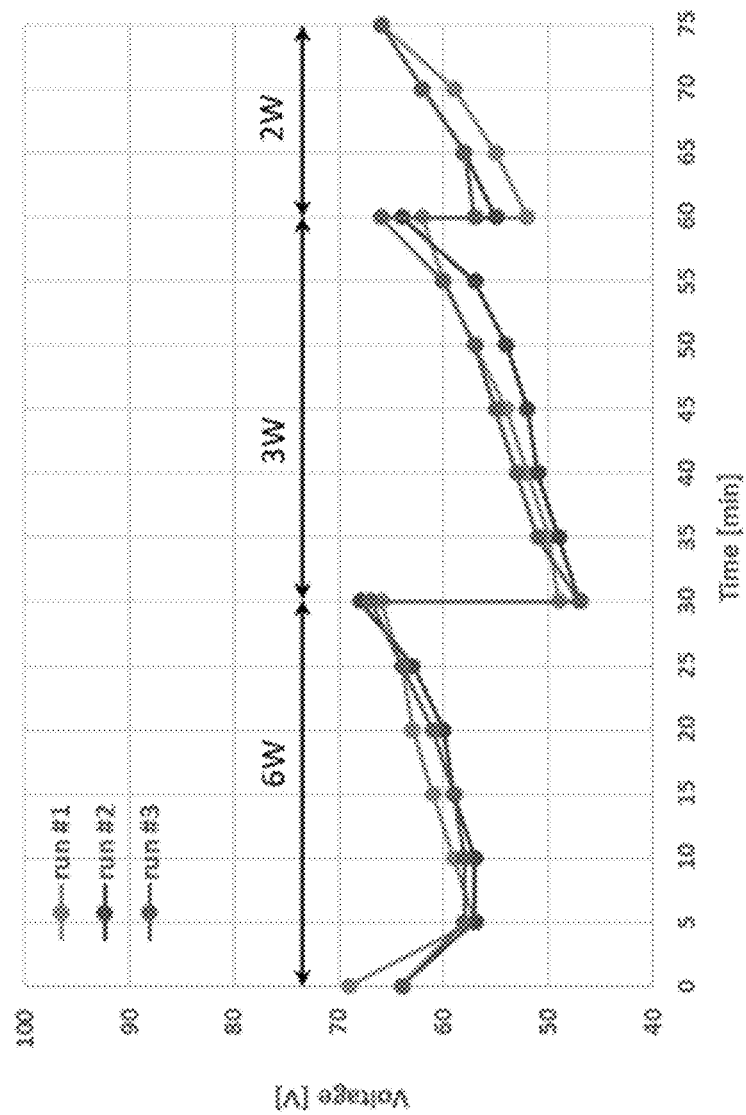
FIG. 18 provides voltage profiles for three independent ETP runs in accordance with Example 8.

Referring now to FIG. 18, in each stage during which the power was kept constant, the voltage gradually increased. In the last stage (2 W power, 60 min. to 75 min.), the voltage was 65 V when the focused zone comprising the nucleic acid molecules migrated into the collection cup. Voltage profiles were observed to be consistent when comparing each of the three independent runs, which indicated that the voltage feedback from the power supply could be used to monitor the location of the nucleic acid molecules within the device.

Example 9: ETP with Optical-Based Sample Detection

Figure 19A:
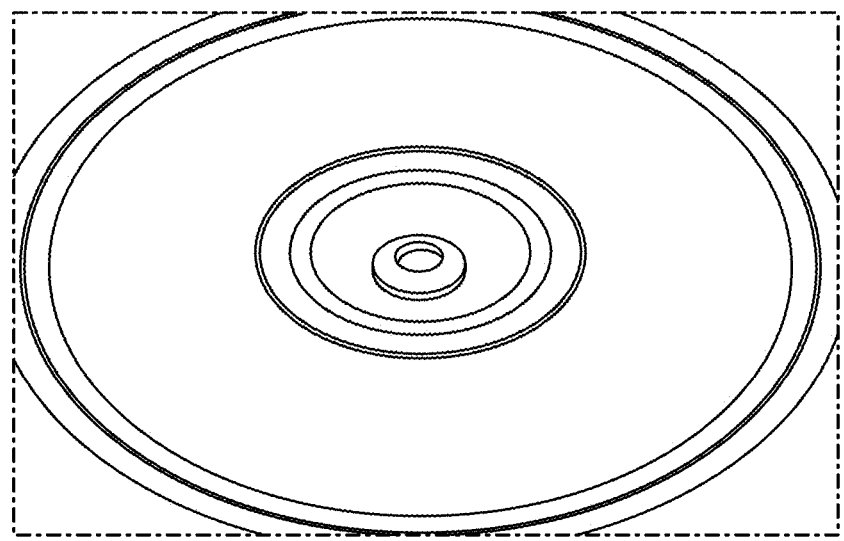
FIG. 19A provides an image of an ETP device during an ETP run in accordance with Example 9.
Figure 19B:
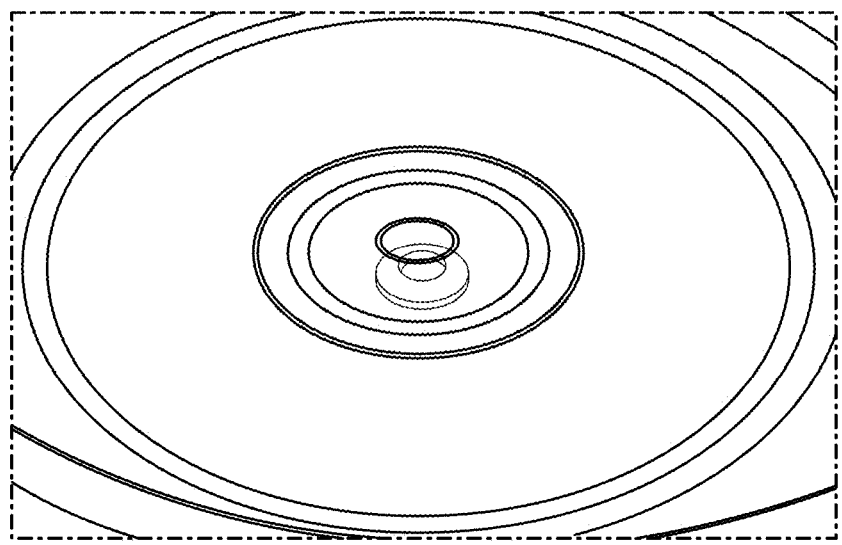
FIG. 19B provides a fluorescence-based image of an ETP device taken during an ETP run in accordance with Example 9.
Figure 19C:
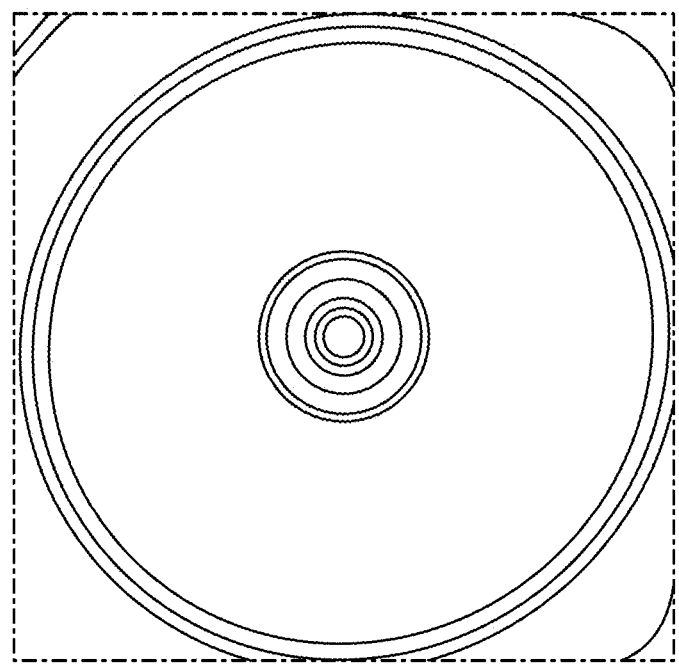
FIG. 19C provides an image of an ETP device taken during an ETP run in accordance with Example 9.
Figure 19D:
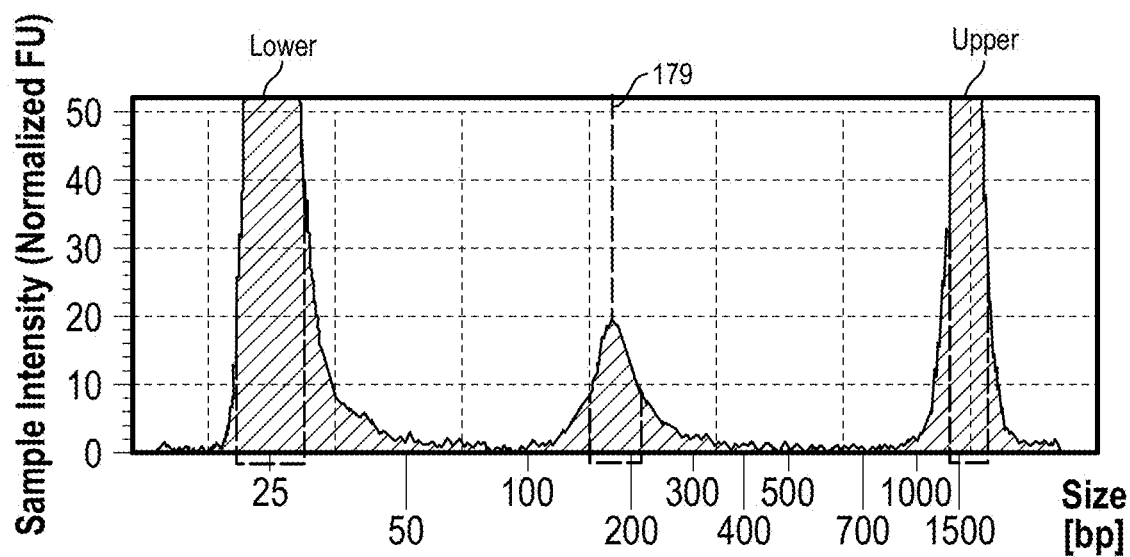
FIG. 19D provides an electropherogram for the focused and collected ETP sample analyzed in accordance with Example 9.

In the present example, ETP runs were performed using optical detection with colored dye to monitor the position of nucleic acids during the ETP runs. A chromatic dye with an electrophoretic mobility lower than nucleic acids can be used to enable optical tracking of the location of nucleic acids. For example, such dyes include Brilliant blue FCF, Indigo carmine, Sunset yellow FCF, Allura red, Fast green FCF, Patent blue V and Carmoisine. In the present example, two independent ETP runs were performed to focus and collect nucleic acid molecules using brilliant blue dye as an optical marker (see ETP Run 1: FIG. 19A-FIG. 19B; and ETP Run 2: FIG. 19C-FIG. 19D).

FIG. 19A presents an image of an ETP device during an ETP run in which Brilliant Blue dye was used as an optical marker during focusing and collection of nucleic acid molecules, and also in which SYBR-gold dye was further used to monitor the position of the nucleic acid molecules. The electrophoretic mobility of the blue dye was lower than that of the nucleic acids, and, as such, the blue dye migrated after the focused zone comprising the nucleic acid. Contaminant appeared as a brown-colored focused zone (see FIG. 19A). In addition to the photographic image of FIG. 19A, a fluorescence-based image was taken during the ETP run (see FIG. 19B). The fluorescence-based image of FIG. 19B demonstrates that the focused zone comprising the band comprising DNA labeled with SYBR-gold migrated faster than the brilliant blue dye.

FIG. 19C presents an image of an ETP device during an ETP run in which Brilliant Blue was used as an optical marker during focusing and collection of nucleic acid molecules. A plasma sample comprising cfDNA was used for the ETP run of FIG. 19C and FIG. 19D. The ETP run was stopped once the dye band reached the collection well. After focusing and collecting the cfDNA, analysis was performed on the focused and collected cfDNA sample using an Agilent TapeStation system (see FIG. 19D). The electropherogram (see FIG. 19D) showed a peak at 179 bp representing the desired cfDNA molecules which were focused and collected during the ETP run, thereby demonstrating the utility of Brilliant blue dye to monitor the location of nucleic acids.

Example 10: ETP with Thermal-Based Sample Detection

In the present example, an ETP run was performed in which thermal imaging was used during focusing and collection of a DNA ladder. For the thermal imaging of the present example, an infrared-based thermal imaging camera (SEEK thermal ShotPro) was used. Additionally, fluorescence imaging was used. Thermal and fluorescent images were taken at four sequential time points of 20 min., 40 min., 42 min., and 44 min. (see FIG. 20A-FIG. 20B). Furthermore, the voltage feedback from the power supply was measured during the ETP run.

FIG. 20A presents thermal images that were taken at four time points during the ETP run: 20 min., 40 min., 42 min., and 44 min. It was observed that the temperature at the center of the device increased by 17° C. (from 38° C. to 55° C.) between 40 and 44 min., during which the DNA ladder, visible as the green-fluorescent ring in FIG. 20B, moved into the center collection cup.

Figure 20C:
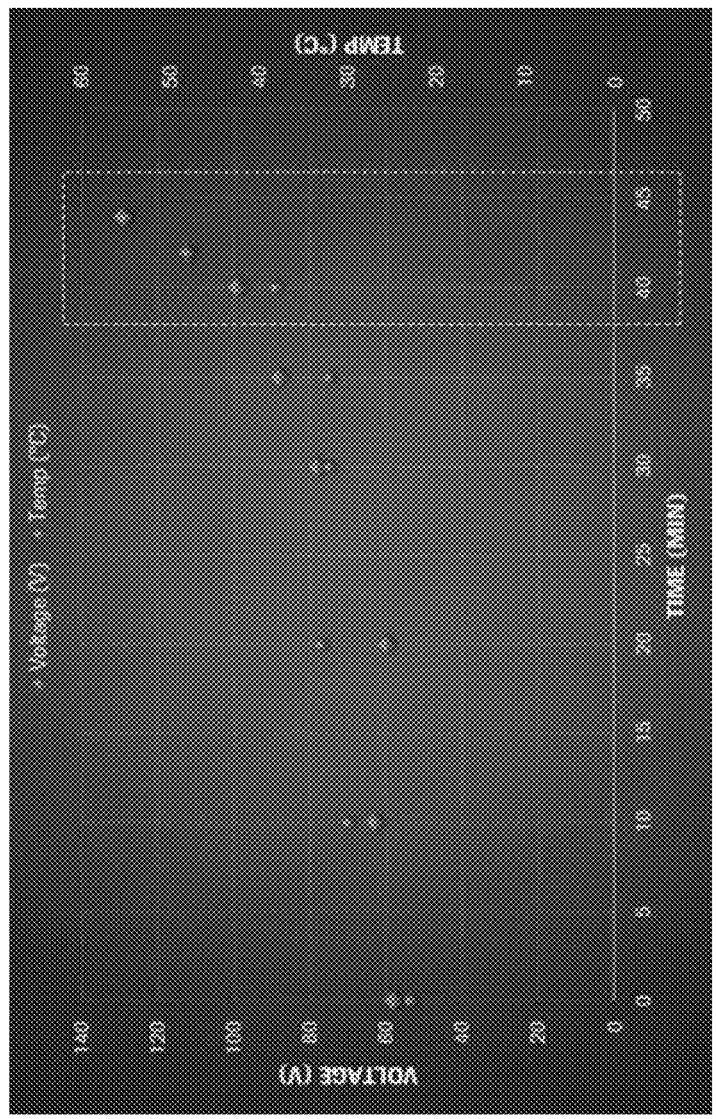
FIG. 20C presents data related to the voltage change and temperature change over time during an ETP run in accordance with Example 10.

FIG. 20C presents the voltage and temperature change over time during the ETP run of the present example. It was observed that the trend of the voltage change over time was similar to that of the temperature change over time. As such, the voltage feedback from the power supply provided an additional means for monitoring the location of DNA ladder molecules within the device.

The invention claimed is:

1. A method of automated sample analysis, wherein said method comprises:
   (a) providing a device comprising an arrangement of electrodes sufficient for epitachophoresis, the device comprising
      i. an outer circular first electrode:
      ii. a channel comprising a terminating electrolyte:
      iii. a circular gel comprising a leading electrolyte:
      iv. a sample collection reservoir in the center of the circular gel:
      v. a second electrode in the center of the circular gel:
      vi. a detector configured to detect the presence of a sample in the sample collection reservoir using voltage, current, conductivity, resistivity, temperature, color, or fluorescence: and
      vii. an automated sample collection device;
   (b) providing the sample on said device, wherein the sample comprises one or more target analytes;
   (c) applying a voltage difference between the first electrode and the second electrode;
   (d) flowing, using the voltage difference, the one or more target analytes in one or more focused zones through the circular gel toward the second electrode;
   (e) detecting the location of said one or more target analytes using the detector; and
   (f) automated collecting of said one or more target analytes from the sample collection reservoir using the automated sample collection device.

2. The method of claim 1, further comprising providing at least one optical marker on said device.

3. The method of claim 2, wherein the at least one optical marker comprises a first optical marker and a second optical marker, the first optical marker having an electrophoretic mobility faster than the electrophoretic mobility of a target analyte of the one or more target analytes, and the second optical marker having an electrophoretic mobility slower than the electrophoretic mobility of the target analyte.

4. The method of claim 1, wherein the automated collecting of said one or more target analytes is triggered by the detection detecting the location of said one or more target analytes.

5. The method of claim 1, wherein the automated collecting of said one or more target analytes comprises aspirating and dispensing liquid.

6. A device for sample analysis comprising the following arranged in concentric circles:
   a) an outer circular first electrode;
   b) a channel comprising a terminating electrolyte;
   c) a circular gel comprising a leading electrolyte;
   d) a sample collection reservoir in the center of the circular gel;
   e) a second electrode in the center of the circular gel;
   f) a detector configured to detect the presence of a sample in the sample collection reservoir using voltage, current, conductivity, resistivity, temperature, color, or fluorescence; and
   g) an automated sample collection device.

7. The device of claim 6, further comprising a feedback control configured to terminate device operation based on an output from the detector.

8. The device of claim 6, further comprising a feedback control configured to trigger collection of the sample based on an output from the detector.

9. The device of claim 6, wherein the detector comprises a surface resistivity detection probe.

10. The device of claim 6, wherein the detector comprises an infrared thermal imaging camera.

11. The device of claim 6, wherein the detector comprises a fluorescence imaging camera.

12. A device for sample analysis comprising the following arranged in concentric circles:
   a) an outer circular first electrode disposed at an edge of a channel;
   b) a sample collection reservoir in the center of the channel;
   c) a second electrode in the center of the channel;

d) a detector configured to detect the presence of a sample in the sample collection reservoir using voltage, current, conductivity, resistivity, temperature, color, or fluorescence; and e) an automated sample collection device.

13. The device of claim 12, further comprising a feedback control configured to terminate device operation based on an output from the detector.

14. The device of claim 12, further comprising a feedback control configured to trigger collection of the sample based on an output from the detector.

15. The device of claim 12, wherein the detector comprises a surface resistivity detection probe.

16. The device of claim 12, wherein the detector comprises an infrared thermal imaging camera.

17. The device of claim 12, wherein the detector comprises a fluorescence imaging camera.

* * * * *